US011206460B2

(12) United States Patent
Stadelmeier et al.

(10) Patent No.: US 11,206,460 B2
(45) Date of Patent: Dec. 21, 2021

(54) TRANSMITTER AND TRANSMISSION METHOD FOR TRANSMITTING PAYLOAD DATA AND EMERGENCY INFORMATION

(71) Applicant: Saturn Licensing LLC, New York, NY (US)

(72) Inventors: Lothar Stadelmeier, Stuttgart (DE); Makiko Kan, Tokyo (JP); Nabil Loghin, Freiberg (DE); Daniel Schneider, Stuttgart (DE); Jan Zoellner, Braunschweig (DE); Lachlan Bruce Michael, Tokyo (JP); Yuji Shinohara, Tokyo (JP); Samuel Asangbeng Atungsiri, Basingstoke (GB); Gholam Hosein Asjadi, Guildford (GB); Matthew Paul Athol Taylor, Weybridge (GB)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 14/894,131

(22) PCT Filed: Jun. 3, 2014

(86) PCT No.: PCT/EP2014/061467
§ 371 (c)(1),
(2) Date: Nov. 25, 2015

(87) PCT Pub. No.: WO2014/195303
PCT Pub. Date: Dec. 11, 2014

(65) Prior Publication Data
US 2016/0094895 A1    Mar. 31, 2016

(30) Foreign Application Priority Data

Jun. 5, 2013  (EP) .................................... 13170706

(51) Int. Cl.
*H04N 21/81* (2011.01)
*H04H 20/59* (2008.01)
(Continued)

(52) U.S. Cl.
CPC .......... *H04N 21/814* (2013.01); *H04H 20/59* (2013.01); *H04L 1/0009* (2013.01);
(Continued)

(58) Field of Classification Search
None
See application file for complete search history.

(56) References Cited

U.S. PATENT DOCUMENTS 7,388,922 B2  6/2008 Yamagata
7,440,506 B2  10/2008 Atungsiri et al.
(Continued)

FOREIGN PATENT DOCUMENTS

CN          1487741 A    4/2004
CN        101569188 A    10/2009
(Continued)

OTHER PUBLICATIONS

Office Action dated Oct. 20, 2016 in Canadian Patent Application No. 2,904,775.
(Continued)

*Primary Examiner* — Ricky Chin
(74) *Attorney, Agent, or Firm* — Oblon, McClelland, Maier & Neustadt, L.L.P.

(57) ABSTRACT

A transmitter for transmitting payload data and emergency information using data symbols in a single-carrier or multi-carrier broadcast system includes a modulator configured to modulate one or more transmission symbols with signaling data for use in detecting and recovering the payload data at a receiver and to modulate one or more transmission symbols with the payload data. An emergency information
(Continued)

receiver receives emergency information carrying information of an actual emergency. An emergency information embedder embeds emergency information into one or more transmission symbols, wherein the emergency information is embedded within a predetermined time period after its reception by using a resource used for carrying signaling data and/or payload data if no emergency information shall be transmitted. A transmission unit transmits the transmission symbols.

18 Claims, 31 Drawing Sheets

(51) Int. Cl.
  H04L 1/00 (2006.01)
  H04L 27/34 (2006.01)
  H04N 21/2383 (2011.01)
  H04N 21/2362 (2011.01)
  H04N 21/488 (2011.01)
  H04N 21/438 (2011.01)
  H04N 21/235 (2011.01)
  H04N 21/236 (2011.01)
  H04N 21/435 (2011.01)

(52) U.S. Cl.
  CPC .......... H04L 1/0015 (2013.01); H04L 1/0057 (2013.01); H04L 1/0071 (2013.01); H04L 27/345 (2013.01); H04L 27/3455 (2013.01); H04N 21/235 (2013.01); H04N 21/2362 (2013.01); H04N 21/2383 (2013.01); H04N 21/23614 (2013.01); H04N 21/435 (2013.01); H04N 21/4382 (2013.01); H04N 21/4882 (2013.01); H04L 1/0065 (2013.01)

(56) References Cited

U.S. PATENT DOCUMENTS

| | | | |
|---|---|---|---|
| 9,008,203 B2 | 4/2015 | Asjadi | |
| 9,065,711 B2 | 6/2015 | Asjadi | |
| 9,369,325 B2* | 6/2016 | Kim | H04L 5/0026 |
| 9,432,235 B2 | 8/2016 | Asjadi | |
| 9,774,893 B2* | 9/2017 | Moon | H04N 21/2383 |
| 2003/0093788 A1* | 5/2003 | Takenaka | H04N 21/4394 725/33 |
| 2005/0159132 A1* | 7/2005 | Wright | H04L 51/00 455/404.1 |
| 2006/0072623 A1* | 4/2006 | Park | H04H 20/28 370/487 |
| 2007/0079337 A1* | 4/2007 | Vincent | H04H 20/67 725/62 |
| 2007/0171889 A1* | 7/2007 | Kwon | H04W 72/082 370/350 |
| 2007/0194906 A1* | 8/2007 | Sink | G08B 17/10 340/506 |
| 2007/0204291 A1* | 8/2007 | Ichihashi | H04N 5/4401 725/33 |
| 2008/0043712 A1* | 2/2008 | Hart | H04B 7/15507 370/348 |
| 2008/0070546 A1* | 3/2008 | Lee | H04W 76/50 455/404.2 |
| 2008/0101306 A1* | 5/2008 | Bertrand | H04L 27/2613 370/336 |
| 2008/0127259 A1* | 5/2008 | Hong | H04L 67/16 725/39 |
| 2008/0225892 A1 | 9/2008 | Vare et al. | |
| 2008/0316961 A1* | 12/2008 | Bertrand | H04L 5/00 370/329 |
| 2009/0154547 A1 | 6/2009 | Yousef | |
| 2009/0168909 A1 | 7/2009 | Stadelmeier et al. | |
| 2009/0180596 A1* | 7/2009 | Reynolds | H04L 12/66 379/48 |
| 2009/0239497 A1* | 9/2009 | Sennett | H04W 76/50 455/404.1 |
| 2009/0251315 A1* | 10/2009 | Lee | H04W 4/06 340/540 |
| 2009/0257520 A1 | 10/2009 | Lin et al. | |
| 2009/0276804 A1* | 11/2009 | Hamada | G08B 27/008 725/33 |
| 2010/0105405 A1* | 4/2010 | Vujcic | H04L 5/0053 455/452.1 |
| 2010/0118994 A1 | 5/2010 | Park et al. | |
| 2010/0124292 A1 | 5/2010 | Rajagopal | |
| 2010/0124300 A1 | 5/2010 | Rajagopal | |
| 2010/0158047 A1* | 6/2010 | Lee | H04H 20/103 370/474 |
| 2010/0208602 A1* | 8/2010 | Stolt | H04L 1/205 370/252 |
| 2010/0210243 A1* | 8/2010 | Vujcic | H04B 1/7073 455/411 |
| 2010/0284477 A1* | 11/2010 | Kwon | H04B 7/0417 375/260 |
| 2010/0322184 A1 | 12/2010 | Xiao | |
| 2011/0002378 A1* | 1/2011 | Raveendran | H04H 60/41 375/240.01 |
| 2011/0007730 A1* | 1/2011 | Han | H04J 11/003 370/342 |
| 2011/0013720 A1* | 1/2011 | Lee | H04J 3/0682 375/295 |
| 2011/0019622 A1* | 1/2011 | Lee | H04L 5/0007 370/328 |
| 2011/0096867 A1 | 4/2011 | Kang et al. | |
| 2011/0154391 A1* | 6/2011 | Velazquez | H04H 20/59 725/33 |
| 2011/0197223 A1* | 8/2011 | Ravula | H04N 21/814 725/33 |
| 2011/0212701 A1* | 9/2011 | Xing | H04H 40/27 455/404.1 |
| 2011/0289527 A1* | 11/2011 | Wei | H04H 60/13 725/33 |
| 2011/0299381 A1 | 12/2011 | Ge et al. | |
| 2012/0028570 A1* | 2/2012 | Sun | H04L 1/0618 455/9 |
| 2012/0030703 A1* | 2/2012 | Strong | H04H 20/59 725/33 |
| 2012/0148210 A1 | 6/2012 | Ichihashi | |
| 2012/0183022 A1 | 7/2012 | Stadelmeier et al. | |
| 2012/0243629 A1 | 9/2012 | van Houtum et al. | |
| 2013/0023227 A1* | 1/2013 | Yokoyama | H04W 4/90 455/404.1 |
| 2014/0002941 A1 | 1/2014 | Atungsir et al. | |
| 2014/0010179 A1* | 1/2014 | Lee | H04W 72/0406 370/329 |
| 2014/0010180 A1* | 1/2014 | Lee | H04W 72/04 370/329 |
| 2014/0064263 A1* | 3/2014 | Cheng | H04W 8/005 370/350 |
| 2014/0071957 A1* | 3/2014 | Xu | H04W 4/70 370/336 |
| 2014/0085107 A1* | 3/2014 | Gutierrez | G08G 1/096716 340/905 |
| 2014/0133332 A1* | 5/2014 | Lee | H04W 88/04 370/252 |
| 2014/0198875 A1* | 7/2014 | Kim | H04L 5/0007 375/295 |
| 2014/0269981 A1 | 9/2014 | Asjadi | |
| 2014/0269982 A1* | 9/2014 | Asjadi | H04L 25/0226 375/295 |
| 2014/0294002 A1* | 10/2014 | Kim | H04L 27/2613 370/390 |
| 2014/0294124 A1 | 10/2014 | Atungsiri et al. | |
| 2015/0058908 A1* | 2/2015 | Ko | H04N 21/23424 725/116 |
| 2015/0071153 A1* | 3/2015 | Hong | H04L 5/0023 370/311 |

(56) References Cited

U.S. PATENT DOCUMENTS

| | | | |
|---|---|---|---|
| 2015/0078473 A1* | 3/2015 | Ko | H04H 20/57 375/267 |
| 2015/0163085 A1 | 6/2015 | Stadelmeier et al. | |
| 2015/0256375 A1 | 9/2015 | Asjadi | |
| 2015/0258375 A1 | 9/2015 | Asjadi | |
| 2015/0334758 A1* | 11/2015 | Kim | H04W 76/14 370/329 |
| 2015/0372775 A1* | 12/2015 | Kwak | H04L 1/0041 455/3.01 |
| 2016/0044693 A1* | 2/2016 | Sun | H04W 72/10 370/336 |
| 2016/0094895 A1* | 3/2016 | Stadelmeier | H04L 1/0015 725/33 |
| 2016/0227274 A1* | 8/2016 | Oh | H04N 21/6336 |
| 2017/0142497 A1* | 5/2017 | Kim | H04L 69/22 |
| 2019/0122536 A1* | 4/2019 | McCormick | G08B 27/008 |

FOREIGN PATENT DOCUMENTS

| | | |
|---|---|---|
| CN | 101854324 A | 10/2010 |
| CN | 102292951 A | 12/2011 |
| CN | 102652415 A | 8/2012 |
| DE | 102 10 656 A1 | 5/2003 |
| EP | 2 071 757 A1 | 6/2009 |
| JP | 2007-228046 A1 | 9/2007 |
| JP | 2010-136434 A | 6/2010 |
| KR | 10-2010-0001687 | 1/2010 |
| TW | 443059 B | 6/2001 |
| WO | WO 2008/129845 A1 | 10/2008 |
| WO | WO 2011/120213 A1 | 10/2011 |

OTHER PUBLICATIONS

U.S. Appl. No. 14/226,937, filed Mar. 27, 2014, US 2014-0294124-A1, Atungsiri et al.
U.S. Appl. No. 14/721,886, filed May 26, 2015, US 2015-0256375-A1, Asjadi.
U.S. Pat. No. 9,008,203, filed Apr. 14, 2015, Asjadi.
U.S. Pat. No. 9,065,711, filed Jun. 23, 2015, Asjadi.
U.S. Appl. No. 14/778,922, filed Sep. 21, 2015, Atungsiri.
U.S. Appl. No. 14/786,725, filed Oct. 23, 2015, Stadelmeier et al.
U.S. Appl. No. 14/412,265, filed Dec. 31, 2014, US 2015-0163085-A1, Stadelmeier et al.
U.S. Appl. No. 14/778,954, filed Sep. 21, 2015, Atungsiri.
International Search Report dated Oct. 7, 2014 in PCT/EP14/061467 Filed Jun. 3, 2014.
Office Action dated Apr. 19, 2017 in Mexican Patent Application No. MX/a/2015/016515 (with English language translation).
Search Report dated Oct. 16, 2017 in Chinese Patent Application No. 201480014485.8 (with English language translation of Combines Office Action and Search Report).
Combined Chinese Office Action and Search Report dated Dec. 28, 2017 in corresponding Patent Application No. 201480032596.1 (with English Translation) citing documents AA, AO and AP therein, 21 pages.
Office Action dated Aug. 14, 2017 in co-pending U.S. Appl. No. 14/894,131.
International Search Report and Written Opinion dated Apr. 29, 2014 in PCT/GB2014/050441.
European Search Report dated Sep. 12, 2013, in European Application No. GB1304531.5.
Jong-Seob Baek et al., "Efficient Pilot Patterns and Channel Estimations for MIMO-OFDM Systems." Sections II-III, IEEE Transcribers on Broadcasting, vol. 58, No. 4, Dec. 2012, pub. IEEE, US, pp. 648-653.
ETSI EN 302 755 V1.3.1 (Apr. 2012). Digital Video Broadcasting (DVB); Frame structure channel coding and modulation for a second generation digital terrestrial television broadcasting system (DVB-T2); European standard; pp. 1-188.
"Final Report on ATSC 3.0 Next Generation Broadcast Television" Advanced Television Systems Committee, ATSC Planning Team 2, Sep. 21, 2011, pp. 1-40.

* cited by examiner

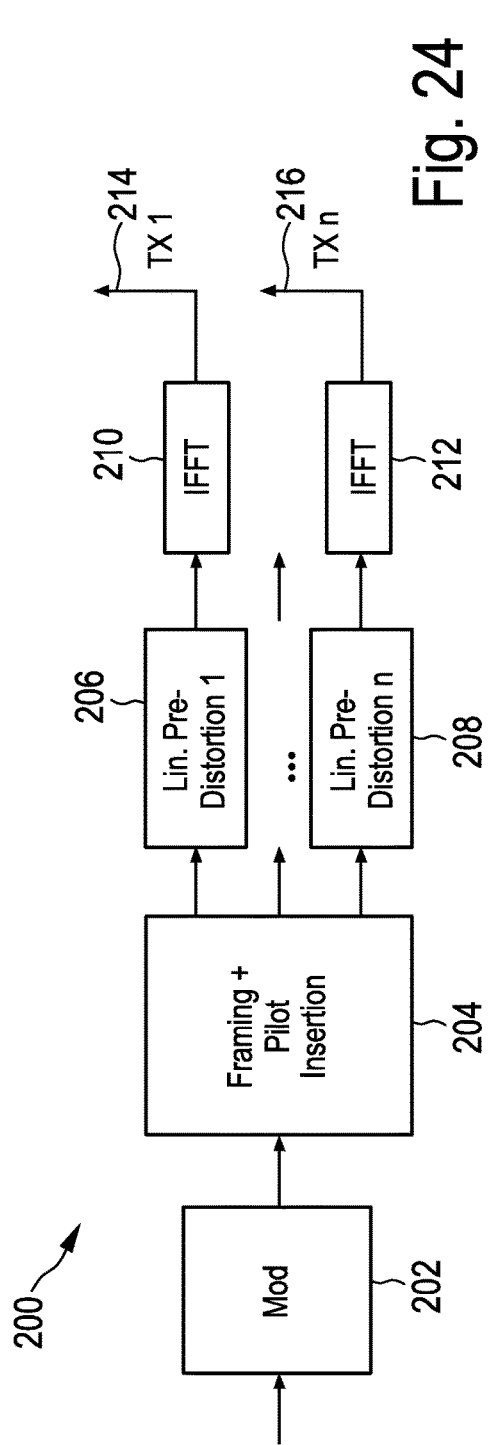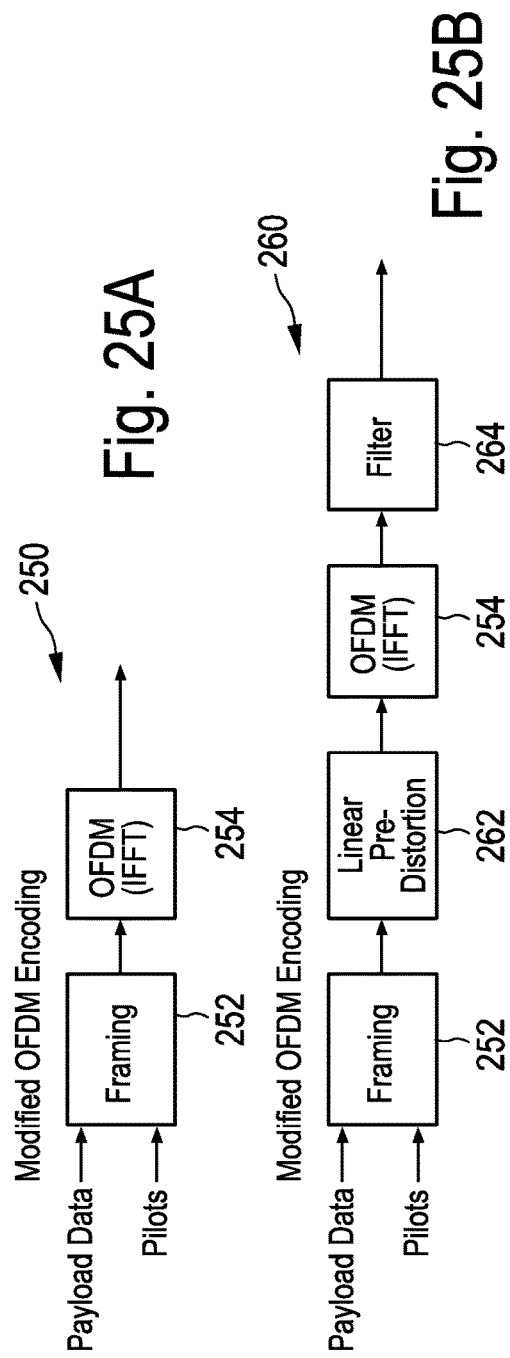

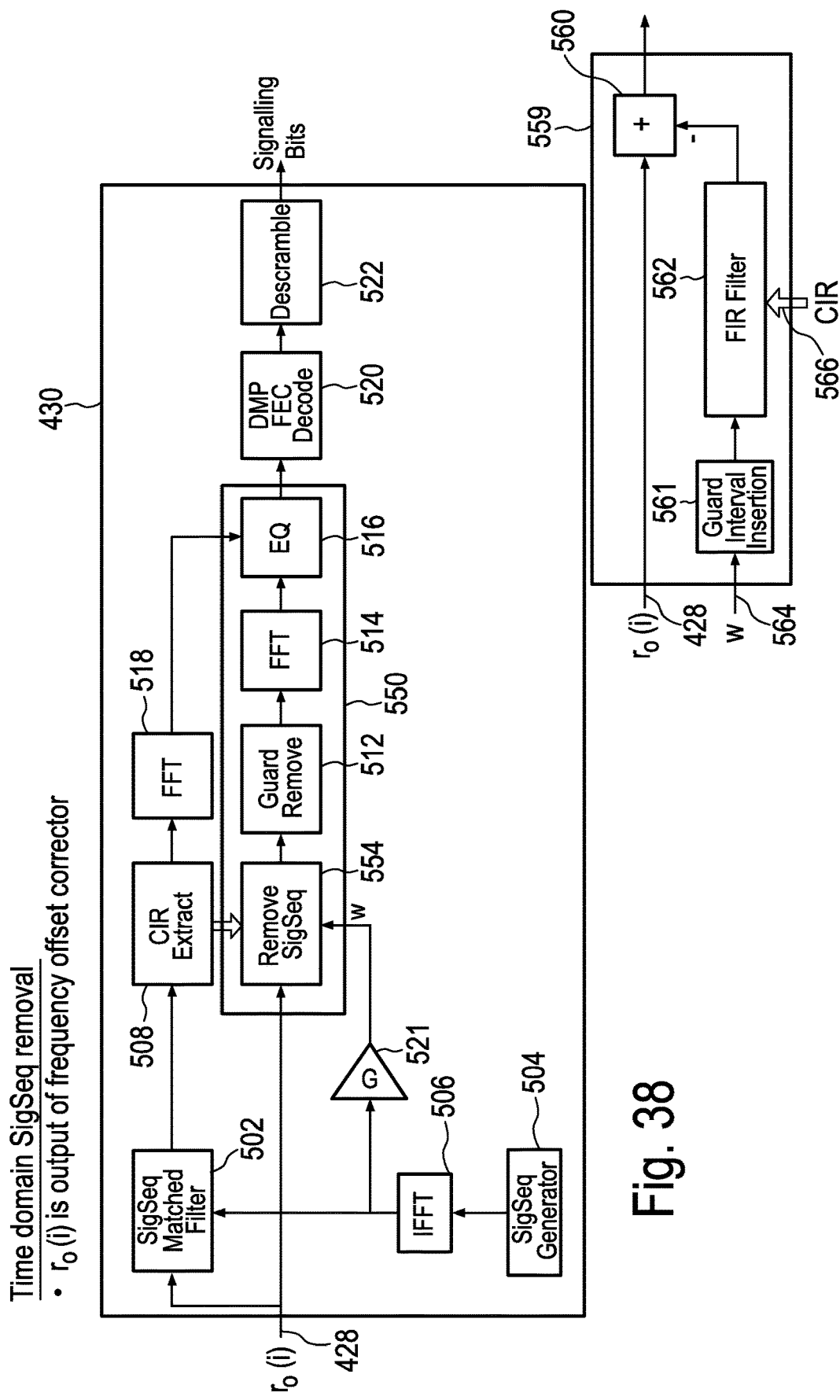

| T-SigSeq | Example (u) | Example (Na) |
|---|---|---|
| T-SigSeq 0 | 1 | 6816 |
| T-SigSeq 1 | 11 | 6816 |

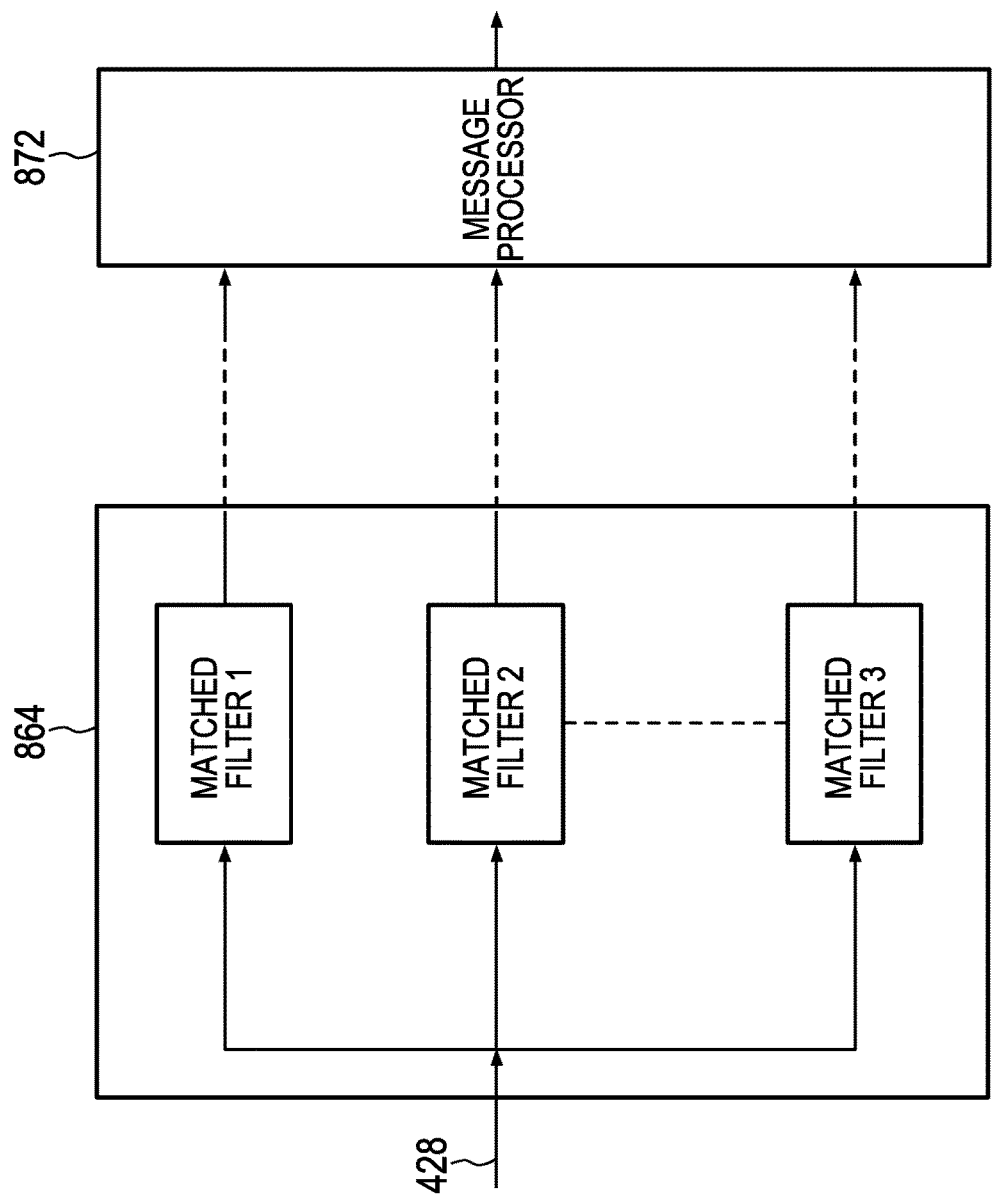

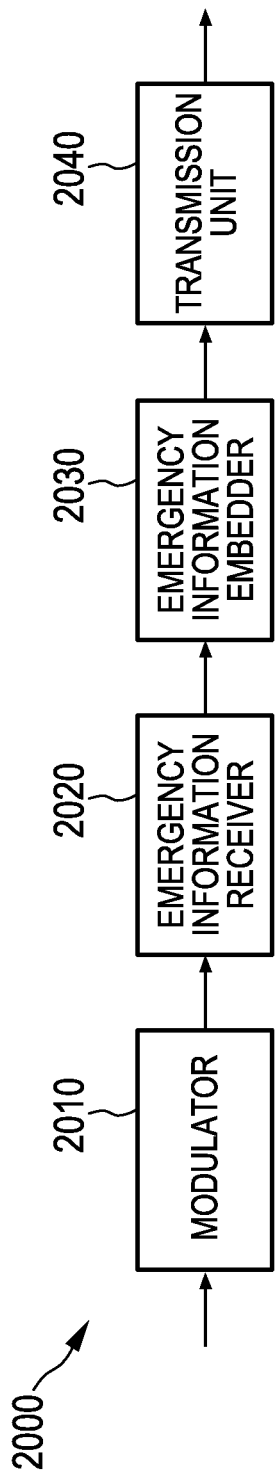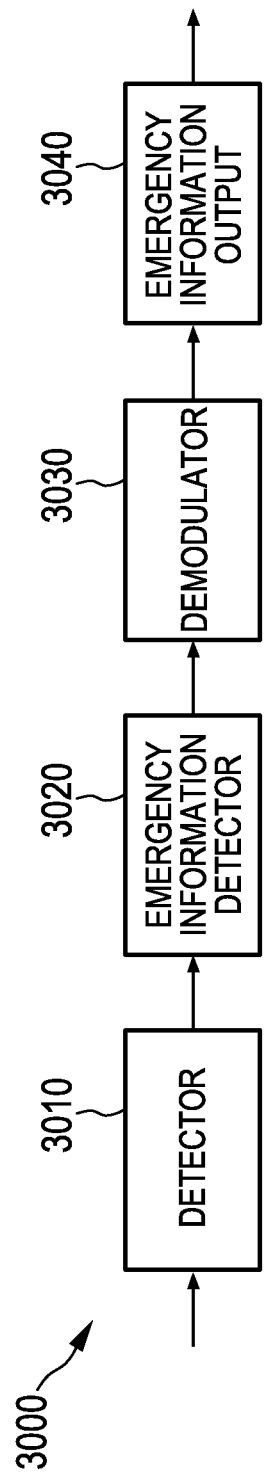

Fig. 48

Normal LDPC code (64800 bits)

N=64800, rate=2/30

Normal BCH code (16200 bits)

N=16200, rate=3/15 = 1/5 ("code identifier 1/4")

188 518 775 1694 1820 3394 3986 4140 4224 5236 5783 6313 6371 6792 7067 7084 7173 7445 7549 7973 9043 9219 9942 10111 10258 10300 10353 10707 10769 10796 11079 11661 12025 12042 12702 12838
7 25 392 557 625 838 1377 2223 2396 3058 3335 3348 3363 3918 4040 4128 4899 5189 5474 5838 6040 6124 7777 8220 8783 9299 9785 10924 11083 11902 12381 12513 12758 12834 12871 12950
76 4691 7180 7325 11292
6454 8048 12058 12946
3953 4932 10808 12700
4605 9117 9921 10662
2984 8202 10670 12877
4357 6205 7370 10403
5559 9847 10911 11147

TRANSMITTER AND TRANSMISSION METHOD FOR TRANSMITTING PAYLOAD DATA AND EMERGENCY INFORMATION

BACKGROUND

Field of the Disclosure

The present disclosure relates to a transmitter and a corresponding transmission method for transmitting payload data and emergency information using Orthogonal Frequency Division Multiplexed symbols. The present disclosure relates further to a receiver and a corresponding receiving method for detecting and recovering payload data and emergency information from a received signal.

Description of Related Art

There are many examples of radio communications systems in which data is communicated using Orthogonal Frequency Division Multiplexing (OFDM). Television systems which have been arranged to operate in accordance with Digital Video Broadcasting (DVB) standards for example, use OFDM for terrestrial and cable transmissions. OFDM can be generally described as providing K orthogonal narrow band subcarriers (where K is an integer) which are modulated in parallel, each subcarrier communicating a modulated data symbol such as Quadrature Amplitude Modulated (QAM) symbol or Quadrature Phase-shift Keying (QPSK) symbol. The modulation of the subcarriers is formed in the frequency domain and transformed into the time domain for transmission. Since the data symbols are communicated in parallel on the subcarriers, the same modulated symbols may be communicated on each subcarrier for an extended period. The subcarriers are modulated in parallel contemporaneously, so that in combination the modulated carriers form an OFDM symbol. The OFDM symbol therefore comprises a plurality of subcarriers each of which has been modulated contemporaneously with different modulation symbols. During transmission, a guard interval filled by a cyclic prefix of the OFDM symbol precedes each OFDM symbol. When present, the guard interval is dimensioned to absorb any echoes of the transmitted signal that may arise from multipath propagation.

As indicated above, the number of narrowband carriers K in an OFDM symbol can be varied depending on operational requirements of a communications system. The guard interval represents overhead and so is preferably minimized as a fraction of the OFDM symbol duration in order to increase spectral efficiency. For a given guard interval fraction, the ability to cope with increased multipath propagation whilst maintaining a given spectral efficiency can be improved by increasing the number K of subcarriers thereby increasing the duration of the OFDM symbol. However, there can also be a reduction in robustness in the sense that it may be more difficult for a receiver to recover data transmitted using a high number of subcarriers compared to a smaller number of subcarriers, because for a fixed transmission bandwidth, increasing the number of subcarriers K also means reducing the bandwidth of each subcarrier. A reduction in the separation between subcarriers can make demodulation of the data from the subcarriers more difficult for example, in the presence of Doppler frequency. That is to say that although a larger number of subcarriers (high order operating mode) can provide a greater spectral efficiency, for some propagation conditions a target bit error rate of communicated data may require a higher signal to noise ratio than required for a lower number of subcarriers.

An effective and low latency emergency warning system (EWS) is considered to be a substantial element of a future terrestrial broadcast system, e.g. a future ATSC (Advanced Television Systems Committee) terrestrial broadcast system. It has been shown from the analysis of large scale emergency cases and natural catastrophes in the past that a terrestrial broadcast system can reach most people in the shortest possible time. While the terrestrial broadcast system remained operational in the very most of the emergencies, mobile and cellular systems often stopped their operation or have been overloaded and have therefore been unable to inform people. For example, the last superstorm "Sandy" in the US Northeast demonstrated the fragile limits of cell phone networks during times of emergency. The importance of the broadcasting infrastructure as the medium for rapid dissemination of emergency information to the public in the event of natural disasters, man-made catastrophes, terrorist attacks, and similar events which endanger the safety of the public has thus been emphasized.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure

SUMMARY

It is an object to provide a transmitter and a corresponding transmission method for very quickly and reliably transmitting emergency information in a broadcast system. It is a further object to provide a receiver and a corresponding receiving method for very quickly and reliably detecting and recovering emergency information transmitted in a broadcast system.

According to an aspect there is provided a transmitter for transmitting payload data and emergency information using data symbols in a single-carrier or multi-carrier broadcast system, the transmitter comprising a modulator configured to modulate one or more transmission symbols with signaling data for use in detecting and recovering the payload data at a receiver and to modulate one or more transmission symbols with the payload data, an emergency information receiver configured to receive emergency information carrying information of an actual emergency, an emergency information embedder configured to embed emergency information into one or more transmission symbols, wherein the emergency information is embedded within a predetermined time period after its reception by using a resource used for carrying signaling data and/or payload data if no emergency information shall be transmitted, and a transmission unit configured to transmit the transmission symbols.

According to a further aspect there is provided a receiver for detecting and recovering payload data and emergency information from a received signal that has been transmitted using data symbols in a single-carrier or multi-carrier broadcast system, the receiver comprising a detector configured to detect the received signal, the received signal comprising the payload data and signaling data for use in detecting and recovering the payload data, the signaling data being carried by one or more transmission symbols and the payload data being carried by one or more transmission symbols, wherein emergency information carrying information of an actual emergency is embedded into one or more transmission symbols, an emergency information detector configured to detect and recover the emergency information from the one or more transmission symbols, a demodulator configured to recover the signaling data from the one or more transmission symbol for recovering the payload data from the one or more transmission symbols, and an emergency information output configured to output the emergency information and/or predetermined emergency output information provided for being output in case of the detection of emergency information.

According to a still further aspect a transmitter for transmitting payload data and emergency information using data symbols in a multi-carrier broadcast system, the transmitter comprising:

a modulator configured to modulate one or more transmission symbols with signaling data for use in detecting and recovering the payload data at a receiver and to modulate one or more transmission symbols with the payload data, an emergency information receiver configured to receive emergency information carrying information of an actual emergency, an emergency information embedder configured to embed emergency information into one or more transmission symbols modulated with payload data, wherein the emergency information is embedded within a predetermined time period after its reception by providing a number of additional subcarriers carrying said emergency information, said subcarriers being provided at an edge of the spectrum used for transmission and/or spread across the subcarriers carrying the payload data, and a transmission unit configured to transmit the transmission symbols.

According to still further aspects a corresponding transmission method and a corresponding receiving method are provided. Finally, a computer program comprising program means for causing a computer to carry out the steps of the methods disclosed herein, when said computer program is carried out on a computer, as well as a non-transitory computer-readable recording medium that stores therein a computer program product, which, when executed by a processor, causes the methods disclosed herein to be performed are provided.

Preferred embodiments are defined in the dependent claims. It shall be understood that the disclosed methods, the disclosed computer program and the disclosed computer-readable recording medium have similar and/or identical preferred embodiments as the claimed transmitter and/or receiver and as defined in the dependent claims.

One of the aspects of the disclosure is to provide a realistic EWS signaling solution, including various advantageous embodiments for embedding the required emergency information (also referred to as EWS signaling data hereinafter) in a most effective, robust and low-complex way into the signal to be transmitted.

The disclosed solution is preferably focusing on a low latency, preferably a more or less instant (e.g. with a delay of less than 1 sec, preferably less than 500 msec, even more preferably less than 100 msec), EWS functionality with very basic and fundamental information on the emergency event. This holds for both the transmitter side and the receiver side, i.e. the emergency information shall be processed such that it is transmitted with very low latency and that it can be received and decoded with very low latency. This basic and 'instant' EWS functionality can easily be combined with other existing or future emergency warning systems that may operate on upper layers (for example as part of the transport stream, e.g. embedded in signaling data PSI/SI) or come with an increased latency. For instance, the very quickly transmitted and decoded emergency information may comprise a link to more detailed information (e.g. more precise and detailed location information about the location of the emergency event, instructions what to do, etc.) about the emergency event that is transmitted with some latency, which is acceptable for such more detailed information.

In a preferred embodiment, the transmission and reception, respectively, of actual emergency information is combined with an additional functionality for signaling of an emergency event by use of an emergency indicator enabling a detection of an emergency event also for low power receivers.

In another embodiment it is proposed that the emergency information (and/or predetermined emergency output information provided for being output in case of the detection of emergency information) is output only if both the emergency indicator and the emergency information have been successfully detected, since the alert might be foreseen for a different region. Hence, according to this embodiment the overall EWS delay is the sum of the detection delay (i.e. the delay for detecting the emergency indicator) and the decoding delay (i.e. the delay for detecting and decoding the emergency information). Further, it also decreases the probability of false detections, if combined detection and decoding are applied before outputting an emergency alert.

The proposed solution can generally be applied in multi-carrier broadcast systems, such as an Orthogonal Frequency Division Multiplexed (OFDM) based broadcast system, in which the signaling data and the payload data are modulated onto OFDM symbols each being carried by multiple subcarriers, and in single-carrier broadcast systems, such as a single carrier QAM or an 8-level vestigial sideband (8-VSB) modulation, in which the signaling data and the payload data are modulated onto transmission symbols each being carried by a single carrier.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 24 shows an embodiment of enhanced single frequency network processing, FIG. 25 shows a normal OFDM encoding chain and an OFDM encoding chain with spectral shaping and pre-distortion, FIG. 38 shows a schematic block diagram of one example of a preamble detection and decoding processor which forms part of the receiver shown in FIG. 37a, FIG. 39 shows a schematic block diagram of an example of a signature sequence remover which forms part of the preamble detection and decoding processor shown in FIG. 38, FIG. 45 shows a schematic block diagram of a signaling decoder of the receiver shown in FIG. 44 providing an example embodiment of the present technique, FIG. 46 shows a schematic diagram of an embodiment of a transmitter according to the present disclosure, FIG. 47 shows a schematic diagram of an embodiment of a receiver according to the present disclosure, FIG. 48 shows an example of a 64 k LDPC code for an exemplary code rate, and FIG. 49 shows an example of a 16 k BCH code for an exemplary code rate.

DETAILED DESCRIPTION OF THE EMBODIMENTS

Embodiments of the present disclosure can be arranged to form a transmission network for transmitting signals representing data including video data and audio data so that the transmission network can, for example, form a broadcast network for transmitting television signals to television receiving devices. In some examples the devices for receiving the audio/video of the television signals may be mobile devices in which the television signals are received while on the move. In other examples the audio/video data may be received by conventional television receivers which may be stationary and may be connected to a fixed antenna or antennas.

Television receivers may or may not include an integrated display for television images and may be recorder devices including multiple tuners and demodulators. The antenna(s) may be inbuilt to television receiver devices. The connected or inbuilt antenna(s) may be used to facilitate reception of different signals as well as television signals. Embodiments of the present disclosure are therefore configured to facilitate the reception of audio/video data representing television programs to different types of devices in different environments.

As will be appreciated, receiving television signals with a mobile device while on the move may be more difficult because radio reception conditions will be considerably different to those of a conventional television receiver whose input comes from a fixed antenna.

Figure 35:
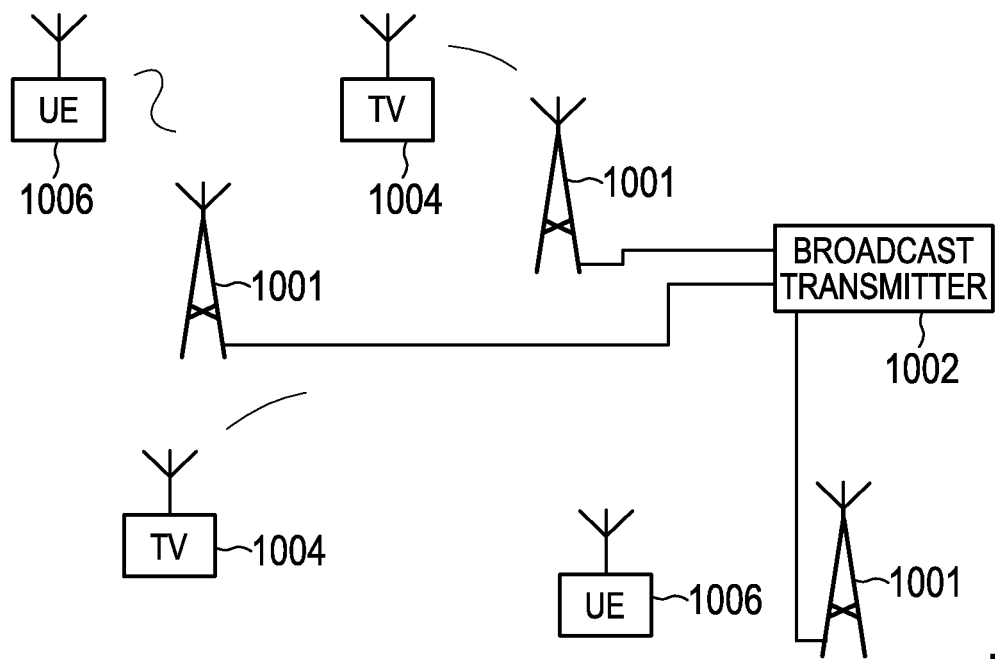
FIG. 35 shows a schematic diagram illustrating an arrangement of a broadcast transmission network.

Referring now to the drawings, wherein like reference numerals designate identical or corresponding parts throughout the several views, an example illustration of a television broadcast system is shown in FIG. 35. In FIG. 35 broadcast television transmitters 1001 are shown to be connected to a broadcast gateway 1002. The broadcast gateway 1002 transmits signals from transmitters 1001 within a coverage area provided by the broadcast network. The television broadcast network shown in FIG. 35 operates as a so called single frequency network in which each of the television broadcast transmitters 1001 transmit the radio signals conveying audio/video data contemporaneously so that these can be received by television receivers 1004 as well as mobile devices 1006 within a coverage area provided by the broadcast network. For the example shown in FIG. 35 the signals transmitted by the broadcast transmitters 1001 are transmitted using Orthogonal Frequency Division Multiplexing (OFDM) which can provide an arrangement for transmitting the same signals from each of the broadcast stations 1002 which can be combined by a television receiver even if these signals are transmitted from different transmitters 1001. Provided a spacing of the broadcast transmitters 1001 is such that the propagation time between the signals transmitted by different broadcast transmitters 1001 is less than or does not substantially exceed a guard interval that precedes the transmission of each of the OFDM symbols then a receiver device 1004, 1006 can receive the OFDM symbols and recover data from the OFDM symbols in a way which combines the signals transmitted from the different broadcast transmitters 1001. Examples of standards for broadcast networks that employ OFDM in this way include DVB-T, DVB-T2 and ISDB-T.

The following disclosure provides the description of a system, particularly for the physical layer of ATSC 3.0 (to which the present disclosure is not limited, but is only used for exemplary explanation). It is partly based on the DVB-T2 standard (EN 302 755 V1.3.1, Frame structure channel coding and modulation for a second generation digital terrestrial television broadcasting system (DVB-T2), April 2012). It uses preferably an advanced LDPC FEC encoding as well as OFDM modulation. Further, additional technologies are disclosed to improve the throughput and robustness of digital terrestrial transmissions as well as the inclusion of a low latency emergency warning system. Complexity and memory usage have been reduced to make implementation easier.

The following aspects of the proposed system will be explained in more detail below:
- Non-Uniform Constellations (NUC) targeting higher throughput, capacity and robustness;
- LDPC and BCH codes which target higher throughput, capacity and robustness;
- A preamble, providing increased flexibility, more signaling capacity, and also integrating the detection functionality of an emergency warning system (EWS) for low power consumption;
- EWS signaling—being embedded into the data stream without interruption of the transmitted services;
- Flexible framing, allowing to mix several frame types as well as to cover different bandwidths;
- New Pilot Patterns, reducing the capacity loss as well as limiting complexity;
- A PAPR reduction scheme, improving the transmission efficiency of the OFDM system;
- Redundancy on Demand, enabling a differentiator for hybrid TV receivers.

In an exemplary, non-limiting embodiment described in the following the supported input formats to the physical layer are MPEG 2 Transport Stream (TS) as well as IP streams. One or several of these streams map to one Physical Layer Pipe (PLP). The baseband packets of each PLP are scrambled and fed into the BICM (Bit Interleaved Coding and Modulation) encoder. In a first step the baseband packets are LDPC and BCH encoded. The following bit interleaver guarantees best possible combined performance of FEC encoding and the following QAM mapping. QAM constellations sizes from QPSK up to 1024-QAM are proposed to cover the relevant SNR range. Non Uniform Constellations provide an additional shaping gain compared to conventional uniform constellations.

After the QAM mapper a time interleaver is inserted to enhance performance in time variant channels as well as to mitigate effects from impulse interferers. The proposed time interleaver reduces the memory size while still allowing variable bit rates as well as seamless handling of discontinued PLPs.

Afterwards an optional MIMO encoding stage is inserted. eSFN (enhanced Single Frequency Network) can be applied as rate 1 MIMO scheme. Spatial multiplexing as a full rate 2 MIMO scheme is also proposed, where the number of transmit antennas is limited to two. The spatial multiplexing MIMO scheme can be improved by additional methods (such as eSM, phase hopping, etc. from DVB-NGH (DVB BlueBook A160, Next Generation broadcasting system to Handheld, physical layer specification (DVB-NGH), November 2012)), which helps to improve the performance in more correlated channels as well as power imbalances.

The cells from the different PLPs are then scheduled and frequency interleaved. After pilot insertion the framing stage combines the preamble with its embedded L1 signaling with the payload symbols. The proposed system supports a variety of different channel bandwidths, as a multiple of the standard bandwidth (e.g. n*6 MHz). Similar as in DVB-T2, the chosen framing format supports different frame types. It is therefore possible to arbitrarily mix large FFT size frames for stationary TV, lower FFT size frames for mobile TV as well as 'Future Extension Frames' within one RF channel.

Finally the input symbols are OFDM modulated, A/D converted and up-converted to the transmission RF frequency.

The concept of 'absolute OFDM' is adopted from DVB-C2 (EN 302 769 V1.2.1, Frame structure channel coding and modulation for a second generation digital transmission system for cable systems (DVB-C2), April 2011). The L1 signaling blocks in the preamble and post-amble symbols begin at the absolute frequency of 0 MHz and are partitioned in steps of 5.71 MHz. The signal across the different RF frequencies is defined in a unique way for the whole spectrum. It should be noted that the pilot sequences of the OFDM signal are unique for every frequency. The reason for this is to avoid unwanted repetitions in the frequency domain which may cause unwanted high peak values of the OFDM signal in the time domain.

Furthermore the system includes a low latency 'Emergency Warning System (EWS)', which allows signaling the occurrence of an emergency event within less than 100 msec. The detection of the EWS event can be done even by receivers in standby mode, by very simple and low-power processing of the preamble symbols only. The EWS signaling data in case of an emergency event is inserted into the frames in a way that allows continued decoding of the services (i.e. no service interruption in case of an emergency event).

Figure 1:
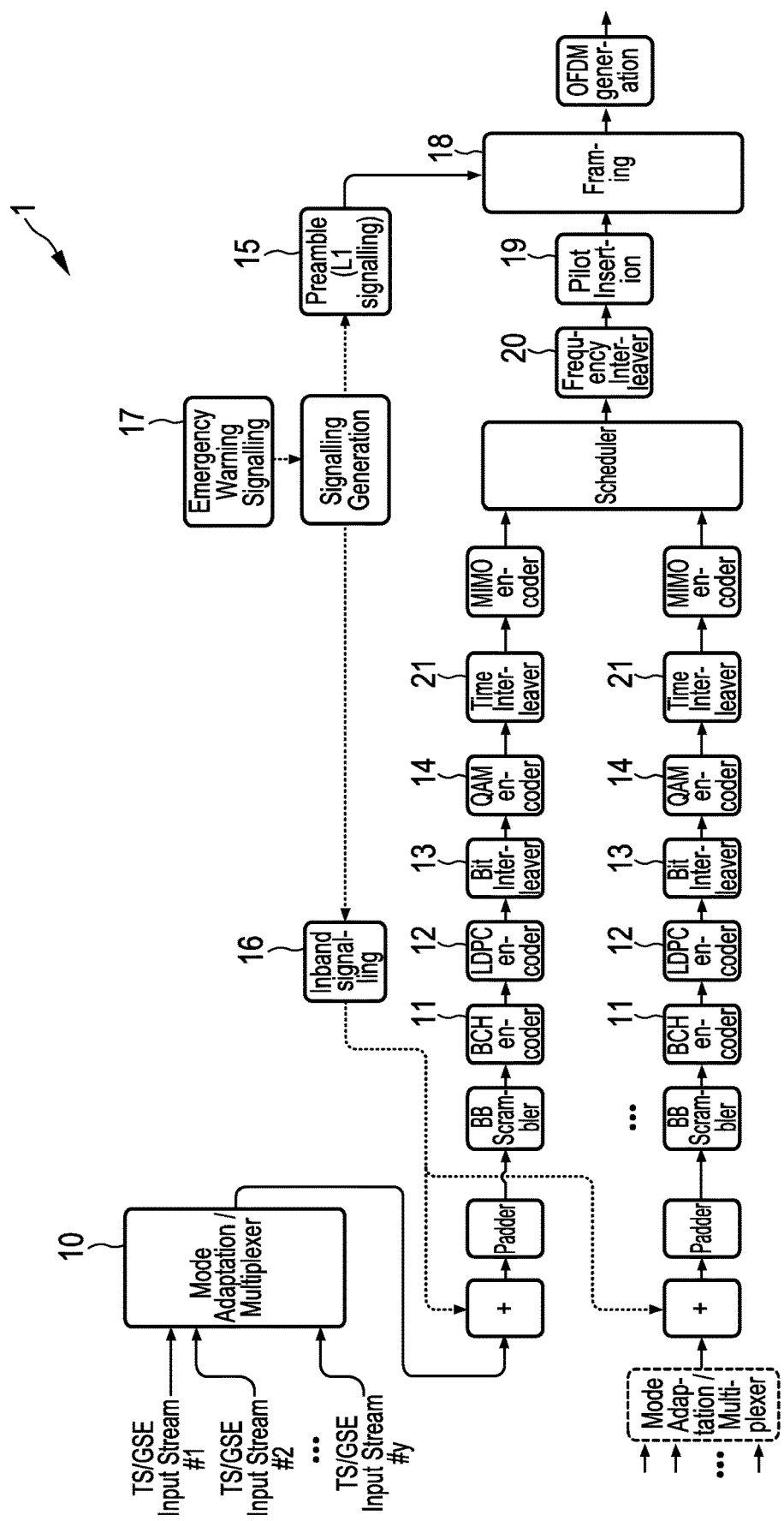
FIG. 1 shows a general block diagram of a transmitter according to the present disclosure.

FIG. 1 shows a general block diagram of a transmitter 1 of a proposed system according to the present disclosure. Various technical aspects of the system, in particular the transmitter and the receiver, will be explained using exemplary, non-limiting examples of parameters and structural elements by which said technical aspects may be implemented.

Input format and PLP processing will now be described. Prior to the mode adaptation 10 there is a pre-processing block (not shown) that performs a similar function as in DVB-T2. The allowed input streams are MPEG 2 Transport Stream (TS) as well as IP streams. In general, all types of streams can be handled by encapsulation into IP or TS packets. Processing of transport streams (TS) is done in a similar way as in DVB-T2, while for encapsulating IP streams an enhanced and simplified glue layer is described below. The pre-processor breaks up any multi-program transport streams (MPTS) into its constituent single program transport streams (SPTS) separating out the SI meta-data to be transported separately. These streams are then encapsulated and fed into the mode adaptation block. For each input streams, the mode adaptation produces a stream of baseband frames (BBFRAMES) that are then carried in a single Physical Layer Pipe (PLP). The SI meta-data after due encapsulation exits the mode adaptation as a common PLP.

The re-combination of a common and data PLP for one service (Multiple PLP) has shown some complexity in T2 implementations, especially on the receiver side, and so a more simple method may be supported in the transmitter. There is some linkage signaled for PLPs that are related and the form of relationship is also signaled.

The system allows to group PLPs, e.g. to support SVC (scalable video coding) if required. However, the number of PLPs involved is limited. In addition to the common PLP, different PLPs can be associated to each other. In this system Type 1 PLPs are preferably used to allow for low power reception with time slicing as well as to limit system complexity.

IP input processing will now be described. The mechanism for input of IP packets is more difficult than TS packets, since the size of IP packets varies dynamically. Protocols such as GSE (ETSI TS 102 606-1 and -2: "Digital Video Broadcasting (DVB); Generic Stream Encapsulation (GSE) Protocol") have attempted to overcome this by proposing an intermediate encapsulation protocol with a standardized header and mechanism for input of multiple protocols. However, this method has several drawbacks, not the least of which is the large memory required at the receiver to cope with all possible combinations of input. Furthermore, the large number of possible inputs has made simple implementation in hardware needlessly difficult.

In the disclosed system, while retaining the generic input capabilities of GSE, in consideration of the fact that the packet size is restricted to 1500 bytes for an IPv2 MTU, the input packet size is restricted to less than 1800 bytes, and the number of packet fragments is restricted. By implementing these restrictions, the maximum memory and the processing burden is greatly reduced.

Figure 2:
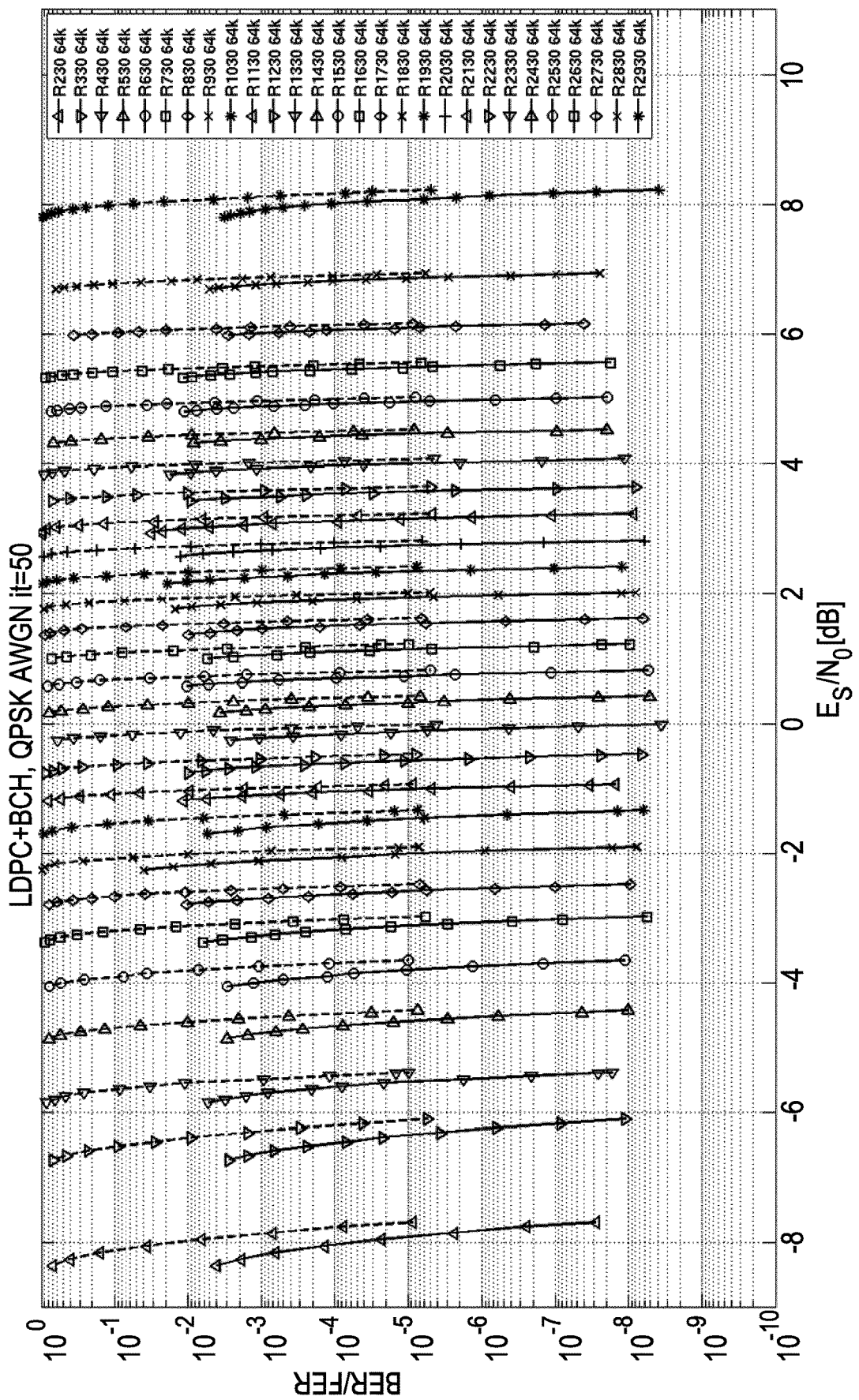
FIG. 2 shows a diagram illustrating performances of proposed 64 k codes in AWGN channel.
Figure 3:
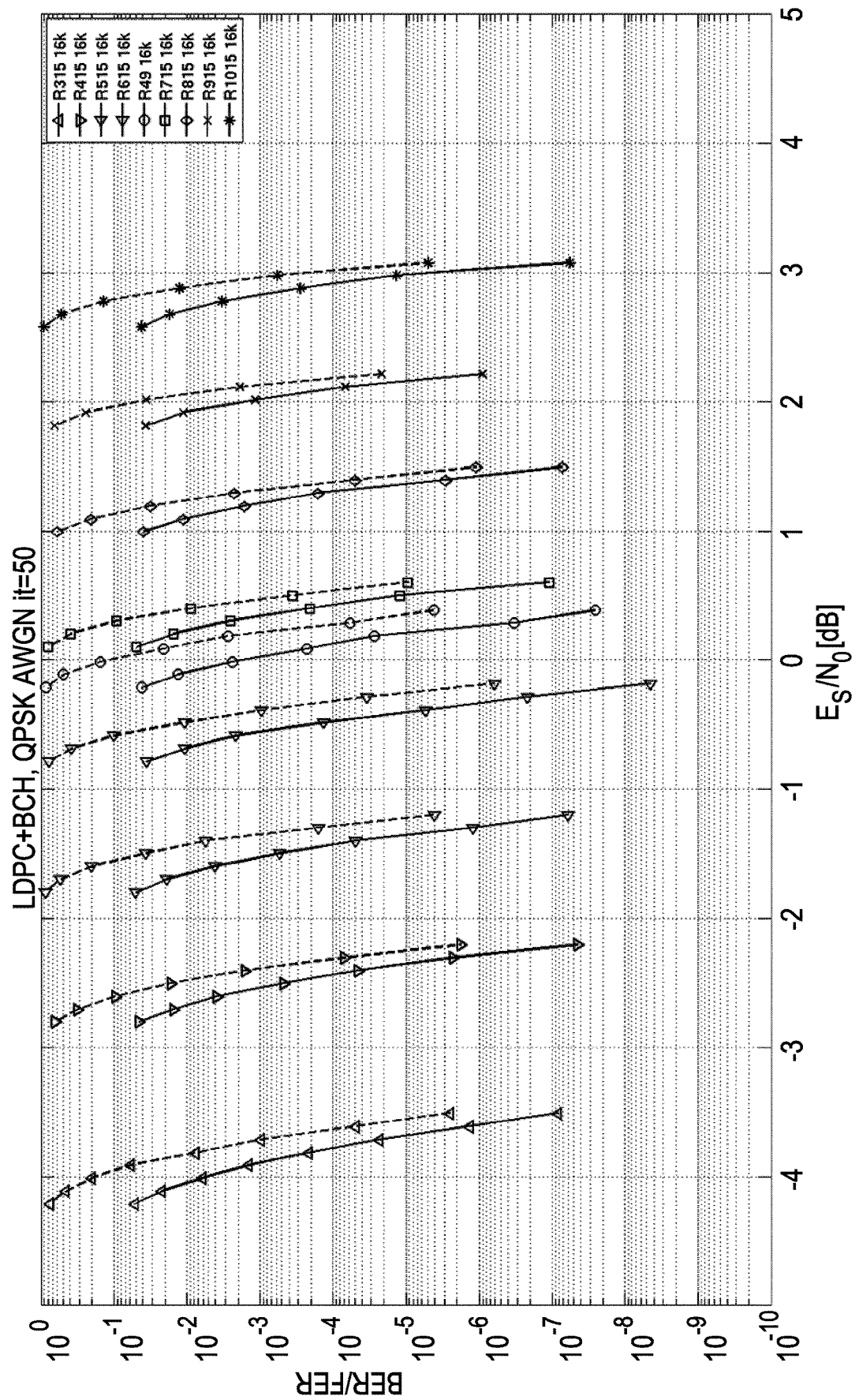
FIG. 3 shows a diagram illustrating the performance of proposed 16 k codes in AWGN channel.
Figures 48, 49:
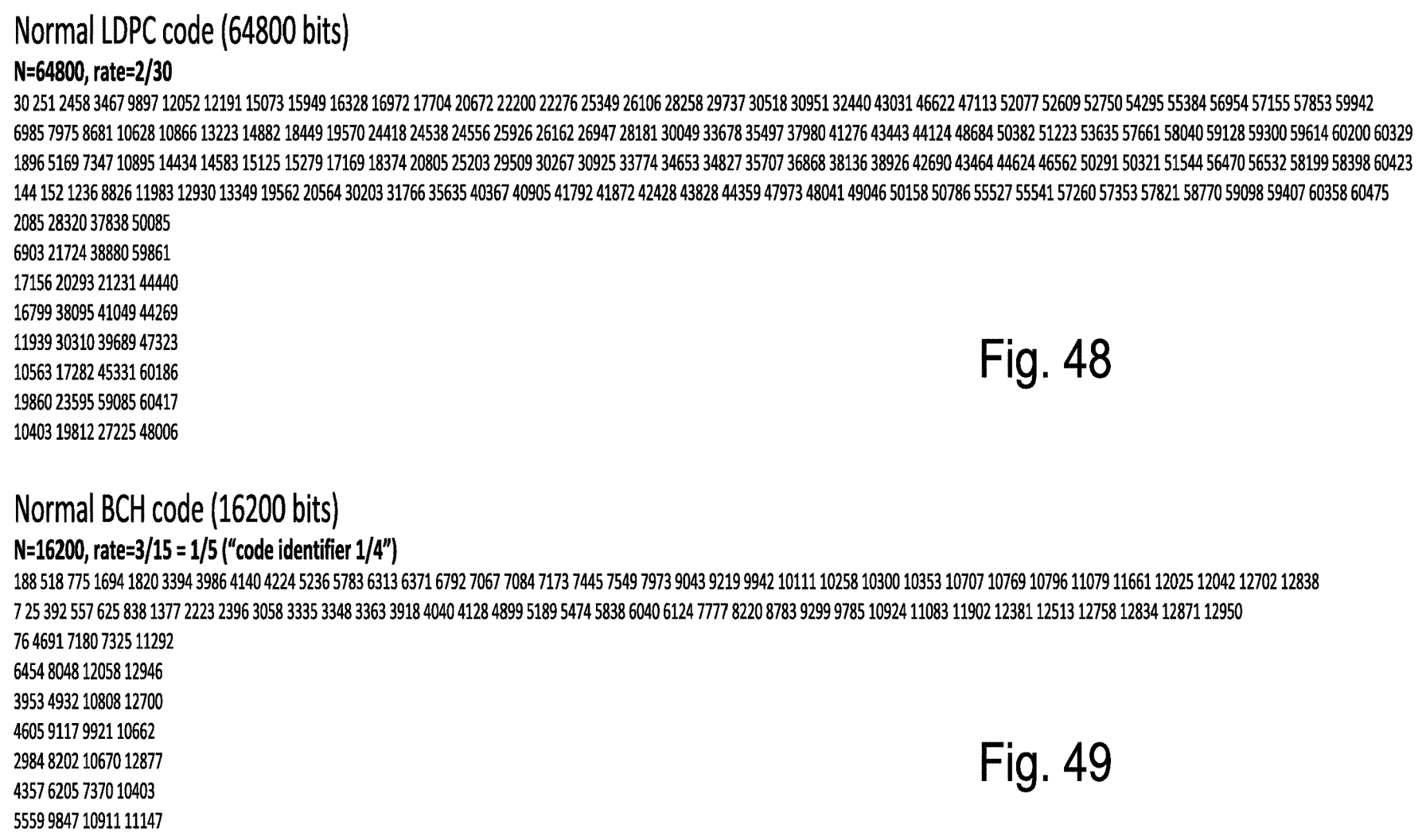

Bit Interleaved Coding and Modulation (BICM) will now be described. First, forward error correction (FEC) will be described. In the disclosed system advanced coding comprising a concatenated LDPC and BCH code (64 k and 16 k codeword size) is used in a BCH encoder 11 and an LDPC encoder 12. The proposed codes have a similar structure to those used in DVB-T2, in which the information part has quasi-cyclic structure with a parallel factor and the parity part has a repeat accumulate structure, allowing for easier implementation of equipment which supports multiple standards. The new codes have increased performance compared to DVB-T2 codes. FIG. 2 shows the performances of proposed 64 k codes in AWGN channel; FIG. 3 shows the performance of proposed 16 k codes in AWGN channel. An example of a 64 k LDPC code for an exemplary code rate is shown in FIG. 48 and an example of a 16 k BCH code for an exemplary code rate is shown in FIG. 49. The new codes are allocated in a very wide range of SNR with equidistant steps, so that they can provide freedom to choose parameters suited to various channel environments, avoiding large efficiency losses. The range can be enhanced more by combinations with various kinds of constellations, including the higher order non-uniform constellations outlined below. The concatenated BCH codes assure lower error floors for high-throughput services such as UHDTV or SHV. Furthermore, the 4 k LDPC code from DVB-NGH is used for signaling protection of the preamble symbol.

Figure 4:
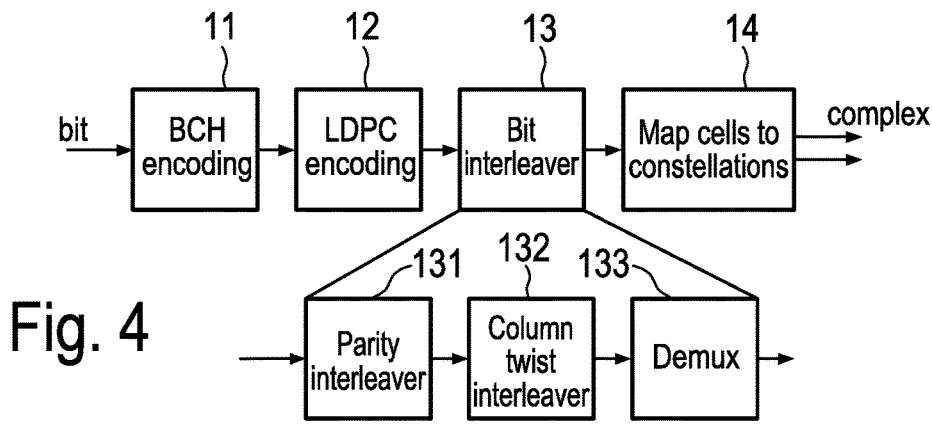
FIG. 4 shows a block diagram of the FEC part of a transmitter.

The bit interleaver 13 will now be described. A bit interleaver is proposed to be used in this system, in a similar manner to those used for DVB-T2. This bit interleaver 13 preferably comprises three parts, as shown in the block diagram of FIG. 4 showing the elements of the FEC encoder: parity interleaver 131, column twist interleaver 132, and demultiplexer 133. The main purpose of having parity interleave is to reduce the damage of deep fade caused by multi-path environment and to let parity bits part have quasi-cyclic structure for parallel operations in receiver side. The column twist interleaver can also scatter the damage of deep fades, whilst the demultiplexer can optimize the combination between a set of LDPC code bits and a bit level of a certain robustness defined by constellation and bit labeling.

Non-Uniform Constellations used by the QAM encoder 14 will now be described. In particular, the optimization of QAM constellation by constellation shaping, which is also known as Non-Uniform Constellations (NUC), will be described.

The NUCs proposed in this document have been optimized to offer best possible BICM capacity in an AWGN and Rayleigh channel for different SNR values. They cover all constellations from 16-QAM up to 1024-QAM (as QPSK allows no constellation shaping). The tables list the constellations for different QAM sizes and SNR values. The predetermined constellations are defined by the constellation position vector $u_{1 \ldots v}$, wherein $v=\operatorname{sqrt}(M)/2-1$.

In the following the definition of the NUC position vectors obtained by use of the above described approach is provided for some values of M. The signal-to-noise ratio (SNR) is always denoted in dB and corresponds to the average SNR in case of fading channels.

a1) 16-QAM or 4-PAM for a non-fading channel (1. option)

| SNR | 0 | 0.5 | 1.0 | 1.5 | 2.0 | 2.5 | 3.0 | 3.5 | 4.0 | 4.5 | 5.0 | 5.5 | 6.0 | 6.5 |
|---|---|---|---|---|---|---|---|---|---|---|---|---|---|---|
| $u_1$ | 1.0001 | 1.0001 | 1.0002 | 1.1550 | 1.6201 | 1.9580 | 2.2633 | 2.5594 | 2.8411 | 3.0980 | 3.3357 | 3.5294 | 3.6712 | 3.7520 |
| SNR | 7.0 | 7.5 | 8.0 | 8.5 | 9.0 | 9.5 | 10.0 | 10.5 | 11.0 | 11.5 | 12.0 | 12.5 | 13.0 | 13.5 |
| $u_1$ | 3.7812 | 3.7480 | 3.6736 | 3.5998 | 3.5184 | 3.4446 | 3.3818 | 3.3239 | 3.2786 | 3.2407 | 3.2109 | 3.1793 | 3.1581 | 3.1390 |
| SNR | 14 | 14.5 | 15.0 | 15.5 | 16.0 | 16.5 | 17.0 | 17.5 | 18.0 | 18.5 | 19.0 | 19.5 | 20.0 | |
| $u_1$ | 3.1219 | 3.1078 | 3.0964 | 3.0819 | 3.0774 | 3.0665 | 3.0579 | 3.0528 | 3.0485 | 3.0423 | 3.0411 | 3.0333 | 3.0521 | | a2) 16-QAM or 4-PAM for a fading channel (1. option)

| SNR | 0 | 0.5 | 1.0 | 1.5 | 2.0 | 2.5 | 3.0 | 3.5 | 4.0 | 4.5 | 5.0 | 5.5 | 6.0 | 6.5 |
|---|---|---|---|---|---|---|---|---|---|---|---|---|---|---|
| $u_1$ | 1.6289 | 1.8484 | 2.0415 | 2.2247 | 2.3853 | 2.5335 | 2.6736 | 2.7962 | 2.8980 | 2.9832 | 3.0593 | 3.1169 | 3.1616 | 3.1973 |
| SNR | 7.0 | 7.5 | 8.0 | 8.5 | 9.0 | 9.5 | 10.0 | 10.5 | 11.0 | 11.5 | 12.0 | 12.5 | 13.0 | 13.5 |
| $u_1$ | 3.2180 | 3.2334 | 3.2427 | 3.2473 | 3.2477 | 3.2463 | 3.2436 | 3.2388 | 3.2312 | 3.2291 | 3.2224 | 3.2149 | 3.2129 | 3.2055 |
| SNR | 14 | 14.5 | 15.0 | 15.5 | 16.0 | 16.5 | 17.0 | 17.5 | 18.0 | 18.5 | 19.0 | 19.5 | 20.0 | |
| $u_1$ | 3.2036 | 3.1976 | 3.1953 | 3.1917 | 3.1854 | 3.1853 | 3.1803 | 3.1799 | 3.1761 | 3.1712 | 3.1715 | 3.1721 | 3.1711 | | a3) 16-QAM/4-PAM for a non-fading channel (2. option)

| SNR/u | 0 | 0.5 | 1 | 1.5 | 2 | 2.5 | 3 | 3.5 | 4 | 4.5 | 5 | 5.5 | 6 | 6.5 |
|---|---|---|---|---|---|---|---|---|---|---|---|---|---|---|
| u1 | 1.0001 | 1.0001 | 1.0002 | 1.155 | 1.6201 | 1.958 | 2.2633 | 2.5594 | 2.8411 | 3.098 | 3.3357 | 3.5294 | 3.6712 | 3.752 |
| SNR/u | 7 | 7.5 | 8 | 8.5 | 9 | 9.5 | 10 | 10.5 | 11 | 11.5 | 12 | 12.5 | 13 | 13.5 |
| u1 | 3.7812 | 3.748 | 3.6736 | 3.5998 | 3.5184 | 3.4446 | 3.3818 | 3.3239 | 3.2786 | 3.2407 | 3.2109 | 3.1793 | 3.1581 | 3.139 |
| SNR/u | 14 | 14.5 | 15 | 15.5 | 16 | 16.5 | 17 | 17.5 | 18 | 18.5 | 19 | 19.5 | 20 | |
| u1 | 3.1219 | 3.1078 | 3.0964 | 3.0819 | 3.0774 | 3.0665 | 3.0579 | 3.0528 | 3.0485 | 3.0423 | 3.0411 | 3.0333 | 3.0521 | | a4) 16-QAM/4-PAM for a fading channel (2. option)

| SNR | 0 | 0.5 | 1 | 1.5 | 2 | 2.5 | 3 | 3.5 | 4 | 4.5 | 5 | 5.5 | 6 | 6.5 |
|---|---|---|---|---|---|---|---|---|---|---|---|---|---|---|
| u1 | 1.6289 | 1.8484 | 2.0415 | 2.2247 | 2.3853 | 2.5335 | 2.6736 | 2.7962 | 2.898 | 2.9832 | 3.0593 | 3.1169 | 3.1616 | 3.1973 |
| SNR | 7 | 7.5 | 8 | 8.5 | 9 | 9.5 | 10 | 10.5 | 11 | 11.5 | 12 | 12.5 | 13 | 13.5 |
| u1 | 3.218 | 3.2334 | 3.2427 | 3.2473 | 3.2477 | 3.2463 | 3.2436 | 3.2388 | 3.2312 | 3.2291 | 3.2224 | 3.2149 | 3.2129 | 3.2055 |
| SNR | 14 | 14.5 | 15 | 15.5 | 16 | 16.5 | 17 | 17.5 | 18 | 18.5 | 19 | 19.5 | 20 | |
| u1 | 3.2036 | 3.1976 | 3.1953 | 3.1917 | 3.1854 | 3.1853 | 3.1803 | 3.1799 | 3.1761 | 3.1712 | 3.1715 | 3.1721 | 3.1711 | | b1) 64-QAM or 8-PAM for a non-fading channel (1. option)

| SNR | 5 | 6 | 7 | 8 | 9 | 10 | 11 | 12 | 13 | 14 | 15 | 16 | 17 |
|---|---|---|---|---|---|---|---|---|---|---|---|---|---|
| $u_1$ | 1.0000 | 1.0022 | 1.0009 | 1.1945 | 1.4265 | 1.7169 | 2.0784 | 2.4886 | 2.8098 | 2.9798 | 3.0657 | 3.0895 | 3.0744 |
| $u_2$ | 2.6799 | 3.6839 | 3.7714 | 3.5638 | 3.6893 | 3.9984 | 4.4060 | 4.8482 | 5.2018 | 5.4093 | 5.5100 | 5.4881 | 5.3864 |
| $u_3$ | 3.4087 | 3.6839 | 3.7779 | 4.6322 | 5.4024 | 6.2400 | 7.1114 | 7.9262 | 8.4762 | 8.7005 | 8.7024 | 8.4935 | 8.1750 |

| SNR | 18 | 19 | 20 | 21 | 22 | 23 | 24 | 25 | 26 | 27 | 28 | 29 | 30 |
|---|---|---|---|---|---|---|---|---|---|---|---|---|---|
| $u_1$ | 3.0557 | 3.0409 | 3.0309 | 3.0244 | 3.0180 | 3.0140 | 3.0153 | 3.0107 | 3.0001 | 2.7744 | 2.2837 | 3.0137 | 1.9278 |
| $u_2$ | 5.2889 | 5.2157 | 5.1647 | 5.1260 | 5.0979 | 5.0766 | 5.0685 | 5.0403 | 5.0254 | 4.5265 | 3.3188 | 5.1307 | 3.2632 |
| $u_3$ | 7.8949 | 7.6816 | 7.5265 | 7.4114 | 7.3213 | 7.2517 | 7.2083 | 7.1286 | 7.1277 | 6.6760 | 5.0386 | 6.6178 | 4.4151 | b2) 64-QAM or 8-PAM for a fading channel (1. option)

| SNR | 5 | 6 | 7 | 8 | 9 | 10 | 11 | 12 | 13 | 14 | 15 | 16 | 17 |
|---|---|---|---|---|---|---|---|---|---|---|---|---|---|
| $u_1$ | 1.0353 | 1.1062 | 1.2092 | 1.3451 | 1.5409 | 1.8112 | 2.1208 | 2.3945 | 2.6067 | 2.7560 | 2.8505 | 2.9120 | 2.9496 |
| $u_2$ | 2.8206 | 2.9015 | 3.0799 | 3.2980 | 3.5826 | 3.9386 | 4.3237 | 4.6577 | 4.9074 | 5.0773 | 5.1674 | 5.2201 | 5.2393 |
| $u_3$ | 3.4534 | 3.9220 | 4.4154 | 4.9297 | 5.5069 | 6.1594 | 6.8108 | 7.3475 | 7.7177 | 7.9488 | 8.0398 | 8.0680 | 8.0538 |

| SNR | 18 | 19 | 20 | 21 | 22 | 23 | 24 | 25 | 26 | 27 | 28 | 29 | 30 |
|---|---|---|---|---|---|---|---|---|---|---|---|---|---|
| $u_1$ | 2.9751 | 2.9907 | 3.0032 | 3.0055 | 3.0126 | 3.0124 | 3.0136 | 3.0165 | 3.0156 | 3.0158 | 3.0160 | 3.0180 | 3.0183 |
| $u_2$ | 5.2491 | 5.2493 | 5.2489 | 5.2365 | 5.2375 | 5.2247 | 5.2182 | 5.2165 | 5.2098 | 5.2070 | 5.2040 | 5.2036 | 5.1995 |
| $u_3$ | 8.0217 | 7.9849 | 7.9528 | 7.9035 | 7.8862 | 7.8443 | 7.8194 | 7.8046 | 7.7839 | 7.7661 | 7.7620 | 7.7569 | 7.7566 | b3) 64-QAM/8-PAM for a non-fading channel (2. option)

| SNR | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| u1 | 1.0007 | 1.0017 | 0.7353 | 0.9997 | 1.0002 | 0.9998 | 1.0001 | 1 | 1.1927 | 1.4264 | 1.7169 | 2.0738 | 2.4886 | 2.8112 |
| u2 | 1.0005 | 1.0004 | 1.0005 | 2.2657 | 2.8429 | 3.337 | 3.6717 | 3.7738 | 3.5613 | 3.6905 | 3.9984 | 4.3992 | 4.8482 | 5.2041 |
| u3 | 0.9998 | 0.9999 | 1.4855 | 2.2642 | 2.842 | 3.3367 | 3.6718 | 3.775 | 4.6253 | 5.4009 | 6.24 | 7.1031 | 7.9262 | 8.4801 |

| SNR | 14 | 15 | 16 | 17 | 18 | 19 | 20 | 21 | 22 | 23 | 24 | 25 | 26 | 27 |
|---|---|---|---|---|---|---|---|---|---|---|---|---|---|---|
| u1 | 2.9803 | 3.0658 | 3.089 | 3.0745 | 3.0551 | 3.0408 | 3.0308 | 3.0234 | 3.0183 | 3.0146 | 3.0117 | 3.006 | 2.9999 | 3.0181 |
| u2 | 5.4101 | 5.5099 | 5.4876 | 5.3868 | 5.288 | 5.2157 | 5.1639 | 5.1262 | 5.0982 | 5.0776 | 5.0613 | 5.0467 | 5.0116 | 5.0174 |
| u3 | 8.7018 | 8.7025 | 8.4931 | 8.1754 | 7.8925 | 7.6814 | 7.5255 | 7.4093 | 7.3204 | 7.2536 | 7.2029 | 7.156 | 7.1015 | 7.12 |

| SNR | 28 | 29 | 30 |
|---|---|---|---|
| u1 | 3.1429 | 2.5878 | 2.6804 |
| u2 | 5.2147 | 4.0051 | 4.2638 |
| u3 | 7.481 | 5.6207 | 5.7796 | b4) 64-QAM/8-PAM for a fading channel (2. option)

| SNR | 5 | 6 | 7 | 8 | 9 | 10 | 11 | 12 | 13 | 14 | 15 | 16 | 17 | 18 |
|---|---|---|---|---|---|---|---|---|---|---|---|---|---|---|
| u1 | 1.0353 | 1.1062 | 1.2092 | 1.3451 | 1.5409 | 1.8112 | 2.1208 | 2.3945 | 2.6067 | 2.756 | 2.8505 | 2.912 | 2.9496 | 2.9751 |
| u2 | 2.8206 | 2.9015 | 3.0799 | 3.298 | 3.5826 | 3.9386 | 4.3237 | 4.6577 | 4.9074 | 5.0773 | 5.1674 | 5.2201 | 5.2393 | 5.2491 |
| u3 | 3.4534 | 3.922 | 4.4154 | 4.9297 | 5.5069 | 6.1594 | 6.8108 | 7.3475 | 7.7177 | 7.9488 | 8.0398 | 8.068 | 8.0538 | 8.0217 |

| SNR | 19 | 20 | 21 | 22 | 23 | 24 | 25 | 26 | 27 | 28 | 29 | 30 |
|---|---|---|---|---|---|---|---|---|---|---|---|---|
| u1 | 2.9907 | 3.0032 | 3.0055 | 3.0126 | 3.0124 | 3.0136 | 3.0165 | 3.0156 | 3.0158 | 3.016 | 3.018 | 3.0183 |
| u2 | 5.2493 | 5.2489 | 5.2365 | 5.2375 | 5.2247 | 5.2182 | 5.2165 | 5.2098 | 5.207 | 5.204 | 5.2036 | 5.1995 |
| u3 | 7.9849 | 7.9528 | 7.9035 | 7.8862 | 7.8443 | 7.8194 | 7.8046 | 7.7839 | 7.7661 | 7.762 | 7.7569 | 7.7566 | c1) 256-QAM or 16-PAM for a non-fading channel (1. option)

| SNR | 5 | 6 | 7 | 8 | 9 | 10 | 11 | 12 | 13 | 14 | 15 | 16 | 17 |
|---|---|---|---|---|---|---|---|---|---|---|---|---|---|
| $u_1$ | 1.0097 | 1.0665 | 1.0768 | 1.0930 | 1.1066 | 1.0503 | 1.0278 | 1.0000 | 1.0000 | 1.0000 | 1.0000 | 1.0256 | 1.1132 |
| $u_2$ | 1.0243 | 1.4150 | 1.2578 | 1.4817 | 1.7257 | 1.9773 | 2.1334 | 2.3571 | 2.6866 | 2.8218 | 2.9484 | 3.0100 | 3.0828 |
| $u_3$ | 1.0300 | 1.6034 | 1.2587 | 1.5300 | 1.7257 | 1.9773 | 2.1334 | 2.3622 | 2.7092 | 2.8892 | 3.1149 | 3.2249 | 3.4673 |
| $u_4$ | 2.6821 | 3.3596 | 3.4255 | 3.7766 | 3.9138 | 4.1612 | 4.3125 | 4.4722 | 4.8316 | 4.9033 | 5.1366 | 5.2497 | 5.4373 |
| $u_5$ | 2.6821 | 3.3596 | 3.4255 | 3.7766 | 3.9375 | 4.1734 | 4.4861 | 4.8450 | 5.3535 | 5.5528 | 5.8510 | 6.0534 | 6.5183 |
| $u_6$ | 3.3063 | 4.0879 | 4.3286 | 4.6970 | 5.0898 | 5.6363 | 6.3912 | 6.8392 | 7.6085 | 7.9200 | 8.3122 | 8.4791 | 8.8521 |
| $u_7$ | 3.6820 | 4.7573 | 4.7284 | 5.4489 | 6.2380 | 6.5675 | 7.7493 | 8.8112 | 10.0024 | 10.6021 | 11.1960 | 11.3836 | 11.7747 |

| SNR | 18 | 19 | 20 | 21 | 22 | 23 | 24 | 25 | 26 | 27 | 28 | 29 | 30 |
|---|---|---|---|---|---|---|---|---|---|---|---|---|---|
| $u_1$ | 1.3440 | 2.0909 | 2.7505 | 2.9606 | 3.0120 | 3.0176 | 3.0142 | 3.0104 | 3.0073 | 3.0054 | 3.0042 | 3.0022 | 2.9919 |
| $u_2$ | 3.2921 | 4.0957 | 4.8095 | 5.0402 | 5.0981 | 5.0934 | 5.0719 | 5.0525 | 5.0386 | 5.0269 | 5.0222 | 5.0150 | 5.0017 |
| $u_3$ | 4.0379 | 5.5745 | 6.8101 | 7.2061 | 7.2981 | 7.2676 | 7.2042 | 7.1500 | 7.1120 | 7.0845 | 7.0663 | 7.0475 | 7.0199 |
| $u_4$ | 5.9945 | 7.7068 | 9.1334 | 9.6065 | 9.6891 | 9.5883 | 9.4460 | 9.3305 | 9.2485 | 9.1897 | 9.1488 | 9.1103 | 9.0581 |
| $u_5$ | 7.5727 | 9.9098 | 11.7487 | 12.3192 | 12.3427 | 12.1129 | 11.8445 | 11.6314 | 11.4793 | 11.3645 | 11.2861 | 11.2158 | 11.1448 |
| $u_6$ | 9.9517 | 12.7455 | 14.9217 | 15.4925 | 15.3646 | 14.9269 | 14.4704 | 14.1111 | 13.8500 | 13.6527 | 13.5110 | 13.3957 | 13.2816 |
| $u_7$ | 13.0332 | 16.3954 | 18.9099 | 19.3657 | 18.9656 | 18.2095 | 17.4738 | 16.8947 | 16.4666 | 16.1368 | 15.8975 | 15.6946 | 15.5305 | c2) 256-QAM or 16-PAM for a fading channel (1. option)

| SNR | 5 | 6 | 7 | 8 | 9 | 10 | 11 | 12 | 13 | 14 | 15 | 16 | 17 |
|---|---|---|---|---|---|---|---|---|---|---|---|---|---|
| $u_1$ | 1.0356 | 1.0100 | 1.0290 | 1.0219 | 1.0329 | 1.0094 | 1.0111 | 1.0000 | 1.0000 | 1.0001 | 1.0246 | 1.1185 | 1.3950 |
| $u_2$ | 1.3828 | 1.3870 | 1.5299 | 1.4838 | 1.7668 | 1.9127 | 2.1472 | 2.2908 | 2.4733 | 2.6105 | 2.7092 | 2.8453 | 3.1765 |
| $u_3$ | 1.3992 | 1.3870 | 1.5492 | 1.4838 | 1.7668 | 1.9127 | 2.1472 | 2.3051 | 2.5255 | 2.7354 | 2.9390 | 3.2706 | 3.9636 |
| $u_4$ | 3.0045 | 3.1253 | 3.3047 | 3.3824 | 3.7309 | 3.9074 | 4.1429 | 4.3242 | 4.5173 | 4.6739 | 4.8281 | 5.1438 | 5.9227 |
| $u_5$ | 3.0045 | 3.1449 | 3.3048 | 3.4113 | 3.7801 | 4.0235 | 4.3590 | 4.7401 | 5.0524 | 5.3659 | 5.7359 | 6.3140 | 7.4309 |
| $u_6$ | 3.6491 | 4.1004 | 4.3581 | 4.6594 | 5.1755 | 5.6876 | 6.0417 | 6.6189 | 7.0304 | 7.3939 | 7.7768 | 8.4290 | 9.7743 |
| $u_7$ | 4.3373 | 4.5258 | 4.9468 | 5.3793 | 5.9000 | 6.6271 | 7.4630 | 8.7179 | 9.2916 | 9.7803 | 10.2831 | 11.1015 | 12.7817 |

| SNR | 18 | 19 | 20 | 21 | 22 | 23 | 24 | 25 | 26 | 27 | 28 | 29 | 30 |
|---|---|---|---|---|---|---|---|---|---|---|---|---|---|
| $u_1$ | 1.8520 | 2.2282 | 2.4888 | 2.6609 | 2.7728 | 2.8431 | 2.8888 | 2.9170 | 2.9375 | 2.9504 | 2.9593 | 2.9671 | 2.9692 |
| $u_2$ | 3.7148 | 4.1544 | 4.4597 | 4.6629 | 4.7937 | 4.8730 | 4.9250 | 4.9552 | 4.9771 | 4.9892 | 4.9973 | 5.0074 | 5.0060 |
| $u_3$ | 4.9210 | 5.6758 | 6.1947 | 6.5358 | 6.7533 | 6.8809 | 6.9632 | 7.0090 | 7.0410 | 7.0554 | 7.0668 | 7.0806 | 7.0767 |
| $u_4$ | 7.0428 | 7.9073 | 8.4842 | 8.8475 | 9.0687 | 9.1840 | 9.2515 | 9.2802 | 9.2999 | 9.2969 | 9.2999 | 9.3060 | 9.2919 |
| $u_5$ | 8.9081 | 10.0295 | 10.7658 | 11.2198 | 11.4828 | 11.6084 | 11.6720 | 11.6871 | 11.6912 | 11.6733 | 11.6622 | 11.6610 | 11.6332 |
| $u_6$ | 11.5661 | 12.8870 | 13.7176 | 14.1966 | 14.4408 | 14.5284 | 14.5407 | 14.5072 | 14.4683 | 14.4127 | 14.3708 | 14.3439 | 14.2915 |
| $u_7$ | 14.9910 | 16.5637 | 17.4984 | 17.9831 | 18.1769 | 18.1849 | 18.1070 | 17.9950 | 17.8844 | 17.7634 | 17.6707 | 17.6011 | 17.5056 | c3) 256-QAM/16-PAM for a non-fading channel (2. option)

| SNR | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| u1 | 0.9987 | 1 | 0.8555 | 0.9986 | 1.0007 | 0.9999 | 1 | 1.0001 | 1.1538 | 1.2053 | 1.1098 | 1.0113 | 0.9755 | 0.961 |
| u2 | 0.9995 | 0.9988 | 0.6438 | 0.999 | 1.0022 | 1.0008 | 0.9997 | 1 | 1.3318 | 1.4592 | 1.5806 | 1.8511 | 2.1909 | 2.5454 |
| u3 | 1.0006 | 1.0012 | 0.7241 | 0.9997 | 1.0003 | 0.9994 | 1.0002 | 1 | 1.1537 | 1.2044 | 1.4081 | 1.7918 | 2.1934 | 2.5919 |
| u4 | 1.0014 | 0.9977 | 0.9802 | 2.2701 | 2.8454 | 3.336 | 3.6707 | 3.7727 | 4.0051 | 4.1314 | 3.8919 | 3.9933 | 4.2942 | 4.6269 |
| u5 | 0.9994 | 0.9966 | 0.8403 | 2.261 | 2.8447 | 3.3359 | 3.6718 | 3.7726 | 3.5919 | 3.7449 | 3.8725 | 4.2278 | 4.6785 | 5.1556 |
| u6 | 0.9984 | 0.9972 | 1.2098 | 2.2574 | 2.8455 | 3.3381 | 3.6727 | 3.7737 | 4.0063 | 4.1297 | 4.7175 | 5.7442 | 6.5854 | 7.3386 |
| u7 | 1.0001 | 0.9996 | 1.4732 | 2.265 | 2.8465 | 3.3369 | 3.6713 | 3.7738 | 5.9093 | 6.4423 | 6.812 | 7.6428 | 8.6591 | 9.7477 |

| SNR | 14 | 15 | 16 | 17 | 18 | 19 | 20 | 21 | 22 | 23 | 24 | 25 | 26 | 27 |
|---|---|---|---|---|---|---|---|---|---|---|---|---|---|---|
| u1 | 0.9653 | 0.9856 | 1.0251 | 1.1128 | 1.3449 | 2.0965 | 2.7527 | 2.9608 | 3.012 | 3.0177 | 3.0143 | 3.0103 | 3.0079 | 3.0062 |
| u2 | 2.7901 | 2.9261 | 3.0106 | 3.0821 | 3.2917 | 4.1039 | 4.811 | 5.0404 | 5.0984 | 5.0934 | 5.0717 | 5.0526 | 5.0399 | 5.0306 |
| u3 | 2.88 | 3.0661 | 3.2252 | 3.4662 | 4.0382 | 5.5877 | 6.8118 | 7.2066 | 7.2996 | 7.2675 | 7.2034 | 7.15 | 7.1134 | 7.0869 |
| u4 | 4.8939 | 5.0926 | 5.2509 | 5.436 | 5.9941 | 7.7231 | 9.1364 | 9.6073 | 9.6907 | 9.5882 | 9.4452 | 9.3304 | 9.2506 | 9.1924 |
| u5 | 5.5283 | 5.7961 | 6.055 | 6.5161 | 7.5736 | 9.9317 | 11.7532 | 12.3202 | 12.3438 | 12.1129 | 11.8432 | 11.6313 | 11.4811 | 11.3712 |
| u6 | 7.8908 | 8.2396 | 8.4806 | 8.8492 | 9.9513 | 12.7737 | 14.9274 | 15.4938 | 15.3648 | 14.9271 | 14.4683 | 14.1107 | 13.8529 | 13.661 |
| u7 | 10.5917 | 11.0972 | 11.3853 | 11.7713 | 13.0322 | 16.4337 | 18.9135 | 19.3674 | 18.9636 | 18.2094 | 17.4708 | 16.8942 | 16.4697 | 16.1476 |

| SNR | 28 | 29 | 30 |
|---|---|---|---|
| u1 | 3.0044 | 3.0038 | 3.003 |
| u2 | 5.023 | 5.0178 | 5.0128 |
| u3 | 7.067 | 7.0512 | 7.0407 |
| u4 | 9.1486 | 9.1126 | 9.0893 |
| u5 | 11.2883 | 11.2217 | 11.1749 |

|     |         |         |         |
| --- | ------- | ------- | ------- |
| u6  | 13.5157 | 13.3981 | 13.3164 |
| u7  | 15.9014 | 15.7029 | 15.5677 | c4) 256-QAM/16-PAM for the fading channel (2. option)

| SNR | 0 | 1 | 2 | 3 | 4 | 5 | 6 | 7 | 8 | 9 | 10 | 11 | 12 | 13 |
| --- | --- | --- | --- | --- | --- | --- | --- | --- | --- | --- | --- | --- | --- | --- |
| u1 | 0.9798 | 0.9967 | 0.9947 | 0.9971 | 1.0007 | 1.03 | 1.0688 | 1.0762 | 1.0537 | 1.0342 | 1.0147 | 0.9992 | 0.9918 | 0.9922 |
| u2 | 0.8908 | 1.0016 | 0.9934 | 1.0006 | 0.9987 | 1.0588 | 1.1381 | 1.2317 | 1.3585 | 1.5225 | 1.7405 | 2.0063 | 2.2615 | 2.4654 |
| u3 | 0.9072 | 1.0041 | 0.9993 | 1.0003 | 0.9997 | 1.0295 | 1.0664 | 1.1441 | 1.2863 | 1.4689 | 1.7111 | 2.0037 | 2.2873 | 2.5275 |
| u4 | 1.4244 | 2.0539 | 2.4036 | 2.6739 | 2.9049 | 3.019 | 3.2106 | 3.239 | 3.2891 | 3.4602 | 3.7019 | 3.9966 | 4.2761 | 4.5013 |
| u5 | 1.3906 | 2.0371 | 2.3593 | 2.6731 | 2.9097 | 2.6841 | 2.8603 | 3.0627 | 3.3005 | 3.5807 | 3.9182 | 4.3056 | 4.6871 | 5.0312 |
| u6 | 1.5899 | 2.024 | 2.3535 | 2.6762 | 2.8921 | 3.0205 | 3.2171 | 3.6521 | 4.2742 | 4.8242 | 5.3945 | 5.997 | 6.5483 | 7.0034 |
| u7 | 1.6351 | 2.042 | 2.3973 | 2.6721 | 2.8859 | 3.9489 | 4.5222 | 5.0297 | 5.6081 | 6.271 | 7.0282 | 7.8489 | 8.6107 | 9.2424 |

| SNR | 14 | 15 | 16 | 17 | 18 | 19 | 20 | 21 | 22 | 23 | 24 | 25 | 26 | 27 |
| --- | --- | --- | --- | --- | --- | --- | --- | --- | --- | --- | --- | --- | --- | --- |
| u1 | 0.9989 | 1.0259 | 1.1155 | 1.3963 | 1.8534 | 2.2282 | 2.4891 | 2.6619 | 2.7729 | 2.8437 | 2.889 | 2.9176 | 2.9379 | 2.9516 |
| u2 | 2.6086 | 2.7135 | 2.8419 | 3.1795 | 3.7175 | 4.1541 | 4.4608 | 4.664 | 4.7936 | 4.8758 | 4.9257 | 4.956 | 4.9778 | 4.9933 |
| u3 | 2.7307 | 2.9443 | 3.2659 | 3.9675 | 4.9244 | 5.676 | 6.197 | 6.5386 | 6.7531 | 6.8857 | 6.9639 | 7.0096 | 7.0412 | 7.064 |
| u4 | 4.6692 | 4.8339 | 5.1383 | 5.9281 | 7.0475 | 7.9072 | 8.4862 | 8.8521 | 9.0685 | 9.1906 | 9.253 | 9.282 | 9.3008 | 9.3117 |
| u5 | 5.3576 | 5.7413 | 6.3082 | 7.4353 | 8.9135 | 10.0292 | 10.7694 | 11.2248 | 11.4823 | 11.6157 | 11.6732 | 11.6881 | 11.6943 | 11.6904 |
| u6 | 7.3828 | 7.7887 | 8.4196 | 9.7825 | 11.5726 | 12.8864 | 13.7217 | 14.2018 | 14.4402 | 14.5326 | 14.5421 | 14.508 | 14.472 | 14.4315 |
| u7 | 9.7612 | 10.2938 | 11.0879 | 12.7927 | 15.0009 | 16.5632 | 17.5017 | 17.9894 | 18.1764 | 18.1926 | 18.1172 | 17.9984 | 17.8904 | 17.7896 |

| SNR | 28 | 29 | 30 | 31 | 32 | 33 | 34 | 35 | 36 | 37 | 38 | 39 | 40 |
| --- | --- | --- | --- | --- | --- | --- | --- | --- | --- | --- | --- | --- | --- |
| u1 | 2.9597 | 2.9661 | 2.9708 | 2.9726 | 2.9757 | 2.979 | 2.9795 | 2.9803 | 2.981 | 2.982 | 2.9813 | 2.9795 | 2.9788 |
| u2 | 4.9991 | 5.0047 | 5.0081 | 5.009 | 5.0124 | 5.0173 | 5.0145 | 5.016 | 5.0165 | 5.0165 | 5.0154 | 5.0085 | 5.0096 |
| u3 | 7.0698 | 7.0758 | 7.0795 | 7.0795 | 7.0819 | 7.0887 | 7.0822 | 7.086 | 7.086 | 7.0867 | 7.0883 | 7.0759 | 7.0772 |
| u4 | 9.3029 | 9.2996 | 9.2958 | 9.2878 | 9.2861 | 9.2921 | 9.2787 | 9.2803 | 9.2787 | 9.2784 | 9.2785 | 9.2623 | 9.2664 |
| u5 | 11.668 | 11.6526 | 11.6385 | 11.6222 | 11.6137 | 11.6142 | 11.5969 | 11.5934 | 11.5903 | 11.5892 | 11.5893 | 11.5636 | 11.561 |
| u6 | 14.3754 | 14.3333 | 14.2955 | 14.2621 | 14.2394 | 14.2301 | 14.2009 | 14.1909 | 14.1835 | 14.1804 | 14.173 | 14.1335 | 14.1421 |
| u7 | 17.6749 | 17.5886 | 17.5132 | 17.4498 | 17.4048 | 17.3749 | 17.3292 | 17.307 | 17.2908 | 17.2734 | 17.2633 | 17.208 | 17.2206 | d1) 1024-QAM or 32-PAM for a non-fading channel (1. option)

| SNR | 8 | 9 | 10 | 11 | 12 | 13 | 14 | 15 | 16 | 17 | 18 |
| --- | --- | --- | --- | --- | --- | --- | --- | --- | --- | --- | --- |
| $u_1$ | 1.0067 | 1.0148 | 1.0507 | 1.0476 | 1.0198 | 1.0464 | 1.0909 | 1.0037 | 1.0187 | 1.0148 | 1.0251 |
| $u_2$ | 1.0380 | 1.0523 | 1.0845 | 1.0835 | 1.0373 | 1.0701 | 1.0910 | 1.0428 | 1.0711 | 1.1108 | 1.2863 |
| $u_3$ | 1.0695 | 1.0949 | 1.1046 | 1.1376 | 1.0754 | 1.0813 | 1.1644 | 1.0447 | 1.0807 | 1.1364 | 1.2891 |
| $u_4$ | 1.6402 | 1.8347 | 2.0518 | 2.5314 | 2.6729 | 2.9275 | 3.0920 | 2.9924 | 3.0361 | 3.0693 | 3.3256 |
| $u_5$ | 1.6741 | 1.9096 | 2.1058 | 2.5742 | 2.7200 | 2.9512 | 3.1966 | 3.0105 | 3.0631 | 3.0902 | 3.3296 |
| $u_6$ | 1.6802 | 1.9096 | 2.1287 | 2.5742 | 2.7278 | 3.0476 | 3.2399 | 3.1832 | 3.3080 | 3.4418 | 3.9436 |
| $u_7$ | 1.7120 | 1.9314 | 2.1552 | 2.6395 | 2.7641 | 3.0980 | 3.3711 | 3.1850 | 3.3133 | 3.4430 | 3.9450 |
| $u_8$ | 3.7616 | 3.9751 | 4.2512 | 4.6900 | 4.7720 | 5.0430 | 5.3006 | 5.1666 | 5.2248 | 5.3743 | 5.9219 |
| $u_9$ | 3.7988 | 4.0277 | 4.3122 | 4.7622 | 4.8209 | 5.1017 | 5.4156 | 5.1666 | 5.2248 | 5.3743 | 5.9219 |
| $u_{10}$ | 3.7988 | 4.0671 | 4.3749 | 4.8789 | 5.0144 | 5.5053 | 5.8716 | 5.8269 | 5.9842 | 6.2741 | 7.2272 |
| $u_{11}$ | 3.8518 | 4.1230 | 4.3905 | 4.8870 | 5.0144 | 5.5054 | 5.8716 | 5.8763 | 6.0961 | 6.4804 | 7.4547 |
| $u_{12}$ | 4.8732 | 5.3269 | 6.0182 | 6.8091 | 7.0796 | 7.6797 | 8.0443 | 7.9004 | 7.9850 | 8.3476 | 9.4109 |
| $u_{13}$ | 4.9607 | 5.3481 | 6.0182 | 6.8466 | 7.0905 | 7.6878 | 8.1462 | 8.2883 | 8.3856 | 8.9683 | 10.1262 |
| $u_{14}$ | 5.5363 | 5.9883 | 6.7380 | 7.6823 | 8.1294 | 8.8170 | 9.3690 | 9.9247 | 10.1499 | 11.0046 | 12.4646 |
| $u_{15}$ | 5.7097 | 6.5205 | 7.2058 | 8.0785 | 8.4303 | 9.8312 | 10.9109 | 11.9003 | 12.0120 | 13.4835 | 15.2549 |

| SNR | 19 | 20 | 21 | 22 | 23 | 24 | 25 | 26 | 27 | 28 | 29 |
| --- | --- | --- | --- | --- | --- | --- | --- | --- | --- | --- | --- |
| $u_1$ | 1.0024 | 1.0006 | 1.0016 | 1.0005 | 1.0031 | 1.0346 | 1.2687 | 2.5688 | 2.9137 | 2.9903 | 3.0038 |
| $u_2$ | 1.7107 | 2.5479 | 2.8831 | 2.9838 | 3.0077 | 3.0243 | 3.2174 | 4.5722 | 4.9309 | 5.0103 | 5.0225 |
| $u_3$ | 1.7141 | 2.5515 | 2.8832 | 2.9845 | 3.0245 | 3.1135 | 3.6704 | 6.2334 | 6.8977 | 7.0454 | 7.0642 |
| $u_4$ | 3.6770 | 4.5909 | 4.9553 | 5.0538 | 5.0615 | 5.0609 | 5.4996 | 8.2567 | 8.9703 | 9.1297 | 9.1403 |
| $u_5$ | 3.6786 | 4.5909 | 4.9553 | 5.0704 | 5.1383 | 5.3184 | 6.3316 | 10.0819 | 11.0442 | 11.2591 | 11.2602 |
| $u_6$ | 4.8209 | 6.4238 | 7.0286 | 7.1835 | 7.1646 | 7.1593 | 8.0505 | 12.1692 | 13.2274 | 13.4612 | 13.4368 |
| $u_7$ | 4.8209 | 6.4274 | 7.0642 | 7.2914 | 7.4407 | 7.8023 | 9.3361 | 14.2128 | 15.4757 | 15.7441 | 15.6806 |
| $u_8$ | 6.8262 | 8.6260 | 9.3012 | 9.4393 | 9.3945 | 9.5457 | 11.0297 | 16.4523 | 17.8558 | 18.1316 | 18.0048 |
| $u_9$ | 6.8553 | 8.7222 | 9.5195 | 9.8531 | 10.1506 | 10.7731 | 12.6757 | 18.7884 | 20.3719 | 20.6408 | 20.4242 |
| $u_{10}$ | 8.6131 | 10.9071 | 11.7486 | 11.9625 | 12.0642 | 12.5104 | 14.5305 | 21.3353 | 23.0690 | 23.2947 | 22.9559 |
| $u_{11}$ | 8.9135 | 11.4255 | 12.5514 | 13.0881 | 13.5886 | 14.2704 | 16.5415 | 24.1089 | 25.9761 | 26.1177 | 25.6206 |
| $u_{12}$ | 11.0009 | 13.7880 | 14.9096 | 15.3045 | 15.6473 | 16.3124 | 18.7922 | 27.1742 | 29.1347 | 29.1436 | 28.4455 |
| $u_{13}$ | 11.9746 | 15.2957 | 16.9425 | 17.5792 | 17.9741 | 18.6433 | 21.3263 | 30.5883 | 32.5987 | 32.4209 | 31.4714 |

-continued

| | | | | | | | | | | |
|---|---|---|---|---|---|---|---|---|---|---|
| $u_{14}$ | 14.5395 | 18.2064 | 19.8795 | 20.4586 | 20.7562 | 21.3536 | 24.2238 | 34.4505 | 36.4620 | 36.0306 | 34.7706 |
| $u_{15}$ | 17.7040 | 21.9252 | 23.6632 | 24.0824 | 24.1747 | 24.6202 | 27.6622 | 38.9891 | 40.9391 | 40.1627 | 38.5012 |

| SNR | 30 | 31 | 32 | 33 | 34 | 35 | 36 | 37 | 38 | 39 | 40 |
|---|---|---|---|---|---|---|---|---|---|---|---|
| $u_1$ | 3.0029 | 3.0028 | 3.0023 | 3.0037 | 3.0010 | 3.0022 | 2.9991 | 3.0009 | 2.9630 | 2.7120 | 2.4609 |
| $u_2$ | 5.0173 | 5.0132 | 5.0104 | 5.0116 | 5.0054 | 5.0074 | 5.0111 | 5.0049 | 4.9499 | 4.2412 | 3.3493 |
| $u_3$ | 7.0495 | 7.0372 | 7.0285 | 7.0273 | 7.0167 | 7.0181 | 7.0328 | 7.0073 | 6.9154 | 5.8741 | 4.7174 |
| $u_4$ | 9.1072 | 9.0800 | 9.0612 | 9.0527 | 9.0358 | 9.0349 | 9.0456 | 9.0153 | 8.8955 | 7.6262 | 6.4878 |
| $u_5$ | 11.1981 | 11.1476 | 11.1119 | 11.0933 | 11.0668 | 11.0584 | 11.0454 | 11.0325 | 10.8427 | 8.9624 | 7.7169 |
| $u_6$ | 13.3309 | 13.2465 | 13.1864 | 13.1515 | 13.1108 | 13.0955 | 13.0779 | 13.0621 | 12.7897 | 10.8692 | 8.5130 |
| $u_7$ | 15.5146 | 15.3830 | 15.2899 | 15.2330 | 15.1738 | 15.1445 | 15.0931 | 15.1013 | 14.7269 | 12.0858 | 9.8751 |
| $u_8$ | 17.7592 | 17.5659 | 17.4290 | 17.3407 | 17.2566 | 17.2099 | 17.1422 | 17.1488 | 16.6081 | 13.7050 | 11.5486 |
| $u_9$ | 20.0760 | 19.8040 | 19.6107 | 19.4829 | 19.3658 | 19.2996 | 19.1878 | 19.2029 | 18.5568 | 15.1881 | 12.4136 |
| $u_{10}$ | 22.4791 | 22.1087 | 21.8439 | 21.6641 | 21.5065 | 21.4089 | 21.2611 | 21.2792 | 20.1847 | 16.9468 | 14.2051 |
| $u_{11}$ | 24.9859 | 24.4938 | 24.1410 | 23.8963 | 23.6863 | 23.5530 | 23.3458 | 23.3490 | 21.2990 | 18.7549 | 15.1350 |
| $u_{12}$ | 27.6192 | 26.9793 | 26.5155 | 26.1908 | 25.9177 | 25.7334 | 25.4559 | 25.4652 | 24.3404 | 20.4199 | 16.3718 |
| $u_{13}$ | 30.4127 | 29.5936 | 28.9967 | 28.5657 | 28.2131 | 27.9698 | 27.6069 | 27.6293 | 25.1817 | 20.6889 | 18.1707 |
| $u_{14}$ | 33.4269 | 32.3855 | 31.6180 | 31.0614 | 30.6020 | 30.2801 | 29.8393 | 29.8551 | 28.0675 | 24.2726 | 18.9363 |
| $u_{15}$ | 36.7956 | 35.4677 | 34.4795 | 33.7493 | 33.1451 | 32.7195 | 32.0437 | 32.1466 | 29.1598 | 25.0126 | 20.2944 | d2) 1024-QAM or 32-PAM for a fading channel (1. option)

| SNR | 0 | 1 | 2 | 3 | 4 | 5 | 6 | 7 | 8 | 9 | 10 |
|---|---|---|---|---|---|---|---|---|---|---|---|
| $u_1$ | 1.0003 | 1.0000 | 1.0000 | 1.0011 | 1.0000 | 1.0000 | 1.0006 | 1.0000 | 1.0002 | 1.0043 | 1.0108 |
| $u_2$ | 1.0003 | 1.0049 | 1.0163 | 1.0196 | 1.0208 | 1.0308 | 1.0214 | 1.0390 | 1.0252 | 1.0803 | 1.1627 |
| $u_3$ | 1.0027 | 1.0254 | 1.0360 | 1.0381 | 1.0582 | 1.0725 | 1.0400 | 1.0475 | 1.0286 | 1.1088 | 1.1942 |
| $u_4$ | 1.0164 | 1.0686 | 1.1300 | 1.2102 | 1.2704 | 1.3984 | 1.4402 | 1.5327 | 1.6809 | 1.9443 | 2.2594 |
| $u_5$ | 1.0277 | 1.0704 | 1.1395 | 1.2359 | 1.2821 | 1.4126 | 1.4586 | 1.5465 | 1.6972 | 1.9733 | 2.3050 |
| $u_6$ | 1.0456 | 1.0894 | 1.1495 | 1.2553 | 1.2994 | 1.4417 | 1.4951 | 1.5465 | 1.7362 | 2.0279 | 2.4395 |
| $u_7$ | 1.0487 | 1.1132 | 1.1734 | 1.2757 | 1.3364 | 1.4849 | 1.5096 | 1.7364 | 2.0560 | 2.4406 |   |
| $u_8$ | 1.9738 | 2.1671 | 2.3628 | 2.5480 | 2.7476 | 3.0647 | 3.1661 | 3.3174 | 3.5767 | 3.8954 | 4.3049 |
| $u_9$ | 2.0526 | 2.1986 | 2.4403 | 2.6234 | 2.8083 | 3.1166 | 3.2014 | 3.3403 | 3.5857 | 3.9143 | 4.3315 |
| $u_{10}$ | 2.0663 | 2.2340 | 2.4536 | 2.6234 | 2.8196 | 3.1458 | 3.2015 | 3.3860 | 3.6394 | 4.0486 | 4.6119 |
| $u_{11}$ | 2.1022 | 2.2898 | 2.5070 | 2.6836 | 2.8698 | 3.1887 | 3.2388 | 3.3919 | 3.6572 | 4.0846 | 4.6119 |
| $u_{12}$ | 2.4454 | 2.6894 | 2.9825 | 3.2145 | 3.4803 | 3.8713 | 4.0826 | 4.4221 | 4.8650 | 5.3735 | 6.0449 |
| $u_{13}$ | 2.5537 | 2.7750 | 3.0830 | 3.2993 | 3.6342 | 4.0375 | 4.1566 | 4.4677 | 4.8650 | 5.3735 | 6.1193 |
| $u_{14}$ | 2.7190 | 2.9743 | 3.3004 | 3.5711 | 3.9845 | 4.3829 | 4.6192 | 4.9832 | 5.4362 | 6.1354 | 6.8700 |
| $u_{15}$ | 2.8164 | 3.1340 | 3.3947 | 3.7517 | 4.0778 | 4.5240 | 4.8297 | 5.2517 | 5.7299 | 6.6103 | 7.5087 |

| SNR | 11 | 12 | 13 | 14 | 15 | 16 | 17 | 18 | 19 | 20 | 21 |
|---|---|---|---|---|---|---|---|---|---|---|---|
| $u_1$ | 1.0206 | 1.0240 | 1.0158 | 1.0030 | 1.0094 | 1.0165 | 1.0109 | 1.0003 | 1.0009 | 1.0043 | 1.0003 |
| $u_2$ | 1.0739 | 1.1088 | 1.2267 | 1.0173 | 1.0577 | 1.1641 | 1.3963 | 1.6842 | 2.0893 | 2.3787 | 2.5628 |
| $u_3$ | 1.1015 | 1.1366 | 1.2493 | 1.0173 | 1.0632 | 1.1895 | 1.4131 | 1.6863 | 2.0899 | 2.3793 | 2.5641 |
| $u_4$ | 2.3031 | 2.5070 | 2.7823 | 2.6207 | 2.7531 | 2.9022 | 3.1798 | 3.5239 | 3.9928 | 4.3337 | 4.5385 |
| $u_5$ | 2.3307 | 2.5226 | 2.8092 | 2.6267 | 2.7580 | 2.9222 | 3.1944 | 3.5282 | 3.9930 | 4.3342 | 4.5580 |
| $u_6$ | 2.3962 | 2.6229 | 3.0150 | 2.7411 | 2.9810 | 3.3589 | 3.9199 | 4.5765 | 5.3853 | 5.9529 | 6.2800 |
| $u_7$ | 2.4238 | 2.6526 | 3.0349 | 2.7470 | 2.9811 | 3.3605 | 3.9203 | 4.5765 | 5.3906 | 5.9865 | 6.3991 |
| $u_8$ | 4.3380 | 4.5737 | 4.9461 | 4.6738 | 4.8680 | 5.2293 | 5.8532 | 6.6194 | 7.5215 | 8.1146 | 8.4195 |
| $u_9$ | 4.3743 | 4.6127 | 4.9764 | 4.6738 | 4.8680 | 5.2293 | 5.8532 | 6.6415 | 7.6038 | 8.3211 | 8.8558 |
| $u_{10}$ | 4.6129 | 4.9434 | 5.4050 | 5.3030 | 5.6793 | 6.3007 | 7.1684 | 8.1899 | 9.3413 | 10.1083 | 10.5973 |
| $u_{11}$ | 4.6129 | 4.9434 | 5.4050 | 5.3190 | 5.7268 | 6.4114 | 7.3330 | 8.5123 | 9.8455 | 10.8886 | 11.6792 |
| $u_{12}$ | 6.2332 | 6.6912 | 7.1932 | 7.0781 | 7.4631 | 8.1246 | 9.1671 | 10.4955 | 11.9313 | 12.9749 | 13.7196 |
| $u_{13}$ | 6.2378 | 6.7067 | 7.2143 | 7.4316 | 7.8792 | 8.7397 | 9.9527 | 11.6664 | 13.4007 | 14.6947 | 15.6090 |
| $u_{14}$ | 7.2044 | 7.7531 | 8.3908 | 9.0011 | 9.5503 | 10.5383 | 11.9678 | 13.9641 | 15.9024 | 17.3089 | 18.2685 |
| $u_{15}$ | 7.8925 | 8.6732 | 9.0513 | 10.9148 | 11.5100 | 12.7890 | 14.4376 | 16.9300 | 19.1680 | 20.7369 | 21.7475 |

| SNR | 22 | 23 | 24 | 25 | 26 | 27 | 28 | 29 | 30 | 31 | 32 |
|---|---|---|---|---|---|---|---|---|---|---|---|
| $u_1$ | 1.0002 | 1.0753 | 1.5871 | 2.0792 | 2.3953 | 2.5979 | 2.7284 | 2.8108 | 2.8638 | 2.8972 | 2.9205 |
| $u_2$ | 2.6821 | 2.8032 | 3.3595 | 3.9137 | 4.2801 | 4.5188 | 4.6763 | 4.7770 | 4.8432 | 4.8844 | 4.9121 |
| $u_3$ | 2.6985 | 2.9606 | 4.0489 | 5.0644 | 5.7316 | 6.1639 | 6.4450 | 6.6243 | 6.7411 | 6.8116 | 6.8624 |
| $u_4$ | 4.6475 | 4.8124 | 5.9653 | 7.0563 | 7.7599 | 8.2091 | 8.4995 | 8.6815 | 8.7991 | 8.8675 | 8.9155 |
| $u_5$ | 4.7447 | 5.1854 | 6.8626 | 8.3577 | 9.3324 | 9.9565 | 10.3588 | 10.6098 | 10.7698 | 10.8617 | 10.9265 |
| $u_6$ | 6.4363 | 6.7835 | 8.6319 | 10.2875 | 11.3529 | 12.0290 | 12.4603 | 12.7241 | 12.8892 | 12.9778 | 13.0422 |
| $u_7$ | 6.7723 | 7.5030 | 9.8196 | 11.8295 | 13.1294 | 13.9541 | 14.4760 | 14.7917 | 14.9857 | 15.0876 | 15.1596 |
| $u_8$ | 8.6146 | 9.2375 | 11.8029 | 14.0035 | 15.3949 | 16.2563 | 16.7886 | 17.0983 | 17.2797 | 17.3649 | 17.4228 |
| $u_9$ | 9.3840 | 10.3216 | 13.3049 | 15.8351 | 17.4372 | 18.4233 | 19.0262 | 19.3679 | 19.5628 | 19.6463 | 19.6994 |
| $u_{10}$ | 11.0496 | 12.0123 | 15.3459 | 18.1385 | 19.8764 | 20.9233 | 21.5442 | 21.8783 | 22.0561 | 22.1145 | 22.1450 |
| $u_{11}$ | 12.3712 | 13.5373 | 17.2964 | 20.4157 | 22.3392 | 23.4820 | 24.1409 | 24.4781 | 24.6459 | 24.6783 | 24.6849 |
| $u_{12}$ | 14.3775 | 15.6118 | 19.8018 | 23.2294 | 25.2925 | 26.4779 | 27.1285 | 27.4264 | 27.5506 | 27.5290 | 27.4931 |
| $u_{13}$ | 16.3759 | 17.7521 | 22.4374 | 26.2246 | 28.4576 | 29.7039 | 30.3509 | 30.6108 | 30.6865 | 30.6041 | 30.5122 |

-continued

| | | | | | | | | | | |
|---|---|---|---|---|---|---|---|---|---|---|
| $u_{14}$ | 19.0535 | 20.5285 | 25.7859 | 29.9638 | 32.3556 | 33.6202 | 34.2212 | 34.3969 | 34.3835 | 34.2046 | 34.0347 |
| $u_{15}$ | 22.5334 | 24.1205 | 30.0937 | 34.7506 | 37.3202 | 38.5786 | 39.0930 | 39.1396 | 38.9925 | 38.6816 | 38.3850 |

| SNR | 33 | 34 | 35 | 36 | 37 | 38 | 39 | 40 |
|---|---|---|---|---|---|---|---|---|
| $u_1$ | 2.9354 | 2.9461 | 2.9539 | 2.9566 | 2.9625 | 2.9679 | 2.9706 | 2.9668 |
| $u_2$ | 4.9294 | 4.9430 | 4.9521 | 4.9535 | 4.9610 | 4.9733 | 4.9711 | 4.9647 |
| $u_3$ | 6.8891 | 6.9128 | 6.9279 | 6.9327 | 6.9441 | 6.9639 | 6.9598 | 6.9537 |
| $u_4$ | 8.9381 | 8.9612 | 8.9734 | 8.9760 | 8.9857 | 9.0117 | 9.0034 | 8.9914 |
| $u_5$ | 10.9554 | 10.9880 | 11.0022 | 11.0031 | 11.0166 | 11.0516 | 11.0381 | 11.0244 |
| $u_6$ | 13.0641 | 13.0956 | 13.1054 | 13.1036 | 13.1132 | 13.1541 | 13.1339 | 13.1153 |
| $u_7$ | 15.1815 | 15.2131 | 15.2214 | 15.2164 | 15.2267 | 15.2711 | 15.2475 | 15.2256 |
| $u_8$ | 17.4273 | 17.4495 | 17.4469 | 17.4330 | 17.4369 | 17.4818 | 17.4503 | 17.4219 |
| $u_9$ | 19.6952 | 19.7108 | 19.6985 | 19.6773 | 19.6762 | 19.7216 | 19.6855 | 19.6521 |
| $u_{10}$ | 22.1170 | 22.1128 | 22.0880 | 22.0535 | 22.0433 | 22.0913 | 22.0378 | 21.9943 |
| $u_{11}$ | 24.6327 | 24.6090 | 24.5689 | 24.5179 | 24.4941 | 24.5412 | 24.4762 | 24.4209 |
| $u_{12}$ | 27.3953 | 27.3392 | 27.2667 | 27.1957 | 27.1547 | 27.1976 | 27.1095 | 27.0355 |
| $u_{13}$ | 30.3630 | 30.2747 | 30.1682 | 30.0651 | 30.0017 | 30.0359 | 29.9279 | 29.8362 |
| $u_{14}$ | 33.8099 | 33.6615 | 33.5079 | 33.3683 | 33.2557 | 33.2767 | 33.1414 | 33.0224 |
| $u_{15}$ | 38.0516 | 37.8298 | 37.6071 | 37.3990 | 37.2354 | 37.2407 | 37.0845 | 36.9002 |

| SNR | 42 | 44 | 46 | 48 | 50 |
|---|---|---|---|---|---|
| $u_1$ | 2.9738 | 2.9727 | 2.9803 | 2.9747 | 2.9755 |
| $u_2$ | 4.9763 | 4.9704 | 4.9831 | 4.9798 | 4.9849 |
| $u_3$ | 6.9716 | 6.9620 | 6.9761 | 6.9699 | 6.9855 |
| $u_4$ | 9.0140 | 8.9995 | 9.0169 | 9.0005 | 9.0175 |
| $u_5$ | 11.0516 | 11.0383 | 11.0596 | 11.0277 | 11.0471 |
| $u_6$ | 13.1460 | 13.1331 | 13.1545 | 13.0993 | 13.1231 |
| $u_7$ | 15.2595 | 15.2451 | 15.2638 | 15.1874 | 15.2293 |
| $u_8$ | 17.4578 | 17.4387 | 17.4605 | 17.3555 | 17.4128 |
| $u_9$ | 19.6900 | 19.6695 | 19.6999 | 19.5662 | 19.6282 |
| $u_{10}$ | 22.0331 | 22.0039 | 22.0346 | 21.8900 | 21.9543 |
| $u_{11}$ | 24.4634 | 24.4247 | 24.4522 | 24.2985 | 24.3779 |
| $u_{12}$ | 27.0712 | 27.0228 | 27.0504 | 26.8712 | 26.9537 |
| $u_{13}$ | 29.8692 | 29.7967 | 29.8201 | 29.6120 | 29.6794 |
| $u_{14}$ | 33.0482 | 32.9359 | 32.9517 | 32.7729 | 32.8541 |
| $u_{15}$ | 36.8842 | 36.7255 | 36.7204 | 36.5908 | 36.7169 | d3) 1024-QAM/32-PAM for a non-fading channel (2.$^{35}$ option)

| SNR | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| u1 | 0.9992 | 0.9991 | 0.9626 | 0.9967 | 0.9967 | 0.9988 | 0.9997 | 1.0671 | 1.0969 | 1.0363 | 0.962 | 1.0001 | 0.9878 | 0.9942 |
| u2 | 0.9957 | 0.9942 | 0.8697 | 0.9895 | 0.9965 | 0.9992 | 0.9989 | 1.1388 | 1.2043 | 1.2107 | 1.1702 | 0.9997 | 0.9747 | 0.966 |
| u3 | 0.9965 | 0.9943 | 0.8971 | 0.99 | 0.9962 | 0.9991 | 0.9986 | 1.0674 | 1.0955 | 1.1639 | 1.2161 | 0.9996 | 0.9863 | 0.9719 |
| u4 | 0.9971 | 0.9965 | 0.6648 | 0.99 | 0.9954 | 0.9994 | 1.0008 | 1.1386 | 1.2048 | 1.3562 | 1.4866 | 1.8264 | 2.2272 | 2.5533 |
| u5 | 0.996 | 0.9939 | 0.6491 | 0.9905 | 0.9956 | 0.9997 | 1.001 | 1.2138 | 1.3242 | 1.4129 | 1.4414 | 1.848 | 2.2217 | 2.5387 |
| u6 | 0.9992 | 1.0019 | 0.6995 | 0.9974 | 0.9977 | 0.9998 | 1.0017 | 1.1384 | 1.2058 | 1.2085 | 1.1751 | 1.8267 | 2.223 | 2.5691 |
| u7 | 0.9999 | 1.0022 | 0.719 | 0.9994 | 0.9993 | 1.0004 | 1.0017 | 1.0667 | 1.0964 | 1.162 | 1.2213 | 1.8066 | 2.2286 | 2.581 |
| u8 | 1.0018 | 1.0047 | 0.9796 | 2.2704 | 2.8447 | 3.3339 | 3.6691 | 4.1038 | 4.3038 | 4.1189 | 3.88 | 3.962 | 4.3457 | 4.661 |
| u9 | 1.0009 | 1.0043 | 0.9448 | 2.264 | 2.8416 | 3.334 | 3.6696 | 3.6418 | 3.8694 | 4.0902 | 4.1993 | 4.1097 | 4.4994 | 4.7046 |
| u10 | 0.9975 | 0.9957 | 0.8525 | 2.2387 | 2.8354 | 3.336 | 3.672 | 3.4119 | 3.666 | 3.7746 | 3.802 | 4.2647 | 4.7161 | 5.1202 |
| u11 | 0.9986 | 0.9982 | 0.8839 | 2.2405 | 2.8378 | 3.3375 | 3.6721 | 3.6428 | 3.8684 | 3.7435 | 3.6203 | 4.1131 | 4.5362 | 5.0343 |
| u12 | 0.9986 | 0.9963 | 1.2974 | 2.2393 | 2.8414 | 3.3349 | 3.6662 | 4.1042 | 4.3048 | 4.1203 | 3.8917 | 6.185 | 6.9957 | 7.2365 |
| u13 | 0.9975 | 0.996 | 1.243 | 2.2388 | 2.838 | 3.3348 | 3.6674 | 3.6422 | 3.8687 | 4.0904 | 4.2129 | 5.8337 | 6.7509 | 7.454 |
| u14 | 1.001 | 1.0011 | 1.4137 | 2.2601 | 2.844 | 3.335 | 3.6673 | 4.1032 | 4.3066 | 5.0379 | 5.5707 | 6.2198 | 7.2075 | 8.594 |
| u15 | 1.0017 | 1.0022 | 1.4853 | 2.2698 | 2.8465 | 3.3339 | 3.6669 | 6.1624 | 6.9359 | 7.2501 | 7.4066 | 8.6211 | 9.7438 | 10.859 |

| SNR | 14 | 15 | 16 | 17 | 18 | 19 | 20 | 21 | 22 | 23 | 24 | 25 | 26 | 27 |
|---|---|---|---|---|---|---|---|---|---|---|---|---|---|---|
| u1 | 1.0007 | 1.0027 | 0.9981 | 0.9933 | 0.9936 | 0.999 | 1 | 1.0001 | 0.9973 | 1.0036 | 1.0338 | 1.2685 | 2.568 | 2.9124 |
| u2 | 0.9694 | 0.9834 | 1.0086 | 1.0594 | 1.2188 | 1.7124 | 2.5469 | 2.8781 | 2.9836 | 3.0078 | 3.024 | 3.2172 | 4.5709 | 4.9289 |
| u3 | 0.9681 | 0.9811 | 1.0101 | 1.0676 | 1.2263 | 1.7139 | 2.5465 | 2.8764 | 2.9837 | 3.0244 | 3.1126 | 3.6704 | 6.2313 | 6.8942 |
| u4 | 2.7737 | 2.9007 | 2.9741 | 3.0241 | 3.159 | 3.6872 | 4.5907 | 4.9456 | 5.0494 | 5.0625 | 5.0597 | 5.4996 | 8.2546 | 8.9668 |
| u5 | 2.7714 | 2.9125 | 2.9988 | 3.0553 | 3.1727 | 3.6864 | 4.5862 | 4.9442 | 5.0663 | 5.138 | 5.3175 | 6.3322 | 10.0797 | 11.0396 |
| u6 | 2.8418 | 3.0307 | 3.1789 | 3.35 | 3.7479 | 4.8324 | 6.417 | 7.0146 | 7.1785 | 7.1643 | 7.1579 | 8.0513 | 12.1665 | 13.2221 |
| u7 | 2.846 | 3.0218 | 3.1519 | 3.3116 | 3.7215 | 4.8231 | 6.4211 | 7.0502 | 7.2858 | 7.4383 | 7.8018 | 9.3367 | 14.2096 | 15.4697 |
| u8 | 4.9072 | 5.0916 | 5.2328 | 5.352 | 5.6798 | 6.8426 | 8.6195 | 9.2808 | 9.4323 | 9.3928 | 9.5449 | 11.0304 | 16.4487 | 17.8497 |
| u9 | 4.8825 | 5.0325 | 5.1573 | 5.2795 | 5.6568 | 6.8702 | 8.7174 | 9.4992 | 9.8449 | 10.1481 | 10.7709 | 12.6768 | 18.7845 | 20.3652 |
| u10 | 5.4415 | 5.6696 | 5.8553 | 6.1215 | 6.9014 | 8.6299 | 10.8957 | 11.7222 | 11.9532 | 12.0621 | 12.5094 | 14.5322 | 21.3307 | 23.0612 |
| u11 | 5.45 | 5.7667 | 6.0273 | 6.3484 | 7.1423 | 8.9474 | 11.4173 | 12.5228 | 13.0769 | 13.586 | 14.2684 | 16.5436 | 24.1032 | 25.9674 |
| u12 | 7.6047 | 7.8958 | 8.1046 | 8.3161 | 9.0363 | 11.0231 | 13.7773 | 14.8757 | 15.2913 | 15.6441 | 16.3101 | 18.7948 | 27.1676 | 29.1243 |
| u13 | 8.0146 | 8.4122 | 8.6722 | 8.9298 | 9.7542 | 12.0148 | 15.2835 | 16.9016 | 17.5633 | 17.972 | 18.6404 | 21.3291 | 30.5806 | 32.5873 |

-continued

| | | | | | | | | | | | | | |
|---|---|---|---|---|---|---|---|---|---|---|---|---|---|
| u14 | 9.6267 | 10.3424 | 10.7968 | 11.1339 | 12.0444 | 14.5782 | 18.1947 | 19.8327 | 20.4394 | 20.7517 | 21.3511 | 24.2271 | 34.4413 | 36.4503 |
| u15 | 11.9177 | 12.7867 | 13.3749 | 13.7814 | 14.8151 | 17.7532 | 21.9096 | 23.606 | 24.0612 | 24.1702 | 24.6165 | 27.6663 | 38.9792 | 40.9267 |

| SNR | 28 | 29 | 30 | 31 | 32 | 33 | 34 | 35 | 36 | 37 | 38 | 39 | 40 |
|---|---|---|---|---|---|---|---|---|---|---|---|---|---|
| u1 | 2.9902 | 3.0016 | 3.0038 | 3.002 | 3.0024 | 3.0017 | 3.0014 | 3.0014 | 2.9988 | 3.0102 | 3.0035 | 2.7197 | 2.0472 |
| u2 | 5.01 | 5.0206 | 5.0186 | 5.0131 | 5.0105 | 5.0084 | 5.006 | 5.0051 | 5.0006 | 5.0192 | 5.0363 | 4.4139 | 2.9841 |
| u3 | 7.0446 | 7.0618 | 7.0515 | 7.0373 | 7.0287 | 7.022 | 7.0169 | 7.0134 | 7.0044 | 7.0244 | 7.0893 | 6.2809 | 3.9607 |
| u4 | 9.1283 | 9.1368 | 9.1105 | 9.081 | 9.0608 | 9.0466 | 9.0367 | 9.0261 | 9.0134 | 9.0332 | 9.1092 | 7.9322 | 5.0898 |
| u5 | 11.257 | 11.2562 | 11.2029 | 11.1486 | 11.1121 | 11.0856 | 11.0685 | 11.0475 | 11.0277 | 11.0421 | 11.1317 | 9.6412 | 6.0761 |
| u6 | 13.4588 | 13.4329 | 13.3374 | 13.2478 | 13.1867 | 13.143 | 13.1106 | 13.0776 | 13.0484 | 13.061 | 13.1503 | 11.2735 | 7.1638 |
| u7 | 15.7417 | 15.6758 | 15.5224 | 15.3852 | 15.2907 | 15.2225 | 15.173 | 15.1242 | 15.0767 | 15.0837 | 15.1749 | 13.1326 | 8.1645 |
| u8 | 18.1292 | 18.0006 | 17.7684 | 17.5682 | 17.4293 | 17.3297 | 17.2569 | 17.1873 | 17.1224 | 17.1191 | 17.2333 | 14.826 | 9.3331 |
| u9 | 20.6379 | 20.419 | 20.0868 | 19.8058 | 19.6109 | 19.4704 | 19.3651 | 19.2702 | 19.1868 | 19.1703 | 19.3081 | 16.4589 | 10.3444 |
| u10 | 23.2916 | 22.9487 | 22.4913 | 22.1116 | 21.8445 | 21.6501 | 21.5069 | 21.3796 | 21.2695 | 21.2328 | 21.3472 | 18.0904 | 11.3035 |
| u11 | 26.1151 | 25.6105 | 24.9996 | 24.4967 | 24.1418 | 23.8821 | 23.6873 | 23.5173 | 23.3768 | 23.3264 | 23.4267 | 19.7596 | 12.4831 |
| u12 | 29.1412 | 28.4332 | 27.6343 | 26.9825 | 26.5176 | 26.1721 | 25.9187 | 25.6964 | 25.5123 | 25.421 | 25.4868 | 21.3998 | 13.6002 |
| u13 | 32.4176 | 31.4579 | 30.4306 | 29.5967 | 28.997 | 28.5515 | 28.2162 | 27.9277 | 27.6916 | 27.5544 | 27.5728 | 23.1872 | 14.6124 |
| u14 | 36.0267 | 34.7541 | 33.4466 | 32.3882 | 31.6189 | 31.0443 | 30.605 | 30.2317 | 29.932 | 29.7649 | 29.6897 | 24.9174 | 15.8244 |
| u15 | 40.1583 | 38.4818 | 36.8177 | 35.4703 | 34.4789 | 33.7311 | 33.1542 | 32.6692 | 32.2795 | 32.0045 | 31.9429 | 26.7754 | 16.8182 | d4) 1024-QAM/32-PAM for a fading channel (2. option)

| SNR | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| u1 | 0.9877 | 0.9983 | 1.0021 | 0.996 | 1.0038 | 1.0274 | 1.0458 | 1.0252 | 1.0251 | 1.0106 | 1.0022 | 0.9999 | 0.9993 | 0.9997 |
| u2 | 0.9503 | 0.9963 | 0.9924 | 1.001 | 0.9979 | 1.0502 | 1.1021 | 1.093 | 1.0684 | 1.0421 | 1.0226 | 1.0034 | 0.9938 | 0.9916 |
| u3 | 0.9615 | 0.9958 | 0.9968 | 0.9963 | 1.0033 | 1.0263 | 1.0508 | 1.0681 | 1.0408 | 1.0311 | 1.0201 | 1.0037 | 0.9938 | 0.9911 |
| u4 | 0.8564 | 0.9951 | 0.9982 | 0.9969 | 1.0019 | 1.0506 | 1.1052 | 1.2121 | 1.3282 | 1.4929 | 1.7209 | 1.983 | 2.2325 | 2.4349 |
| u5 | 0.8494 | 0.9967 | 0.994 | 0.9991 | 1.0008 | 1.073 | 1.1571 | 1.2411 | 1.3645 | 1.5094 | 1.7258 | 1.9826 | 2.2312 | 2.4346 |
| u6 | 0.8807 | 0.9994 | 0.9998 | 0.9959 | 1.0025 | 1.0482 | 1.1021 | 1.1634 | 1.3105 | 1.4612 | 1.6899 | 1.9706 | 2.2471 | 2.486 |
| u7 | 0.8914 | 1.0007 | 0.9995 | 0.998 | 0.9995 | 1.0236 | 1.0521 | 1.1359 | 1.2768 | 1.4444 | 1.6851 | 1.9712 | 2.2486 | 2.4864 |
| u8 | 1.3814 | 2.0455 | 2.4146 | 2.6684 | 2.9175 | 3.2588 | 3.4859 | 3.2744 | 3.2804 | 3.4275 | 3.6722 | 3.954 | 4.2289 | 4.4576 |
| u9 | 1.3622 | 2.044 | 2.4 | 2.6704 | 2.8872 | 2.8611 | 3.0858 | 3.2456 | 3.3136 | 3.4906 | 3.7323 | 3.9988 | 4.255 | 4.4646 |
| u10 | 1.2981 | 2.0293 | 2.3562 | 2.6608 | 2.8918 | 2.6571 | 2.8799 | 3.0861 | 3.3236 | 3.5804 | 3.9166 | 4.2842 | 4.6461 | 4.9706 |
| u11 | 1.3174 | 2.0299 | 2.3711 | 2.6666 | 2.9157 | 2.8566 | 3.0645 | 3.0951 | 3.294 | 3.5187 | 3.8461 | 4.2212 | 4.6016 | 4.9552 |
| u12 | 1.5422 | 2.0304 | 2.3575 | 2.6702 | 2.919 | 3.2583 | 3.4956 | 3.7397 | 4.4647 | 4.8383 | 5.3122 | 5.8215 | 6.3089 | 6.7222 |
| u13 | 1.5175 | 2.0313 | 2.3446 | 2.6653 | 2.8934 | 2.8625 | 3.0965 | 3.6125 | 4.257 | 4.7767 | 5.3692 | 5.9729 | 6.5416 | 7.0327 |
| u14 | 1.604 | 2.0428 | 2.3901 | 2.6689 | 2.8884 | 3.265 | 3.5501 | 4.3656 | 4.7788 | 5.4497 | 6.2546 | 7.0898 | 7.8656 | 8.5382 |
| u15 | 1.6294 | 2.0466 | 2.4075 | 2.6719 | 2.9129 | 4.5146 | 5.143 | 5.676 | 6.3035 | 6.969 | 7.8139 | 8.7306 | 9.6322 | 10.4411 |

| SNR | 14 | 15 | 16 | 17 | 18 | 19 | 20 | 21 | 22 | 23 | 24 | 25 | 26 | 27 |
|---|---|---|---|---|---|---|---|---|---|---|---|---|---|---|
| u1 | 1.0006 | 1.0003 | 0.9986 | 0.9994 | 0.9989 | 1.0005 | 0.9993 | 1.0023 | 1.0042 | 1.0772 | 1.5857 | 2.0789 | 2.3946 | 2.5983 |
| u2 | 0.9966 | 1.0149 | 1.0776 | 1.2742 | 1.6871 | 2.0897 | 2.3726 | 2.5667 | 2.6852 | 2.8011 | 3.3587 | 3.9147 | 4.2782 | 4.5193 |
| u3 | 0.9957 | 1.0158 | 1.0779 | 1.2749 | 1.6874 | 2.0888 | 2.3722 | 2.5683 | 2.7063 | 2.9634 | 4.0473 | 5.0664 | 5.7293 | 6.1649 |
| u4 | 2.5818 | 2.6848 | 2.7905 | 3.0323 | 3.5222 | 3.9945 | 4.3233 | 4.5468 | 4.6563 | 4.8127 | 5.9637 | 7.0579 | 7.7572 | 8.2107 |
| u5 | 2.5854 | 2.6903 | 2.7982 | 3.0371 | 3.522 | 3.9931 | 4.325 | 4.5636 | 4.7536 | 5.1864 | 6.8591 | 8.3596 | 9.3297 | 9.9594 |
| u6 | 2.6894 | 2.882 | 3.1454 | 3.6813 | 4.5789 | 5.3843 | 5.9387 | 6.2876 | 6.4513 | 6.7838 | 8.6281 | 10.2901 | 11.3497 | 12.0321 |
| u7 | 2.6871 | 2.8747 | 3.1351 | 3.6718 | 4.5753 | 5.3894 | 5.9728 | 6.4073 | 6.786 | 7.5029 | 9.816 | 11.834 | 13.1252 | 13.9574 |
| u8 | 4.6338 | 4.7815 | 5.0115 | 5.5854 | 6.6178 | 7.5206 | 8.0948 | 8.4282 | 8.6367 | 9.238 | 11.7978 | 14.0092 | 15.3897 | 16.2598 |
| u9 | 4.6222 | 4.7619 | 4.9912 | 5.5804 | 6.6403 | 7.6013 | 8.3014 | 8.8692 | 9.4056 | 10.32 | 13.3009 | 15.8419 | 17.4299 | 18.4269 |
| u10 | 5.2658 | 5.5779 | 6.0174 | 6.8559 | 8.1969 | 9.3371 | 10.0842 | 10.6112 | 11.0768 | 12.0115 | 15.3408 | 18.1472 | 19.8671 | 20.9273 |
| u11 | 5.2889 | 5.6434 | 6.134 | 7.0475 | 8.5126 | 9.8429 | 10.8635 | 11.6946 | 12.4 | 13.5356 | 17.2901 | 20.4243 | 22.3301 | 23.4863 |
| u12 | 7.0625 | 7.3854 | 7.8549 | 8.8436 | 10.4887 | 11.9255 | 12.9446 | 13.7334 | 14.4128 | 15.6099 | 19.7947 | 23.2381 | 25.2825 | 26.4823 |
| u13 | 7.4575 | 7.8797 | 8.4919 | 9.7042 | 11.6571 | 13.3962 | 14.6601 | 15.6274 | 16.4161 | 17.7524 | 22.4306 | 26.2322 | 28.4484 | 29.7085 |
| u14 | 9.1068 | 9.635 | 10.344 | 11.727 | 13.9522 | 15.8981 | 17.2695 | 18.2933 | 19.0986 | 20.5256 | 25.7783 | 29.973 | 32.3413 | 33.6247 |
| u15 | 11.14 | 11.7874 | 12.6414 | 14.2894 | 16.9161 | 19.1591 | 20.6892 | 21.7769 | 22.5894 | 24.1254 | 30.084 | 34.7629 | 37.3028 | 38.5854 |

| SNR | 28 | 29 | 30 | 31 | 32 | 33 | 34 | 35 | 36 | 37 | 38 | 39 | 40 |
|---|---|---|---|---|---|---|---|---|---|---|---|---|---|
| u1 | 2.7301 | 2.8111 | 2.8638 | 2.8985 | 2.9204 | 2.9359 | 2.9464 | 2.9538 | 2.959 | 2.9627 | 2.9646 | 2.9686 | 2.9708 |
| u2 | 4.6776 | 4.7777 | 4.8422 | 4.8846 | 4.9112 | 4.9307 | 4.9428 | 4.952 | 4.9581 | 4.9636 | 4.9649 | 4.9695 | 4.9721 |
| u3 | 6.4472 | 6.6249 | 6.7392 | 6.8128 | 6.8596 | 6.8928 | 6.913 | 6.9288 | 6.9398 | 6.9487 | 6.951 | 6.9583 | 6.9643 |
| u4 | 8.5011 | 8.6817 | 8.7961 | 8.8683 | 8.9124 | 8.9438 | 8.9619 | 8.9752 | 8.9849 | 8.9938 | 8.9932 | 9.0001 | 9.0054 |
| u5 | 10.3587 | 10.6081 | 10.7659 | 10.8639 | 10.9225 | 10.9642 | 10.9877 | 11.0041 | 11.0164 | 11.0274 | 11.0264 | 11.0342 | 11.0416 |
| u6 | 12.4587 | 12.7205 | 12.8844 | 12.9827 | 13.0371 | 13.0761 | 13.095 | 13.1067 | 13.1177 | 13.1268 | 13.1229 | 13.1289 | 13.1362 |
| u7 | 14.4744 | 14.7859 | 14.98 | 15.0938 | 15.153 | 15.1954 | 15.2147 | 15.2242 | 15.2319 | 15.2421 | 15.2363 | 15.2411 | 15.2498 |
| u8 | 16.7868 | 17.0907 | 17.2736 | 17.3718 | 17.4153 | 17.4442 | 17.4504 | 17.4501 | 17.4511 | 17.4547 | 17.4418 | 17.4433 | 17.4518 |
| u9 | 19.0243 | 19.3589 | 19.5552 | 19.6555 | 19.6923 | 19.7141 | 19.7134 | 19.7042 | 19.6989 | 19.698 | 19.6791 | 19.6776 | 19.6851 |
| u10 | 21.5442 | 21.8683 | 22.0472 | 22.1242 | 22.1375 | 22.138 | 22.1179 | 22.0915 | 22.0748 | 22.0635 | 22.0342 | 22.0291 | 22.033 |
| u11 | 24.1421 | 24.467 | 24.6335 | 24.688 | 24.6782 | 24.6569 | 24.6156 | 24.5739 | 24.5418 | 24.5191 | 24.4785 | 24.4679 | 24.468 |
| u12 | 27.1288 | 27.4152 | 27.5337 | 27.5378 | 27.4826 | 27.4215 | 27.3471 | 27.2736 | 27.2191 | 27.1778 | 27.119 | 27.0996 | 27.0922 |
| u13 | 30.3512 | 30.5985 | 30.6651 | 30.6154 | 30.503 | 30.398 | 30.2838 | 30.1761 | 30.0938 | 30.0323 | 29.9512 | 29.9185 | 29.8979 |

-continued

| | | | | | | | | | | | | |
|---|---|---|---|---|---|---|---|---|---|---|---|---|
| u14 | 34.2179 | 34.3818 | 34.3579 | 34.2186 | 34.0203 | 33.8444 | 33.6739 | 33.5132 | 33.3876 | 33.2927 | 33.1818 | 33.1313 | 33.0899 |
| u15 | 39.0866 | 39.1219 | 38.9603 | 38.6961 | 38.3675 | 38.0938 | 37.8319 | 37.5978 | 37.4117 | 37.2731 | 37.1096 | 37.0386 | 36.9652 | e1) 4096-QAM or 64-PAM for a non-fading channel (1. option)

| SNR | 8 | 9 | 10 | 11 | 12 | 13 | 14 | 15 | 16 | 17 | 18 |
|---|---|---|---|---|---|---|---|---|---|---|---|
| $u_1$ | 1.0009 | 1.0095 | 1.0017 | 1.0005 | 1.0026 | 1.0357 | 1.0462 | 1.0088 | 1.0294 | 1.0550 | 1.0814 |
| $u_2$ | 1.0034 | 1.0191 | 1.0071 | 1.0103 | 1.0058 | 1.0935 | 1.0747 | 1.0271 | 1.0589 | 1.1067 | 1.1275 |
| $u_3$ | 1.0085 | 1.0328 | 1.0104 | 1.0195 | 1.0178 | 1.1234 | 1.1266 | 1.0514 | 1.1024 | 1.1932 | 1.2000 |
| $u_4$ | 1.0271 | 1.0685 | 1.0379 | 1.0755 | 1.1253 | 1.2903 | 1.2950 | 1.3224 | 1.3806 | 1.9358 | 2.5877 |
| $u_5$ | 1.0425 | 1.0933 | 1.0515 | 1.0862 | 1.1495 | 1.3104 | 1.3388 | 1.3527 | 1.4228 | 1.9850 | 2.6735 |
| $u_6$ | 1.0680 | 1.1256 | 1.0680 | 1.0948 | 1.1750 | 1.3332 | 1.3865 | 1.3620 | 1.4469 | 2.0585 | 2.7203 |
| $u_7$ | 1.0914 | 1.1453 | 1.0851 | 1.1268 | 1.1974 | 1.3824 | 1.4096 | 1.3754 | 1.4702 | 2.1306 | 2.7772 |
| $u_8$ | 1.6408 | 1.9406 | 2.1732 | 2.4538 | 2.7812 | 3.2032 | 3.3168 | 3.3215 | 3.4226 | 4.0242 | 4.7576 |
| $u_9$ | 1.6739 | 1.9863 | 2.2032 | 2.4732 | 2.8165 | 3.2260 | 3.3652 | 3.3288 | 3.4528 | 4.1132 | 4.8002 |
| $u_{10}$ | 1.7194 | 2.0417 | 2.2381 | 2.5159 | 2.8342 | 3.2727 | 3.4215 | 3.3467 | 3.4850 | 4.1566 | 4.8626 |
| $u_{11}$ | 1.7336 | 2.0649 | 2.2482 | 2.5421 | 2.8665 | 3.3094 | 3.4483 | 3.3743 | 3.5120 | 4.2105 | 4.9374 |
| $u_{12}$ | 1.7336 | 2.0649 | 2.2482 | 2.5654 | 2.9673 | 3.4823 | 3.6899 | 3.7007 | 3.9353 | 5.0951 | 6.3475 |
| $u_{13}$ | 1.7489 | 2.0891 | 2.2680 | 2.5736 | 2.9882 | 3.5109 | 3.7310 | 3.7351 | 3.9752 | 5.1790 | 6.4107 |
| $u_{14}$ | 1.7667 | 2.1100 | 2.2697 | 2.5749 | 2.9882 | 3.5472 | 3.7653 | 3.7530 | 4.0006 | 5.2035 | 6.4781 |
| $u_{15}$ | 1.7858 | 2.1333 | 2.2705 | 2.5880 | 2.9954 | 3.6091 | 3.7893 | 4.0301 | 5.3100 | 6.5484 |
| $u_{16}$ | 3.7227 | 4.1178 | 4.3166 | 4.6107 | 4.9833 | 5.5502 | 5.7186 | 5.6573 | 5.9066 | 7.1262 | 8.4751 |
| $u_{17}$ | 3.7418 | 4.1491 | 4.3322 | 4.6276 | 4.9903 | 5.5822 | 5.7506 | 5.6655 | 5.9204 | 7.2088 | 8.5684 |
| $u_{18}$ | 3.7590 | 4.1737 | 4.3574 | 4.6571 | 5.0237 | 5.6385 | 5.8167 | 5.6849 | 5.9370 | 7.2417 | 8.5939 |
| $u_{19}$ | 3.7960 | 4.2200 | 4.3712 | 4.6746 | 5.0441 | 5.6775 | 5.8728 | 5.7212 | 5.9817 | 7.2914 | 8.6700 |
| $u_{20}$ | 3.8009 | 4.2440 | 4.4357 | 4.8048 | 5.2639 | 6.0310 | 6.3727 | 6.3707 | 6.8343 | 8.5615 | 10.3314 |
| $u_{21}$ | 3.8124 | 4.2614 | 4.4461 | 4.8333 | 5.2981 | 6.0708 | 6.4211 | 6.4165 | 6.8835 | 8.6242 | 10.4036 |
| $u_{22}$ | 3.8523 | 4.2874 | 4.4500 | 4.8427 | 5.3090 | 6.0708 | 6.4211 | 6.4165 | 6.9279 | 8.7014 | 10.5216 |
| $u_{23}$ | 3.8737 | 4.3357 | 4.4807 | 4.8543 | 5.3363 | 6.1026 | 6.4513 | 6.4233 | 6.9731 | 8.8015 | 10.5873 |
| $u_{24}$ | 4.8434 | 5.5231 | 5.8999 | 6.5381 | 7.2235 | 8.1484 | 8.5019 | 8.3784 | 8.8105 | 10.5696 | 12.5476 |
| $u_{25}$ | 4.9258 | 5.5864 | 5.9652 | 6.5983 | 7.2684 | 8.1872 | 8.5620 | 8.4081 | 8.8693 | 10.6847 | 12.6596 |
| $u_{26}$ | 4.9451 | 5.6415 | 5.9778 | 6.5984 | 7.2774 | 8.2065 | 8.5897 | 8.4766 | 9.1103 | 11.0060 | 13.0289 |
| $u_{27}$ | 5.0309 | 5.7430 | 6.0828 | 6.6419 | 7.3205 | 8.2309 | 8.6088 | 8.4887 | 9.1104 | 11.0060 | 13.0289 |
| $u_{28}$ | 5.4098 | 6.2244 | 6.6305 | 7.3617 | 8.0157 | 9.2080 | 9.7789 | 9.9190 | 10.7495 | 12.8951 | 15.2014 |
| $u_{29}$ | 5.5000 | 6.3459 | 6.7055 | 7.4383 | 8.1449 | 9.3149 | 9.8518 | 9.9298 | 10.7503 | 12.8995 | 15.2179 |
| $u_{30}$ | 5.7152 | 6.5427 | 7.0184 | 7.8330 | 8.6100 | 9.8433 | 10.6486 | 10.6096 | 11.8462 | 13.9129 | 16.3707 |
| $u_{31}$ | 5.8780 | 6.7570 | 7.2858 | 8.0687 | 8.7350 | 10.1300 | 10.9482 | 10.8858 | 12.3898 | 14.9464 | 17.4057 |

| SNR | 19 | 20 | 21 | 22 | 23 | 24 | 25 | 26 | 27 | 28 | 29 |
|---|---|---|---|---|---|---|---|---|---|---|---|
| $u_1$ | 1.0483 | 1.0007 | 1.0044 | 1.0055 | 1.0013 | 1.0009 | 1.0008 | 1.0004 | 1.0002 | 1.0009 | 1.0000 |
| $u_2$ | 1.0613 | 1.0233 | 1.0049 | 1.0067 | 1.0042 | 1.0169 | 1.1155 | 2.1473 | 2.7977 | 2.9554 | 2.9938 |
| $u_3$ | 1.0869 | 1.0300 | 1.0156 | 1.0126 | 1.0156 | 1.0172 | 1.1158 | 2.1476 | 2.7982 | 2.9562 | 2.9938 |
| $u_4$ | 2.3556 | 2.7238 | 2.9064 | 2.9831 | 3.0040 | 3.0164 | 3.0800 | 4.1326 | 4.8095 | 4.9735 | 5.0126 |
| $u_5$ | 2.3688 | 2.7327 | 2.9092 | 2.9851 | 3.0143 | 3.0175 | 3.0803 | 4.1329 | 4.8098 | 4.9740 | 5.0127 |
| $u_6$ | 2.4071 | 2.7463 | 2.9108 | 2.9891 | 3.0189 | 3.0684 | 3.3125 | 5.4313 | 6.6706 | 6.9751 | 7.0470 |
| $u_7$ | 2.4309 | 2.7844 | 2.9252 | 2.9939 | 3.0209 | 3.0687 | 3.3127 | 5.4321 | 6.6709 | 6.9755 | 7.0476 |
| $u_8$ | 4.4042 | 4.7555 | 4.9733 | 5.0568 | 5.0728 | 5.0540 | 5.1743 | 7.3914 | 8.7230 | 9.0520 | 9.1240 |
| $u_9$ | 4.4505 | 4.7853 | 4.9821 | 5.0665 | 5.0763 | 5.0545 | 5.1744 | 7.3919 | 8.7232 | 9.0521 | 9.1269 |
| $u_{10}$ | 4.4768 | 4.8087 | 4.9864 | 5.0786 | 5.1205 | 5.2247 | 5.6985 | 8.9330 | 10.7048 | 11.1492 | 11.2396 |
| $u_{11}$ | 4.4984 | 4.8151 | 4.9894 | 5.0804 | 5.1241 | 5.2259 | 5.6990 | 8.9335 | 10.7052 | 11.1499 | 11.2521 |
| $u_{12}$ | 6.0304 | 6.6746 | 7.0482 | 7.1894 | 7.1853 | 7.1332 | 7.4320 | 10.9015 | 12.8463 | 13.3324 | 13.4094 |
| $u_{13}$ | 6.0394 | 6.7008 | 7.0583 | 7.1926 | 7.1891 | 7.1344 | 7.4326 | 10.9021 | 12.8463 | 13.3372 | 13.4549 |
| $u_{14}$ | 6.0730 | 6.7081 | 7.0832 | 7.2853 | 7.3954 | 7.6181 | 8.4317 | 12.7115 | 15.0078 | 15.5775 | 15.6226 |
| $u_{15}$ | 6.1073 | 6.7375 | 7.0832 | 7.2884 | 7.4045 | 7.6184 | 8.4328 | 12.7116 | 15.0103 | 15.6018 | 15.7683 |
| $u_{16}$ | 8.1524 | 8.8607 | 9.3063 | 9.4515 | 9.4026 | 9.4234 | 10.0879 | 14.7765 | 17.3133 | 17.9142 | 17.8813 |
| $u_{17}$ | 8.1720 | 8.8962 | 9.3102 | 9.4574 | 9.4108 | 9.4236 | 10.0879 | 14.7780 | 17.3310 | 18.0102 | 18.2795 |
| $u_{18}$ | 8.2313 | 8.9543 | 9.4881 | 9.7987 | 10.0367 | 10.4715 | 11.5465 | 16.8714 | 19.7069 | 20.3186 | 20.2643 |
| $u_{19}$ | 8.2425 | 8.9679 | 9.4972 | 9.8026 | 10.0398 | 10.4715 | 11.5513 | 16.8932 | 19.7984 | 20.6313 | 21.1418 |
| $u_{20}$ | 10.1358 | 11.0877 | 11.6875 | 11.9433 | 11.9948 | 12.2390 | 13.2621 | 19.1416 | 22.2235 | 22.8444 | 23.0106 |
| $u_{21}$ | 10.2083 | 11.1511 | 11.7122 | 11.9433 | 11.9948 | 12.2473 | 13.3028 | 19.2585 | 22.5518 | 23.6444 | 24.4435 |
| $u_{22}$ | 10.4647 | 11.5011 | 12.3809 | 12.9249 | 13.3478 | 13.8662 | 15.0350 | 21.5237 | 24.8994 | 25.7504 | 26.2833 |
| $u_{23}$ | 10.4667 | 11.5016 | 12.3809 | 12.9352 | 13.3886 | 13.9623 | 15.2365 | 21.9595 | 25.7968 | 27.2622 | 28.0976 |
| $u_{24}$ | 12.5892 | 13.7714 | 14.6800 | 15.1061 | 15.3331 | 15.7560 | 16.9792 | 24.1820 | 28.0789 | 29.3444 | 30.1001 |
| $u_{25}$ | 12.5892 | 13.7714 | 14.6898 | 15.2127 | 15.5317 | 16.1253 | 17.6049 | 25.3100 | 29.8341 | 31.4219 | 32.2373 |
| $u_{26}$ | 13.4094 | 14.7156 | 16.2278 | 17.0434 | 17.4121 | 17.9163 | 19.3517 | 27.5432 | 32.1791 | 33.7649 | 34.5644 |
| $u_{27}$ | 13.6158 | 15.0373 | 16.6096 | 17.6500 | 18.1533 | 18.9388 | 20.7325 | 29.6202 | 34.6720 | 36.3392 | 37.0984 |
| $u_{28}$ | 15.7576 | 17.2752 | 18.8400 | 19.7714 | 20.1992 | 20.8666 | 22.6401 | 32.1698 | 37.5238 | 39.2039 | 39.8717 |
| $u_{29}$ | 16.4104 | 18.0503 | 19.8935 | 21.3735 | 22.0959 | 22.9213 | 24.8156 | 35.1006 | 40.7639 | 42.4017 | 42.9261 |

-continued

| | | | | | | | | | | |
|---|---|---|---|---|---|---|---|---|---|---|
| $u_{30}$ | 18.5684 | 20.5641 | 22.6573 | 24.0450 | 24.6870 | 25.4664 | 27.4064 | 38.5288 | 44.4858 | 46.0196 | 46.3385 |
| $u_{31}$ | 21.1733 | 23.6230 | 26.0750 | 27.5013 | 27.9919 | 28.6401 | 30.5717 | 42.6611 | 48.9075 | 50.2608 | 50.2913 |

| SNR | 30 | 31 | 32 | 33 | 34 | 35 | 36 | 37 | 38 | 39 | 40 |
|---|---|---|---|---|---|---|---|---|---|---|---|
| $u_1$ | 1.0001 | 1.0248 | 2.4408 | 2.8945 | 2.9839 | 2.9994 | 3.0018 | 3.0006 | 3.0003 | 3.0001 | 2.9997 |
| $u_2$ | 3.0017 | 3.0182 | 4.4380 | 4.8985 | 4.9886 | 5.0033 | 5.0058 | 5.0032 | 5.0024 | 5.0018 | 5.0008 |
| $u_3$ | 3.0030 | 3.0632 | 5.9156 | 6.8070 | 6.9830 | 7.0115 | 7.0140 | 7.0089 | 7.0069 | 7.0048 | 7.0037 |
| $u_4$ | 5.0173 | 5.0328 | 7.9059 | 8.8226 | 9.0024 | 9.0302 | 9.0288 | 9.0193 | 9.0151 | 9.0102 | 9.0071 |
| $u_5$ | 5.0216 | 5.1327 | 9.4507 | 10.7591 | 11.0195 | 11.0577 | 11.0516 | 11.0358 | 11.0282 | 11.0193 | 11.0115 |
| $u_6$ | 7.0498 | 7.0422 | 11.4357 | 12.7957 | 13.0656 | 13.0993 | 13.0845 | 13.0595 | 13.0468 | 13.0326 | 13.0195 |
| $u_7$ | 7.0641 | 7.2652 | 13.0665 | 14.7736 | 15.1170 | 15.1551 | 15.1295 | 15.0921 | 15.0721 | 15.0515 | 15.0306 |
| $u_8$ | 9.1060 | 9.0644 | 15.0535 | 16.8418 | 17.2002 | 17.2304 | 17.1884 | 17.1352 | 17.1049 | 17.0757 | 17.0463 |
| $u_9$ | 9.1497 | 9.5244 | 16.7818 | 18.8755 | 19.2998 | 19.3267 | 19.2631 | 19.1895 | 19.1460 | 19.1067 | 19.0675 |
| $u_{10}$ | 11.1813 | 11.1850 | 18.7842 | 20.9896 | 21.4336 | 21.4475 | 21.3554 | 21.2573 | 21.1971 | 21.1455 | 21.0958 |
| $u_{11}$ | 11.3033 | 11.9919 | 20.6171 | 23.0931 | 23.5947 | 23.5943 | 23.4675 | 23.3400 | 23.2595 | 23.1929 | 23.1300 |
| $u_{12}$ | 13.2745 | 13.5314 | 22.6537 | 25.2693 | 25.7957 | 25.7708 | 25.6021 | 25.4389 | 25.3346 | 25.2505 | 25.1715 |
| $u_{13}$ | 13.5814 | 14.6560 | 24.5978 | 27.4601 | 28.0325 | 27.9792 | 27.7614 | 27.5562 | 27.4240 | 27.3180 | 27.2219 |
| $u_{14}$ | 15.4281 | 16.1335 | 26.6926 | 29.7208 | 30.3180 | 30.2241 | 29.9475 | 29.6937 | 29.5290 | 29.3975 | 29.2822 |
| $u_{15}$ | 16.0896 | 17.4553 | 28.7584 | 32.0195 | 32.6497 | 32.5080 | 32.1630 | 31.8534 | 31.6506 | 31.4900 | 31.3522 |
| $u_{16}$ | 17.8031 | 18.9459 | 30.9410 | 34.3908 | 35.0362 | 34.8341 | 34.4104 | 34.0374 | 33.7912 | 33.5976 | 33.4333 |
| $u_{17}$ | 18.9158 | 20.3994 | 33.1475 | 36.8221 | 37.4807 | 37.2058 | 36.6926 | 36.2478 | 35.9521 | 35.7214 | 35.5286 |
| $u_{18}$ | 20.5417 | 21.9560 | 35.4574 | 39.3347 | 39.9907 | 39.6274 | 39.0134 | 38.4877 | 38.1359 | 37.8626 | 37.6368 |
| $u_{19}$ | 21.9857 | 23.5351 | 37.8330 | 41.9281 | 42.5704 | 42.1029 | 41.3762 | 40.7588 | 40.3444 | 40.0228 | 39.7614 |
| $u_{20}$ | 23.6361 | 25.2008 | 40.3158 | 44.6167 | 45.2248 | 44.6370 | 43.7840 | 43.0657 | 42.5801 | 42.2047 | 41.9019 |
| $u_{21}$ | 25.2935 | 26.9290 | 42.9015 | 47.4057 | 47.9613 | 47.2349 | 46.2412 | 45.4110 | 44.8462 | 44.4090 | 44.0606 |
| $u_{22}$ | 27.0746 | 28.7504 | 45.6132 | 50.3061 | 50.7879 | 49.9025 | 48.7528 | 47.7990 | 47.1463 | 46.6413 | 46.2405 |
| $u_{23}$ | 28.9429 | 30.6660 | 48.4574 | 53.3265 | 53.7113 | 52.6466 | 51.3243 | 50.2344 | 49.4838 | 48.9030 | 48.4433 |
| $u_{24}$ | 30.9398 | 32.6931 | 51.4505 | 56.4788 | 56.7408 | 55.4760 | 53.9630 | 52.7229 | 51.8619 | 51.1973 | 50.6724 |
| $u_{25}$ | 33.0715 | 34.8412 | 54.6068 | 59.7763 | 59.8883 | 58.4008 | 56.6777 | 55.2711 | 54.2893 | 53.5305 | 52.9293 |
| $u_{26}$ | 35.3606 | 37.1247 | 57.9431 | 63.2360 | 63.1703 | 61.4335 | 59.4783 | 57.8899 | 56.7734 | 55.9080 | 55.2244 |
| $u_{27}$ | 37.8240 | 39.5605 | 61.4829 | 66.8796 | 66.6073 | 64.5910 | 62.3797 | 60.5886 | 59.3222 | 58.3376 | 57.5609 |
| $u_{28}$ | 40.4876 | 42.1719 | 65.2585 | 70.7389 | 70.2237 | 67.8970 | 65.4018 | 63.3861 | 61.9504 | 60.8316 | 59.9460 |
| $u_{29}$ | 43.3896 | 44.9941 | 69.3198 | 74.8651 | 74.0651 | 71.3880 | 68.5763 | 66.3072 | 64.6797 | 63.4096 | 62.3996 |
| $u_{30}$ | 46.6014 | 48.0918 | 73.7587 | 79.3419 | 78.2083 | 75.1280 | 71.9563 | 69.3942 | 67.5467 | 66.1014 | 64.9470 |
| $u_{31}$ | 50.2840 | 51.6166 | 78.7813 | 84.3684 | 82.8265 | 79.2656 | 75.6675 | 72.7558 | 70.6393 | 68.9832 | 67.6450 | e2) 4096-QAM or 64-PAM for a fading channel (1. option)

| SNR | 10 | 12 | 14 | 16 | 18 | 20 | 22 | 24 | 26 | 28 | 30 |
|---|---|---|---|---|---|---|---|---|---|---|---|
| $u_1$ | 1.0037 | 1.0034 | 1.0348 | 1.0952 | 1.0016 | 1.0009 | 1.0005 | 1.0084 | 1.0011 | 1.0013 | 1.4601 |
| $u_2$ | 1.0162 | 1.0343 | 1.0617 | 1.1176 | 1.0241 | 1.0018 | 1.0036 | 1.4936 | 2.2772 | 2.6447 | 3.2217 |
| $u_3$ | 1.0240 | 1.0678 | 1.0884 | 1.1793 | 1.0305 | 1.0041 | 1.0043 | 1.4944 | 2.2777 | 2.6458 | 3.6969 |
| $u_4$ | 1.1921 | 1.3907 | 1.5640 | 2.0417 | 2.0126 | 2.3581 | 2.6689 | 3.2663 | 4.1425 | 4.5751 | 5.6208 |
| $u_5$ | 1.2171 | 1.4100 | 1.5873 | 2.1063 | 2.0228 | 2.3589 | 2.6691 | 3.2663 | 4.1430 | 4.5762 | 6.1651 |
| $u_6$ | 1.2361 | 1.4531 | 1.6033 | 2.1127 | 2.0502 | 2.3605 | 2.6803 | 3.8388 | 5.4771 | 6.2622 | 7.8852 |
| $u_7$ | 1.2492 | 1.4877 | 1.6363 | 2.1955 | 2.0517 | 2.3634 | 2.6818 | 3.8552 | 5.4782 | 6.2644 | 8.5434 |
| $u_8$ | 2.3653 | 2.8845 | 3.2972 | 3.9998 | 3.8921 | 4.3057 | 4.6463 | 5.7758 | 7.4940 | 8.3068 | 10.4374 |
| $u_9$ | 2.3776 | 2.9044 | 3.3210 | 4.0789 | 3.9027 | 4.3085 | 4.6470 | 5.7801 | 7.4956 | 8.3148 | 11.2098 |
| $u_{10}$ | 2.4146 | 2.9464 | 3.3431 | 4.0949 | 3.9258 | 4.3091 | 4.7142 | 6.5005 | 8.9584 | 10.0754 | 12.8922 |
| $u_{11}$ | 2.4330 | 2.9727 | 3.3727 | 4.1576 | 3.9303 | 4.3106 | 4.7159 | 6.5026 | 8.9599 | 10.1075 | 13.7819 |
| $u_{12}$ | 2.5921 | 3.2909 | 3.8752 | 5.0460 | 5.1105 | 5.9019 | 6.4314 | 8.2437 | 10.9416 | 12.1137 | 15.6075 |
| $u_{13}$ | 2.6018 | 3.3308 | 3.8838 | 5.1032 | 5.1251 | 5.9026 | 6.4322 | 8.2470 | 10.9430 | 12.2240 | 16.6372 |
| $u_{14}$ | 2.6036 | 3.3538 | 3.9079 | 5.1106 | 5.1577 | 5.9275 | 6.6966 | 9.2839 | 12.6130 | 13.9827 | 18.3518 |
| $u_{15}$ | 2.6134 | 3.3538 | 3.9575 | 5.2402 | 5.1622 | 5.9305 | 6.6977 | 9.2923 | 12.6172 | 14.2759 | 19.5480 |
| $u_{16}$ | 4.4724 | 5.2413 | 5.8593 | 7.1349 | 7.1838 | 8.0530 | 8.5878 | 11.2148 | 14.8247 | 16.1910 | 21.4467 |
| $u_{17}$ | 4.4904 | 5.2557 | 5.9016 | 7.2435 | 7.2025 | 8.0584 | 8.5900 | 11.2224 | 14.8505 | 16.7578 | 22.7923 |
| $u_{18}$ | 4.5233 | 5.2967 | 5.9330 | 7.2709 | 7.2402 | 8.2244 | 9.2676 | 12.5840 | 16.7154 | 18.3893 | 24.6241 |
| $u_{19}$ | 4.5370 | 5.3428 | 5.9400 | 7.3156 | 7.2402 | 8.2272 | 9.2676 | 12.5847 | 16.8401 | 19.2507 | 26.1464 |
| $u_{20}$ | 4.7553 | 5.7766 | 6.6383 | 8.4305 | 8.7991 | 10.0062 | 10.9491 | 14.5161 | 18.9533 | 21.0189 | 28.1725 |
| $u_{21}$ | 4.7821 | 5.8104 | 6.6641 | 8.4825 | 8.8222 | 10.0149 | 10.9503 | 14.5520 | 19.3674 | 22.1700 | 29.8997 |
| $u_{22}$ | 4.8082 | 5.8291 | 6.6807 | 8.5209 | 9.0392 | 10.6920 | 12.1865 | 16.2361 | 21.2176 | 23.9044 | 32.0068 |
| $u_{23}$ | 4.8130 | 5.8737 | 6.7033 | 8.6186 | 9.0422 | 10.6920 | 12.2150 | 16.4697 | 22.1503 | 25.3694 | 34.0023 |
| $u_{24}$ | 6.2441 | 7.4671 | 8.5303 | 10.4806 | 10.9914 | 12.7390 | 14.0922 | 18.4450 | 24.2033 | 27.3692 | 36.4075 |
| $u_{25}$ | 6.2893 | 7.4955 | 8.5634 | 10.5693 | 10.9914 | 12.7601 | 14.2864 | 19.1390 | 25.6388 | 29.1536 | 38.7203 |
| $u_{26}$ | 6.2893 | 7.5445 | 8.6516 | 10.7902 | 11.8153 | 14.1858 | 15.8472 | 20.9184 | 27.7224 | 31.3403 | 41.3928 |
| $u_{27}$ | 6.3436 | 7.6168 | 8.6551 | 10.7902 | 11.8939 | 14.5324 | 16.6065 | 22.3106 | 29.7261 | 33.5729 | 44.1720 |
| $u_{28}$ | 7.0226 | 8.5293 | 9.9244 | 12.4877 | 13.6889 | 16.4941 | 18.4985 | 24.4836 | 32.3433 | 36.2788 | 47.4221 |
| $u_{29}$ | 7.0606 | 8.5418 | 9.9244 | 12.4922 | 14.1769 | 17.7125 | 20.1454 | 26.6758 | 35.1307 | 39.2095 | 50.9584 |

-continued

| | | | | | | | | | | | |
|---|---|---|---|---|---|---|---|---|---|---|---|
| $u_{30}$ | 7.4057 | 9.0421 | 10.6101 | 13.4485 | 15.9473 | 20.0492 | 22.5947 | 29.6354 | 38.6833 | 42.8367 | 55.2496 |
| $u_{31}$ | 7.6853 | 9.2770 | 10.9700 | 13.9607 | 18.0971 | 23.1093 | 25.8301 | 33.4923 | 43.2861 | 47.4796 | 60.6968 |

| SNR | 32 | 34 | 36 | 38 | 40 | 42 | 44 |
|---|---|---|---|---|---|---|---|
| $u_1$ | 2.3630 | 2.7143 | 2.8569 | 2.9146 | 2.9430 | 2.9572 | 2.9626 |
| $u_2$ | 4.2240 | 4.6431 | 4.8201 | 4.8928 | 4.9295 | 4.9485 | 4.9531 |
| $u_3$ | 5.5916 | 6.3624 | 6.6825 | 6.8138 | 6.8769 | 6.9108 | 6.9193 |
| $u_4$ | 7.5711 | 8.3609 | 8.6875 | 8.8217 | 8.8852 | 8.9195 | 8.9261 |
| $u_5$ | 8.9677 | 10.1017 | 10.5677 | 10.7565 | 10.8452 | 10.8923 | 10.9017 |
| $u_6$ | 10.8558 | 12.0656 | 12.5624 | 12.7646 | 12.8566 | 12.9054 | 12.9128 |
| $u_7$ | 12.3100 | 13.8453 | 14.4705 | 14.7240 | 14.8372 | 14.8969 | 14.9042 |
| $u_8$ | 14.3495 | 15.9079 | 16.5327 | 16.7803 | 16.8878 | 16.9453 | 16.9457 |
| $u_9$ | 15.8626 | 17.7314 | 18.4764 | 18.7717 | 18.8959 | 18.9623 | 18.9619 |
| $u_{10}$ | 17.8122 | 19.7689 | 20.5381 | 20.8410 | 20.9630 | 21.0277 | 21.0190 |
| $u_{11}$ | 19.4002 | 21.6494 | 22.5319 | 22.8716 | 23.0051 | 23.0767 | 23.0663 |
| $u_{12}$ | 21.4914 | 23.7930 | 24.6692 | 25.0032 | 25.1259 | 25.1890 | 25.1683 |
| $u_{13}$ | 23.1749 | 25.7482 | 26.7175 | 27.0846 | 27.2145 | 27.2800 | 27.2540 |
| $u_{14}$ | 25.2444 | 27.9133 | 28.8962 | 29.2543 | 29.3711 | 29.4289 | 29.3923 |
| $u_{15}$ | 27.0554 | 29.9674 | 31.0256 | 31.4026 | 31.5200 | 31.5729 | 31.5300 |
| $u_{16}$ | 29.3071 | 32.2781 | 33.3164 | 33.6672 | 33.7575 | 33.7939 | 33.7339 |
| $u_{17}$ | 31.2488 | 34.4427 | 35.5372 | 35.8963 | 35.9772 | 36.0047 | 35.9322 |
| $u_{18}$ | 33.5157 | 36.8096 | 37.8974 | 38.2279 | 38.2797 | 38.2878 | 38.1965 |
| $u_{19}$ | 35.6233 | 39.1139 | 40.2361 | 40.5572 | 40.5894 | 40.5810 | 40.4746 |
| $u_{20}$ | 38.1010 | 41.6634 | 42.7477 | 43.0181 | 43.0067 | 42.9681 | 42.8356 |
| $u_{21}$ | 40.4118 | 44.1431 | 45.2395 | 45.4777 | 45.4325 | 45.3693 | 45.2134 |
| $u_{22}$ | 43.0288 | 46.8438 | 47.9000 | 48.0709 | 47.9708 | 47.8722 | 47.6880 |
| $u_{23}$ | 45.6116 | 49.5583 | 50.5912 | 50.7048 | 50.5545 | 50.4196 | 50.2024 |
| $u_{24}$ | 48.5564 | 52.5523 | 53.4949 | 53.5164 | 53.2904 | 53.1044 | 52.8455 |
| $u_{25}$ | 51.4802 | 55.5697 | 56.4532 | 56.3844 | 56.0878 | 55.8498 | 55.5491 |
| $u_{26}$ | 54.7552 | 58.8833 | 59.6566 | 59.4612 | 59.0692 | 58.7671 | 58.4167 |
| $u_{27}$ | 58.1823 | 62.3637 | 63.0156 | 62.6864 | 62.1896 | 61.8161 | 61.4120 |
| $u_{28}$ | 62.1034 | 66.2736 | 66.7414 | 66.2379 | 65.6055 | 65.1352 | 64.6642 |
| $u_{29}$ | 66.3748 | 70.5252 | 70.7893 | 70.0851 | 69.2959 | 68.7220 | 68.1765 |
| $u_{30}$ | 71.4868 | 75.5508 | 75.5368 | 74.5533 | 73.5731 | 72.8440 | 72.1957 |
| $u_{31}$ | 77.9207 | 81.8329 | 81.4363 | 80.0774 | 78.8139 | 77.8906 | 77.1759 | e3) 4096-QAM/64-PAM for a non-fading channel (2. option)

| SNR | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| u1 | 0.9997 | 0.9978 | 0.9991 | 1 | 1.0007 | 1.0007 | 1 | 0.9557 | 1.0614 | 0.9551 | 0.98 | 0.9906 | 0.9983 | 1.0028 |
| u2 | 0.9987 | 0.9964 | 0.9907 | 0.9992 | 1.0007 | 1.0013 | 0.9998 | 0.9995 | 1.132 | 1.0662 | 0.9665 | 0.9929 | 0.9872 | 0.9951 |
| u3 | 0.9992 | 0.9959 | 0.9909 | 1.0013 | 1.0018 | 1.0022 | 0.9998 | 1.0455 | 1.0635 | 1.1175 | 0.9872 | 1.0026 | 0.9889 | 0.9923 |
| u4 | 0.9952 | 0.9939 | 0.9506 | 0.9912 | 0.9956 | 0.9997 | 0.9991 | 1.0963 | 1.1367 | 1.2469 | 1.0968 | 1.0043 | 0.9773 | 0.9706 |
| u5 | 0.9949 | 0.9927 | 0.9497 | 0.9904 | 0.9958 | 1.0001 | 0.999 | 1.0477 | 1.2106 | 1.1914 | 1.0729 | 0.9947 | 0.9757 | 0.9733 |
| u6 | 0.9959 | 0.9925 | 0.9569 | 0.9928 | 0.9977 | 1.0007 | 0.999 | 1.0005 | 1.1354 | 1.0632 | 1.0886 | 0.9926 | 0.9867 | 0.9808 |
| u7 | 0.9964 | 0.9925 | 0.9572 | 0.9948 | 0.9985 | 1.0012 | 0.9989 | 1.0469 | 1.067 | 1.1141 | 1.1127 | 1.0022 | 0.9885 | 0.9781 |
| u8 | 0.9979 | 0.996 | 0.82 | 0.9969 | 1.0009 | 1.0011 | 0.9982 | 1.0953 | 1.1392 | 1.2422 | 1.5245 | 1.8225 | 2.2129 | 2.5779 |
| u9 | 0.9971 | 0.9926 | 0.8212 | 0.9946 | 0.9999 | 1.0006 | 0.9981 | 1.0475 | 1.2127 | 1.1856 | 1.4974 | 1.8028 | 2.201 | 2.5773 |
| u10 | 0.9956 | 0.9897 | 0.8169 | 0.9928 | 0.9977 | 1.0004 | 0.998 | 1.0967 | 1.2926 | 1.3288 | 1.484 | 1.8262 | 2.1995 | 2.564 |
| u11 | 0.9956 | 0.988 | 0.8184 | 0.992 | 0.9969 | 0.9997 | 0.9977 | 1.1472 | 1.2149 | 1.3855 | 1.5124 | 1.8468 | 2.2116 | 2.5645 |
| u12 | 0.9999 | 1.0001 | 0.8477 | 1.0019 | 1.0015 | 1 | 0.998 | 1.0951 | 1.1374 | 1.2436 | 1.3501 | 1.8228 | 2.2139 | 2.5865 |
| u13 | 0.9993 | 0.9984 | 0.8477 | 1.0004 | 1.0011 | 0.9998 | 0.9979 | 1.047 | 1.2107 | 1.1876 | 1.3224 | 1.8029 | 2.2021 | 2.5859 |
| u14 | 1.0002 | 0.9981 | 0.8539 | 1.0011 | 1.0023 | 0.9996 | 0.9977 | 1.0951 | 1.1352 | 1.059 | 1.338 | 1.781 | 2.2032 | 2.5981 |
| u15 | 1.0006 | 0.9988 | 0.8548 | 1.0027 | 1.0023 | 0.9993 | 0.9976 | 1.0466 | 1.0674 | 1.1096 | 1.365 | 1.7998 | 2.2143 | 2.599 |
| u16 | 1.0013 | 0.9984 | 1.3062 | 2.2808 | 2.8695 | 3.3381 | 3.672 | 3.6931 | 4.5055 | 4.0594 | 3.6916 | 3.9511 | 4.3515 | 4.733 |
| u17 | 1.0009 | 0.9976 | 1.306 | 2.276 | 2.8682 | 3.3383 | 3.6706 | 4.1143 | 4.0708 | 4.49 | 3.7952 | 3.9685 | 4.3262 | 4.6905 |
| u18 | 1.0001 | 0.9975 | 1.2944 | 2.2716 | 2.8549 | 3.3373 | 3.668 | 3.692 | 3.8547 | 3.9737 | 3.9649 | 4.1043 | 4.4877 | 4.7651 |
| u19 | 1.0006 | 0.9989 | 1.2962 | 2.2767 | 2.8579 | 3.3377 | 3.6688 | 3.4797 | 4.0617 | 3.7447 | 3.8381 | 4.0787 | 4.5102 | 4.8115 |
| u20 | 0.9966 | 0.9843 | 1.2316 | 2.2476 | 2.8174 | 3.3366 | 3.6668 | 3.3388 | 3.8426 | 3.5963 | 3.7694 | 4.2066 | 4.6844 | 5.1505 |
| u21 | 0.9965 | 0.9862 | 1.2316 | 2.2428 | 2.816 | 3.3366 | 3.6654 | 3.4788 | 3.7127 | 3.7506 | 3.8549 | 4.2413 | 4.6695 | 5.1004 |
| u22 | 0.9979 | 0.9883 | 1.2438 | 2.2472 | 2.8316 | 3.338 | 3.6687 | 3.693 | 3.8504 | 3.9858 | 3.7378 | 4.1047 | 4.4864 | 4.988 |
| u23 | 0.9988 | 0.9908 | 1.2452 | 2.2521 | 2.8344 | 3.3383 | 3.6697 | 3.4793 | 4.0539 | 3.7531 | 3.6629 | 4.0789 | 4.5089 | 5.0366 |
| u24 | 0.9975 | 0.9885 | 1.5288 | 2.2442 | 2.8217 | 3.3383 | 3.6695 | 3.695 | 4.5123 | 4.0459 | 4.3425 | 6.0223 | 6.8569 | 7.2668 |
| u25 | 0.9969 | 0.9892 | 1.527 | 2.2404 | 2.8202 | 3.3377 | 3.6672 | 4.1199 | 4.0697 | 4.5777 | 6.3293 | 7.2964 | 7.5851 |
| u26 | 0.9957 | 0.9906 | 1.5113 | 2.237 | 2.8068 | 3.3353 | 3.6622 | 3.6994 | 3.8542 | 3.9657 | 4.7092 | 5.9321 | 6.867 | 7.6187 |
| u27 | 0.996 | 0.992 | 1.5119 | 2.2422 | 2.8098 | 3.3356 | 3.663 | 3.4819 | 4.0606 | 3.7388 | 4.5292 | 5.7308 | 6.6111 | 7.3641 |
| u28 | 1.0002 | 0.9931 | 1.6026 | 2.2672 | 2.849 | 3.34 | 3.6708 | 3.6937 | 4.5158 | 4.0294 | 5.7423 | 6.024 | 6.8485 | 8.1001 |
| u29 | 0.9996 | 0.9947 | 1.6004 | 2.264 | 2.8464 | 3.3382 | 3.6682 | 4.1221 | 4.0742 | 4.4504 | 5.71 | 6.3295 | 7.2893 | 8.6424 |
| u30 | 1.0003 | 0.9972 | 1.6155 | 2.2689 | 2.86 | 3.3379 | 3.6703 | 6.9367 | 4.5402 | 6.1369 | 6.5297 | 7.621 | 8.7159 | 9.8487 |
| u31 | 1.0005 | 1.0011 | 1.6156 | 2.2746 | 2.8614 | 3.3359 | 3.6701 | 4.1219 | 7.7332 | 7.8583 | 8.2835 | 9.5686 | 10.848 | 12.0736 |

-continued

| SNR | 14 | 15 | 16 | 17 | 18 | 19 | 20 | 21 | 22 | 23 | 24 | 25 | 26 | 27 |
|---|---|---|---|---|---|---|---|---|---|---|---|---|---|---|
| u1 | 1.0012 | 1.0004 | 1.0001 | 1.0001 | 1.0017 | 0.9994 | 0.9991 | 1.0002 | 1.0004 | 0.9988 | 1.0002 | 1.0002 | 0.9995 | 0.9998 |
| u2 | 1.0012 | 1.0025 | 0.9995 | 0.9931 | 0.9949 | 0.9978 | 0.9973 | 0.9989 | 0.9993 | 0.9997 | 1.0165 | 1.1141 | 2.1397 | 2.7888 |
| u3 | 1.0002 | 1.0027 | 0.9992 | 0.9935 | 0.9925 | 0.9974 | 0.9973 | 1 | 0.9997 | 1.0012 | 1.0173 | 1.1147 | 2.1405 | 2.7905 |
| u4 | 0.9684 | 0.9816 | 1.0059 | 1.0493 | 1.182 | 1.5796 | 2.455 | 2.8426 | 2.9714 | 3.0025 | 3.0148 | 3.08 | 4.1242 | 4.7995 |
| u5 | 0.9695 | 0.9821 | 1.006 | 1.0522 | 1.1824 | 1.5808 | 2.4551 | 2.8429 | 2.9714 | 3.0028 | 3.0143 | 3.0802 | 4.124 | 4.8013 |
| u6 | 0.9697 | 0.9806 | 1.0066 | 1.0576 | 1.1891 | 1.5819 | 2.4541 | 2.8411 | 2.9706 | 3.0134 | 3.0663 | 3.3089 | 5.4109 | 6.6532 |
| u7 | 0.9688 | 0.9802 | 1.0065 | 1.0566 | 1.188 | 1.5815 | 2.4543 | 2.8404 | 2.9705 | 3.0122 | 3.0667 | 3.3087 | 5.4124 | 6.6551 |
| u8 | 2.7742 | 2.898 | 2.9707 | 3.0198 | 3.1266 | 3.5406 | 4.4866 | 4.9057 | 5.0421 | 5.061 | 5.0494 | 5.1723 | 7.3692 | 8.7048 |
| u9 | 2.7759 | 2.8996 | 2.9696 | 3.016 | 3.1241 | 3.5415 | 4.4867 | 4.9067 | 5.0432 | 5.0601 | 5.0501 | 5.1727 | 7.3707 | 8.706 |
| u10 | 2.7715 | 2.9072 | 2.9916 | 3.0457 | 3.1402 | 3.541 | 4.4834 | 4.9035 | 5.0525 | 5.1122 | 5.2228 | 5.6928 | 8.9013 | 10.681 |
| u11 | 2.77 | 2.9062 | 2.9926 | 3.0494 | 3.1422 | 3.5425 | 4.4833 | 4.9039 | 5.0525 | 5.1118 | 5.2217 | 5.6928 | 8.9024 | 10.6801 |
| u12 | 2.8379 | 3.0216 | 3.1657 | 3.3215 | 3.6581 | 4.5549 | 6.2418 | 6.9491 | 7.1699 | 7.1725 | 7.1285 | 7.4272 | 10.8677 | 12.8191 |
| u13 | 2.8393 | 3.0233 | 3.1642 | 3.3159 | 3.6531 | 4.5542 | 6.2414 | 6.9493 | 7.1687 | 7.1707 | 7.1292 | 7.4281 | 10.8681 | 12.8187 |
| u14 | 2.844 | 3.017 | 3.1421 | 3.2814 | 3.6249 | 4.5445 | 6.2417 | 6.9759 | 7.25 | 7.3803 | 7.6122 | 8.4242 | 12.6721 | 14.9756 |
| u15 | 2.843 | 3.0158 | 3.1438 | 3.2861 | 3.6295 | 4.5453 | 6.2415 | 6.9762 | 7.2509 | 7.3814 | 7.6109 | 8.4241 | 12.6723 | 14.9747 |
| u16 | 4.911 | 5.0847 | 5.2173 | 5.3247 | 5.5906 | 6.5342 | 8.4252 | 9.2104 | 9.4291 | 9.3921 | 9.4171 | 10.0811 | 14.7326 | 17.2923 |
| u17 | 4.8946 | 5.078 | 5.2225 | 5.3361 | 5.5964 | 6.5309 | 8.4176 | 9.2059 | 9.4328 | 9.3936 | 9.4161 | 10.0799 | 14.7331 | 17.2755 |
| u18 | 4.8828 | 5.032 | 5.1525 | 5.263 | 5.5632 | 6.5493 | 8.4939 | 9.3909 | 9.7733 | 10.0241 | 10.4656 | 11.538 | 16.821 | 19.7523 |
| u19 | 4.8993 | 5.0389 | 5.1478 | 5.2534 | 5.5595 | 6.5509 | 8.5005 | 9.3955 | 9.768 | 10.0192 | 10.4628 | 11.5406 | 16.8423 | 19.666 |
| u20 | 5.4537 | 5.6751 | 5.8353 | 6.0525 | 6.7077 | 8.1966 | 10.6339 | 11.6235 | 11.9277 | 11.9919 | 12.2335 | 13.2526 | 19.0855 | 22.4952 |
| u21 | 5.4274 | 5.661 | 5.8447 | 6.0828 | 6.7436 | 8.2344 | 10.6663 | 11.6306 | 11.9181 | 11.9835 | 12.2406 | 13.2955 | 19.2025 | 22.1794 |
| u22 | 5.4211 | 5.7314 | 5.9947 | 6.2932 | 6.9708 | 8.5154 | 11.1197 | 12.3574 | 12.9096 | 13.3504 | 13.8605 | 15.0255 | 21.46 | 25.7242 |
| u23 | 5.446 | 5.7457 | 5.9865 | 6.2653 | 6.934 | 8.4705 | 11.0711 | 12.3354 | 12.9262 | 13.3985 | 13.9572 | 15.2319 | 21.8968 | 24.8484 |
| u24 | 7.601 | 7.9092 | 8.1116 | 8.2986 | 8.8843 | 10.5567 | 13.4789 | 14.6975 | 15.1159 | 15.345 | 15.7488 | 16.9733 | 24.1121 | 29.7447 |
| u25 | 7.6905 | 7.9139 | 8.0671 | 8.234 | 8.8098 | 10.4713 | 13.4082 | 14.7119 | 15.2287 | 15.5598 | 16.121 | 17.6005 | 25.2362 | 28.0103 |
| u26 | 8.0227 | 8.3661 | 8.5885 | 8.7912 | 9.4292 | 11.2659 | 14.6004 | 16.3761 | 17.081 | 17.4332 | 17.9118 | 19.3511 | 27.4658 | 34.5679 |
| u27 | 7.8908 | 8.3208 | 8.642 | 8.9175 | 9.6219 | 11.5386 | 14.97 | 16.8358 | 17.7127 | 18.2141 | 18.9411 | 20.7343 | 29.5377 | 32.086 |
| u28 | 9.4399 | 10.0496 | 10.4616 | 10.7875 | 11.5373 | 13.6107 | 17.3205 | 19.1194 | 19.8684 | 20.2666 | 20.8688 | 22.6464 | 32.0788 | 40.6327 |
| u29 | 9.7624 | 10.4834 | 10.962 | 11.3065 | 12.0909 | 14.2876 | 18.2519 | 20.3764 | 21.561 | 22.2111 | 22.9314 | 24.8269 | 35.0018 | 37.4081 |
| u30 | 10.8696 | 11.8503 | 12.6479 | 13.2236 | 14.1807 | 16.6639 | 21.0844 | 23.2372 | 24.2835 | 24.8299 | 25.4818 | 27.4224 | 38.4187 | 45.0872 |
| u31 | 13.0935 | 14.0851 | 14.9452 | 15.6218 | 16.7225 | 19.5472 | 24.5629 | 26.8501 | 27.8003 | 28.1675 | 28.6568 | 30.5887 | 42.5428 | 49.499 |

| SNR | 28 | 29 | 30 | 31 | 32 | 33 | 34 | 35 | 36 | 37 | 38 | 39 | 40 |
|---|---|---|---|---|---|---|---|---|---|---|---|---|---|
| u1 | 0.9976 | 0.9987 | 1.0014 | 1.025 | 2.4413 | 2.8939 | 2.9843 | 2.9997 | 3.0019 | 3.0007 | 3.0007 | 3.0003 | 2.9995 |
| u2 | 2.9488 | 2.9915 | 3.0025 | 3.018 | 4.4383 | 4.8976 | 4.9895 | 5.0043 | 5.0061 | 5.0036 | 5.003 | 5.0018 | 5.001 |
| u3 | 2.9479 | 2.9924 | 3.0037 | 3.0632 | 5.9167 | 6.8058 | 6.9842 | 7.0135 | 7.0137 | 7.0097 | 7.0074 | 7.0054 | 7.0045 |
| u4 | 4.9619 | 5.0094 | 5.0187 | 5.0331 | 7.9068 | 8.8211 | 9.0048 | 9.0324 | 9.0288 | 9.0203 | 9.0152 | 9.0116 | 9.0111 |
| u5 | 4.9639 | 5.011 | 5.0222 | 5.1327 | 9.4519 | 10.7571 | 11.0224 | 11.0604 | 11.0525 | 11.0369 | 11.0279 | 11.0206 | 11.0185 |
| u6 | 6.9622 | 7.042 | 7.0521 | 7.0424 | 11.4366 | 12.7933 | 13.0677 | 13.1031 | 13.086 | 13.0608 | 13.0457 | 13.0341 | 13.0292 |
| u7 | 6.9646 | 7.0451 | 7.0661 | 7.2657 | 13.0678 | 14.7709 | 15.1192 | 15.1604 | 15.1306 | 15.0937 | 15.0694 | 15.0521 | 15.0437 |
| u8 | 9.0372 | 9.1166 | 9.1087 | 9.0645 | 15.0544 | 16.8389 | 17.2032 | 17.2373 | 17.1893 | 17.1369 | 17.1017 | 17.0762 | 17.0621 |
| u9 | 9.0366 | 9.12 | 9.1529 | 9.5267 | 16.783 | 18.8721 | 19.3026 | 19.3344 | 19.2643 | 19.1918 | 19.1426 | 19.1063 | 19.0849 |
| u10 | 11.1331 | 11.2301 | 11.1846 | 11.1868 | 18.7849 | 20.9854 | 21.4382 | 21.4555 | 21.3571 | 21.2603 | 21.194 | 21.1446 | 21.1144 |
| u11 | 11.1295 | 11.2429 | 11.3066 | 11.9962 | 20.6177 | 23.0888 | 23.5996 | 23.6025 | 23.4702 | 23.3435 | 23.2559 | 23.1917 | 23.1505 |
| u12 | 13.3129 | 13.3994 | 13.2789 | 13.5349 | 22.654 | 25.265 | 25.8011 | 25.7794 | 25.6052 | 25.4431 | 25.3306 | 25.2483 | 25.1935 |
| u13 | 13.316 | 13.4449 | 13.5855 | 14.661 | 24.5975 | 27.4555 | 28.0387 | 27.9889 | 27.7649 | 27.5612 | 27.4193 | 27.3164 | 27.2455 |
| u14 | 15.5542 | 15.6103 | 15.4321 | 16.1384 | 26.6918 | 29.7155 | 30.3242 | 30.2341 | 29.9519 | 29.6994 | 29.5231 | 29.3957 | 29.3073 |
| u15 | 15.58 | 15.7567 | 16.0956 | 17.4614 | 28.7572 | 32.0137 | 32.6572 | 32.518 | 32.1673 | 31.8602 | 31.6441 | 31.4885 | 31.3787 |
| u16 | 17.887 | 17.8671 | 17.8082 | 18.9525 | 30.94 | 34.3846 | 35.0455 | 34.8442 | 34.4149 | 34.0451 | 33.7833 | 33.5958 | 33.4606 |
| u17 | 17.9845 | 18.2619 | 18.9235 | 20.4071 | 33.1458 | 36.8156 | 37.4911 | 37.2161 | 36.6987 | 36.2565 | 35.9437 | 35.7192 | 35.5554 |
| u18 | 20.2884 | 20.2456 | 20.5488 | 21.964 | 35.4548 | 39.3279 | 40.0014 | 39.6382 | 39.0206 | 38.4973 | 38.1256 | 37.8593 | 37.6646 |
| u19 | 20.6026 | 21.1199 | 21.993 | 23.5441 | 37.8295 | 41.9212 | 42.5806 | 42.1143 | 41.383 | 40.7696 | 40.3329 | 40.0202 | 39.7791 |
| u20 | 22.8105 | 22.9898 | 23.6434 | 25.2095 | 40.3124 | 44.6095 | 45.2363 | 44.6495 | 43.79 | 43.0773 | 42.5661 | 42.2016 | 41.9315 |
| u21 | 23.6105 | 24.4211 | 25.3021 | 26.9381 | 42.8978 | 47.3978 | 47.9743 | 47.2486 | 46.2474 | 45.4239 | 44.8319 | 44.407 | 44.0928 |
| u22 | 25.7141 | 26.2598 | 27.0831 | 28.76 | 45.609 | 50.2974 | 50.8009 | 49.9168 | 48.7598 | 47.8129 | 47.1293 | 46.6391 | 46.2746 |
| u23 | 27.2209 | 28.0726 | 28.951 | 30.6768 | 48.453 | 53.3172 | 53.7241 | 52.6664 | 51.3323 | 50.249 | 49.4658 | 48.9001 | 48.4795 |
| u24 | 29.302 | 30.0719 | 30.9486 | 32.7041 | 51.4455 | 56.4693 | 56.7544 | 55.4931 | 53.9725 | 52.7382 | 51.8433 | 51.1958 | 50.7105 |
| u25 | 31.3751 | 32.209 | 33.0801 | 34.8521 | 54.6007 | 59.7663 | 59.9029 | 58.419 | 56.6876 | 55.2875 | 54.2702 | 53.5266 | 52.974 |
| u26 | 33.7153 | 34.532 | 35.3703 | 37.136 | 57.9366 | 63.2251 | 63.1856 | 61.4525 | 59.489 | 57.9066 | 56.7507 | 55.9047 | 55.2723 |
| u27 | 36.2816 | 37.0684 | 37.8335 | 39.572 | 61.4759 | 66.868 | 66.6219 | 64.6108 | 62.39 | 60.607 | 59.2976 | 58.3332 | 57.6109 |
| u28 | 39.1419 | 39.8412 | 40.4977 | 42.1824 | 65.2512 | 70.7275 | 70.2394 | 67.918 | 65.413 | 63.4057 | 61.9235 | 60.8256 | 60.0019 |
| u29 | 42.336 | 42.8943 | 43.4022 | 45.0041 | 69.3127 | 74.8524 | 74.0829 | 71.4105 | 68.5885 | 66.3283 | 64.6487 | 63.4014 | 62.4582 |
| u30 | 45.9471 | 46.3002 | 46.6146 | 48.1025 | 73.7506 | 79.3277 | 78.2264 | 75.1519 | 71.9717 | 69.4194 | 67.5124 | 66.0884 | 65.0072 |
| u31 | 50.1806 | 50.2503 | 50.2989 | 51.6274 | 78.7737 | 84.3532 | 82.8441 | 79.2912 | 75.6839 | 72.7834 | 70.6068 | 68.9588 | 67.7069 | e4) 4096-QAM/64-PAM for a fading channel (2. option)

| SNR | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| u1 | 0.9963 | 0.9978 | 1.0042 | 1.0018 | 0.9993 | 1.0199 | 1.0097 | 1.0072 | 1.0028 | 0.9994 | 0.9999 | 0.9996 | 1.0002 | 1.0005 |
| u2 | 0.9888 | 0.995 | 1.0058 | 1.0009 | 1 | 1.0401 | 1.0467 | 1.0288 | 1.0323 | 1.0103 | 1.0036 | 0.9995 | 1 | 1.0007 |
| u3 | 0.9918 | 0.9943 | 1.0101 | 1.0036 | 1.0003 | 1.0198 | 1.0337 | 1.018 | 1.0303 | 1.0099 | 1.0047 | 0.9997 | 1.0001 | 1.0009 |
| u4 | 0.9541 | 0.9962 | 0.9955 | 0.9907 | 1.0023 | 1.0376 | 1.0885 | 1.0841 | 1.0665 | 1.0416 | 1.0207 | 1.0048 | 0.9958 | 0.9914 |

-continued

| | | | | | | | | | | | | | | |
|---|---|---|---|---|---|---|---|---|---|---|---|---|---|---|
| u5 | 0.9509 | 0.9947 | 0.9963 | 0.9911 | 1.0019 | 1.0575 | 1.1007 | 1.0947 | 1.0687 | 1.0415 | 1.0205 | 1.0045 | 0.9959 | 0.9919 |
| u6 | 0.9572 | 0.994 | 1.0008 | 0.9947 | 1.0008 | 1.0371 | 1.0611 | 1.0713 | 1.0375 | 1.0295 | 1.018 | 1.0044 | 0.9963 | 0.9921 |
| u7 | 0.9601 | 0.9933 | 1.0043 | 0.998 | 0.9999 | 1.0167 | 1.049 | 1.061 | 1.0352 | 1.0293 | 1.0191 | 1.0045 | 0.9965 | 0.9922 |
| u8 | 0.8508 | 0.9904 | 1.0057 | 0.9981 | 1.0011 | 1.0359 | 1.1057 | 1.2062 | 1.3196 | 1.4848 | 1.7124 | 1.9789 | 2.2284 | 2.4296 |
| u9 | 0.8497 | 0.9921 | 1.0036 | 0.9975 | 1.0009 | 1.0568 | 1.1177 | 1.2173 | 1.323 | 1.4854 | 1.7111 | 1.9774 | 2.229 | 2.4304 |
| u10 | 0.8453 | 0.9927 | 0.9998 | 0.9957 | 1.0008 | 1.0777 | 1.1579 | 1.2437 | 1.3637 | 1.5033 | 1.7169 | 1.977 | 2.2279 | 2.4297 |
| u11 | 0.8497 | 0.9966 | 0.9966 | 0.9945 | 1.0008 | 1.0584 | 1.1449 | 1.2318 | 1.3601 | 1.5036 | 1.7176 | 1.9772 | 2.2285 | 2.4298 |
| u12 | 0.8794 | 0.9961 | 1.0066 | 1.0036 | 0.9997 | 1.04 | 1.0892 | 1.1572 | 1.3143 | 1.456 | 1.6837 | 1.9674 | 2.2398 | 2.4752 |
| u13 | 0.8775 | 0.9967 | 1.0043 | 1.0016 | 1 | 1.0598 | 1.1014 | 1.1687 | 1.3174 | 1.4567 | 1.6825 | 1.9661 | 2.2404 | 2.4761 |
| u14 | 0.8838 | 0.9993 | 1.0044 | 1.0026 | 0.9999 | 1.0395 | 1.0619 | 1.144 | 1.2769 | 1.4404 | 1.6764 | 1.9651 | 2.2423 | 2.4776 |
| u15 | 0.887 | 1.0004 | 1.0046 | 1.0026 | 1.0005 | 1.0192 | 1.05 | 1.1336 | 1.2731 | 1.4409 | 1.6771 | 1.9652 | 2.2428 | 2.4777 |
| u16 | 1.3685 | 2.044 | 2.4233 | 2.7677 | 2.9386 | 3.5023 | 3.4408 | 3.2474 | 3.2673 | 3.4167 | 3.6611 | 3.9531 | 4.2293 | 4.4538 |
| u17 | 1.3632 | 2.0409 | 2.4206 | 2.7543 | 2.926 | 3.031 | 3.3601 | 3.2589 | 3.2953 | 3.4403 | 3.6759 | 3.9601 | 4.2313 | 4.4531 |
| u18 | 1.3522 | 2.036 | 2.4072 | 2.7164 | 2.8659 | 2.7928 | 3.1046 | 3.2433 | 3.3198 | 3.4991 | 3.737 | 4.0075 | 4.2628 | 4.4661 |
| u19 | 1.3584 | 2.0387 | 2.4131 | 2.7296 | 2.876 | 3.0328 | 3.1327 | 3.2291 | 3.2928 | 3.4736 | 3.7215 | 3.9997 | 4.2609 | 4.4673 |
| u20 | 1.2937 | 2.0217 | 2.3696 | 2.6067 | 2.872 | 2.7985 | 2.8894 | 3.0788 | 3.3078 | 3.5536 | 3.8874 | 4.2677 | 4.632 | 4.955 |
| u21 | 1.2893 | 2.0179 | 2.3654 | 2.5953 | 2.8622 | 2.6481 | 2.879 | 3.0908 | 3.3328 | 3.5791 | 3.9074 | 4.2792 | 4.6369 | 4.954 |
| u22 | 1.3005 | 2.0217 | 2.3804 | 2.6264 | 2.9212 | 2.7978 | 2.9999 | 3.0955 | 3.3114 | 3.5221 | 3.8387 | 4.2143 | 4.5858 | 4.9287 |
| u23 | 1.3059 | 2.0243 | 2.3849 | 2.6377 | 2.9333 | 3.0347 | 3.0216 | 3.0827 | 3.286 | 3.4971 | 3.8215 | 4.2031 | 4.5824 | 4.9304 |
| u24 | 1.536 | 2.0277 | 2.3595 | 2.6209 | 2.931 | 3.5055 | 3.4745 | 3.7641 | 4.5388 | 4.8012 | 5.2768 | 5.7983 | 6.2845 | 6.6904 |
| u25 | 1.5286 | 2.0274 | 2.3608 | 2.611 | 2.9209 | 3.0294 | 3.3939 | 3.7415 | 4.5688 | 4.8766 | 5.3692 | 5.8801 | 6.3465 | 6.73 |
| u26 | 1.5142 | 2.0263 | 2.351 | 2.5814 | 2.8639 | 2.7958 | 3.1184 | 3.4571 | 4.2838 | 4.7955 | 5.3854 | 5.9967 | 6.555 | 7.028 |
| u27 | 1.5207 | 2.0302 | 2.3596 | 2.5937 | 2.8759 | 3.0301 | 3.1528 | 3.6471 | 4.2441 | 4.7386 | 5.3092 | 5.9145 | 6.4785 | 6.9667 |
| u28 | 1.6081 | 2.0374 | 2.397 | 2.7137 | 2.8798 | 3.4906 | 3.7542 | 4.4918 | 4.6545 | 5.4141 | 6.1357 | 6.9502 | 7.6934 | 8.3177 |
| u29 | 1.5999 | 2.0376 | 2.3962 | 2.7007 | 2.8677 | 3.0254 | 3.6131 | 4.3043 | 4.6739 | 5.427 | 6.2138 | 7.0723 | 7.8706 | 8.5561 |
| u30 | 1.6138 | 2.0443 | 2.4108 | 2.7391 | 2.9274 | 3.4965 | 4.488 | 4.9563 | 5.6429 | 6.2434 | 7.0601 | 7.9787 | 8.901 | 9.7418 |
| u31 | 1.6203 | 2.0495 | 2.4173 | 2.752 | 2.9369 | 5.0575 | 5.6783 | 6.2681 | 6.9732 | 7.6928 | 8.5941 | 9.597 | 10.5869 | 11.4949 |

| SNR | 14 | 15 | 16 | 17 | 18 | 19 | 20 | 21 | 22 | 23 | 24 | 25 | 26 | 27 |
|---|---|---|---|---|---|---|---|---|---|---|---|---|---|---|
| u1 | 1.0004 | 1.0002 | 1.0002 | 0.9998 | 0.999 | 0.9988 | 0.9995 | 0.9999 | 1.0013 | 0.9999 | 1.001 | 0.9997 | 1.0009 | 0.9992 |
| u2 | 1.0009 | 0.9991 | 0.9984 | 0.9984 | 1.0001 | 0.9996 | 0.9992 | 1.0004 | 1.0032 | 1.0364 | 1.3959 | 1.9271 | 2.272 | 2.494 |
| u3 | 1.0008 | 0.9992 | 0.9986 | 0.9983 | 0.9997 | 0.998 | 0.9988 | 1.0013 | 1.0018 | 1.037 | 1.3944 | 1.9264 | 2.2732 | 2.4945 |
| u4 | 0.9953 | 1.0125 | 1.067 | 1.2356 | 1.6294 | 2.0374 | 2.3337 | 2.5341 | 2.6647 | 2.7604 | 3.1499 | 3.7388 | 4.1332 | 4.3943 |
| u5 | 0.9956 | 1.0127 | 1.067 | 1.2354 | 1.6298 | 2.0374 | 2.3334 | 2.5347 | 2.6639 | 2.7604 | 3.1496 | 3.7379 | 4.1327 | 4.3952 |
| u6 | 0.9956 | 1.0133 | 1.0683 | 1.2372 | 1.6304 | 2.0374 | 2.3318 | 2.5328 | 2.6769 | 2.8536 | 3.6527 | 4.7448 | 5.4651 | 5.9409 |
| u7 | 0.9957 | 1.0135 | 1.0683 | 1.2366 | 1.6304 | 2.0366 | 2.3321 | 2.5362 | 2.6761 | 2.8534 | 3.6538 | 4.7432 | 5.4655 | 5.9407 |
| u8 | 2.5769 | 2.6774 | 2.7777 | 2.9864 | 3.4541 | 3.93 | 4.2773 | 4.5077 | 4.6411 | 4.7342 | 5.5345 | 6.7158 | 7.4777 | 7.9756 |
| u9 | 2.5774 | 2.6773 | 2.7771 | 2.9867 | 3.4539 | 3.931 | 4.2766 | 4.5089 | 4.6405 | 4.7345 | 5.5352 | 6.7145 | 7.478 | 7.9745 |
| u10 | 2.5794 | 2.6833 | 2.784 | 2.9906 | 3.4555 | 3.9297 | 4.2772 | 4.5202 | 4.7063 | 5.0028 | 6.2647 | 7.8812 | 8.9382 | 9.6301 |
| u11 | 2.5793 | 2.6837 | 2.7837 | 2.9912 | 3.4561 | 3.9294 | 4.2768 | 4.5204 | 4.7061 | 5.0025 | 6.2637 | 7.8827 | 8.9384 | 9.6296 |
| u12 | 2.6756 | 2.8656 | 3.1097 | 3.5858 | 4.4555 | 5.277 | 5.8854 | 6.2318 | 6.4228 | 6.6184 | 7.9618 | 9.7611 | 10.9166 | 11.6754 |
| u13 | 2.6764 | 2.8653 | 3.1091 | 3.5859 | 4.4552 | 5.2757 | 5.8595 | 6.2314 | 6.4225 | 6.6189 | 7.9616 | 9.7632 | 10.9185 | 11.6664 |
| u14 | 2.6747 | 2.8576 | 3.1006 | 3.577 | 4.4507 | 5.2792 | 5.8832 | 6.3219 | 6.6852 | 7.215 | 8.9989 | 11.1777 | 12.5855 | 13.5279 |
| u15 | 2.6746 | 2.8581 | 3.1004 | 3.5775 | 4.4509 | 5.2795 | 5.8851 | 6.3212 | 6.6842 | 7.2149 | 8.9993 | 11.1786 | 12.5908 | 13.4849 |
| u16 | 4.6252 | 4.7674 | 4.9751 | 5.474 | 6.4759 | 7.4011 | 8.0147 | 8.3718 | 8.5777 | 8.9581 | 10.8873 | 13.2883 | 14.7944 | 15.8428 |
| u17 | 4.6243 | 4.7676 | 4.9767 | 5.4757 | 6.4751 | 7.3997 | 8.0232 | 8.372 | 8.5775 | 9.9585 | 10.885 | 13.2918 | 14.8184 | 15.6955 |
| u18 | 4.6188 | 4.7505 | 4.9585 | 5.4675 | 6.4921 | 7.4646 | 8.1858 | 8.7429 | 9.2532 | 9.94 | 12.2345 | 14.9831 | 16.6805 | 18.0725 |
| u19 | 4.62 | 4.7491 | 4.9578 | 5.4681 | 6.4921 | 7.4665 | 8.1853 | 8.7398 | 9.2525 | 9.9394 | 12.2364 | 15.0095 | 16.8025 | 17.6716 |
| u20 | 5.246 | 5.5472 | 5.9566 | 6.7028 | 8.0145 | 9.1828 | 9.9708 | 10.5001 | 10.9359 | 11.5978 | 14.1236 | 17.1287 | 18.9131 | 20.8359 |
| u21 | 5.2441 | 5.5486 | 5.9602 | 6.7104 | 8.0232 | 9.1919 | 9.9745 | 10.4999 | 10.9341 | 11.6041 | 14.1646 | 17.2749 | 19.325 | 20.0208 |
| u22 | 5.2556 | 5.6032 | 6.0637 | 6.8816 | 8.3055 | 9.641 | 10.6757 | 11.4966 | 12.1712 | 12.9965 | 15.8137 | 19.1281 | 21.168 | 23.862 |
| u23 | 5.2584 | 5.602 | 6.0592 | 6.8738 | 8.2927 | 9.6278 | 10.6671 | 11.5018 | 12.202 | 13.088 | 16.0518 | 19.6555 | 22.0945 | 22.6034 |
| u24 | 7.0279 | 7.3462 | 7.7844 | 8.6613 | 10.2586 | 11.7039 | 12.7329 | 13.483 | 14.0789 | 14.878 | 17.9826 | 21.7256 | 24.1425 | 27.5194 |
| u25 | 7.0459 | 7.3437 | 7.7662 | 8.6344 | 10.2325 | 11.6913 | 12.7532 | 13.5672 | 14.2758 | 15.2586 | 18.6869 | 22.8323 | 25.575 | 25.8774 |
| u26 | 7.4305 | 7.8203 | 8.3639 | 9.4101 | 11.2613 | 12.9619 | 14.2091 | 15.1187 | 15.8369 | 16.8096 | 20.4248 | 24.7955 | 27.6541 | 31.8142 |
| u27 | 7.3941 | 7.8194 | 8.4057 | 9.5027 | 11.4236 | 13.2128 | 14.5744 | 15.6519 | 16.6054 | 17.8237 | 21.8049 | 26.5569 | 29.6567 | 29.6686 |
| u28 | 8.8516 | 9.3478 | 9.9831 | 11.1654 | 13.2585 | 15.161 | 16.5544 | 17.6098 | 18.5 | 19.6965 | 23.9472 | 29.0147 | 32.2679 | 37.1329 |
| u29 | 9.1461 | 9.7003 | 10.4171 | 11.7322 | 14.0437 | 16.204 | 17.8423 | 19.1046 | 20.1574 | 21.4926 | 26.1156 | 31.5831 | 35.0526 | 34.4897 |
| u30 | 10.4828 | 11.1807 | 12.0295 | 13.5243 | 16.1109 | 18.4804 | 20.2275 | 21.5413 | 22.6144 | 23.9997 | 29.0224 | 34.929 | 38.6023 | 41.5575 |
| u31 | 12.3176 | 13.1061 | 14.0796 | 15.7967 | 18.7604 | 21.4433 | 23.3683 | 24.7641 | 25.8663 | 27.2995 | 32.8238 | 39.2987 | 43.2007 | 45.9849 |

| SNR | 28 | 29 | 30 | 31 | 32 | 33 | 34 | 35 | 36 | 37 | 38 | 39 | 40 |
|---|---|---|---|---|---|---|---|---|---|---|---|---|---|
| u1 | 1.0006 | 1.0043 | 1.4608 | 2.031 | 2.3634 | 2.5782 | 2.7135 | 2.8007 | 2.8562 | 2.8925 | 2.9145 | 2.932 | 2.9432 |
| u2 | 2.6454 | 2.7379 | 3.2219 | 3.8448 | 4.2255 | 4.4775 | 4.6426 | 4.7502 | 4.8197 | 4.8656 | 4.8927 | 4.9155 | 4.9282 |
| u3 | 2.6449 | 2.746 | 3.6983 | 4.8763 | 5.5926 | 6.0595 | 6.3617 | 6.5573 | 6.6818 | 6.7624 | 6.8134 | 6.8524 | 6.8778 |
| u4 | 4.5762 | 4.6828 | 5.6197 | 6.8402 | 7.5722 | 8.051 | 8.3598 | 8.5611 | 8.6878 | 8.7697 | 8.8219 | 8.8609 | 8.8865 |
| u5 | 4.5757 | 4.7079 | 6.1651 | 7.912 | 8.9681 | 9.6583 | 10.0999 | 10.3859 | 10.5661 | 10.6838 | 10.7566 | 10.8106 | 10.8472 |
| u6 | 6.2598 | 6.4365 | 7.8821 | 9.7373 | 10.8558 | 11.5914 | 12.0627 | 12.3691 | 12.5612 | 12.6874 | 12.763 | 12.8207 | 12.8615 |
| u7 | 6.2627 | 6.5065 | 8.5398 | 10.8859 | 12.31 | 13.2454 | 13.8413 | 14.2281 | 14.47 | 14.6273 | 14.7205 | 14.7934 | 14.8444 |
| u8 | 8.3042 | 8.4445 | 10.4315 | 12.8891 | 14.3481 | 15.3017 | 15.9032 | 16.2913 | 16.5325 | 16.6862 | 16.7743 | 16.8469 | 16.8975 |
| u9 | 8.3131 | 8.6065 | 11.2028 | 14.1091 | 15.8609 | 17.0043 | 17.7263 | 18.1889 | 18.4766 | 18.6587 | 18.7627 | 18.8479 | 18.907 |
| u10 | 10.0729 | 10.254 | 12.8833 | 15.9704 | 17.8101 | 19.0084 | 19.7625 | 20.244 | 20.5396 | 20.7276 | 20.8283 | 20.9151 | 20.9752 |
| u11 | 10.1062 | 10.5627 | 13.7734 | 17.2797 | 19.3987 | 20.7764 | 21.6431 | 22.1941 | 22.5302 | 22.7431 | 22.8571 | 22.9529 | 23.0199 |
| u12 | 12.1078 | 12.3025 | 15.599 | 19.2948 | 21.4876 | 22.9043 | 23.7857 | 24.3407 | 24.6737 | 24.8824 | 24.9883 | 25.0776 | 25.1403 |
| u13 | 12.2211 | 12.8281 | 16.6269 | 20.7185 | 23.1709 | 24.7554 | 25.7402 | 26.3568 | 26.7257 | 26.9539 | 27.0702 | 27.1641 | 27.23 |
| u14 | 13.9787 | 14.3539 | 18.3392 | 22.6727 | 25.2367 | 26.8878 | 27.9051 | 28.5338 | 28.9056 | 29.1316 | 29.2408 | 29.3276 | 29.3905 |
| u15 | 14.2723 | 15.1126 | 19.5353 | 24.2439 | 27.0471 | 28.8505 | 29.9595 | 30.6383 | 31.0373 | 31.2752 | 31.3895 | 31.4767 | 31.5389 |

-continued

| | | | | | | | | | | | |
|---|---|---|---|---|---|---|---|---|---|---|---|
| u16 | 16.1851 | 16.7817 | 21.4333 | 26.3916 | 29.2986 | 31.147 | 32.2702 | 32.9453 | 33.3306 | 33.5558 | 33.6536 | 33.727 | 33.7773 |
| u17 | 16.7562 | 17.7277 | 22.7796 | 28.1062 | 31.2381 | 33.2292 | 34.4336 | 35.1516 | 35.5544 | 35.7864 | 35.8824 | 35.9518 | 35.997 |
| u18 | 18.3851 | 19.2664 | 24.6112 | 30.2335 | 33.5042 | 35.5666 | 36.7993 | 37.5228 | 37.9155 | 38.1359 | 38.2116 | 38.2677 | 38.2999 |
| u19 | 19.2499 | 20.3968 | 26.1323 | 32.1242 | 35.6097 | 37.8022 | 39.1019 | 39.8565 | 40.2573 | 40.4733 | 40.5406 | 40.5882 | 40.6091 |
| u20 | 21.0165 | 22.1002 | 28.1574 | 34.4644 | 38.0874 | 40.3385 | 41.6513 | 42.3946 | 42.7722 | 42.9647 | 43.0011 | 43.0265 | 43.0262 |
| u21 | 22.1679 | 23.4306 | 29.8838 | 36.5679 | 40.3963 | 42.7627 | 44.1297 | 44.8896 | 45.2621 | 45.4415 | 45.4589 | 45.4682 | 45.4529 |
| u22 | 23.9006 | 25.1704 | 31.9904 | 39.027 | 43.0119 | 45.4482 | 46.8305 | 47.576 | 47.92 | 48.069 | 48.0512 | 48.0322 | 47.99 |
| u23 | 25.3642 | 26.7556 | 33.9846 | 41.4123 | 45.5943 | 48.1289 | 49.5435 | 50.2892 | 50.6125 | 50.7335 | 50.6844 | 50.639 | 50.5714 |
| u24 | 27.3645 | 28.7536 | 36.3885 | 44.2002 | 48.5385 | 51.1272 | 52.5353 | 53.2485 | 53.5222 | 53.5931 | 53.4946 | 53.4105 | 53.3077 |
| u25 | 29.1484 | 30.6214 | 38.698 | 46.9287 | 51.4594 | 54.1327 | 55.5551 | 56.2467 | 56.4806 | 56.5119 | 56.3625 | 56.2412 | 56.1041 |
| u26 | 31.3343 | 32.829 | 41.3722 | 50.0315 | 54.734 | 57.4607 | 58.8707 | 59.512 | 59.683 | 59.6552 | 59.4393 | 59.268 | 59.0883 |
| u27 | 33.5648 | 35.1146 | 44.1486 | 53.2678 | 58.1622 | 60.9496 | 62.3471 | 62.9389 | 63.0415 | 62.9454 | 62.6599 | 62.439 | 62.2059 |
| u28 | 36.2682 | 37.8272 | 47.3995 | 57.0085 | 62.0839 | 64.905 | 66.2558 | 66.7683 | 66.7757 | 66.5764 | 66.2081 | 65.9151 | 65.6227 |
| u29 | 39.1974 | 40.7685 | 50.93 | 61.0847 | 66.3515 | 69.2122 | 70.5087 | 70.932 | 70.83 | 70.5214 | 70.0572 | 69.6802 | 69.3125 |
| u30 | 42.8228 | 44.3725 | 55.219 | 65.9903 | 71.458 | 74.3362 | 75.5397 | 75.8248 | 75.5766 | 75.0956 | 74.5263 | 74.0405 | 73.5803 |
| u31 | 47.4691 | 48.9596 | 60.6605 | 72.1993 | 77.8935 | 80.7711 | 81.8379 | 81.9286 | 81.4804 | 80.7898 | 80.0683 | 79.4178 | 78.8141 |

Thus, a coding and modulation apparatus making use of these NUC tables comprises
an encoder that encodes input data into cell words, and
a modulator that modulates said cell words into constellation values of a non-uniform constellation,
wherein said modulator is configured to use, based on the total number M of constellation points of the constellation, the signal-to-noise ratio SNR in dB and the channel characteristics, a non-uniform constellation from a group of constellations comprising one or more of the constellations defined by the constellation position vector $u_{1 \ldots v}$, wherein v=sqrt(M)/2−1, as described in the NUC tables.

Figure 5:
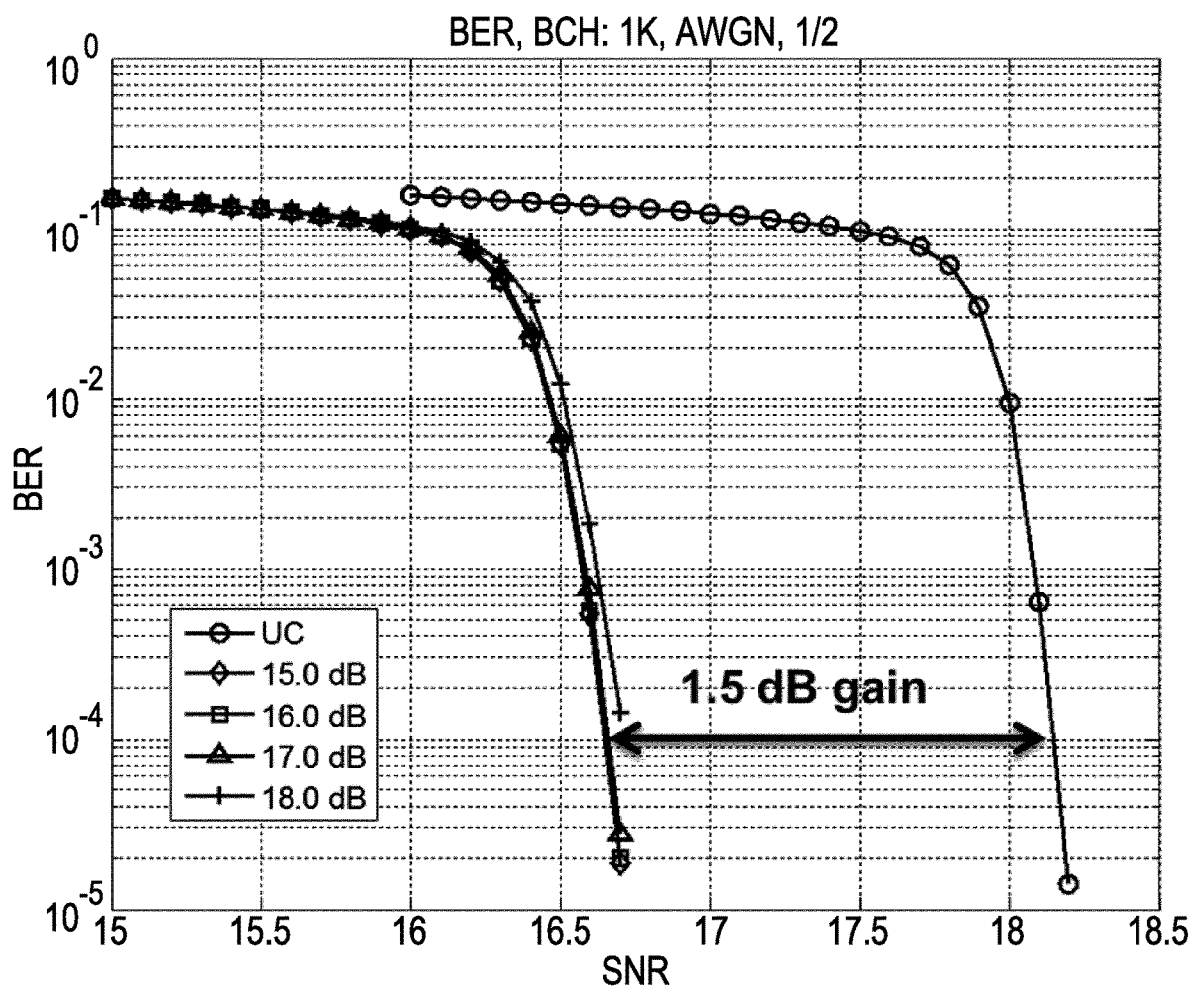
FIG. 5 shows an example plot of the BER performance for uniform 1024-QAM and related non-uniform constellations (NUC) with CR ½.

FIG. 5 shows a BER performance comparison for 1024-QAM and code rate ½ (LDPC block size: 64 k bits) between uniform and the proposed non-uniform constellation (optimized for 15 . . . 18 dB). In this example, 1.5 dB shaping gain can be achieved with NUCs. The following table summarizes the gain of 1 k NUCs over AWGN channel with 64 k LDPC that has been achieved with NUCs in system simulations:

| | Coderate | Gain [dB] | Provided by NUC for x dB |
|---|---|---|---|
| NUC gain decreases for smaller SNR due to flattening out of the capacity to 0 b/s/Hz | 1/3 | 1.2 | 13 dB |
| | 2/5 | 1.25 | 14 dB |
| | 1/2 | 1.5 | 16 dB |
| NUC gain decreases for higher SNR due to flattening out of the capacity to 10 b/s/Hz | 3/5 | 1.3 | 20 dB |
| | 2/3 | 1.1 | 22 dB |
| | 3/4 | 0.8 | 24 dB |
| | 4/5 | 0.6 | 26 dB |
| | 5/6 | 0.5 | 26 dB |

Figure 6:
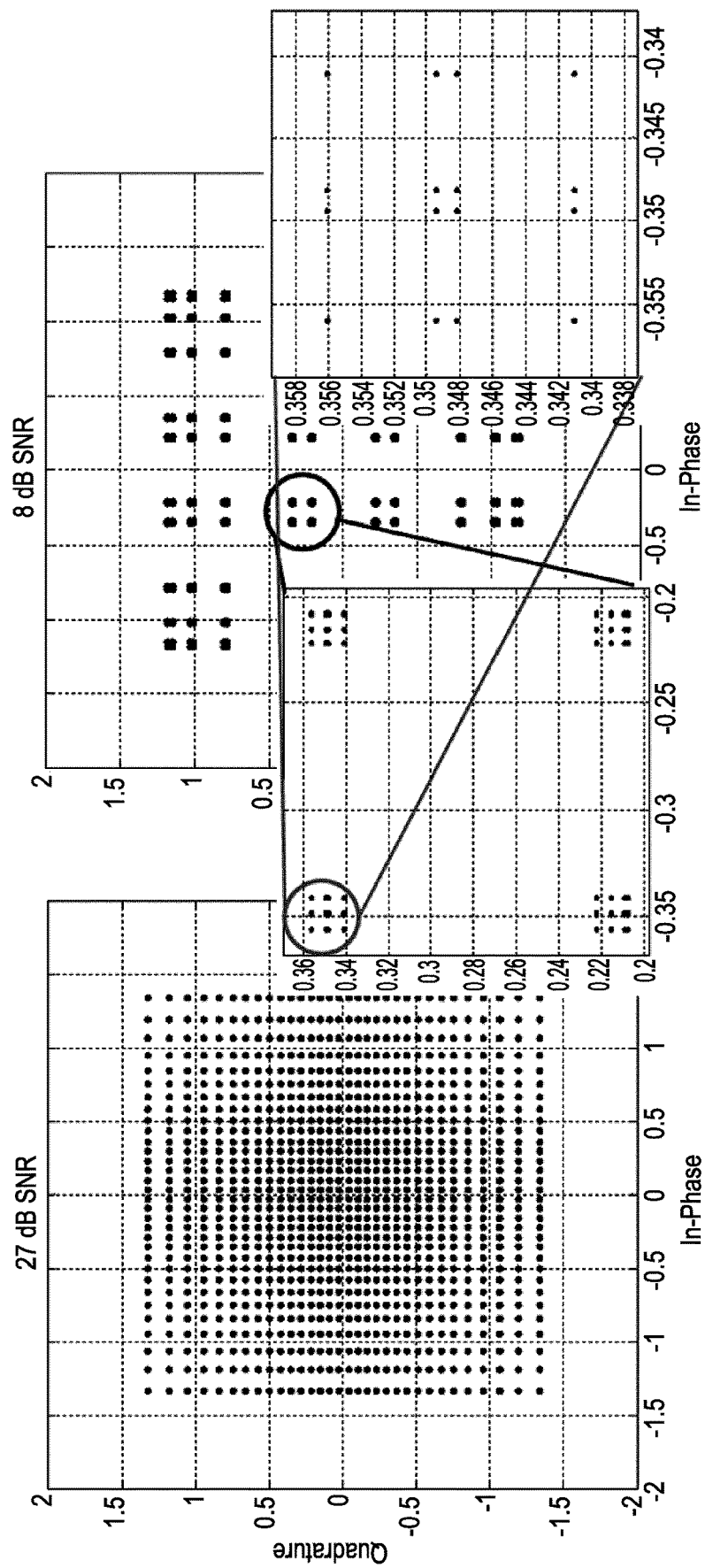
FIG. 6 shows diagrams illustrating the NUC shapes (1024-QAM NUC)

FIG. 6 shows an illustration of the NUC gain for 1024-QAM.

Shannon has shown that the distribution of the signal alphabet for maximum capacity in the AWGN channel must be Gaussian as well (high SNR scenario in the left FIG. 6, 27 dB). Looking at 8 dB SNR (i.e. low SNR scenario in the right diagram of FIG. 6), the optimum constellations unveils areas with dense packet constellations. From a first impression it seems that some LSBs are "sacrificed" to enhance the MSBs performance. In fact the densely packed shape allows for better distinction between the bits with lower bit order (especially MSB-1 and MSB-2) increasing their capacity, the LSBs anyhow hardly carry any information at low SNR.

Figure 7:
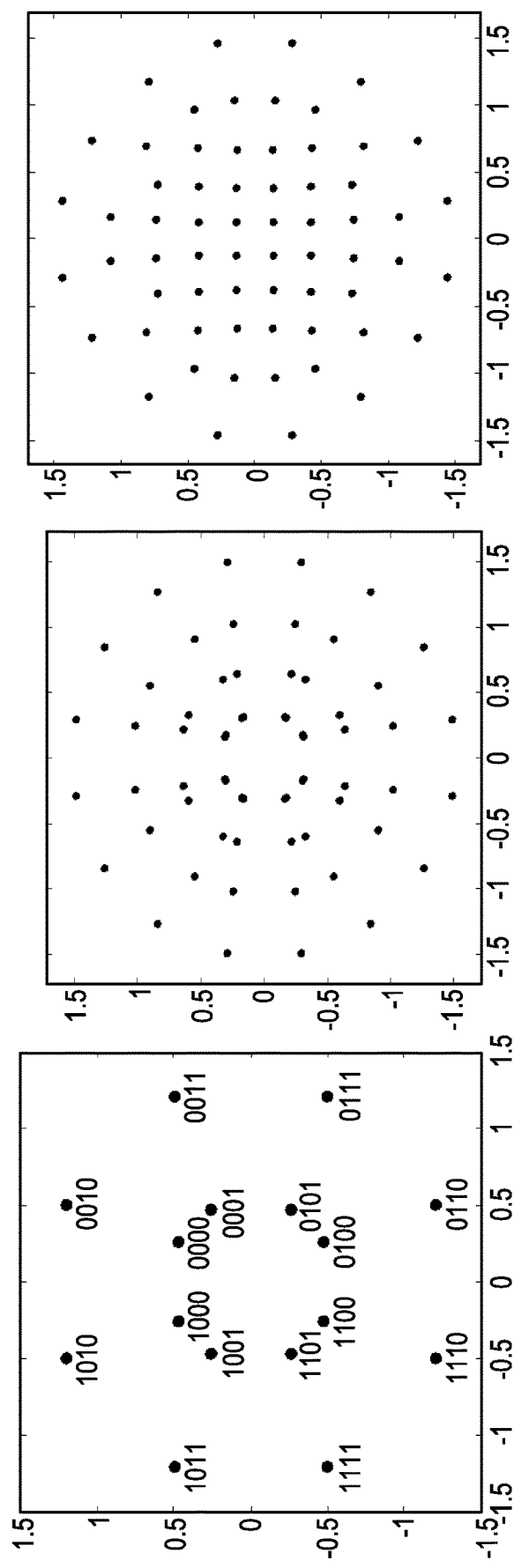
FIG. 7 shows 16-QNUC optimized for 7 dB SNR and 64-QNUC optimized for 10 dB SNR and 15 dB SNR.

It should be noted that all proposed NUCs can still be demapped with a regular 1D-Demapper. Alternatively to these 1D-NUCs, symmetric 2-dimensional non uniform constellations (2D-NUCs, meaning quadrant symmetric constellations, and sometimes also named as quadrant-symmetric QNUC) can provide some additional BICM capacity gain. 2D NUCs are derived from a single quadrant of the constellation, i.e. from the remaining quadrants can easily be calculated due to symmetries. FIG. 7 exemplary shows a 16-2D-NUC optimized for 7 dB SNR (left) and 64-2D-NUC optimized for 10 dB SNR (middle) and 15 dB SNR (right), all optimized in AWGN channel.

2D-NUCs outperform the upper 1D-NUCs over the complete SNR range, but especially improve the performance in the low SNR region and related smaller constellation orders. For larger constellation orders like 256-NUC the additional gain of 2D-NUCs decreases. The additional shaping gain of 2D-NUCs however comes at the cost of additional complexity in the demapper by performing two-dimensional QAM demapping, since all bits of 2D-NUCs must be demapped considering both in- and quadrature phase component. Therefore 2D-NUCs are proposed mainly for lower constellation orders.

Thus, a coding and modulation apparatus making use of these QNUC (2D-NUC) tables comprises
an encoder that encodes input data into cell words, and
a modulator that modulates said cell words into constellation values of a non-uniform constellation,
wherein said modulator is configured to use, based on the total number M of constellation points of the constellation and the signal-to-noise ratio SNR in dB, a non-uniform constellation from a group of constellations comprising one or more of the following constellations, wherein the constellation points of the different quadrants of a constellation are defined by a constellation position vector $w_{0 \ldots b-1}$, wherein b=M/4, wherein
the constellation points $x_{0 \ldots b-1}$ of a first quadrant are defined as $x_{0 \ldots b-1}=w_{0 \ldots b-1}$,
the constellation points $x_{b \ldots 2b-1}$ of a second quadrant are defined as $x_{b \ldots 2b-1}=\text{conj}(w_{0 \ldots b-1})$,
the constellation points $x_{3b \ldots 4b-1}$ of a third quadrant are defined as $x_{3b \ldots 4b-1}=-w_{0 \ldots b-1}$,
the constellation points $x_{2b \ldots 3b-1}$ of a fourth quadrant are defined as $x_{2b \ldots 3b-1}=-\text{conj}(w_{0 \ldots b-1})$,
wherein conj is the complex conjugate, and
wherein the constellation position vectors of the different constellations of the group of constellations are defined in the QNUC tables.

In the following the definition of the NUC position vectors obtained by use of the above described approach for obtaining QQAM constellations is provided for some values of M. The signal-to-noise ratio (SNR) is always denoted in dB.

a) 16QQAM—AWGN channel

| | w | | | |
|---|---|---|---|---|
| SNR | w0 | w1 | w2 | w3 |
| 0 | 0.7071 + 0.7071i | 0.7071 + 0.7071i | 0.7071 + 0.7071i | 0.7071 + 0.7071i |
| 0.5 | 0.7071 + 0.7071i | 0.7071 + 0.7071i | 0.7071 + 0.7071i | 0.7071 + 0.7071i |
| 1 | 0.7071 + 0.7071i | 0.7071 + 0.7071i | 0.7071 + 0.7071i | 0.7071 + 0.7071i |
| 1.5 | 0.6921 + 0.8373i | 0.8373 + 0.6921i | 0.5853 + 0.6908i | 0.6908 + 0.5854i |
| 2 | 0.5879 + 0.4053i | 1.0566 + 0.6114i | 0.4053 + 0.5879i | 0.6114 + 1.0566i |
| 2.5 | 0.5354 + 0.3507i | 0.3507 + 0.5354i | 1.1217 + 0.5763i | 0.5763 + 1.1217i |
| 3 | 0.5551 + 1.1571i | 0.3189 + 0.5012i | 1.1571 + 0.5551i | 0.5012 + 0.3189i |
| 3.5 | 0.5410 + 1.1789i | 1.1789 + 0.5410i | 0.2981 + 0.4781i | 0.4781 + 0.2981i |
| 4 | 0.5309 + 1.1928i | 1.1928 + 0.5309i | 0.2842 + 0.4633i | 0.4633 + 0.2842i |
| 4.5 | 0.2752 + 0.4551i | 0.4551 + 0.2752i | 0.5232 + 1.2014i | 1.2014 + 0.5232i |
| 5 | 0.2696 + 0.4521i | 0.4521 + 0.2696i | 0.5169 + 1.2065i | 1.2065 + 0.5169i |
| 5.5 | 1.2092 + 0.5115i | 0.4530 + 0.2663i | 0.5115 + 1.2092i | 0.2663 + 0.4530i |
| 6 | 0.2642 + 0.4570i | 0.4570 + 0.2642i | 0.5067 + 1.2102i | 1.2102 + 0.5067i |
| 6.5 | 0.4634 + 0.2626i | 1.2100 + 0.5023i | 0.2626 + 0.4634i | 0.5023 + 1.2100i |
| 7 | 0.2606 + 0.4718i | 0.4718 + 0.2606i | 0.4984 + 1.2088i | 1.2088 + 0.4984i |
| 7.5 | 0.4951 + 1.2068i | 1.2068 + 0.4951i | 0.2575 + 0.4819i | 0.4819 + 0.2575i |
| 8 | 0.4925 + 1.2040i | 0.2530 + 0.4936i | 1.2040 + 0.4925i | 0.4936 + 0.2530i |
| 8.5 | 0.5061 + 0.2474i | 0.2474 + 0.5061i | 1.2007 + 0.4909i | 0.4909 + 1.2007i |
| 9 | 0.2472 + 0.5461i | 0.4910 + 0.2363i | 0.5032 + 1.2019i | 1.1908 + 0.4773i |
| 9.5 | 0.6186 + 0.2544i | 0.2213 + 0.4416i | 1.2080 + 0.5377i | 0.4487 + 1.1657i |
| 10 | 0.2173 + 0.4189i | 0.6578 + 0.2571i | 0.4326 + 1.1445i | 1.2088 + 0.5659i |
| 10.5 | 0.9576 + 0.2881i | 0.2881 + 0.2881i | 0.9576 + 0.9576i | 0.2881 + 0.9576i |
| 11 | 0.2918 + 0.2918i | 0.9565 + 0.2918i | 0.2918 + 0.9565i | 0.9565 + 0.9565i |
| 11.5 | 0.2949 − 0.2949i | 0.9555 − 0.2949i | 0.2949 − 0.9555i | 0.9555 − 0.9555i |
| 12 | 0.2976 − 0.2976i | 0.9547 − 0.2976i | 0.2976 − 0.9547i | 0.9547 − 0.9547i |
| 12.5 | 0.2999 − 0.2999i | 0.9540 − 0.2999i | 0.2999 − 0.9540i | 0.9540 − 0.9540i |
| 13 | 0.3018 − 0.3018i | 0.9534 − 0.3018i | 0.3018 − 0.9534i | 0.9534 − 0.9534i |
| 13.5 | 0.3035 − 0.3035i | 0.9528 − 0.3035i | 0.3035 − 0.9528i | 0.9528 − 0.9528i |
| 14 | 0.3050 − 0.3050i | 0.9523 − 0.3050i | 0.3050 − 0.9523i | 0.9523 − 0.9523i |
| 14.5 | 0.3063 − 0.3063i | 0.9519 − 0.3063i | 0.3063 − 0.9519i | 0.9519 − 0.9519i |
| 15 | 0.9516 + 0.9512i | 0.9516 + 0.3073i | 0.3074 + 0.9519i | 0.3075 + 0.3076i | b) 32QQAM—AWGN channel

| | w | | | |
|---|---|---|---|---|
| SNR | w0 | w1 | w2 | w3 |
| 0 | 0.7071 + 0.7071i | 0.7071 + 0.7071ii | 0.7071 + 0.7071i | 0.7071 + 0.7071i |
| 0.5 | 0.7071 + 0.7071i | 0.7071 + 0.7071i | 0.7071 + 0.7071i | 0.7071 + 0.7071i |
| 1 | 0.7071 + 0.7071i | 0.7071 + 0.7071i | 0.7071 + 0.7071i | 0.7071 + 0.7071i |
| 1.5 | 0.5852 + 0.6908i | 0.6906 + 0.5853i | 0.6919 + 0.8373i | 0.8369 + 0.6921i |
| 2 | 0.4053 + 0.5879i | 0.5879 + 0.4054i | 0.6114 + 1.0565i | 1.0566 + 0.6114i |
| 2.5 | 0.3507 + 0.5354i | 0.5354 + 0.3507i | 0.5763 + 1.1217i | 1.1217 + 0.5763i |
| 3 | 0.3189 + 0.5012i | 0.5012 + 0.3189i | 0.5551 + 1.1571i | 1.1571 + 0.5551i |
| 3.5 | 0.2981 + 0.4781i | 0.4781 + 0.2981i | 0.5410 + 1.1789i | 1.1789 + 0.5410i |
| 4 | 0.2842 + 0.4633i | 0.4633 + 0.2842i | 0.5309 + 1.1927i | 1.1927 + 0.5309i |
| 4.5 | 0.2752 + 0.4551i | 0.4551 + 0.2752i | 0.5232 + 1.2014i | 1.2014 + 0.5232i |
| 5 | 0.2696 + 0.4521i | 0.4521 + 0.2696i | 0.5170 + 1.2065i | 1.2065 + 0.5169i |
| 5.5 | 0.2663 + 0.4530i | 0.4530 + 0.2663i | 0.5115 + 1.2092i | 1.2092 + 0.5115i |
| 6 | 0.2642 + 0.4570i | 0.4570 + 0.2642i | 0.5067 + 1.2102i | 1.2102 + 0.5067i |
| 6.5 | 0.2553 + 0.4543i | 0.4543 + 0.2553i | 0.4305 + 1.2537i | 1.2537 + 0.4305i |
| 7 | 0.2470 + 0.4515i | 0.4515 + 0.2470i | 0.3595 + 1.2746i | 1.2746 + 0.3595i |
| 7.5 | 0.2410 + 0.4578i | 0.4577 + 0.2410i | 0.3211 + 1.2755i | 1.2755 + 0.3211i |
| 8 | 0.2351 + 0.4699i | 0.4699 + 0.2351i | 0.2957 + 1.2701i | 1.2701 + 0.2957i |
| 8.5 | 0.2270 + 0.3121i | 0.6255 + 0.2091i | 0.3173 + 1.3160i | 1.3378 + 0.3422i |
| 9 | 0.2117 + 0.2518i | 0.6564 + 0.1984i | 0.3463 + 1.3865i | 1.3392 + 0.3470i |
| 9.5 | 0.2014 + 0.2235i | 0.6716 + 0.1924i | 0.3533 + 1.4075i | 1.3374 + 0.3431i |
| 10 | 0.1946 + 0.2025i | 0.6811 + 0.1872i | 0.3555 + 1.4163i | 1.3323 + 0.3370i |
| 10.5 | 0.1917 + 0.1863i | 0.6885 + 0.1824i | 0.3554 + 1.4185i | 1.3247 + 0.3312i |
| 11 | 0.1929 + 0.1744i | 0.6963 + 0.1782i | 0.3541 + 1.4168i | 1.3162 + 0.3270i |
| 11.5 | 0.1978 + 0.1660i | 0.7046 + 0.1752i | 0.3521 + 1.4127i | 1.3074 + 0.3244i |
| 12 | 0.2047 + 0.1603i | 0.7126 + 0.1738i | 0.3499 + 1.4076i | 1.2978 + 0.3226i |
| 12.5 | 0.2121 + 0.1569i | 0.7185 + 0.1739i | 0.3478 + 1.4027i | 1.2867 + 0.3209i |
| 13 | 0.2187 + 0.1559i | 0.7211 + 0.1755i | 0.3459 + 1.3987i | 1.2734 + 0.3186i |
| 13.5 | 0.2234 + 0.1575i | 0.7198 + 0.1782i | 0.3442 + 1.3961i | 1.2579 + 0.3156i |
| 14 | 0.2261 + 0.1614i | 0.7147 + 0.1816i | 0.3425 + 1.3949i | 1.2405 + 0.3119i |

-continued

| | | | | |
|---|---|---|---|---|
| 14.5 | 0.2113 + 0.1819i | 0.6590 + 0.1934i | 0.6163 + 1.2930i | 1.1691 + 0.2524i |
| 15 | 0.2082 + 0.1903i | 0.6467 + 0.1971i | 0.6624 + 1.2634i | 1.1455 + 0.2430i |

| | w | | | |
|---|---|---|---|---|
| SNR | w4 | w5 | w6 | w7 |
| 0 | 0.7071 + 0.7071i | 0.7071 + 0.7071i | 0.7071 + 0.7071i | 0.7071 + 0.7071i |
| 0.5 | 0.7071 + 0.7071i | 0.7071 + 0.7071i | 0.7071 + 0.7071i | 0.7071 + 0.7071i |
| 1 | 0.7071 + 0.7071i | 0.7071 + 0.7071i | 0.7071 + 0.7071i | 0.7071 + 0.7071i |
| 1.5 | 0.5856 + 0.6908i | 0.6911 + 0.5854i | 0.6923 + 0.8374i | 0.8376 + 0.6922i |
| 2 | 0.4053 + 0.5879i | 0.5879 + 0.4053i | 0.6114 + 1.0565i | 1.0566 + 0.6114i |
| 2.5 | 0.3507 + 0.5354i | 0.5354 + 0.3507i | 0.5763 + 1.1217i | 1.1217 + 0.5763i |
| 3 | 0.3189 + 0.5012i | 0.5012 + 0.3189i | 0.5551 + 1.1571i | 1.1572 + 0.5551i |
| 3.5 | 0.2980 + 0.4781i | 0.4781 + 0.2981i | 0.5410 + 1.1789i | 1.1789 + 0.5410i |
| 4 | 0.2842 + 0.4633i | 0.4633 + 0.2842i | 0.5310 + 1.1928i | 1.1928 + 0.5310i |
| 4.5 | 0.2752 + 0.4551i | 0.4551 + 0.2752i | 0.5232 + 1.2014i | 1.2014 + 0.5232i |
| 5 | 0.2696 + 0.4521i | 0.4521 + 0.2696i | 0.5169 + 1.2065i | 1.2065 + 0.5170i |
| 5.5 | 0.2663 + 0.4530i | 0.4530 + 0.2663i | 0.5115 + 1.2092i | 1.2092 + 0.5115i |
| 6 | 0.2642 + 0.4570i | 0.4570 + 0.2642i | 0.5067 + 1.2102i | 1.2102 + 0.5067i |
| 6.5 | 0.2699 + 0.4632i | 0.4632 + 0.2699i | 0.5752 + 1.1632i | 1.1632 + 0.5752i |
| 7 | 0.2734 + 0.4630i | 0.4630 + 0.2734i | 0.6396 + 1.1327i | 1.1327 + 0.6395i |
| 7.5 | 0.2728 + 0.4655i | 0.4655 + 0.2728i | 0.6715 + 1.1226i | 1.1226 + 0.6715i |
| 8 | 0.2695 + 0.4698i | 0.4698 + 0.2695i | 0.6913 + 1.1190i | 1.1190 + 0.6913i |
| 8.5 | 0.2428 + 0.4444i | 0.5783 + 0.3109i | 0.4151 + 1.0074i | 1.0441 + 0.8436i |
| 9 | 0.2317 + 0.4565i | 0.6091 + 0.3434i | 0.3354 + 0.9582i | 0.9927 + 0.8356i |
| 9.5 | 0.2276 + 0.4678i | 0.6230 + 0.3674i | 0.3047 + 0.9383i | 0.9683 + 0.8393i |
| 10 | 0.2266 + 0.4818i | 0.6303 + 0.3928i | 0.2860 + 0.9269i | 0.9538 + 0.8460i |
| 10.5 | 0.2273 + 0.4949i | 0.6340 + 0.4191i | 0.2729 + 0.9204i | 0.9446 + 0.8543i |
| 11 | 0.2283 + 0.5036i | 0.6364 + 0.4437i | 0.2627 + 0.9170i | 0.9382 + 0.8637i |
| 11.5 | 0.2287 + 0.5076i | 0.6386 + 0.4654i | 0.2546 + 0.9154i | 0.9335 + 0.8738i |
| 12 | 0.2280 + 0.5086i | 0.6410 + 0.4845i | 0.2485 + 0.9154i | 0.9299 + 0.8841i |
| 12.5 | 0.2258 + 0.5089i | 0.6431 + 0.5018i | 0.2443 + 0.9172i | 0.9274 + 0.8949i |
| 13 | 0.2225 + 0.5103i | 0.6446 + 0.5183i | 0.2415 + 0.9207i | 0.9257 + 0.9059i |
| 13.5 | 0.2189 + 0.5139i | 0.6455 + 0.5346i | 0.2398 + 0.9259i | 0.9246 + 0.9174i |
| 14 | 0.2157 + 0.5201i | 0.6463 + 0.5505i | 0.2389 + 0.9324i | 0.9230 + 0.9294i |
| 14.5 | 0.2042 + 0.5736i | 0.6214 + 0.5984i | 0.2154 + 1.0277i | 1.0670 + 0.7825i |
| 15 | 0.2028 + 0.5942i | 0.6209 + 0.6087i | 0.2221 + 1.0561i | 1.0812 + 0.7572i | c) 64QQAM—AWGN channel

| SNR | w0 | w1 | w2 | w3 | w4 | w5 | w6 | w7 |
|---|---|---|---|---|---|---|---|---|
| 0 | 0.7071 + 0.7071i | 0.7071 + 0.7071i | 0.7071 + 0.7071i | 0.7071 + 0.7071i | 0.7071 + 0.7071i | 0.7071 + 0.7071i | 0.7071 + 0.7071i | 0.7071 + 0.7071i |
| 0.5 | 0.7071 + 0.7071i | 0.7071 + 0.7071i | 0.7071 + 0.7071i | 0.7071 + 0.7071i | 0.7071 + 0.7071i | 0.7071 + 0.7071i | 0.7071 + 0.7071i | 0.7071 + 0.7071i |
| 1 | 0.7071 + 0.7071i | 0.7071 + 0.7071i | 0.7071 + 0.7071i | 0.7071 + 0.7071i | 0.7071 + 0.7071i | 0.7071 + 0.7071i | 0.7071 + 0.7071i | 0.7071 + 0.7071i |
| 1.5 | 0.8374 + 0.6919i | 0.6909 + 0.5852i | 0.8371 + 0.6921i | 0.6907 + 0.5853i | 0.8375 + 0.6921i | 0.6910 + 0.5854i | 0.8372 + 0.6923i | 0.6908 + 0.5855i |
| 2 | 1.0566 + 0.6114i | 1.0566 + 0.6114i | 0.5879 + 0.4053i | 0.5879 + 0.4053i | 0.6114 + 1.0566i | 0.6114 + 1.0566i | 0.4053 + 0.5879i | 0.4053 + 0.5879i |
| 2.5 | 1.1217 + 0.5763i | 1.1217 + 0.5763i | 0.5879 + 0.4053i | 0.5879 + 0.5763i | 0.5354 + 0.3507i | 0.5354 + 0.3507i | 0.5354 + 0.3507i | 0.5354 + 0.3507i |
| 3 | 0.5551 + 1.1571i | 0.3189 + 0.5012i | 1.1217 + 0.5763i | 0.5012 + 0.3189i | 0.5551 + 1.1571i | 0.3189 + 0.5012i | 1.1572 + 0.5551i | 0.5012 + 0.3189i |
| 3.5 | 1.1789 + 0.5410i | 1.1789 + 0.5410i | 1.1571 + 0.5551i | 1.1789 + 0.5410i | 0.4781 + 0.2981i | 0.4781 + 0.2981i | 0.4781 + 0.2981i | 0.4781 + 0.2981i |
| 4 | 0.2842 + 0.4633i | 0.2842 + 0.4633i | 0.5309 + 1.1928i | 0.5309 + 1.1927i | 0.2842 + 0.4633i | 0.2842 + 0.4633i | 0.5309 + 1.1928i | 0.5309 + 1.1927i |
| 4.5 | 0.5232 + 1.2014i | 0.5232 + 1.2014i | 0.5232 + 1.2014i | 0.5232 + 1.2014i | 1.2014 + 0.5232i | 1.2014 + 0.5232i | 1.2014 + 0.5232i | 1.2014 + 0.5232i |
| 5 | 1.2065 + 0.5170i | 1.2065 + 0.5169i | 1.2066 + 0.5169i | 1.2066 + 0.5169i | 0.5169 + 1.2065i | 0.5169 + 1.2065i | 0.5169 + 1.2065i | 0.5169 + 1.2065i |
| 5.5 | 1.2092 + 0.5115i | 1.2092 + 0.5115i | 1.2092 + 0.5115i | 1.2092 + 0.5115i | 0.4530 + 0.2663i | 0.4530 + 0.2663i | 0.4530 + 0.2663i | 0.4530 + 0.2663i |
| 6 | 0.2642 + 0.4570i | 0.2642 + 0.4570i | 0.2642 + 0.4570i | 0.2642 + 0.4570i | 0.4570 + 0.2642i | 0.4570 + 0.2642i | 0.4570 + 0.2642i | 0.4570 + 0.2642i |
| 6.5 | 0.5752 + 1.1632i | 0.4305 + 1.2537i | 0.5752 + 1.1632i | 0.4305 + 1.2537i | 1.1632 + 0.5752i | 1.2537 + 0.4305i | 1.1632 + 0.5752i | 1.2537 + 0.4305i |
| 7 | 0.3595 + 1.2746i | 0.6396 + 1.1327i | 0.3595 + 1.2746i | 0.6396 + 1.1327i | 1.2746 + 0.3595i | 1.1327 + 0.6396i | 1.2746 + 0.3595i | 1.1327 + 0.6396i |
| 7.5 | 0.7476 + 1.2181i | 0.5961 + 1.0258i | 0.3325 + 1.3887i | 0.3069 + 1.1510i | 1.2181 + 0.7475i | 1.0258 + 0.5961i | 1.3887 + 0.3325i | 1.1510 + 0.3069i |
| 8 | 0.3109 + 1.4253i | 0.7943 + 1.2523i | 0.2868 + 1.0998i | 0.5786 + 0.9799i | 1.4253 + 0.3109i | 1.2523 + 0.7943i | 1.0998 + 0.2868i | 0.9799 + 0.5786i |
| 8.5 | 1.6023 + 0.4387i | 1.0881 + 0.8753i | 0.4387 + 1.6023i | 0.8753 + 1.0881i | 0.8454 + 0.3049i | 0.8454 + 0.3049i | 0.7818 + 0.2019i | 0.7540 + 0.2653i |
| 9 | 0.4221 + 1.5951i | 1.5951 + 0.4221i | 0.8732 + 1.0971i | 1.0971 + 0.8732i | 0.7823 + 0.2020i | 0.9288 + 0.2247i | 0.7537 + 0.2686i | 0.8479 + 0.3175i |
| 9.5 | 0.8408 + 1.2670i | 0.5485 + 0.9136i | 0.2950 + 1.4844i | 0.2548 + 1.0308i | 1.2670 + 0.8407i | 0.9136 + 0.5485i | 1.4844 + 0.2950i | 1.0308 + 0.2548i |
| 10 | 1.2647 + 0.8443i | 1.4891 + 0.2935i | 0.9020 + 0.5498i | 1.0230 + 0.2451i | 0.3069 + 0.1750i | 0.3075 + 0.1615i | 0.5944 + 0.3252i | 0.6401 + 0.2182i |
| 10.5 | 0.2925 + 1.4892i | 0.8449 + 1.2622i | 0.2351 + 1.0196i | 0.5555 + 0.8926i | 1.4892 + 0.2925i | 1.2622 + 0.8449i | 1.0196 + 0.2351i | 0.8926 + 0.5555i |
| 11 | 0.8435 + 1.2594i | 0.5630 + 0.8851i | 0.2921 + 1.4867i | 0.2255 + 1.0193i | 1.2594 + 0.8435i | 0.8851 + 0.5630i | 1.4867 + 0.2921i | 1.0193 + 0.2255i |
| 11.5 | 0.2920 + 1.4827i | 0.8411 + 1.2563i | 0.2174 + 1.0211i | 0.5702 + 0.8798i | 1.4827 + 0.2920i | 1.2563 + 0.8411i | 1.0211 + 0.2174i | 0.8798 + 0.5702i |
| 12 | 0.2920 + 1.4781i | 0.8380 + 1.2527i | 0.2112 + 1.0242i | 0.5763 + 0.8768i | 1.4781 + 0.2920i | 1.2527 + 0.8380i | 1.0242 + 0.2112i | 0.8768 + 0.5763i |
| 12.5 | 0.2920 + 1.4732i | 0.8348 + 1.2487i | 0.2071 + 1.0283i | 0.5811 + 0.8760i | 1.4732 + 0.2920i | 1.2487 + 0.8348i | 1.0283 + 0.2071i | 0.8760 + 0.5811i |
| 13 | 0.2978 + 1.4669i | 0.8421 + 1.2355i | 0.2135 + 1.0389i | 0.6055 + 0.8654i | 1.4685 + 0.2859i | 1.2516 + 0.8201i | 1.0279 + 0.1981i | 0.8857 + 0.5642i |
| 13.5 | 1.4627 + 0.2996i | 1.0469 + 0.2187i | 1.2278 + 0.8422i | 0.8605 + 0.6179i | 0.4106 + 0.1299i | 0.7441 + 0.1749i | 0.3822 + 0.1824i | 0.6160 + 0.4168i |
| 14 | 0.2989 + 1.4602i | 0.8389 + 1.2232i | 0.2232 + 1.0534i | 0.6245 + 0.8593i | 1.4560 + 0.2819i | 1.2434 + 0.8085i | 1.0319 + 0.1914i | 0.8945 + 0.5550i |
| 14.5 | 0.2878 + 1.4388i | 0.8133 + 1.2150i | 0.2219 + 1.0386i | 0.6145 + 0.8494i | 1.4656 + 0.2931i | 1.2278 + 0.8230i | 1.0649 + 0.2069i | 0.8971 + 0.5677i |
| 15 | 0.9687 - 0.4488i | 0.1261 - 0.4193i | 0.6752 - 0.4269i | 0.3896 - 0.4201i | 0.1304 - 0.1506i | 0.1248 - 0.1379i | 0.6647 - 0.1295i | 0.3769 - 0.1364i |
| 15.5 | 0.9856 - 0.4661i | 0.1264 - 0.4145i | 0.6825 - 0.4329i | 0.3948 - 0.4179i | 0.1366 - 0.1534i | 0.1272 - 0.1353i | 0.6796 - 0.1340i | 0.3877 - 0.1359i |
| 16 | 1.0161 - 0.4912i | 0.1287 - 0.4061i | 0.6966 - 0.4427i | 0.4025 - 0.4141i | 0.1441 - 0.1581i | 0.1321 - 0.1317i | 0.6995 - 0.1411i | 0.4035 - 0.1354i |
| 16.5 | 1.0519 - 0.5188i | 0.1325 - 0.3998i | 0.7146 - 0.4532i | 0.4122 - 0.4120i | 0.1500 - 0.1642i | 0.1374 - 0.1295i | 0.7170 - 0.1473i | 0.4185 - 0.1357i |
| 17 | 1.0725 - 0.5328i | 0.1361 - 0.4023i | 0.7267 - 0.4592i | 0.4198 - 0.4151i | 0.1501 - 0.1676i | 0.1398 - 0.1309i | 0.7233 - 0.1496i | 0.4246 - 0.1370i |
| 17.5 | 1.0854 - 0.5394i | 0.1392 - 0.4078i | 0.7353 - 0.4623i | 0.4262 - 0.4205i | 0.1474 - 0.1695i | 0.1407 - 0.1336i | 0.7243 - 0.1504i | 0.4265 - 0.1388i |
| 18 | 1.0941 - 0.5424i | 0.1418 - 0.4131i | 0.7424 - 0.4645i | 0.4318 - 0.4266i | 0.1439 - 0.1707i | 0.1411 - 0.1361i | 0.7235 - 0.1509i | 0.4269 - 0.1406i |
| 18.5 | 1.0998 - 0.5430i | 0.1439 - 0.4173i | 0.7487 - 0.4666i | 0.4370 - 0.4325i | 0.1405 - 0.1713i | 0.1414 - 0.1380i | 0.7224 - 0.1517i | 0.4269 - 0.1425i |
| 19 | 1.1032 - 0.5410i | 0.1458 - 0.4204i | 0.7543 - 0.4691i | 0.4418 - 0.4382i | 0.1373 - 0.1716i | 0.1414 - 0.1393i | 0.7213 - 0.1527i | 0.4267 - 0.1443i |
| 19.5 | 1.1043 - 0.5346i | 0.1473 - 0.4225i | 0.7587 - 0.4731i | 0.4459 - 0.4435i | 0.1338 - 0.1710i | 0.1414 - 0.1401i | 0.7201 - 0.1544i | 0.4264 - 0.1461i |
| 20 | 1.1039 - 0.5232i | 0.1486 - 0.4237i | 0.7620 - 0.4802i | 0.4492 - 0.4482i | 0.1304 - 0.1696i | 0.1413 - 0.1405i | 0.7193 - 0.1572i | 0.4263 - 0.1477i |

| SNR | w8 | w9 | w10 | w11 | w12 | w13 | w14 | w15 |
|---|---|---|---|---|---|---|---|---|
| 0 | 0.7071 + 0.7071i | 0.7071 + 0.7071i | 0.7071 + 0.7071i | 0.7071 + 0.7071i | 0.7071 + 0.7071i | 0.7071 + 0.7071i | 0.7071 + 0.7071i | 0.7071 + 0.7071i |
| 0.5 | 0.7071 + 0.7071i | 0.7071 + 0.7071i | 0.7071 + 0.7071i | 0.7071 + 0.7071i | 0.7071 + 0.7071i | 0.7071 + 0.7071i | 0.7071 + 0.7071i | 0.7071 + 0.7071i |

-continued

| | | | | | | |
|---|---|---|---|---|---|---|
| 1 | 0.7071 + 0.7071i | 0.7071 + 0.7071i | 0.7071 + 0.7071i | 0.7071 + 0.7071i | 0.7071 + 0.7071i | 0.7071 + 0.7071i | 0.7072 + 0.7071i |
| 1.5 | 0.6922 + 0.8371i | 0.6854 + 0.6907i | 0.6920 + 0.8373i | 0.5852 + 0.6908i | 0.6923 + 0.8373i | 0.5854 + 0.6908i | 0.5853 + 0.6910i |
| 2 | 1.0565 + 0.6114i | 1.0565 + 0.6114i | 0.5879 + 0.4053i | 0.5879 + 0.4053i | 0.6114 + 1.0566i | 0.6114 + 1.0566i | 0.4053 + 0.5879i |
| 2.5 | 0.5763 + 1.1217i | 0.5763 + 1.1217i | 0.5763 + 1.1217i | 0.5763 + 1.1217i | 0.3507 + 0.5354i | 0.3507 + 0.5354i | 0.3507 + 0.5354i |
| 3 | 0.5551 + 1.1571i | 0.3189 + 0.5012i | 0.1571 + 0.5551i | 0.5012 + 0.3189i | 0.5551 + 1.1572i | 0.3189 + 0.5012i | 0.5012 + 0.3189i |
| 3.5 | 0.5410 + 1.1789i | 0.5410 + 1.1789i | 0.5410 + 1.1789i | 0.5410 + 1.1789i | 0.2980 + 0.4781i | 0.2980 + 0.4781i | 0.2980 + 0.4781i |
| 4 | 0.4633 + 0.2842i | 0.4633 + 0.2842i | 1.1927 + 0.5309i | 1.1927 + 0.5309i | 0.4633 + 0.2842i | 0.4633 + 0.2842i | 1.1928 + 0.5309i |
| 4.5 | 0.2752 + 0.4551i | 0.2752 + 0.4551i | 0.2752 + 0.4551i | 0.2752 + 0.4551i | 0.4551 + 0.2752i | 0.4551 + 0.2752i | 0.4551 + 0.2752i |
| 5 | 0.4521 + 0.2696i | 0.4521 + 0.2696i | 0.4521 + 0.2696i | 0.4521 + 0.2696i | 0.2696 + 0.4521i | 0.2696 + 0.4521i | 0.2696 + 0.4521i |
| 5.5 | 0.5067 + 1.2102i | 0.5115 + 0.3029i | 0.5115 + 1.2092i | 0.5115 + 1.2092i | 0.2663 + 0.4530i | 0.2663 + 0.4530i | 0.2663 + 0.4530i |
| 6 | 0.5067 + 1.2102i | 0.5067 + 1.2102i | 0.5067 + 1.2102i | 0.5067 + 1.2102i | 1.2102 + 0.5067i | 1.2102 + 0.5067i | 1.2102 + 0.5067i |
| 6.5 | 0.2699 + 0.4632i | 0.2553 + 0.4543i | 0.2699 + 0.4632i | 0.2553 + 0.4543i | 0.4632 + 0.2699i | 0.4543 + 0.2553i | 0.4543 + 0.2553i |
| 7 | 0.2470 + 0.4515i | 0.2734 + 0.4630i | 0.2470 + 0.4515i | 0.2734 + 0.4630i | 0.4515 + 0.2470i | 0.4632 + 0.2699i | 0.4630 + 0.2734i |
| 7.5 | 0.2486 + 0.4162i | 0.2870 + 0.4969i | 0.2266 + 0.4085i | 0.2500 + 0.4969i | 0.4084 + 0.2266i | 0.4969 + 0.2870i | 0.4969 + 0.2500i |
| 8 | 0.2104 + 0.3815i | 0.2282 + 0.3849i | 0.2478 + 0.5286i | 0.2937 + 0.5184i | 0.3815 + 0.2104i | 0.3849 + 0.2282i | 0.5184 + 0.2937i |
| 8.5 | 0.2019 + 0.7818i | 0.2653 + 0.7540i | 0.2202 + 0.9239i | 0.3049 + 0.8454i | 0.2479 + 0.2675i | 0.2701 + 0.2890i | 0.2890 + 0.2701i |
| 9 | 0.2247 + 0.9288i | 0.2020 + 0.7823i | 0.3175 + 0.8479i | 0.2686 + 0.7537i | 0.2676 + 0.2415i | 0.2675 + 0.2479i | 0.2660 + 0.2913i |
| 9.5 | 0.1821 + 0.3172i | 0.3159 + 0.5815i | 0.1695 + 0.3173i | 0.2278 + 0.6176i | 0.3172 + 0.1821i | 0.5815 + 0.3159i | 0.6176 + 0.2278i |
| 10 | 0.8443 + 1.2648i | 0.2935 + 1.4891i | 0.5498 + 0.9020i | 0.2451 + 1.0230i | 0.1615 + 0.3069i | 0.3252 + 0.5944i | 0.2182 + 0.6401i |
| 10.5 | 0.1558 + 0.3029i | 0.1712 + 0.3021i | 0.2075 + 0.6586i | 0.3354 + 0.6030i | 0.3021 + 0.1712i | 0.6586 + 0.2075i | 0.6030 + 0.3354i |
| 11 | 0.1697 + 0.3011i | 0.3460 + 0.6087i | 0.1514 + 0.3020i | 0.1969 + 0.6737i | 0.3011 + 0.1697i | 0.3020 + 0.1514i | 0.6737 + 0.1969i |
| 11.5 | 0.1475 + 0.3040i | 0.1691 + 0.3028i | 0.1871 + 0.6855i | 0.3563 + 0.6126i | 0.3040 + 0.1475i | 0.6855 + 0.1871i | 0.6126 + 0.3563i |
| 12 | 0.1436 + 0.3081i | 0.1684 + 0.3059i | 0.1789 + 0.6942i | 0.3657 + 0.6155i | 0.3081 + 0.1436i | 0.6942 + 0.1789i | 0.6155 + 0.3657i |
| 12.5 | 0.1393 + 0.3138i | 0.1671 + 0.3094i | 0.1720 + 0.7004i | 0.3741 + 0.6174i | 0.3138 + 0.1393i | 0.7004 + 0.1720i | 0.6174 + 0.3741i |
| 13 | 0.1338 + 0.3767i | 0.1752 + 0.3563i | 0.1756 + 0.7261i | 0.4023 + 0.6180i | 0.2713 + 0.1337i | 0.6840 + 0.1578i | 0.6145 + 0.3555i |
| 13.5 | 0.2831 + 1.4625i | 0.1935 + 1.0296i | 0.8124 + 1.2487i | 0.5574 + 0.8909i | 0.1287 + 0.2512i | 0.1538 + 0.2598i | 0.3493 + 0.6111i |
| 14 | 0.1266 + 0.4289i | 0.1907 + 0.3970i | 0.1717 + 0.7575i | 0.4261 + 0.6136i | 0.2362 + 0.1255i | 0.6735 + 0.1418i | 0.6085 + 0.3483i |
| 14.5 | 0.1177 + 0.4119i | 0.2516 + 0.3998i | 0.1559 + 0.7442i | 0.4328 + 0.5954i | 0.3325 + 0.1582i | 0.7408 + 0.1355i | 0.6200 + 0.3227i |
| 15 | 0.1704 − 0.7904i | 0.1452 − 0.7405i | 0.6932 − 0.8128i | 0.4017 − 0.7221i | 0.1644 − 1.0798i | 0.7344 − 1.2171i | 0.2867 − 1.4419i |
| 15.5 | 0.1580 − 0.8178i | 0.1416 − 0.7330i | 0.6913 − 0.8132i | 0.4018 − 0.7177i | 0.1686 − 1.0718i | 0.7097 − 1.2125i | 0.2732 − 1.4375i |
| 16 | 0.1306 − 0.8649i | 0.1385 − 0.7199i | 0.6874 − 0.8123i | 0.4017 − 0.7107i | 0.4516 − 0.2578i | 0.6750 − 1.2072i | 0.2558 − 1.4247i |
| 16.5 | 0.1952 − 0.9115i | 0.1369 − 0.7073i | 0.6868 − 0.8108i | 0.4044 − 0.7057i | 1.4480 − 0.2403i | 0.6406 − 1.1995i | 0.2402 − 1.4078i |
| 17 | 0.1771 − 0.9315i | 0.1373 − 0.7043i | 0.6956 − 0.8095i | 0.4114 − 0.7109i | 1.4380 − 0.2294i | 0.6220 − 1.1896i | 0.2326 − 1.3986i |
| 17.5 | 0.1693 − 0.9408i | 0.1388 − 0.7057i | 0.7092 − 0.8073i | 0.4197 − 0.7206i | 1.4261 − 0.2216i | 0.6106 − 1.1783i | 0.2287 − 1.3914i |
| 18 | 0.1666 − 0.9452i | 0.1406 − 0.7083i | 0.7229 − 0.8052i | 0.4275 − 0.7307i | 1.4143 − 0.2157i | 0.6029 − 1.1680i | 0.2262 − 1.3855i |
| 18.5 | 0.1673 − 0.9458i | 0.1425 − 0.7109i | 0.7349 − 0.8045i | 0.4344 − 0.7399i | 1.4036 − 0.2110i | 0.5971 − 1.1599i | 0.2240 − 1.3805i |
| 19 | 0.1720 − 0.9413i | 0.1445 − 0.7131i | 0.7452 − 0.8057i | 0.4404 − 0.7481i | 1.3941 − 0.2072i | 0.5918 − 1.1539i | 0.2216 − 1.3761i |
| 19.5 | 0.1847 − 0.9271i | 0.1467 − 0.7148i | 0.7552 − 0.8111i | 0.4463 − 0.7557i | 1.3857 − 0.2033i | 0.5851 − 1.1507i | 0.2181 − 1.3721i |
| 20 | 0.1043 − 0.9013i | 0.1491 − 0.7159i | 0.7655 − 0.8232i | 0.4529 − 0.7625i | 1.3785 − 0.1990i | 0.5745 − 1.1503i | 0.2128 − 1.3684i | d) 256QQAM—AWGN channel

| SNR | w0 | w1 | w2 | w3 | w4 | w5 | w6 | w7 |
|---|---|---|---|---|---|---|---|---|
| 5 | 0.4521 + 0.2696i | 0.4521 + 0.2696i | 1.2065 + 0.5169i | 1.2065 + 0.5169i | 0.4521 + 0.2696i | 0.4521 + 0.2696i | 1.2065 + 0.5169i | 1.2065 + 0.5169i |
| 5.5 | 0.4530 + 0.2663i | 0.4530 + 0.2663i | 1.2092 + 0.5115i | 1.2092 + 0.5115i | 0.4530 + 0.2663i | 0.4530 + 0.2663i | 1.2092 + 0.5115i | 1.2092 + 0.5115i |
| 6 | 1.2102 + 0.5067i | 1.2102 + 0.5067i | 1.2102 + 0.5066i | 1.2102 + 0.5066i | 0.4570 + 0.2642i | 0.4570 + 0.2642i | 0.4570 + 0.2642i | 0.4570 + 0.2642i |
| 6.5 | 1.2537 + 0.4305i | 1.2537 + 0.4304i | 1.2537 + 0.4305i | 1.2537 + 0.4305i | 1.1632 + 0.5752i | 1.1632 + 0.5752i | 1.1632 + 0.5752i | 1.1632 + 0.5752i |
| 7 | 1.1322 + 0.6970i | 1.0432 + 0.6178i | 1.5234 + 1.0871i | 1.1322 + 0.6970i | 1.2925 + 0.3605i | 1.1736 + 0.4749i | 1.6996 + 0.3860i | 1.2925 + 0.3605i |
| 7.5 | 0.2741 + 0.4749i | 0.2526 + 0.4285i | 0.5864 + 1.0293i | 0.6595 + 1.1198i | 0.2951 + 0.5185i | 0.2741 + 0.4749i | 0.5525 + 0.9862i | 0.5864 + 1.0293i |
| 8 | 0.3565 + 1.7813i | 0.3059 + 1.2626i | 0.3059 + 1.2626i | 0.2962 + 1.1484i | 1.0099 + 1.5146i | 0.6749 + 1.1091i | 0.6749 + 1.1091i | 0.6000 + 1.0201i |
| 8.5 | 0.3488 + 1.7914i | 0.2880 + 1.2587i | 0.2880 + 1.2587i | 0.2788 + 1.1468i | 1.0152 + 1.5168i | 0.6879 + 1.1023i | 0.6879 + 1.1023i | 0.6127 + 1.0130i |
| 9 | 1.6414 + 0.6837i | 0.9335 + 0.8803i | 0.2681 + 1.4953i | 0.7270 + 0.9501i | 1.8682 + 0.2925i | 0.8579 + 0.9067i | 0.3433 + 1.4695i | 0.6978 + 1.0003i |
| 9.5 | 1.6327 + 0.6734i | 0.9469 + 0.8771i | 0.2526 + 1.4830i | 0.7372 + 0.9369i | 1.8490 + 0.2874i | 0.8644 + 0.9027i | 0.3370 + 1.4511i | 0.7054 + 0.9892i |
| 10 | 1.7476 − 0.3437i | 1.4279 − 0.2830i | 0.9979 − 0.2435i | 1.0202 − 0.2443i | 1.4280 − 0.2830i | 1.3530 − 0.2686i | 1.0202 − 0.2443i | 1.0415 − 0.2449i |
| 10.5 | 1.7549 − 0.3495i | 1.4293 − 0.2804i | 0.9857 − 0.2340i | 1.0112 − 0.2349i | 1.4293 − 0.2804i | 1.3614 − 0.2635i | 1.0112 − 0.2349i | 1.0372 − 0.2356i |
| 11 | 0.3538 + 1.7624i | 0.2785 + 1.4265i | 0.2791 + 1.4266i | 0.2610 + 1.3647i | 0.9952 + 1.4965i | 0.8099 + 1.2071i | 0.8097 + 1.2074i | 0.7783 + 1.1510i |
| 11.5 | 0.3289 + 1.4165i | 0.3556 + 1.7714i | 0.2605 + 1.3630i | 0.2302 + 1.4276i | 0.7692 + 1.2350i | 1.0007 + 1.5057i | 0.7800 + 1.1485i | 0.8472 + 1.1728i |
| 12 | 0.6800 + 1.6926i | 0.3911 + 1.3645i | 0.2191 + 1.7524i | 0.2274 + 1.4208i | 0.8678 + 1.2487i | 0.7275 + 1.1667i | 0.8747 + 1.0470i | 0.7930 + 1.0406i |
| 12.5 | 0.7085 + 1.6630i | 0.4337 + 1.3632i | 0.2269 + 1.7707i | 0.2214 + 1.4346i | 0.4986 + 0.8198i | 0.7423 + 1.1546i | 0.9077 + 1.0034i | 0.8363 + 0.9971i |
| 13 | 0.7232 + 1.6427i | 0.4625 + 1.3572i | 0.2367 + 1.7836i | 0.2081 + 1.4453i | 0.8955 + 1.2316i | 0.7485 + 1.1494i | 0.9349 + 0.9699i | 0.8724 + 0.9626i |
| 13.5 | 0.7280 + 1.6384i | 0.4787 + 1.3492i | 0.2417 + 1.7872i | 0.1966 + 1.4478i | 0.9185 + 1.2490i | 0.7448 + 1.1524i | 0.9536 + 0.9516i | 0.8912 + 0.9461i |
| 14 | 0.6852 + 1.6631i | 0.4978 + 1.3396i | 0.2241 + 1.7611i | 0.1891 + 1.4343i | 1.0300 + 1.3532i | 0.7389 + 1.1771i | 0.9797 + 0.9598i | 0.8864 + 0.9798i |
| 14.5 | 0.6850 + 1.6565i | 0.5110 + 1.3346i | 0.2284 + 1.7618i | 0.1836 + 1.4363i | 1.0485 + 1.3578i | 0.7448 + 1.1781i | 0.9923 + 0.9464i | 0.9014 + 0.9717i |
| 15 | 1.1831 + 1.3352i | 0.5548 + 0.8930i | 1.0563 + 0.9473i | 1.1944 + 0.8535i | 1.7139 + 0.2236i | 1.4688 + 0.5085i | 0.9846 + 0.6522i | 1.0982 + 0.6252i |
| 15.5 | 1.3333 + 1.1727i | 0.9525 + 1.0450i | 0.8764 + 1.5619i | 0.8595 + 1.2191i | 1.2665 + 0.7890i | 1.0238 + 0.8157i | 1.0119 + 0.5685i | 1.0066 + 0.6087i |
| 16 | 1.0693 + 1.4165i | 1.6456 + 0.7233i | 1.0401 + 0.9844i | 1.3351 + 0.9489i | 1.6696 + 0.1992i | 1.4116 + 0.4773i | 0.9912 + 0.6923i | 1.1625 + 0.6341i |
| 16.5 | 1.3185 + 1.1655i | 1.0729 + 0.9416i | 0.9781 + 1.3517i | 0.9292 + 0.9707i | 1.4986 + 0.8198i | 1.2084 + 0.6881i | 0.9265 + 0.5535i | 0.9824 + 0.6211i |
| 17 | 1.1514 + 1.3474i | 1.3447 + 1.0136i | 0.9323 + 1.1378i | 0.9510 + 0.9427i | 1.2112 + 0.5426i | 1.2864 + 0.7311i | 0.9873 + 0.5679i | 0.9676 + 0.7289i |
| 17.5 | 1.1159 + 1.3726i | 1.3078 + 1.0458i | 0.9051 + 1.1657i | 0.9509 + 0.9581i | 1.2112 + 0.5506i | 1.3032 + 0.7544i | 0.9969 + 0.5672i | 0.9755 + 0.7547i |
| 18 | 1.1058 + 1.3496i | 1.2204 + 1.0180i | 0.8713 + 1.1743i | 0.9189 + 0.9604i | 1.2283 + 0.6284i | 1.4576 + 0.8033i | 1.0010 + 0.6008i | 0.9350 + 0.7635i |
| 18.5 | 1.1022 + 1.3396i | 1.2102 + 1.0122i | 0.8669 + 1.1800i | 0.9153 + 0.9665i | 1.2205 + 0.6352i | 1.4496 + 0.8012i | 0.9972 + 0.5981i | 0.9328 + 0.7745i |
| 19 | 1.5817 + 0.4283i | 1.4894 + 0.1404i | 1.4735 + 0.7375i | 1.2229 + 0.6531i | 1.0586 + 0.3317i | 1.2553 + 0.3125i | 0.9114 + 0.4575i | 1.0349 + 0.5768i |
| 19.5 | 0.8375 + 1.4782i | 1.3271 + 0.8728i | 1.1494 + 1.1881i | 1.0720 + 1.8655i | 1.5541 + 0.6145i | 1.2416 + 0.5886i | 0.9113 + 0.4993i | 1.0207 + 0.6225i |
| 20 | 1.1577 + 1.2607i | 1.2132 + 0.9665i | 0.8650 + 1.2652i | 0.9371 + 1.0167i | 1.2341 + 0.6321i | 1.4507 + 0.7875i | 0.9999 + 0.6438i | 0.9509 + 0.8111i |
| 20.5 | 1.1623 + 1.2367i | 1.2152 + 0.9464i | 0.8671 + 1.2704i | 0.9416 + 1.0203i | 1.2263 + 0.6212i | 1.4418 + 0.7638i | 0.9979 + 0.6457i | 0.9519 + 0.8158i |
| 21 | 1.1584 + 1.2194i | 1.2110 + 0.9332i | 0.8614 + 1.2738i | 0.9374 + 1.0274i | 1.2218 + 0.6145i | 1.4309 + 0.7504i | 0.9986 + 0.6549i | 0.9484 + 0.8261i |
| 21.5 | 1.1541 + 1.1980i | 1.2082 + 0.9192i | 0.8523 + 1.2778i | 0.9253 + 1.0390i | 1.2200 + 0.6057i | 1.4217 + 0.7371i | 1.0021 + 0.6678i | 0.9448 + 0.8412i |
| 22 | 1.1564 + 1.1321i | 1.2409 + 0.8772i | 0.8304 + 1.2958i | 0.8902 + 1.0738i | 1.2195 + 0.5872i | 1.4329 + 0.6862i | 1.0077 + 0.6857i | 0.9610 + 0.8761i |
| 22.5 | 1.1672 + 1.0989i | 1.2422 + 0.8522i | 0.8024 + 1.2971i | 0.8957 + 1.0878i | 1.2134 + 0.5744i | 1.4239 + 0.6620i | 1.0091 + 0.6909i | 0.9644 + 0.8828i |
| 23 | 1.2322 + 1.0269i | 1.4082 + 0.7080i | 0.7782 + 1.3195i | 0.9660 + 1.1333i | 1.4427 + 0.4179i | 1.1837 + 0.7680i | 0.9625 + 0.7036i | 0.9821 + 0.8987i |
| 23.5 | 1.1616 + 1.0595i | 1.2384 + 0.8218i | 0.7696 + 1.2863i | 0.8965 + 1.0947i | 1.1989 + 0.5582i | 1.4012 + 0.6249i | 1.0129 + 0.6976i | 0.9657 + 0.8860i |
| 24 | 1.2424 + 0.9493i | 1.2834 + 0.7245i | 0.9545 + 1.2183i | 1.0015 + 1.0002i | 1.1739 + 0.5257i | 1.3794 + 0.4917i | 1.0065 + 0.6128i | 1.0346 + 0.7930i |
| 24.5 | 1.2328 + 0.9369i | 1.2653 + 0.7160i | 0.9349 + 1.2178i | 0.9989 + 1.0051i | 1.1766 + 0.5132i | 1.3771 + 0.4884i | 1.0162 + 0.6131i | 1.0287 + 0.7970i |
| 25 | 1.2245 + 0.9258i | 1.2535 + 0.7077i | 0.9208 + 1.2105i | 0.9969 + 1.0052i | 1.1757 + 0.5047i | 1.3715 + 0.4846i | 1.0198 + 0.6112i | 1.0415 + 0.7962i |
| 25.5 | 1.2171 + 0.9128i | 1.2413 + 0.6969i | 0.9105 + 1.2064i | 0.9951 + 1.0017i | 1.1707 + 0.4940i | 1.3617 + 0.4870i | 1.0203 + 0.6063i | 1.0268 + 0.7923i |
| 26 | 1.2103 + 0.9014i | 1.2323 + 0.6874i | 0.9022 + 1.1987i | 0.9925 + 0.9967i | 1.1677 + 0.4847i | 1.3547 + 0.4862i | 1.0215 + 0.6013i | 1.0233 + 0.7878i |

-continued

| SNR | w8 | w9 | w10 | w11 | w12 | w13 | w14 | w15 |
|---|---|---|---|---|---|---|---|---|
| 5 | 0.4521 + 0.2696i | 0.4521 + 0.2696i | 1.2065 + 0.5169i | 1.2065 + 0.5169i | 0.4521 + 0.2696i | 0.4521 + 0.2696i | 1.2065 + 0.5169i | 1.2065 + 0.5169i |
| 5.5 | 0.4530 + 0.2663i | 0.4530 + 0.2663i | 1.2092 + 0.5115i | 1.2092 + 0.5115i | 0.4530 + 0.2663i | 0.4530 + 0.2663i | 1.2092 + 0.5115i | 1.2092 + 0.5115i |
| 6 | 1.2102 + 0.5067i | 1.2102 + 0.5067i | 1.2102 + 0.5067i | 1.2102 + 0.5067i | 0.4570 + 0.2642i | 0.4570 + 0.2642i | 0.4570 + 0.2642i | 0.4570 + 0.2642i |
| 6.5 | 1.2538 + 0.4305i | 1.2538 + 0.4304i | 1.2538 + 0.4305i | 1.2538 + 0.4305i | 1.1632 + 0.5752i | 1.1632 + 0.5752i | 1.1632 + 0.5752i | 1.1632 + 0.5752i |
| 7 | 1.0432 + 0.6178i | 0.9995 + 0.5797i | 1.1321 + 0.6970i | 1.0432 + 0.6178i | 1.1735 + 0.3521i | 1.1130 + 0.3476i | 1.2925 + 0.3604i | 1.1736 + 0.3521i |
| 7.5 | 0.4749 + 0.2741i | 0.4285 + 0.2526i | 0.0293 + 0.5865i | 1.1198 + 0.6595i | 0.5185 + 0.2951i | 0.4749 + 0.2741i | 0.9862 + 0.5525i | 1.0293 + 0.5865i |
| 8 | 0.3059 + 1.2587i | 0.2962 + 1.1484i | 0.2962 + 1.1484i | 0.2917 + 1.0949i | 0.6749 + 1.1091i | 0.6000 + 1.0201i | 0.6000 + 1.0201i | 0.5650 + 0.9791i |
| 8.5 | 0.2880 + 1.2587i | 0.2788 + 1.1468i | 0.2788 + 1.1468i | 0.2750 + 1.0951i | 0.6879 + 1.1023i | 0.6127 + 1.0130i | 0.6127 + 1.0130i | 0.5775 + 0.9727i |
| 9 | 1.5505 + 1.0696i | 0.9759 + 0.9428i | 0.3350 + 1.5307i | 0.7461 + 0.9896i | 1.1886 + 1.6606i | 0.8973 + 0.9758i | 0.4528 + 1.5320i | 0.7212 + 1.0496i |
| 9.5 | 1.5654 + 1.1053i | 0.9822 + 0.9424i | 0.3199 + 1.5216i | 0.7507 + 0.9792i | 1.1323 + 1.6866i | 0.8963 + 0.9732i | 0.4510 + 1.5195i | 0.7234 + 1.0425i |
| 10 | 1.4799 − 0.9890i | 1.2150 − 0.8088i | 0.8831 − 0.5335i | 0.8998 − 0.5486i | 1.2150 − 0.8088i | 1.1516 − 0.7656i | 0.8998 − 0.5486i | 0.9155 − 0.5630i |
| 10.5 | 1.4880 − 0.9918i | 1.2116 − 0.8109i | 0.8680 − 0.5320i | 0.8870 − 0.5486i | 1.2116 − 0.8109i | 1.1516 − 0.7744i | 0.8870 − 0.5496i | 0.9058 − 0.5674i |
| 11 | 0.2244 + 0.9784i | 0.2256 + 1.0058i | 0.2257 + 1.0057i | 0.2268 + 1.0350i | 0.5343 + 0.8558i | 0.5530 + 0.8761i | 0.5530 + 0.8761i | 0.5730 + 0.8975i |
| 11.5 | 0.2281 + 0.9987i | 0.2159 + 0.9723i | 0.2194 + 1.0327i | 0.2068 + 1.0040i | 0.5478 + 0.8715i | 0.5381 + 0.8437i | 0.5789 + 0.8889i | 0.5679 + 0.8596i |
| 12 | 0.2098 + 0.9768i | 0.2241 + 1.0454i | 0.1858 + 0.9878i | 0.1901 + 1.0659i | 0.5547 + 0.8312i | 0.5479 + 0.8651i | 0.6073 + 0.8182i | 0.5955 + 0.8420i |
| 12.5 | 0.2230 + 0.9899i | 0.2479 + 1.0582i | 0.1802 + 1.0070i | 0.1891 + 1.0869i | 0.5702 + 0.8176i | 0.5659 + 0.8534i | 0.6329 + 0.7937i | 0.6244 + 0.8161i |
| 13 | 0.2408 + 0.9979i | 0.2750 + 1.0662i | 0.1741 + 1.0211i | 0.1849 + 1.1031i | 0.5789 + 0.8090i | 0.5764 + 0.8491i | 0.6515 + 0.7734i | 0.6454 + 0.7958i |
| 13.5 | 0.2553 + 0.9993i | 0.2988 + 1.0689i | 0.1656 + 1.0288i | 0.1779 + 1.1140i | 0.5802 + 0.8040i | 0.5788 + 0.8534i | 0.6616 + 0.7612i | 0.6574 + 0.7871i |
| 14 | 0.2659 + 0.9951i | 0.3199 + 1.0652i | 0.1586 + 1.0330i | 0.1732 + 1.1198i | 0.5806 + 0.7935i | 0.5791 + 0.8600i | 0.6672 + 0.7597i | 0.6655 + 0.7798i |
| 14.5 | 0.2918 + 0.9951i | 0.3457 + 1.0677i | 0.1513 + 1.0448i | 0.1608 + 1.1366i | 0.5795 + 0.7993i | 0.5814 + 0.8684i | 0.6777 + 0.7528i | 0.6798 + 0.7908i |
| 15 | 0.7901 + 1.2547i | 0.5814 + 1.0118i | 0.8074 + 1.4567i | 0.6237 + 1.0012i | 0.6052 + 0.6617i | 0.5759 + 0.7150i | 0.7056 + 0.6773i | 0.6439 + 0.7138i |
| 15.5 | 0.2231 + 1.7092i | 0.6616 + 0.9740i | 0.5030 + 1.4567i | 0.6230 + 1.1163i | 0.6633 + 0.6064i | 0.6841 + 0.7162i | 0.7194 + 0.5707i | 0.7211 + 0.6351i |
| 16 | 0.7189 + 1.2484i | 0.5519 + 1.0360i | 0.8125 + 0.9999i | 0.6001 + 0.9735i | 0.6062 + 0.6558i | 0.5673 + 0.7044i | 0.7357 + 0.7025i | 0.6195 + 0.7364i |
| 16.5 | 0.5954 + 1.6721i | 0.6356 + 0.9282i | 0.6612 + 1.3085i | 0.6870 + 0.9890i | 0.6139 + 0.5878i | 0.6161 + 0.6843i | 0.7069 + 0.5730i | 0.6968 + 0.6615i |
| 17 | 0.7916 + 1.5326i | 0.5781 + 0.9103i | 0.6737 + 1.2261i | 0.6488 + 0.9682i | 0.6008 + 0.5904i | 0.5968 + 0.6937i | 0.7280 + 0.5839i | 0.7207 + 0.6853i |
| 17.5 | 0.7546 + 1.5371i | 0.5791 + 0.9008i | 0.6529 + 1.2248i | 0.6563 + 0.9619i | 0.5998 + 0.5837i | 0.5965 + 0.6939i | 0.7601 + 0.5787i | 0.7439 + 0.6985i |
| 18 | 0.7460 + 1.5301i | 0.5607 + 0.8951i | 0.6305 + 1.2208i | 0.6414 + 0.9625i | 0.5848 + 0.5763i | 0.5797 + 0.7001i | 0.7518 + 0.5786i | 0.7339 + 0.7041i |
| 18.5 | 0.7388 + 1.5187i | 0.5534 + 0.8948i | 0.6245 + 1.2171i | 0.6469 + 0.9671i | 0.5816 + 0.5744i | 0.5746 + 0.7125i | 0.7634 + 0.5763i | 0.7384 + 0.7224i |
| 19 | 1.0419 + 1.2518i | 0.8657 + 1.0272i | 1.2891 + 1.0296i | 1.0567 + 0.8727i | 0.6260 + 0.6701i | 0.7308 + 0.8371i | 0.7597 + 0.5841i | 0.8864 + 0.7205i |
| 19.5 | 0.6600 + 1.2390i | 0.6575 + 0.9736i | 0.8905 + 1.1414i | 0.8571 + 0.9152i | 0.6106 + 0.5775i | 0.6382 + 0.7572i | 0.7620 + 0.5398i | 0.8086 + 0.7221i |
| 20 | 0.5458 + 1.2087i | 0.5280 + 0.9935i | 0.6621 + 1.4483i | 0.7224 + 0.9905i | 0.5909 + 0.6140i | 0.5567 + 0.7928i | 0.7623 + 0.6325i | 0.7410 + 0.7994i |
| 20.5 | 0.5495 + 1.2117i | 0.5295 + 0.9994i | 0.6564 + 1.4451i | 0.7273 + 1.0021i | 0.5962 + 0.6217i | 0.5627 + 0.8030i | 0.7674 + 0.6377i | 0.7457 + 0.8086i |
| 21 | 0.5460 + 1.2127i | 0.5252 + 1.0028i | 0.6465 + 1.4397i | 0.7242 + 1.0131i | 0.6013 + 0.6294i | 0.5660 + 0.8106i | 0.7730 + 0.6458i | 0.7464 + 0.8190i |
| 21.5 | 0.5373 + 1.2128i | 0.5165 + 1.0048i | 0.6343 + 1.4321i | 0.7152 + 1.0245i | 0.6073 + 0.6384i | 0.5684 + 0.8175i | 0.7801 + 0.6568i | 0.7459 + 0.8311i |
| 22 | 0.5187 + 1.2127i | 0.4960 + 1.0047i | 0.6102 + 1.4243i | 0.6926 + 1.0375i | 0.6194 + 0.6507i | 0.5744 + 0.8249i | 0.7952 + 0.6762i | 0.7540 + 0.8498i |
| 22.5 | 0.5099 + 1.2100i | 0.4914 + 1.0072i | 0.5898 + 1.4201i | 0.6910 + 1.0470i | 0.6271 + 0.6619i | 0.5827 + 0.8346i | 0.8016 + 0.6867i | 0.7612 + 0.8629i |
| 23 | 0.5427 + 1.2003i | 0.5813 + 1.0089i | 0.5291 + 1.4273i | 0.7630 + 1.0578i | 0.6294 + 0.6610i | 0.6110 + 0.8310i | 0.7906 + 0.6835i | 0.7844 + 0.8645i |
| 23.5 | 0.4976 + 1.2018i | 0.4821 + 1.0103i | 0.5648 + 1.4016i | 0.6826 + 1.0558i | 0.6404 + 0.6801i | 0.5954 + 0.8500i | 0.8128 + 0.7021i | 0.7699 + 0.8797i |
| 24 | 0.5286 + 1.2013i | 0.6120 + 1.0209i | 0.7270 + 1.2479i | 0.7961 + 1.0299i | 0.6617 + 0.6693i | 0.6621 + 0.8401i | 0.8310 + 0.6617i | 0.8389 + 0.8357i |
| 24.5 | 0.5158 + 1.1967i | 0.6077 + 1.0231i | 0.7117 + 1.2419i | 0.7917 + 1.0319i | 0.6714 + 0.6767i | 0.6662 + 0.8463i | 0.8411 + 0.6694i | 0.8402 + 0.8434i |
| 25 | 0.5056 + 1.1921i | 0.6041 + 1.0245i | 0.7005 + 1.2353i | 0.7883 + 1.0319i | 0.6790 + 0.6831i | 0.6702 + 0.8514i | 0.8475 + 0.6749i | 0.8427 + 0.8479i |
| 25.5 | 0.4973 + 1.1878i | 0.6009 + 1.0255i | 0.6921 + 1.2284i | 0.7855 + 1.0302i | 0.6850 + 0.6886i | 0.6728 + 0.8554i | 0.8517 + 0.6775i | 0.8443 + 0.8495i |
| 26 | 0.4905 + 1.1842i | 0.5982 + 1.0262i | 0.6854 + 1.2221i | 0.7829 + 1.0274i | 0.6911 + 0.6930i | 0.6740 + 0.8584i | 0.8561 + 0.6778i | 0.8451 + 0.8492i |

-continued

| SNR | w16 | w17 | w18 | w19 | w20 | w21 | w22 | w23 |
|---|---|---|---|---|---|---|---|---|
| 5 | 0.4521 + 0.2696i | 0.4521 + 0.2696i | 1.2066 + 0.5169i | 1.2065 + 0.5169i | 0.4521 + 0.2696i | 0.4521 + 0.2696i | 1.2065 + 0.5169i | 1.2065 + 0.5169i |
| 5.5 | 0.4530 + 0.2663i | 0.4530 + 0.2663i | 1.2092 + 0.5115i | 1.2092 + 0.5115i | 0.4530 + 0.2663i | 0.4530 + 0.2663i | 1.2092 + 0.5115i | 1.2092 + 0.5115i |
| 6 | 0.5067 + 1.2102i | 0.5067 + 1.2102i | 0.5067 + 1.2102i | 0.5067 + 1.2102i | 0.2642 + 0.4570i | 0.2642 + 0.4570i | 0.2642 + 0.4570i | 0.2642 + 0.4570i |
| 6.5 | 0.4543 + 0.2553i | 0.4543 + 0.2553i | 0.4543 + 0.2553i | 0.4543 + 0.2553i | 0.4632 + 0.2699i | 0.4632 + 0.2699i | 0.4632 + 0.2699i | 0.4632 + 0.2699i |
| 7 | 0.4447 + 0.2583i | 0.4838 + 0.2760i | 0.4059 + 0.2408i | 0.4446 + 0.2583i | 0.4489 + 0.2323i | 0.4922 + 0.2439i | 0.4072 + 0.2200i | 0.4489 + 0.2323i |
| 7.5 | 0.2526 + 0.4285i | 0.2320 + 0.3831i | 0.6595 + 1.1198i | 0.9931 + 1.5130i | 0.2741 + 0.4749i | 0.2526 + 0.4285i | 0.5864 + 1.0293i | 0.6595 + 1.1198i |
| 8 | 1.7813 + 0.3565i | 1.2626 + 0.3059i | 1.2626 + 0.3059i | 1.1484 + 0.2962i | 1.5146 + 1.0099i | 1.1091 + 0.6749i | 1.1091 + 0.6749i | 1.0201 + 0.6000i |
| 8.5 | 1.7914 + 0.3488i | 1.2587 + 0.2880i | 1.2587 + 0.2880i | 1.1468 + 0.2788i | 1.5168 + 1.0152i | 1.1023 + 0.6879i | 1.1023 + 0.6879i | 1.0130 + 0.6127i |
| 9 | 1.1513 + 0.2749i | 0.9582 + 0.3853i | 0.9263 + 0.2229i | 0.8516 + 0.3197i | 1.1613 + 0.2336i | 0.9349 + 0.3518i | 0.9192 + 0.2077i | 0.8418 + 0.2979i |
| 9.5 | 1.1819 + 0.2793i | 0.9635 + 0.4036i | 0.9172 + 0.2197i | 0.8422 + 0.3264i | 1.2076 + 0.2313i | 0.9381 + 0.3697i | 0.9115 + 0.2050i | 0.8325 + 0.3045i |
| 10 | 0.3155 − 0.1636i | 0.3150 − 0.1635i | 0.6148 − 0.2197i | 0.6216 − 0.2169i | 0.3150 − 0.1635i | 0.3145 − 0.1634i | 0.6216 − 0.2169i | 0.6290 − 0.2176i |
| 10.5 | 0.3085 − 0.1570i | 0.3061 − 0.1564i | 0.6354 − 0.2066i | 0.6404 − 0.2071i | 0.3061 − 0.1564i | 0.3037 − 0.1557i | 0.6404 − 0.2071i | 0.6460 − 0.2075i |
| 11 | 1.7631 + 0.3541i | 1.4267 + 0.2786i | 1.4265 + 0.2791i | 1.3649 + 0.2609i | 1.4961 + 0.9954i | 1.2073 + 0.8102i | 1.2072 + 0.8097i | 1.1510 + 0.7784i |
| 11.5 | 1.4190 + 0.3287i | 1.7739 + 0.3559i | 1.3649 + 0.2600i | 1.4293 + 0.2298i | 1.2376 + 0.7681i | 1.5057 + 1.0025i | 1.1507 + 0.7776i | 1.1738 + 0.8449i |
| 12 | 1.4070 + 0.1790i | 1.7227 + 0.2900i | 1.3246 + 0.2562i | 1.3636 + 0.3654i | 1.3708 + 1.2834i | 1.6701 + 0.8403i | 1.1614 + 0.7909i | 1.2241 + 0.7367i |
| 12.5 | 1.4067 + 0.1623i | 1.7386 + 0.2869i | 1.3213 + 0.2614i | 1.3555 + 0.3818i | 1.3728 + 1.2802i | 1.6730 + 0.8349i | 1.1629 + 0.7604i | 1.2237 + 0.7169i |
| 13 | 1.4076 + 0.1477i | 1.7480 + 0.2870i | 1.3169 + 0.2677i | 1.3479 + 0.3950i | 1.3698 + 1.2765i | 1.6730 + 0.8318i | 1.1603 + 0.7369i | 1.2208 + 0.7017i |
| 13.5 | 1.4079 + 0.1358i | 1.7492 + 0.2856i | 1.3108 + 0.2733i | 1.3393 + 0.4031i | 1.3733 + 1.2596i | 1.6601 + 0.8198i | 1.1559 + 0.7249i | 1.2163 + 0.6897i |
| 14 | 1.3832 + 0.1273i | 1.7176 + 0.2506i | 1.2890 + 0.2587i | 1.3115 + 0.3882i | 1.4490 + 1.1095i | 1.6791 + 0.7233i | 1.1637 + 0.7318i | 1.2117 + 0.6596i |
| 14.5 | 1.3267 + 0.1182i | 1.7146 + 0.2469i | 1.2824 + 0.2560i | 1.3020 + 0.3885i | 1.4514 + 1.1095i | 1.6674 + 0.7048i | 1.1614 + 0.7220i | 1.2096 + 0.6442i |
| 15 | 0.9695 + 0.1063i | 0.9761 + 0.1132i | 0.9155 + 0.1657i | 0.9251 + 0.1710i | 1.3276 + 0.1371i | 1.2605 + 0.2607i | 0.9657 + 0.4185i | 1.0313 + 0.4086i |
| 15.5 | 1.7803 + 0.2282i | 1.4175 + 0.1304i | 1.0142 + 0.1107i | 1.0875 + 0.1106i | 1.5669 + 0.6281i | 1.3668 + 0.3723i | 1.0160 + 0.3423i | 1.0838 + 0.3367i |
| 16 | 0.9716 + 0.1054i | 0.9824 + 0.1194i | 0.9073 + 0.1715i | 0.9217 + 0.1835i | 1.3198 + 0.1175i | 1.2383 + 0.2709i | 0.9483 + 0.4442i | 1.0242 + 0.4164i |
| 16.5 | 1.6501 + 0.1602i | 1.3265 + 0.1294i | 0.9609 + 0.1136i | 1.0472 + 0.1153i | 1.6046 + 0.4875i | 1.2991 + 0.3994i | 0.9506 + 0.3440i | 1.0402 + 0.3427i |
| 17 | 1.3221 + 0.1224i | 1.6557 + 0.1780i | 1.0381 + 0.1026i | 1.0427 + 0.1024i | 1.2802 + 0.3500i | 1.5980 + 0.5501i | 0.9903 + 0.3365i | 0.9340 + 0.2929i |
| 17.5 | 1.3275 + 0.1269i | 1.6476 + 0.1778i | 1.0687 + 0.1009i | 0.9443 + 0.0988i | 1.2837 + 0.3590i | 1.5920 + 0.5468i | 1.0024 + 0.3379i | 0.9388 + 0.2809i |
| 18 | 1.3214 + 0.1348i | 1.6192 + 0.1568i | 1.0864 + 0.1085i | 0.9690 + 0.1136i | 1.2847 + 0.3887i | 1.5877 + 0.4787i | 1.0252 + 0.3747i | 0.9593 + 0.3085i |
| 18.5 | 1.3267 + 0.1381i | 1.6139 + 0.1586i | 1.1074 + 0.1075i | 0.9719 + 0.1124i | 1.2798 + 0.3928i | 1.5690 + 0.4783i | 1.0323 + 0.3791i | 0.9610 + 0.2983i |
| 19 | 0.8818 + 0.0863i | 0.8598 + 0.0671i | 0.6659 + 0.0819i | 0.6786 + 0.1287i | 0.9883 + 0.2131i | 1.1539 + 0.0898i | 0.7883 + 0.3358i | 0.7109 + 0.2753i |
| 19.5 | 1.5486 + 0.1257i | 1.2666 + 0.1072i | 0.9028 + 0.1029i | 1.0498 + 0.1027i | 1.4788 + 0.3590i | 1.2369 + 0.3451i | 0.9051 + 0.3205i | 1.0533 + 0.3050i |
| 20 | 1.5281 + 0.1441i | 1.2566 + 0.1120i | 0.9743 + 0.0673i | 1.0261 + 0.1720i | 1.4715 + 0.4355i | 1.2435 + 0.3351i | 0.9816 + 0.4825i | 1.0252 + 0.3371i |
| 20.5 | 1.5048 + 0.1396i | 1.2429 + 0.1109i | 0.9704 + 0.0648i | 1.0197 + 0.1762i | 1.4594 + 0.4244i | 1.2338 + 0.3332i | 0.9790 + 0.4840i | 1.0192 + 0.3364i |
| 21 | 1.4884 + 0.1372i | 1.2362 + 0.1109i | 0.9743 + 0.0635i | 1.0194 + 0.1825i | 1.4526 + 0.4196i | 1.2302 + 0.3337i | 0.9804 + 0.4906i | 1.0189 + 0.3404i |
| 21.5 | 1.4742 + 0.1349i | 1.2309 + 0.1105i | 0.9796 + 0.0634i | 1.0198 + 0.1891i | 1.4461 + 0.4142i | 1.2279 + 0.3323i | 0.9827 + 0.4998i | 1.0202 + 0.3467i |
| 22 | 1.4534 + 0.1259i | 1.2190 + 0.1086i | 0.9789 + 0.0639i | 1.0144 + 0.1947i | 1.4356 + 0.3854i | 1.2194 + 0.3249i | 0.9844 + 0.5115i | 1.0179 + 0.3535i |
| 22.5 | 1.4370 + 0.1217i | 1.2104 + 0.1069i | 0.9794 + 0.0652i | 1.0117 + 0.2003i | 1.4268 + 0.3730i | 1.2148 + 0.3198i | 0.9818 + 0.5182i | 1.0172 + 0.3596i |
| 23 | 1.1919 + 0.0896i | 1.4034 + 0.1266i | 1.0017 + 0.0743i | 0.9909 + 0.2196i | 1.2082 + 0.5145i | 1.2105 + 0.3132i | 1.0055 + 0.5362i | 1.0096 + 0.3698i |
| 23.5 | 1.4070 + 0.1153i | 1.1945 + 0.1045i | 0.9784 + 0.0686i | 1.0093 + 0.2102i | 1.4123 + 0.3539i | 1.2076 + 0.3137i | 0.9768 + 0.5294i | 1.0171 + 0.3701i |
| 24 | 1.1265 + 0.0892i | 1.3157 + 0.0959i | 0.9524 + 0.0776i | 0.9403 + 0.2321i | 1.4948 + 0.2501i | 1.2660 + 0.2959i | 0.9649 + 0.4426i | 1.0812 + 0.3131i |
| 24.5 | 1.1278 + 0.0893i | 1.3152 + 0.0946i | 0.9556 + 0.0782i | 0.9422 + 0.2341i | 1.4851 + 0.2508i | 1.2669 + 0.2917i | 0.9719 + 0.4412i | 1.0855 + 0.3077i |
| 25 | 1.1316 + 0.0895i | 1.3173 + 0.0939i | 0.9608 + 0.0790i | 0.9429 + 0.2357i | 1.4766 + 0.2540i | 1.2666 + 0.2886i | 0.9763 + 0.4381i | 1.0887 + 0.3028i |
| 25.5 | 1.1477 + 0.0888i | 1.3330 + 0.0946i | 0.9772 + 0.0808i | 0.9387 + 0.2361i | 1.4686 + 0.2702i | 1.2647 + 0.2863i | 0.9779 + 0.4321i | 1.0881 + 0.2935i |
| 26 | 1.1595 + 0.0882i | 1.3430 + 0.0950i | 0.9894 + 0.0820i | 0.9367 + 0.2358i | 1.4613 + 0.2782i | 1.2637 + 0.2839i | 0.9800 + 0.4265i | 1.0889 + 0.2858i |

-continued

| SNR | w24 | w25 | w26 | w27 | w28 | w29 | w30 | w31 |
|---|---|---|---|---|---|---|---|---|
| 5 | 0.4521 + 0.2696i | 0.4521 + 0.2696i | 1.2066 + 0.5170i | 1.2066 + 0.5169i | 0.4521 + 0.2696i | 0.4521 + 0.2696i | 1.2065 + 0.5169i | 1.2065 + 0.5169i |
| 5.5 | 0.4530 + 0.2663i | 0.4530 + 0.2663i | 1.2092 + 0.5115i | 1.2092 + 0.5115i | 0.4530 + 0.2663i | 0.4530 + 0.2663i | 1.2092 + 0.5115i | 1.2092 + 0.5115i |
| 6 | 0.5067 + 1.2102i | 0.5067 + 1.2102i | 0.5067 + 1.2102i | 0.5067 + 1.2102i | 0.2642 + 0.4570i | 0.2642 + 0.4570i | 0.2642 + 0.4570i | 0.2642 + 0.4570i |
| 6.5 | 0.4543 + 0.2553i | 0.4543 + 0.2553i | 0.4543 + 0.2553i | 0.4543 + 0.2553i | 0.4632 + 0.2699i | 0.4632 + 0.2699i | 0.4632 + 0.2699i | 0.4632 + 0.2699i |
| 7 | 0.4838 + 0.2760i | 0.5211 + 0.2931i | 0.4447 + 0.2583i | 0.4838 + 0.2760i | 0.4922 + 0.2439i | 0.5344 + 0.2543i | 0.4489 + 0.2323i | 0.4922 + 0.2439i |
| 7.5 | 0.4285 + 0.2526i | 0.3831 + 0.2320i | 1.1198 + 0.6595i | 1.5130 + 0.9931i | 0.4749 + 0.2741i | 0.4285 + 0.2526i | 1.0293 + 0.5865i | 1.1198 + 0.6595i |
| 8 | 1.2626 + 0.3059i | 1.1484 + 0.2962i | 1.1484 + 0.2962i | 1.0949 + 0.2917i | 1.1091 + 0.6749i | 1.0201 + 0.6000i | 1.0201 + 0.6000i | 0.9791 + 0.5650i |
| 8.5 | 1.2587 + 0.2880i | 1.1484 + 0.2788i | 1.1468 + 0.2788i | 1.0951 + 0.2750i | 1.1023 + 0.6879i | 1.0130 + 0.6127i | 1.0130 + 0.6127i | 0.9727 + 0.5775i |
| 9 | 0.9975 + 0.2556i | 0.9006 + 0.3666i | 0.8710 + 0.2142i | 0.8224 + 0.3027i | 0.9862 + 0.2318i | 0.8825 + 0.3368i | 0.8657 + 0.2019i | 0.8149 + 0.2834i |
| 9.5 | 1.0053 + 0.2519i | 0.8985 + 0.3753i | 0.8625 + 0.2071i | 0.8135 + 0.3017i | 0.9978 + 0.2280i | 0.8803 + 0.3458i | 0.8585 + 0.1955i | 0.8067 + 0.2829i |
| 10 | 0.3146 − 0.1777i | 0.3142 − 0.1775i | 0.5742 − 0.3118i | 0.5798 − 0.3157i | 0.3142 − 0.1775i | 0.3138 − 0.1773i | 0.5798 − 0.3157i | 0.5859 − 0.3199i |
| 10.5 | 0.3073 − 0.1726i | 0.3050 − 0.1716i | 0.5854 − 0.3219i | 0.5893 − 0.3250i | 0.3050 − 0.1716i | 0.3028 − 0.1707i | 0.5893 − 0.3250i | 0.5937 − 0.3285i |
| 11 | 0.9785 + 0.2245i | 1.0059 + 0.2256i | 1.0059 + 0.2258i | 1.0352 + 0.2267i | 0.8559 + 0.5343i | 0.8762 + 0.5531i | 0.8762 + 0.5531i | 0.8976 + 0.5730i |
| 11.5 | 0.9987 + 0.2268i | 0.9721 + 0.2149i | 1.0331 + 0.2184i | 1.0039 + 0.2063i | 0.8726 + 0.5450i | 0.8450 + 0.5352i | 0.8906 + 0.5760i | 0.8612 + 0.5648i |
| 12 | 0.9769 + 0.1863i | 0.9452 + 0.2057i | 1.0100 + 0.2182i | 0.9795 + 0.2417i | 0.8241 + 0.4856i | 0.8232 + 0.4837i | 0.8799 + 0.5391i | 0.8796 + 0.5356i |
| 12.5 | 0.9683 + 0.1724i | 0.9333 + 0.1897i | 1.0041 + 0.2062i | 0.9683 + 0.2269i | 0.8178 + 0.4576i | 0.8166 + 0.4551i | 0.8733 + 0.5139i | 0.8722 + 0.5104i |
| 13 | 0.9630 + 0.1618i | 0.9257 + 0.1770i | 1.0010 + 0.1965i | 0.9611 + 0.2140i | 0.8118 + 0.4407i | 0.8110 + 0.4367i | 0.8663 + 0.4978i | 0.8649 + 0.4934i |
| 13.5 | 0.9601 + 0.1547i | 0.9220 + 0.1683i | 1.0004 + 0.1894i | 0.9581 + 0.2045i | 0.8067 + 0.4374i | 0.8071 + 0.4310i | 0.8603 + 0.4941i | 0.8598 + 0.4876i |
| 14 | 0.9469 + 0.1512i | 0.9124 + 0.1673i | 0.9890 + 0.1827i | 0.9504 + 0.2018i | 0.7985 + 0.4530i | 0.8036 + 0.4426i | 0.8538 + 0.5071i | 0.8600 + 0.4961i |
| 14.5 | 0.9396 + 0.1469i | 0.9065 + 0.1618i | 0.9886 + 0.1761i | 0.9486 + 0.1944i | 0.7983 + 0.4483i | 0.8042 + 0.4365i | 0.8518 + 0.5057i | 0.8594 + 0.4926i |
| 15 | 0.6332 + 0.1376i | 0.6285 + 0.1371i | 0.6534 + 0.1501i | 0.6480 + 0.1483i | 0.6046 + 0.4106i | 0.5971 + 0.4001i | 0.6631 + 0.4203i | 0.6466 + 0.4063i |
| 15.5 | 0.6340 + 0.1108i | 0.6241 + 0.1086i | 0.7380 + 0.1117i | 0.7116 + 0.1105i | 0.6382 + 0.3325i | 0.6300 + 0.3171i | 0.7230 + 0.3385i | 0.7071 + 0.3272i |
| 16 | 0.6360 + 0.1334i | 0.6290 + 0.1387i | 0.6599 + 0.1476i | 0.6524 + 0.1515i | 0.6101 + 0.4269i | 0.5981 + 0.4118i | 0.6844 + 0.4315i | 0.6536 + 0.4074i |
| 16.5 | 0.6045 + 0.1089i | 0.5923 + 0.1112i | 0.7207 + 0.1103i | 0.6832 + 0.1122i | 0.6014 + 0.3528i | 0.5903 + 0.3283i | 0.7010 + 0.3475i | 0.6697 + 0.3280i |
| 17 | 0.5830 + 0.1125i | 0.5933 + 0.1207i | 0.6682 + 0.1069i | 0.7042 + 0.1111i | 0.5954 + 0.3748i | 0.5987 + 0.3416i | 0.7073 + 0.3701i | 0.7192 + 0.3275i |
| 17.5 | 0.5819 + 0.1126i | 0.5915 + 0.1279i | 0.6742 + 0.1025i | 0.7217 + 0.1106i | 0.5959 + 0.3826i | 0.5970 + 0.3410i | 0.7339 + 0.3759i | 0.7430 + 0.3188i |
| 18 | 0.5961 + 0.1084i | 0.5983 + 0.1324i | 0.7244 + 0.0980i | 0.7655 + 0.1184i | 0.5947 + 0.3818i | 0.5970 + 0.3304i | 0.7535 + 0.3905i | 0.7704 + 0.3249i |
| 18.5 | 0.5961 + 0.1025i | 0.5964 + 0.1417i | 0.7314 + 0.0890i | 0.7775 + 0.1184i | 0.5953 + 0.3915i | 0.5975 + 0.3225i | 0.7649 + 0.4029i | 0.7817 + 0.3156i |
| 19 | 0.4061 + 0.0799i | 0.4265 + 0.2175i | 0.4641 + 0.0772i | 0.4884 + 0.1954i | 0.5409 + 0.5182i | 0.4759 + 0.3755i | 0.6422 + 0.4556i | 0.5543 + 0.3409i |
| 19.5 | 0.5082 + 0.0656i | 0.5265 + 0.1285i | 0.7398 + 0.0890i | 0.6724 + 0.1233i | 0.5700 + 0.4187i | 0.5429 + 0.2967i | 0.7319 + 0.3429i | 0.6646 + 0.2744i |
| 20 | 0.6423 + 0.0698i | 0.6358 + 0.1904i | 0.8003 + 0.0754i | 0.8009 + 0.2018i | 0.6132 + 0.4606i | 0.6264 + 0.3286i | 0.7906 + 0.4757i | 0.8007 + 0.3342i |
| 20.5 | 0.6384 + 0.0678i | 0.6332 + 0.1948i | 0.7968 + 0.0730i | 0.8000 + 0.2036i | 0.6160 + 0.4668i | 0.6266 + 0.3299i | 0.7913 + 0.4796i | 0.8013 + 0.3338i |
| 21 | 0.6429 + 0.0675i | 0.6384 + 0.1981i | 0.8011 + 0.0721i | 0.8064 + 0.2059i | 0.6220 + 0.4731i | 0.6327 + 0.3327i | 0.7953 + 0.4864i | 0.8070 + 0.3377i |
| 21.5 | 0.6501 + 0.0680i | 0.6464 + 0.2016i | 0.8075 + 0.0719i | 0.8146 + 0.2088i | 0.6296 + 0.4809i | 0.6412 + 0.3374i | 0.8008 + 0.4955i | 0.8141 + 0.3431i |
| 22 | 0.6546 + 0.0693i | 0.6531 + 0.2062i | 0.8096 + 0.0722i | 0.8191 + 0.2122i | 0.6400 + 0.4925i | 0.6498 + 0.3451i | 0.8073 + 0.5082i | 0.8199 + 0.3516i |
| 22.5 | 0.6581 + 0.0702i | 0.6580 + 0.2095i | 0.8121 + 0.0727i | 0.8228 + 0.2154i | 0.6452 + 0.5010i | 0.6552 + 0.3508i | 0.8087 + 0.5167i | 0.8230 + 0.3582i |
| 23 | 0.6613 + 0.0692i | 0.6601 + 0.2094i | 0.8231 + 0.0709i | 0.8202 + 0.2164i | 0.6479 + 0.5023i | 0.6570 + 0.3532i | 0.8160 + 0.5191i | 0.8231 + 0.3662i |
| 23.5 | 0.6618 + 0.0721i | 0.6653 + 0.2161i | 0.8148 + 0.0743i | 0.8285 + 0.2219i | 0.6524 + 0.5156i | 0.6640 + 0.3620i | 0.8099 + 0.5313i | 0.8291 + 0.3705i |
| 24 | 0.6277 + 0.0697i | 0.6260 + 0.2109i | 0.7852 + 0.0706i | 0.7804 + 0.2177i | 0.6444 + 0.5097i | 0.6285 + 0.3572i | 0.8056 + 0.5017i | 0.7792 + 0.3548i |
| 24.5 | 0.6341 + 0.0711i | 0.6317 + 0.2150i | 0.7905 + 0.0716i | 0.7839 + 0.2154i | 0.6337 + 0.5167i | 0.6360 + 0.3632i | 0.8156 + 0.5101i | 0.7875 + 0.3608i |
| 25 | 0.6408 + 0.0723i | 0.6355 + 0.2186i | 0.7969 + 0.0724i | 0.7860 + 0.2176i | 0.6614 + 0.5229i | 0.6414 + 0.3685i | 0.8234 + 0.5160i | 0.7936 + 0.3653i |
| 25.5 | 0.6523 + 0.0731i | 0.6352 + 0.2218i | 0.8115 + 0.0731i | 0.7837 + 0.2189i | 0.6674 + 0.5284i | 0.6441 + 0.3734i | 0.8292 + 0.5189i | 0.7961 + 0.3682i |
| 26 | 0.6622 + 0.0739i | 0.6337 + 0.2246i | 0.8231 + 0.0739i | 0.7818 + 0.2196i | 0.6739 + 0.5331i | 0.6474 + 0.3777i | 0.8353 + 0.5198i | 0.7994 + 0.3695i |

-continued

| SNR | w32 | w33 | w34 | w35 | w36 | w37 | w38 | w39 |
|---|---|---|---|---|---|---|---|---|
| 5 | 0.2696 + 0.4521i | 0.2696 + 0.4521i | 0.5169 + 1.2065i | 0.5169 + 1.2065i | 0.2696 + 0.4521i | 0.2696 + 0.4521i | 0.5169 + 1.2065i | 0.5169 + 1.2065i |
| 5.5 | 0.2663 + 0.4530i | 0.2663 + 0.4530i | 0.5115 + 1.2092i | 0.5115 + 1.2092i | 0.2663 + 0.4530i | 0.2663 + 0.4530i | 0.5115 + 1.2092i | 0.5115 + 1.2092i |
| 6 | 1.2102 + 0.5067i | 1.2102 + 0.5067i | 1.2102 + 0.5067i | 1.2102 + 0.5066i | 0.4570 + 0.2642i | 0.4570 + 0.2642i | 0.4570 + 0.2642i | 0.4570 + 0.2642i |
| 6.5 | 0.4304 + 1.2538i | 0.4304 + 1.2538i | 0.4305 + 1.2537i | 0.4305 + 1.2537i | 0.5752 + 1.1632i | 0.5752 + 1.1632i | 0.5752 + 1.1632i | 0.5752 + 1.1632i |
| 7 | 0.5818 + 1.1302i | 0.5321 + 1.0488i | 0.7162 + 1.3338i | 0.5818 + 1.1302i | 0.3631 + 1.2644i | 0.3443 + 1.1417i | 0.4291 + 1.7565i | 0.3631 + 1.2644i |
| 7.5 | 0.2435 + 0.4714i | 0.2297 + 0.4213i | 0.3175 + 1.1489i | 0.3279 + 1.2665i | 0.2555 + 0.5207i | 0.2435 + 0.4714i | 0.3124 + 1.0924i | 0.3175 + 1.1489i |
| 8 | 0.2078 + 0.3708i | 0.2228 + 0.4230i | 0.2228 + 0.4230i | 0.2369 + 0.4792i | 0.2257 + 0.3788i | 0.2485 + 0.4288i | 0.2485 + 0.4288i | 0.2729 + 0.4799i |
| 8.5 | 0.1998 + 0.3693i | 0.2156 + 0.4280i | 0.2156 + 0.4280i | 0.2299 + 0.4909i | 0.2178 + 0.3747i | 0.2432 + 0.4300i | 0.2432 + 0.4300i | 0.2708 + 0.4861i |
| 9 | 0.1831 + 0.6858i | 0.2571 + 0.6818i | 0.1879 + 0.8140i | 0.2811 + 0.7667i | 0.1851 + 0.6883i | 0.2602 + 0.6851i | 0.1916 + 0.8173i | 0.2857 + 0.7722i |
| 9.5 | 0.1794 + 0.6888i | 0.2585 + 0.6798i | 0.1875 + 0.8249i | 0.2921 + 0.7656i | 0.1820 + 0.6921i | 0.2630 + 0.6841i | 0.1926 + 0.8288i | 0.2983 + 0.7729i |
| 10 | 0.3437 − 1.7476i | 0.2830 − 1.4280i | 0.2435 − 0.9979i | 0.2443 − 1.0202i | 0.2830 − 1.4280i | 0.2686 − 1.3530i | 0.2443 − 1.0202i | 0.2449 − 1.0415i |
| 10.5 | 0.3495 − 1.7549i | 0.2804 − 1.4293i | 0.2340 − 0.9857i | 0.2349 − 1.0112i | 0.2804 − 1.4293i | 0.2635 − 1.3614i | 0.2349 − 1.0112i | 0.2356 − 1.0372i |
| 11 | 0.1519 + 0.3049i | 0.1510 + 0.3016i | 0.1510 + 0.3016i | 0.1502 + 0.2983i | 0.1699 + 0.3036i | 0.1685 + 0.3005i | 0.1685 + 0.3005i | 0.1671 + 0.2974i |
| 11.5 | 0.1463 + 0.3015i | 0.1471 + 0.3053i | 0.1453 + 0.2979i | 0.1463 + 0.3015i | 0.1666 + 0.2998i | 0.1683 + 0.3032i | 0.1650 + 0.2964i | 0.1666 + 0.2998i |
| 12 | 0.1376 + 0.3342i | 0.1383 + 0.3292i | 0.1363 + 0.3322i | 0.1370 + 0.3273i | 0.1655 + 0.3265i | 0.1656 + 0.3227i | 0.1634 + 0.3246i | 0.1636 + 0.3208i |
| 12.5 | 0.1305 + 0.3817i | 0.1310 + 0.3772i | 0.1295 + 0.3801i | 0.1300 + 0.3756i | 0.1670 + 0.3628i | 0.1669 + 0.3598i | 0.1652 + 0.3613i | 0.1652 + 0.3583i |
| 13 | 0.1255 + 0.4148i | 0.1258 + 0.4110i | 0.1246 + 0.4139i | 0.1249 + 0.4100i | 0.1693 + 0.3879i | 0.1689 + 0.3856i | 0.1679 + 0.3867i | 0.1675 + 0.3844i |
| 13.5 | 0.1222 + 0.4300i | 0.1222 + 0.4272i | 0.1213 + 0.4297i | 0.1213 + 0.4269i | 0.1716 + 0.3987i | 0.1708 + 0.3972i | 0.1707 + 0.3976i | 0.1700 + 0.3962i |
| 14 | 0.1189 + 0.4354i | 0.1187 + 0.4342i | 0.1181 + 0.4360i | 0.1178 + 0.4348i | 0.1722 + 0.4014i | 0.1713 + 0.4009i | 0.1720 + 0.4006i | 0.1711 + 0.4002i |
| 14.5 | 0.1162 + 0.4484i | 0.1159 + 0.4493i | 0.1156 + 0.4497i | 0.1152 + 0.4507i | 0.1751 + 0.4094i | 0.1743 + 0.4102i | 0.1765 + 0.4086i | 0.1757 + 0.4095i |
| 15 | 0.2366 + 1.7925i | 0.1132 + 1.0217i | 0.1343 + 1.4263i | 0.1131 + 1.0934i | 0.1130 + 0.6377i | 0.1142 + 0.7348i | 0.1100 + 0.6285i | 0.1120 + 0.7126i |
| 15.5 | 0.1057 + 0.9757i | 0.1704 + 0.9162i | 0.1155 + 0.9873i | 0.1783 + 0.9299i | 0.1349 + 0.6360i | 0.1478 + 0.6586i | 0.1365 + 0.6293i | 0.1479 + 0.6511i |
| 16 | 0.1430 + 1.4001i | 0.1156 + 1.1081i | 0.1884 + 1.7333i | 0.1078 + 1.0066i | 0.1071 + 0.6135i | 0.1080 + 0.7000i | 0.1069 + 0.6283i | 0.1060 + 0.7438i |
| 16.5 | 0.1053 + 1.2977i | 0.1293 + 0.9737i | 0.1785 + 1.2326i | 0.1473 + 0.9932i | 0.1149 + 0.6198i | 0.1198 + 0.7262i | 0.1195 + 0.6155i | 0.1240 + 0.7155i |
| 17 | 0.1490 + 1.6173i | 0.1183 + 0.9591i | 0.1303 + 1.3054i | 0.1236 + 1.0413i | 0.1061 + 0.6094i | 0.1122 + 0.7387i | 0.1133 + 0.5999i | 0.1188 + 0.7034i |
| 17.5 | 0.1411 + 1.5896i | 0.1170 + 0.9512i | 0.1278 + 1.2852i | 0.1257 + 1.0327i | 0.1004 + 0.5984i | 0.1100 + 0.7473i | 0.1141 + 0.5926i | 0.1221 + 0.7136i |
| 18 | 0.1396 + 1.5775i | 0.1131 + 0.9418i | 0.1242 + 1.2789i | 0.1226 + 1.0347i | 0.0938 + 0.5780i | 0.1063 + 0.7507i | 0.1145 + 0.5762i | 0.1223 + 0.7129i |
| 18.5 | 0.1401 + 1.5712i | 0.1104 + 0.9411i | 0.1233 + 1.2808i | 0.1220 + 1.0474i | 0.0863 + 0.5683i | 0.1030 + 0.7613i | 0.1177 + 0.5704i | 0.1259 + 0.7175i |
| 19 | 0.1202 + 1.4352i | 0.0996 + 1.2052i | 0.2171 + 1.6874i | 0.2773 + 1.1812i | 0.0839 + 0.8147i | 0.0834 + 0.9964i | 0.1971 + 0.8041i | 0.2436 + 0.9839i |
| 19.5 | 0.1542 + 1.5593i | 0.0710 + 0.9899i | 0.1176 + 1.2799i | 0.1750 + 1.0404i | 0.0755 + 0.6559i | 0.0799 + 0.8133i | 0.1865 + 0.6474i | 0.2027 + 0.8117i |
| 20 | 0.1167 + 1.2700i | 0.0962 + 1.0708i | 0.1297 + 1.5321i | 0.0883 + 0.8994i | 0.0749 + 0.5327i | 0.0612 + 0.6889i | 0.1829 + 0.5465i | 0.1233 + 0.7216i |
| 20.5 | 0.1161 + 1.2756i | 0.0974 + 1.0790i | 0.1295 + 1.5298i | 0.0884 + 0.9064i | 0.0720 + 0.5415i | 0.0591 + 0.6728i | 0.1883 + 0.5570i | 0.1297 + 0.7318i |
| 21 | 0.1140 + 1.2762i | 0.0978 + 1.0812i | 0.1280 + 1.5231i | 0.0867 + 0.9060i | 0.0704 + 0.5429i | 0.0574 + 0.6772i | 0.1921 + 0.5608i | 0.1353 + 0.7334i |
| 21.5 | 0.1108 + 1.2731i | 0.0977 + 1.0794i | 0.1256 + 1.5126i | 0.0853 + 0.9029i | 0.0694 + 0.5429i | 0.0559 + 0.6795i | 0.1945 + 0.5628i | 0.1410 + 0.7326i |
| 22 | 0.1045 + 1.2645i | 0.0959 + 1.0725i | 0.1201 + 1.4962i | 0.0871 + 0.8987i | 0.0687 + 0.5451i | 0.0549 + 0.6836i | 0.1961 + 0.5662i | 0.1487 + 0.7336i |
| 22.5 | 0.1015 + 1.2588i | 0.0952 + 1.0704i | 0.1161 + 1.4831i | 0.0884 + 0.8992i | 0.0685 + 0.5510i | 0.0545 + 0.6912i | 0.1980 + 0.5732i | 0.1557 + 0.7375i |
| 23 | 0.1141 + 1.4950i | 0.0679 + 0.9023i | 0.1059 + 1.2572i | 0.1019 + 1.0664i | 0.0653 + 0.5841i | 0.0662 + 0.7419i | 0.2015 + 0.5913i | 0.1899 + 0.7378i |
| 23.5 | 0.0985 + 1.2520i | 0.0938 + 1.0710i | 0.1114 + 1.4628i | 0.0905 + 0.9054i | 0.0693 + 0.5689i | 0.0563 + 0.7102i | 0.2034 + 0.5915i | 0.1695 + 0.7506i |
| 24 | 0.0901 + 1.1911i | 0.0801 + 1.0038i | 0.1106 + 1.4060i | 0.2328 + 0.9654i | 0.0680 + 0.6561i | 0.0697 + 0.8236i | 0.2070 + 0.6480i | 0.2108 + 0.8051i |
| 24.5 | 0.0894 + 1.1877i | 0.0808 + 1.0036i | 0.1074 + 1.3967i | 0.2340 + 0.9604i | 0.0695 + 0.6593i | 0.0707 + 0.8259i | 0.2118 + 0.6478i | 0.2131 + 0.8017i |
| 25 | 0.0890 + 1.1877i | 0.0816 + 1.0065i | 0.1053 + 1.3909i | 0.2349 + 0.9570i | 0.0709 + 0.6644i | 0.0718 + 0.8309i | 0.2160 + 0.6470i | 0.2150 + 0.7989i |
| 25.5 | 0.0889 + 1.1889i | 0.0823 + 1.0105i | 0.1037 + 1.3867i | 0.2355 + 0.9547i | 0.0721 + 0.6705i | 0.0727 + 0.8369i | 0.2196 + 0.6455i | 0.2165 + 0.7966i |
| 26 | 0.0888 + 1.1903i | 0.0829 + 1.0145i | 0.1023 + 1.3833i | 0.2357 + 0.9536i | 0.0732 + 0.6770i | 0.0737 + 0.8430i | 0.2228 + 0.6437i | 0.2175 + 0.7949i |

-continued

| SNR | w40 | w41 | w42 | w43 | w44 | w45 | w46 | w47 |
|---|---|---|---|---|---|---|---|---|
| 5 | 0.2696 + 0.4521i | 0.2696 + 0.4521i | 0.5170 + 1.2065i | 0.5170 + 1.2065i | 0.2696 + 0.4521i | 0.2696 + 0.4521i | 0.5169 + 1.2065i | 0.5169 + 1.2065i |
| 5.5 | 0.2663 + 0.4530i | 0.2663 + 0.4530i | 0.5115 + 1.2092i | 0.5115 + 1.2092i | 0.2663 + 0.4530i | 0.2663 + 0.4530i | 0.5115 + 1.2092i | 0.5115 + 1.2092i |
| 6 | 1.2102 + 0.5067i | 1.2102 + 0.5067i | 1.2102 + 0.5067i | 1.2102 + 0.5067i | 0.4570 + 0.2642i | 0.4570 + 0.2642i | 0.4570 + 0.2642i | 0.4570 + 0.2642i |
| 6.5 | 0.4304 + 1.2538i | 0.4304 + 1.2538i | 0.4304 + 1.2537i | 0.4304 + 1.2537i | 0.5752 + 1.1632i | 0.5752 + 1.1632i | 0.5752 + 1.1632i | 0.5752 + 1.1632i |
| 7 | 0.5321 + 1.0488i | 0.5054 + 1.0028i | 0.5818 + 1.1302i | 0.5321 + 1.0488i | 0.3443 + 1.1417i | 0.3344 + 1.0806i | 0.3631 + 1.2644i | 0.3443 + 1.1417i |
| 7.5 | 0.4714 + 0.2435i | 0.4213 + 0.2297i | 1.1489 + 0.3175i | 1.2665 + 0.3279i | 0.5207 + 0.2555i | 0.4714 + 0.2435i | 1.0924 + 0.3124i | 1.1489 + 0.3175i |
| 8 | 0.2228 + 0.4230i | 0.2369 + 0.4792i | 0.2369 + 0.4792i | 0.2486 + 0.5341i | 0.2485 + 0.4288i | 0.2729 + 0.4799i | 0.2729 + 0.4799i | 0.2969 + 0.5272i |
| 8.5 | 0.2156 + 0.4280i | 0.2299 + 0.4909i | 0.2299 + 0.4909i | 0.2411 + 0.5508i | 0.2432 + 0.4300i | 0.2708 + 0.4861i | 0.2708 + 0.4861i | 0.2980 + 0.5370i |
| 9 | 0.1856 + 0.6747i | 0.2596 + 0.6730i | 0.1922 + 0.7921i | 0.2849 + 0.7548i | 0.1875 + 0.6772i | 0.2626 + 0.6762i | 0.1956 + 0.7959i | 0.2892 + 0.7605i |
| 9.5 | 0.1819 + 0.6783i | 0.2610 + 0.6715i | 0.1923 + 0.8010i | 0.2956 + 0.7536i | 0.1845 + 0.6814i | 0.2653 + 0.6756i | 0.1970 + 0.8057i | 0.3015 + 0.7610i |
| 10 | 0.9890 − 1.4799i | 0.8088 − 1.2150i | 0.5335 − 0.8833i | 0.5486 − 0.8998i | 0.8088 − 1.2150i | 0.7657 − 1.1516i | 0.5486 − 0.8998i | 0.5630 − 0.9155i |
| 10.5 | 0.9918 − 1.4880i | 0.8109 − 1.2116i | 0.5320 − 0.8680i | 0.5496 − 0.8870i | 0.8109 − 1.2116i | 0.7744 − 1.1516i | 0.5496 − 0.8870i | 0.5674 − 0.9058i |
| 11 | 0.1967 + 0.6516i | 0.1969 + 0.6552i | 0.1969 + 0.6552i | 0.1972 + 0.6592i | 0.3323 + 0.5926i | 0.3347 + 0.5953i | 0.3347 + 0.5953i | 0.3374 + 0.5982i |
| 11.5 | 0.1885 + 0.6662i | 0.1878 + 0.6638i | 0.1877 + 0.6689i | 0.1869 + 0.6663i | 0.3440 + 0.5986i | 0.3433 + 0.5965i | 0.3466 + 0.5998i | 0.3458 + 0.5975i |
| 12 | 0.1779 + 0.6841i | 0.1828 + 0.6845i | 0.1745 + 0.6828i | 0.1793 + 0.6829i | 0.3547 + 0.6009i | 0.3593 + 0.6011i | 0.3576 + 0.5990i | 0.3624 + 0.5994i |
| 12.5 | 0.1792 + 0.7116i | 0.1856 + 0.7087i | 0.1709 + 0.7113i | 0.1774 + 0.7076i | 0.3740 + 0.6070i | 0.3778 + 0.6065i | 0.3777 + 0.6018i | 0.3817 + 0.6013i |
| 13 | 0.1817 + 0.7335i | 0.1889 + 0.7276i | 0.1660 + 0.7356i | 0.1734 + 0.7283i | 0.3879 + 0.6101i | 0.3903 + 0.6093i | 0.3925 + 0.6005i | 0.3948 + 0.5996i |
| 13.5 | 0.1825 + 0.7468i | 0.1898 + 0.7378i | 0.1588 + 0.7521i | 0.1666 + 0.7410i | 0.3967 + 0.6104i | 0.3971 + 0.6093i | 0.4022 + 0.5964i | 0.4020 + 0.5952i |
| 14 | 0.1826 + 0.7535i | 0.1893 + 0.7416i | 0.1516 + 0.7621i | 0.1596 + 0.7470i | 0.4024 + 0.6084i | 0.3991 + 0.6069i | 0.4059 + 0.5914i | 0.4018 + 0.5896i |
| 14.5 | 0.1878 + 0.7652i | 0.1918 + 0.7501i | 0.1441 + 0.7789i | 0.1507 + 0.7597i | 0.4094 + 0.6093i | 0.4040 + 0.6061i | 0.4153 + 0.5858i | 0.4089 + 0.5826i |
| 15 | 0.6334 + 1.5624i | 0.3445 + 1.0222i | 0.3767 + 1.3678i | 0.3375 + 1.0864i | 0.3311 + 0.6416i | 0.3353 + 0.7232i | 0.3182 + 0.6339i | 0.3260 + 0.7097i |
| 15.5 | 0.1266 + 1.3390i | 0.4298 + 0.9537i | 0.2698 + 1.2595i | 0.4136 + 1.0326i | 0.4146 + 0.6068i | 0.4236 + 0.6703i | 0.4011 + 0.5965i | 0.4047 + 0.6466i |
| 16 | 0.4307 + 1.3657i | 0.3427 + 1.0736i | 0.5886 + 1.6752i | 0.3211 + 0.9921i | 0.3296 + 0.6232i | 0.3421 + 0.6984i | 0.3115 + 0.6358i | 0.3204 + 0.7350i |
| 16.5 | 0.2029 + 1.6229i | 0.4061 + 0.9419i | 0.4138 + 1.2839i | 0.3981 + 0.9966i | 0.3744 + 0.6031i | 0.3838 + 0.6977i | 0.3484 + 0.6000i | 0.3571 + 0.6873i |
| 17 | 0.4551 + 1.5890i | 0.3688 + 0.9394i | 0.3994 + 1.2831i | 0.3584 + 1.0296i | 0.3706 + 0.5982i | 0.3667 + 0.7052i | 0.3292 + 0.5917i | 0.3315 + 0.6797i |
| 17.5 | 0.4310 + 1.5685i | 0.3749 + 0.9291i | 0.3899 + 1.2644i | 0.3578 + 1.0211i | 0.3781 + 0.5910i | 0.3716 + 0.7091i | 0.3216 + 0.5867i | 0.3245 + 0.6863i |
| 18 | 0.4257 + 1.5553i | 0.3653 + 0.9212i | 0.3793 + 1.2582i | 0.3474 + 1.0247i | 0.3805 + 0.5765i | 0.3633 + 0.7147i | 0.3133 + 0.5726i | 0.3120 + 0.6868i |
| 18.5 | 0.4244 + 1.5436i | 0.3639 + 0.9208i | 0.3774 + 1.2582i | 0.3430 + 1.0368i | 0.3915 + 0.5705i | 0.3623 + 0.7269i | 0.3080 + 0.5673i | 0.3034 + 0.6934i |
| 19 | 0.7690 + 1.4112i | 0.6649 + 1.1380i | 0.4761 + 1.4765i | 0.4596 + 1.1970i | 0.4764 + 0.7356i | 0.5686 + 0.9186i | 0.3592 + 0.7734i | 0.4125 + 0.9576i |
| 19.5 | 0.4619 + 1.4871i | 0.4964 + 0.9866i | 0.3490 + 1.2589i | 0.3490 + 1.0371i | 0.4558 + 0.6134i | 0.4773 + 0.7891i | 0.3323 + 0.6317i | 0.3411 + 0.8066i |
| 20 | 0.3324 + 1.2294i | 0.3300 + 1.0062i | 0.3879 + 1.4978i | 0.2451 + 0.8999i | 0.4353 + 0.5950i | 0.4122 + 0.7607i | 0.3109 + 0.5751i | 0.2807 + 0.7485i |
| 20.5 | 0.3324 + 1.2302i | 0.3334 + 1.0155i | 0.3846 + 1.4868i | 0.2478 + 0.9074i | 0.4435 + 0.6045i | 0.4193 + 0.7714i | 0.3125 + 0.5857i | 0.2831 + 0.7571i |
| 21 | 0.3284 + 1.2285i | 0.3320 + 1.0206i | 0.3786 + 1.4755i | 0.2471 + 0.9090i | 0.4494 + 0.6106i | 0.4225 + 0.7777i | 0.3144 + 0.5907i | 0.2838 + 0.7596i |
| 21.5 | 0.3217 + 1.2283i | 0.3261 + 1.0269i | 0.3716 + 1.4663i | 0.2470 + 0.9085i | 0.4549 + 0.6160i | 0.4247 + 0.7818i | 0.3170 + 0.5938i | 0.2850 + 0.7600i |
| 22 | 0.3100 + 1.2397i | 0.3058 + 1.0469i | 0.3607 + 1.4682i | 0.2567 + 0.9079i | 0.4631 + 0.6208i | 0.4319 + 0.7788i | 0.3205 + 0.5962i | 0.2904 + 0.7595i |
| 22.5 | 0.3044 + 1.2443i | 0.3002 + 1.0568i | 0.3505 + 1.4648i | 0.2617 + 0.9117i | 0.4705 + 0.6290i | 0.4380 + 0.7857i | 0.3259 + 0.6027i | 0.2955 + 0.7625i |
| 23 | 0.3452 + 1.1540i | 0.4129 + 0.9793i | 0.3125 + 1.3457i | 0.2563 + 0.9501i | 0.4782 + 0.6393i | 0.4531 + 0.8051i | 0.3394 + 0.6131i | 0.3093 + 0.7816i |
| 23.5 | 0.2993 + 1.2594i | 0.2906 + 1.0772i | 0.3403 + 1.4686i | 0.2690 + 0.9234i | 0.4846 + 0.6443i | 0.4495 + 0.7999i | 0.3381 + 0.6175i | 0.3079 + 0.7726i |
| 24 | 0.4884 + 1.4147i | 0.4408 + 0.9883i | 0.2990 + 1.3047i | 0.3098 + 1.1123i | 0.5034 + 0.6582i | 0.5007 + 0.8232i | 0.3521 + 0.6461i | 0.3534 + 0.7992i |
| 24.5 | 0.4818 + 1.4041i | 0.4361 + 0.9895i | 0.2934 + 1.3012i | 0.3024 + 1.1112i | 0.5119 + 0.6637i | 0.5063 + 0.8279i | 0.3591 + 0.6480i | 0.3581 + 0.8012i |
| 25 | 0.4778 + 1.3940i | 0.4318 + 0.9909i | 0.2896 + 1.2989i | 0.2959 + 1.1112i | 0.5190 + 0.6693i | 0.5110 + 0.8331i | 0.3652 + 0.6503i | 0.3620 + 0.8038i |
| 25.5 | 0.4747 + 1.3846i | 0.4279 + 0.9924i | 0.2865 + 1.2969i | 0.2905 + 1.1114i | 0.5249 + 0.6752i | 0.5140 + 0.8384i | 0.3704 + 0.6529i | 0.3647 + 0.8068i |
| 26 | 0.4711 + 1.3764i | 0.4242 + 0.9942i | 0.2836 + 1.2952i | 0.2860 + 1.1119i | 0.5308 + 0.6813i | 0.5155 + 0.8438i | 0.3755 + 0.6565i | 0.3664 + 0.8105i |

| SNR | w48 | w49 | w50 | w51 | w52 | w53 | w54 | w55 |
|---|---|---|---|---|---|---|---|---|
| 5 | 0.2696 + 0.4521i | 0.2696 + 0.4521i | 0.5170 + 1.2065i | 0.5169 + 1.2065i | 0.2696 + 0.4521i | 0.2696 + 0.4521i | 0.5169 + 1.2065i | 0.5169 + 1.2065i |
| 5.5 | 0.2663 + 0.4530i | 0.2663 + 0.4530i | 0.5115 + 1.2092i | 0.5115 + 1.2092i | 0.2663 + 0.4530i | 0.2663 + 0.4530i | 0.5115 + 1.2092i | 0.5115 + 1.2092i |
| 6 | 0.5067 + 1.2102i | 0.5067 + 1.2102i | 0.5067 + 1.2102i | 0.5067 + 1.2102i | 0.2642 + 0.4570i | 0.2642 + 0.4570i | 0.2642 + 0.4570i | 0.2642 + 0.4570i |
| 6.5 | 0.2553 + 0.4543i | 0.2553 + 0.4543i | 0.2553 + 0.4543i | 0.2553 + 0.4543i | 0.2699 + 0.4632i | 0.2699 + 0.4632i | 0.2699 + 0.4632i | 0.2699 + 0.4632i |
| 7 | 0.2570 + 0.4231i | 0.2737 + 0.4610i | 0.2407 + 0.3854i | 0.2570 + 0.4231i | 0.2424 + 0.4005i | 0.2551 + 0.4395i | 0.2293 + 0.3637i | 0.2424 + 0.4005i |
| 7.5 | 0.2297 + 0.4213i | 0.2153 + 0.3744i | 0.3279 + 1.2665i | 0.3690 + 1.7569i | 0.2435 + 0.4714i | 0.2297 + 0.4213i | 0.3175 + 1.1489i | 0.3279 + 1.2665i |
| 8 | 0.3708 + 0.2078i | 0.4230 + 0.2228i | 0.4230 + 0.2228i | 0.4792 + 0.2369i | 0.3788 + 0.2257i | 0.4288 + 0.2485i | 0.4288 + 0.2485i | 0.4799 + 0.2729i |
| 8.5 | 0.3693 + 0.1998i | 0.4280 + 0.2156i | 0.4280 + 0.2156i | 0.4909 + 0.2299i | 0.3747 + 0.2178i | 0.4300 + 0.2432i | 0.4300 + 0.2432i | 0.4861 + 0.2708i |
| 9 | 0.2427 + 0.2263i | 0.2838 + 0.2486i | 0.2831 + 0.2190i | 0.3278 + 0.2440i | 0.2459 + 0.2248i | 0.2871 + 0.2468i | 0.2869 + 0.2171i | 0.3312 + 0.2418i |
| 9.5 | 0.2335 + 0.2229i | 0.2775 + 0.2471i | 0.2850 + 0.2115i | 0.3342 + 0.2392i | 0.2370 + 0.2213i | 0.2813 + 0.2455i | 0.2895 + 0.2096i | 0.3382 + 0.2371i |
| 10 | 0.1636 − 0.3155i | 0.1635 − 0.3150i | 0.2161 − 0.6148i | 0.2169 − 0.6216i | 0.1635 − 0.3150i | 0.1634 − 0.3145i | 0.2169 − 0.6216i | 0.2176 − 0.6290i |
| 10.5 | 0.1570 − 0.3085i | 0.1564 − 0.3061i | 0.2066 − 0.6354i | 0.2071 − 0.6404i | 0.1564 − 0.3061i | 0.1557 − 0.3037i | 0.2071 − 0.6404i | 0.2075 − 0.6460i |
| 11 | 0.3051 + 0.1518i | 0.3018 + 0.1510i | 0.3018 + 0.1510i | 0.2985 + 0.1501i | 0.3037 + 0.1699i | 0.3007 + 0.1685i | 0.3007 + 0.1685i | 0.2977 + 0.1671i |
| 11.5 | 0.2979 + 0.1464i | 0.3017 + 0.1473i | 0.2941 + 0.1456i | 0.2979 + 0.1465i | 0.2972 + 0.1662i | 0.3006 + 0.1678i | 0.2937 + 0.1646i | 0.2971 + 0.1662i |
| 12 | 0.2697 + 0.1443i | 0.2704 + 0.1433i | 0.2644 + 0.1442i | 0.2650 + 0.1432i | 0.2763 + 0.1638i | 0.2768 + 0.1626i | 0.2715 + 0.1630i | 0.2719 + 0.1618i |
| 12.5 | 0.2423 + 0.1395i | 0.2424 + 0.1389i | 0.2387 + 0.1394i | 0.2388 + 0.1389i | 0.2516 + 0.1583i | 0.2517 + 0.1576i | 0.2482 + 0.1578i | 0.2483 + 0.1571i |
| 13 | 0.2256 + 0.1346i | 0.2253 + 0.1344i | 0.2241 + 0.1346i | 0.2237 + 0.1345i | 0.2350 + 0.1552i | 0.2347 + 0.1549i | 0.2335 + 0.1550i | 0.2331 + 0.1547i |
| 13.5 | 0.2177 + 0.1304i | 0.2168 + 0.1304i | 0.2184 + 0.1305i | 0.2174 + 0.1306i | 0.2264 + 0.1539i | 0.2255 + 0.1538i | 0.2269 + 0.1542i | 0.2260 + 0.1541i |
| 14 | 0.2139 + 0.1264i | 0.2129 + 0.1265i | 0.2177 + 0.1267i | 0.2167 + 0.1268i | 0.2205 + 0.1529i | 0.2196 + 0.1529i | 0.2239 + 0.1539i | 0.2230 + 0.1539i |
| 14.5 | 0.2048 + 0.1245i | 0.2036 + 0.1246i | 0.2137 + 0.1252i | 0.2125 + 0.1253i | 0.2114 + 0.1549i | 0.2104 + 0.1549i | 0.2194 + 0.1573i | 0.2184 + 0.1573i |
| 15 | 0.1245 + 0.1187i | 0.1244 + 0.1173i | 0.1239 + 0.1191i | 0.1238 + 0.1176i | 0.1179 + 0.3492i | 0.1194 + 0.3492i | 0.1158 + 0.3713i | 0.1175 + 0.3517i |
| 15.5 | 0.1162 + 0.1238i | 0.1165 + 0.1240i | 0.1164 + 0.1233i | 0.1167 + 0.1236i | 0.1232 + 0.3743i | 0.1224 + 0.3681i | 0.1248 + 0.3757i | 0.1240 + 0.3695i |
| 16 | 0.1246 + 0.1126i | 0.1236 + 0.1147i | 0.1260 + 0.1137i | 0.1249 + 0.1158i | 0.1145 + 0.3722i | 0.1158 + 0.3451i | 0.1155 + 0.3659i | 0.1168 + 0.3397i |
| 16.5 | 0.1108 + 0.1164i | 0.1102 + 0.1224i | 0.1146 + 0.1160i | 0.1140 + 0.1221i | 0.1117 + 0.3822i | 0.1114 + 0.3519i | 0.1161 + 0.3836i | 0.1157 + 0.3531i |
| 17 | 0.1115 + 0.1115i | 0.1120 + 0.1205i | 0.1194 + 0.1109i | 0.1199 + 0.1199i | 0.1072 + 0.3744i | 0.1092 + 0.3378i | 0.1154 + 0.3802i | 0.1176 + 0.3422i |
| 17.5 | 0.1091 + 0.1073i | 0.1100 + 0.1219i | 0.1238 + 0.1068i | 0.1247 + 0.1214i | 0.1034 + 0.3767i | 0.1065 + 0.3301i | 0.1187 + 0.3819i | 0.1221 + 0.3339i |
| 18 | 0.1029 + 0.1005i | 0.1036 + 0.1205i | 0.1336 + 0.1000i | 0.1343 + 0.1201i | 0.0984 + 0.3716i | 0.1017 + 0.3147i | 0.1253 + 0.3759i | 0.1301 + 0.3177i |
| 18.5 | 0.0939 + 0.0943i | 0.0946 + 0.1241i | 0.1446 + 0.0939i | 0.1449 + 0.1242i | 0.0911 + 0.3755i | 0.0942 + 0.3061i | 0.1336 + 0.3799i | 0.1399 + 0.3092i |
| 19 | 0.0784 + 0.0928i | 0.0827 + 0.2753i | 0.0788 + 0.0929i | 0.0872 + 0.2754i | 0.0877 + 0.6330i | 0.0879 + 0.4564i | 0.1446 + 0.6281i | 0.1074 + 0.4545i |
| 19.5 | 0.0788 + 0.0768i | 0.0782 + 0.2154i | 0.1113 + 0.0765i | 0.1213 + 0.2125i | 0.0760 + 0.5036i | 0.0772 + 0.3648i | 0.1642 + 0.4957i | 0.1421 + 0.3594i |
| 20 | 0.0713 + 0.0697i | 0.0711 + 0.1478i | 0.2060 + 0.0687i | 0.2046 + 0.1520i | 0.0715 + 0.3878i | 0.0710 + 0.2879i | 0.1957 + 0.3967i | 0.2012 + 0.2903i |
| 20.5 | 0.0696 + 0.0636i | 0.0695 + 0.1639i | 0.2051 + 0.0633i | 0.2044 + 0.1665i | 0.0700 + 0.4057i | 0.0696 + 0.2929i | 0.1995 + 0.4139i | 0.2029 + 0.2955i |
| 21 | 0.0696 + 0.0610i | 0.0696 + 0.1698i | 0.2077 + 0.0610i | 0.2073 + 0.1721i | 0.0698 + 0.4114i | 0.0697 + 0.2939i | 0.2034 + 0.4201i | 0.2063 + 0.2971i |
| 21.5 | 0.0707 + 0.0595i | 0.0706 + 0.1722i | 0.2119 + 0.0599i | 0.2114 + 0.1748i | 0.0701 + 0.4134i | 0.0705 + 0.2935i | 0.2066 + 0.4231i | 0.2100 + 0.2979i |
| 22 | 0.0723 + 0.0588i | 0.0719 + 0.1737i | 0.2166 + 0.0598i | 0.2155 + 0.1775i | 0.0704 + 0.4157i | 0.0713 + 0.2939i | 0.2086 + 0.4265i | 0.2132 + 0.3001i |
| 22.5 | 0.0730 + 0.0592i | 0.0727 + 0.1768i | 0.2188 + 0.0604i | 0.2178 + 0.1809i | 0.0710 + 0.4212i | 0.0721 + 0.2976i | 0.2107 + 0.4330i | 0.2155 + 0.3047i |
| 23 | 0.0720 + 0.0615i | 0.0717 + 0.1851i | 0.2162 + 0.0625i | 0.2153 + 0.1881i | 0.0692 + 0.4430i | 0.0709 + 0.3116i | 0.2088 + 0.4508i | 0.2131 + 0.3169i |
| 23.5 | 0.0735 + 0.0614i | 0.0734 + 0.1846i | 0.2204 + 0.0628i | 0.2198 + 0.1888i | 0.0720 + 0.4369i | 0.0730 + 0.3094i | 0.2145 + 0.4495i | 0.2184 + 0.3170i |
| 24 | 0.0668 + 0.0698i | 0.0669 + 0.2101i | 0.2012 + 0.0697i | 0.2017 + 0.2100i | 0.0675 + 0.5006i | 0.0672 + 0.3530i | 0.2047 + 0.4981i | 0.2028 + 0.3524i |
| 24.5 | 0.0679 + 0.0704i | 0.0679 + 0.2120i | 0.2045 + 0.0702i | 0.2048 + 0.2113i | 0.0689 + 0.5043i | 0.0683 + 0.3561i | 0.2088 + 0.4995i | 0.2060 + 0.3542i |
| 25 | 0.0687 + 0.0711i | 0.0686 + 0.2143i | 0.2073 + 0.0705i | 0.2070 + 0.2122i | 0.0701 + 0.5091i | 0.0690 + 0.3598i | 0.2121 + 0.5000i | 0.2083 + 0.3552i |
| 25.5 | 0.0699 + 0.0718i | 0.0690 + 0.2167i | 0.2111 + 0.0703i | 0.2080 + 0.2118i | 0.0711 + 0.5149i | 0.0694 + 0.3642i | 0.2146 + 0.4990i | 0.2095 + 0.3547i |
| 26 | 0.0711 + 0.0728i | 0.0687 + 0.2202i | 0.2153 + 0.0697i | 0.2074 + 0.2103i | 0.0722 + 0.5215i | 0.0699 + 0.3698i | 0.2171 + 0.4970i | 0.2104 + 0.3528i |

-continued

| SNR | w56 | w57 | w58 | w59 | w60 | w61 | w62 | w63 |
|---|---|---|---|---|---|---|---|---|
| 5 | 0.2696 + 0.4521i | 0.2696 + 0.4521i | 0.5170 + 1.2065i | 0.5170 + 1.2065i | 0.2696 + 0.4521i | 0.2696 + 0.4521i | 0.5170 + 1.2065i | 0.5169 + 1.2065i |
| 5.5 | 0.2663 + 0.4530i | 0.2663 + 0.4530i | 0.5115 + 1.2092i | 0.5115 + 1.2092i | 0.2663 + 0.4530i | 0.2663 + 0.4530i | 0.5115 + 1.2092i | 0.5115 + 1.2092i |
| 6 | 0.5067 + 1.2102i | 0.5067 + 1.2102i | 0.5067 + 1.2102i | 0.5067 + 1.2102i | 0.2642 + 0.4570i | 0.2642 + 0.4570i | 0.2642 + 0.4570i | 0.2642 + 0.4570i |
| 6.5 | 0.2553 + 0.4543i | 0.2553 + 0.4543i | 0.2553 + 0.4543i | 0.2553 + 0.4543i | 0.2699 + 0.4632i | 0.2699 + 0.4632i | 0.2699 + 0.4632i | 0.2699 + 0.4632i |
| 7 | 0.2737 + 0.4610i | 0.2897 + 0.4968i | 0.2571 + 0.4231i | 0.2737 + 0.4610i | 0.2551 + 0.4393i | 0.2668 + 0.4777i | 0.2424 + 0.4005i | 0.2551 + 0.4393i |
| 7.5 | 0.4213 + 0.2297i | 0.3744 + 0.2153i | 1.2665 + 0.3279i | 1.7569 + 0.3690i | 0.4714 + 0.2435i | 0.4213 + 0.2297i | 1.1489 + 0.3175i | 1.2665 + 0.3279i |
| 8 | 0.4280 + 0.2228i | 0.4792 + 0.2369i | 0.4792 + 0.2369i | 0.5341 + 0.2486i | 0.4288 + 0.2485i | 0.4799 + 0.2729i | 0.4799 + 0.2729i | 0.5272 + 0.2969i |
| 8.5 | 0.4861 + 0.2156i | 0.4909 + 0.2299i | 0.4909 + 0.2299i | 0.5508 + 0.2411i | 0.4300 + 0.2432i | 0.4861 + 0.2708i | 0.4861 + 0.2708i | 0.5370 + 0.2980i |
| 9 | 0.2535 + 0.2242i | 0.2958 + 0.2464i | 0.2959 + 0.2162i | 0.3401 + 0.2408i | 0.2568 + 0.2226i | 0.2992 + 0.2445i | 0.2999 + 0.2142i | 0.3435 + 0.2384i |
| 9.5 | 0.2466 + 0.2220i | 0.2928 + 0.2463i | 0.3019 + 0.2094i | 0.3505 + 0.2369i | 0.2504 + 0.2203i | 0.2968 + 0.2446i | 0.3066 + 0.2074i | 0.3545 + 0.2345i |
| 10 | 0.1777 − 0.3146i | 0.1775 − 0.3142i | 0.3118 − 0.5742i | 0.3157 − 0.5798i | 0.1775 − 0.3142i | 0.1773 − 0.3138i | 0.3157 − 0.5798i | 0.3199 − 0.5859i |
| 10.5 | 0.1726 − 0.3073i | 0.1716 − 0.3050i | 0.3219 − 0.5854i | 0.3250 − 0.5893i | 0.1716 − 0.3050i | 0.1707 − 0.3028i | 0.3250 − 0.5893i | 0.3285 − 0.5937i |
| 11 | 0.6517 + 0.1968i | 0.6553 + 0.1969i | 0.6553 + 0.1970i | 0.6593 + 0.1971i | 0.5926 + 0.3323i | 0.5953 + 0.3347i | 0.5953 + 0.3347i | 0.5983 + 0.3373i |
| 11.5 | 0.6651 + 0.1874i | 0.6629 + 0.1867i | 0.6676 + 0.1867i | 0.6652 + 0.1860i | 0.5987 + 0.3415i | 0.5967 + 0.3408i | 0.5999 + 0.3441i | 0.5977 + 0.3433i |
| 12 | 0.6488 + 0.1696i | 0.6462 + 0.1706i | 0.6456 + 0.1745i | 0.6431 + 0.1753i | 0.5854 + 0.3186i | 0.5862 + 0.3167i | 0.5864 + 0.3275i | 0.5873 + 0.3254i |
| 12.5 | 0.6316 + 0.1560i | 0.6315 + 0.1561i | 0.6247 + 0.1604i | 0.6248 + 0.1604i | 0.5783 + 0.3024i | 0.5798 + 0.3002i | 0.5773 + 0.3109i | 0.5787 + 0.3085i |
| 13 | 0.6170 + 0.1462i | 0.6194 + 0.1456i | 0.6069 + 0.1499i | 0.6096 + 0.1493i | 0.5711 + 0.2953i | 0.5733 + 0.2925i | 0.5681 + 0.3029i | 0.5702 + 0.3000i |
| 13.5 | 0.6100 + 0.1390i | 0.6146 + 0.1379i | 0.5973 + 0.1418i | 0.6021 + 0.1407i | 0.5671 + 0.2989i | 0.5699 + 0.2952i | 0.5622 + 0.3050i | 0.5648 + 0.3012i |
| 14 | 0.6083 + 0.1348i | 0.6131 + 0.1340i | 0.5937 + 0.1359i | 0.5986 + 0.1351i | 0.5634 + 0.3136i | 0.5659 + 0.3081i | 0.5560 + 0.3149i | 0.5581 + 0.3094i |
| 14.5 | 0.6021 + 0.1286i | 0.6083 + 0.1281i | 0.5829 + 0.1293i | 0.5889 + 0.1287i | 0.5602 + 0.3179i | 0.5630 + 0.3124i | 0.5492 + 0.3184i | 0.5514 + 0.3131i |
| 15 | 0.3704 + 0.1254i | 0.3712 + 0.1251i | 0.3655 + 0.1247i | 0.3663 + 0.1243i | 0.3507 + 0.3864i | 0.3567 + 0.3730i | 0.3413 + 0.3842i | 0.3479 + 0.3703i |
| 15.5 | 0.3691 + 0.1161i | 0.3726 + 0.1149i | 0.3462 + 0.1176i | 0.3495 + 0.1166i | 0.3880 + 0.3542i | 0.3859 + 0.3426i | 0.3721 + 0.3619i | 0.3694 + 0.3510i |
| 16 | 0.3798 + 0.1221i | 0.3814 + 0.1262i | 0.3718 + 0.1223i | 0.3734 + 0.1263i | 0.3551 + 0.3930i | 0.3657 + 0.3748i | 0.3422 + 0.3818i | 0.3526 + 0.3629i |
| 16.5 | 0.3595 + 0.1122i | 0.3649 + 0.1166i | 0.3317 + 0.1131i | 0.3362 + 0.1181i | 0.3658 + 0.3713i | 0.3698 + 0.3435i | 0.3402 + 0.3754i | 0.3436 + 0.3473i |
| 17 | 0.3728 + 0.1147i | 0.3680 + 0.1240i | 0.3411 + 0.1128i | 0.3369 + 0.1221i | 0.3747 + 0.3766i | 0.3717 + 0.3455i | 0.3348 + 0.3800i | 0.3339 + 0.3472i |
| 17.5 | 0.3820 + 0.1125i | 0.3761 + 0.1279i | 0.3399 + 0.1094i | 0.3352 + 0.1245i | 0.3834 + 0.3812i | 0.3805 + 0.3416i | 0.3287 + 0.3836i | 0.3290 + 0.3417i |
| 18 | 0.4034 + 0.1051i | 0.3990 + 0.1268i | 0.3351 + 0.1017i | 0.3324 + 0.1227i | 0.3940 + 0.3783i | 0.3941 + 0.3266i | 0.3224 + 0.3797i | 0.3242 + 0.3257i |
| 18.5 | 0.4172 + 0.0983i | 0.4129 + 0.1333i | 0.3295 + 0.0948i | 0.3269 + 0.1276i | 0.4055 + 0.3867i | 0.4070 + 0.3192i | 0.3165 + 0.3859i | 0.3192 + 0.3168i |
| 19 | 0.2459 + 0.0870i | 0.2683 + 0.2541i | 0.2324 + 0.0875i | 0.2491 + 0.2574i | 0.3841 + 0.5754i | 0.3150 + 0.4197i | 0.3139 + 0.6000i | 0.2782 + 0.4299i |
| 19.5 | 0.3357 + 0.0722i | 0.3554 + 0.1787i | 0.2645 + 0.0759i | 0.2773 + 0.1974i | 0.4211 + 0.4555i | 0.3908 + 0.3235i | 0.3141 + 0.4762i | 0.2975 + 0.3417i |
| 20 | 0.4915 + 0.0675i | 0.4864 + 0.1749i | 0.3507 + 0.0674i | 0.3479 + 0.1618i | 0.4601 + 0.4402i | 0.4756 + 0.3132i | 0.3316 + 0.4177i | 0.3417 + 0.2995i |
| 20.5 | 0.4886 + 0.0646i | 0.4846 + 0.1827i | 0.3469 + 0.0633i | 0.3450 + 0.1729i | 0.4639 + 0.4505i | 0.4766 + 0.3165i | 0.3324 + 0.4213i | 0.3406 + 0.3039i |
| 21 | 0.4930 + 0.0636i | 0.4893 + 0.1869i | 0.3495 + 0.0617i | 0.3478 + 0.1777i | 0.4697 + 0.4569i | 0.4820 + 0.3193i | 0.3355 + 0.4373i | 0.3439 + 0.3060i |
| 21.5 | 0.5002 + 0.0638i | 0.4966 + 0.1905i | 0.3552 + 0.0612i | 0.3533 + 0.1810i | 0.4764 + 0.4630i | 0.4895 + 0.3231i | 0.3397 + 0.4416i | 0.3490 + 0.3083i |
| 22 | 0.5063 + 0.0651i | 0.5034 + 0.1956i | 0.3611 + 0.0619i | 0.3592 + 0.1852i | 0.4850 + 0.4713i | 0.4975 + 0.3302i | 0.3439 + 0.4470i | 0.3544 + 0.3131i |
| 22.5 | 0.5098 + 0.0662i | 0.5076 + 0.1992i | 0.3641 + 0.0628i | 0.3625 + 0.1888i | 0.4912 + 0.4790i | 0.5027 + 0.3358i | 0.3482 + 0.4545i | 0.3582 + 0.3185i |
| 23 | 0.5089 + 0.0667i | 0.5074 + 0.2012i | 0.3614 + 0.0643i | 0.3600 + 0.1938i | 0.4951 + 0.4835i | 0.5034 + 0.3391i | 0.3505 + 0.4649i | 0.3566 + 0.3265i |
| 23.5 | 0.5134 + 0.0686i | 0.5133 + 0.2063i | 0.3668 + 0.0655i | 0.3660 + 0.1965i | 0.5011 + 0.4924i | 0.5105 + 0.3465i | 0.3558 + 0.4698i | 0.3634 + 0.3304i |
| 24 | 0.4796 + 0.0697i | 0.4800 + 0.2104i | 0.3382 + 0.0697i | 0.3390 + 0.2100i | 0.4925 + 0.5035i | 0.4833 + 0.3548i | 0.3463 + 0.4979i | 0.3414 + 0.3526i |
| 24.5 | 0.4861 + 0.0706i | 0.4859 + 0.2131i | 0.3435 + 0.0702i | 0.3439 + 0.2114i | 0.5003 + 0.5082i | 0.4895 + 0.3586i | 0.3523 + 0.4998i | 0.3464 + 0.3545i |
| 25 | 0.4922 + 0.0714i | 0.4900 + 0.2154i | 0.3482 + 0.0705i | 0.3474 + 0.2123i | 0.5068 + 0.5129i | 0.4941 + 0.3621i | 0.3574 + 0.5015i | 0.3500 + 0.3558i |
| 25.5 | 0.5014 + 0.0721i | 0.4909 + 0.2174i | 0.3548 + 0.0706i | 0.3488 + 0.2127i | 0.5120 + 0.5180i | 0.4965 + 0.3657i | 0.3613 + 0.5034i | 0.3518 + 0.3569i |
| 26 | 0.5101 + 0.0730i | 0.4897 + 0.2198i | 0.3616 + 0.0709i | 0.3479 + 0.2135i | 0.5175 + 0.5233i | 0.4992 + 0.3698i | 0.3655 + 0.5062i | 0.3537 + 0.3587i |

Signaling will now be described. First, L1 signaling processed by L1 signaling unit 15 will be described. The proposed system uses similar layer 1 (L1) signaling mechanisms as in DVB-T2. However, the signaling capacity of the preamble signal is significantly extended due to the new structure, i.e. mixing data and pilot carriers as well as the overlaid time domain sequence. A P2 symbol as in DVB-T2 is not foreseen for the moment, i.e. the capacity of the new preamble is estimated to be sufficiently high, however an optional dedicated signaling PLP is available for the rare cases when large amounts of data need to be signaled. In-band signaling processed by in-band signaling unit 16 is similar to that in DVB-T2.

Next, an Emergency Warning System (EWS) will be described. Such an EWS generally has the following requirements:

Short system end to end delay: Earthquake: as fast as possible (<100 ms); other natural disaster: <1 s;
Robustness: Very high robustness in low SNR environment;
Low power consumption of EWS receiver: Very low power for PHY decoding, so that the service can be "always-on";
Location awareness: Emergency alert may go out to all receivers, but must have some localization;
Multiple Emergencies: Must be able to cope with multiple emergencies occurring simultaneously:
Security: Must not be able to be "hijacked" (false message)
Support various types of Alerts: Static or variable text messages; static images; link to videos (example: presidential address):
No service interruption, i.e. continuous decoding of the data PLP;
Variable system bandwidth: the EWS system must be able to cope with all possible transmission system bandwidths;
Long Frame Lengths: to be supported like in DVB-T2, long frame lengths are likely for HD (e.g. 4 k, 8 k) services; however, long frame based system may lead to large delays.

The proposed system (i.e. the transmitter and the receiver) includes an emergency warning system 17 which has the following advantages:

Extremely robust, i.e. reliable detection and decoding even for bad channel conditions;
Extremely fast response to emergencies (e.g. earthquakes);
Low power monitoring of signal possible, even for receivers in sleep mode;
Emergency case detection.

The emergency case detection of the emergency warning system is achieved by an emergency indicator, which may be a simple one bit flag that is protected by a scrambling sequence and added to the preamble symbol of the transmitted signal. The same preamble is used for all frame types and it comprises a regular 8 k symbol with an extended guard interval (fractional length 57/128). The emergency indicator could be also embedded into other types of preambles, such as the P1 symbol of DVB-T2. However this has the disadvantage of lower signaling capacity (only 7 bits signaling capacity for a P1 symbol) as well as higher decoding power requirements for receivers in stand-by mode.

The preamble symbol uses an overlaid time domain pilot signal (SigSeq). This requires good ACF (auto correlation function) properties that allows for accurate frame synchronization and channel impulse response (CIR) estimation. The full-band Channel Transfer Function estimation at the receiver is accordingly calculated from the CIR. The SigSeq comprises one of two possible constant amplitude zero autocorrelation (CAZAC) sequences in order to allow power efficient EWS detection which will be explained in more detail below. CAZAC sequences have been chosen due to their excellent correlation properties in time and frequency domain as well as their band-limited spectrum behavior. Normal EWS operation (i.e. no emergency is occurring) is signaled by transmitting the first CAZAC sequence. In case of an emergency event, the second sequence is transmitted. An EWS receiver then performs EWS decoding to find out the details about the EWS event. Further information about the type of emergency and the details may be contained in the L1 signaling information or in the EWS signaling data as proposed herein and as will be explained below.

The SigSeq is extremely robust and also enables receivers in a low power state to monitor the preamble symbol with low power consumption only to see whether there is an emergency. This is in contrast to other systems, where the emergency is contained in the transport stream and the receiver must decode the entire signal in order to detect an emergency.

Embodiments of the present technique can also provide an arrangement in which the choice of signature sequence is in itself a signaling message representing information such as the presence or absence of a warning message within the layer one signaling data or payload. An example of a transmitter for generating a preamble symbol which includes signaling messages according to the present technique is shown in FIG. 8.

The transmitter comprises means to adapt the transmitted preamble to convey additional signaling messages. The general layout and function of the various general elements of the transmitter will be explained below with reference to FIG. 16 so that mainly the essential differences will be explained and the same parts as the transmitter of FIG. 16 have the same numerical references.

Figure 8A:
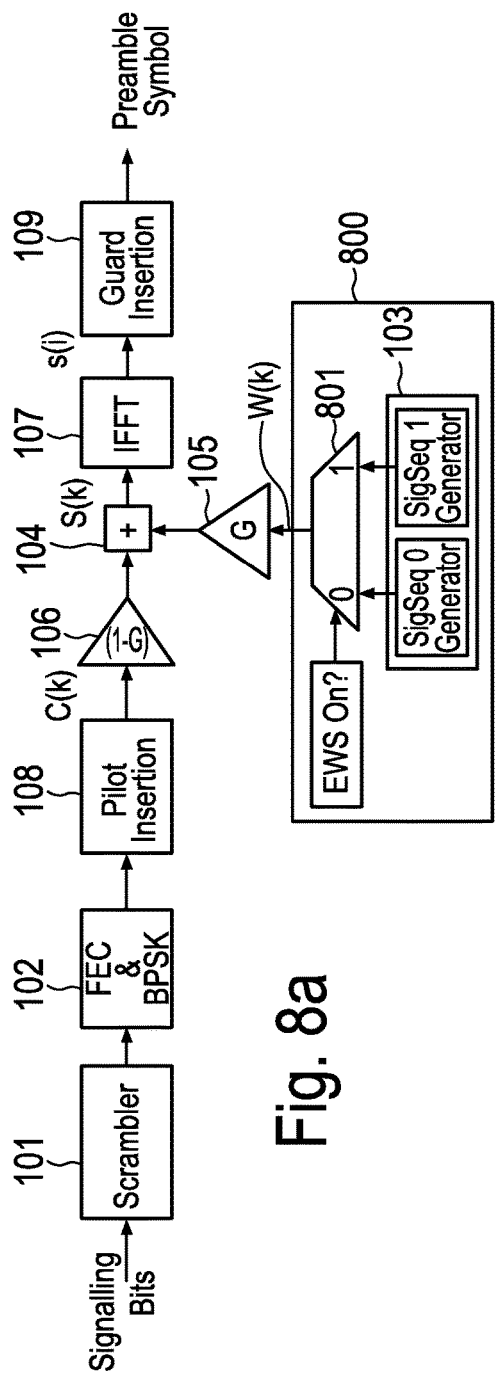
FIG. 8 shows embodiments of a transmitter including means for generation of an EWS detection signal.

As shown in a first embodiment shown in FIG. 8*a*, the signature sequence generator 103 forms part of a signaling sequence processor 800 which in one embodiment includes, with the signature sequence generator 103, an EWS flag generator 801 that generates an EWS flag representing the signature sequence.

Figure 8B:
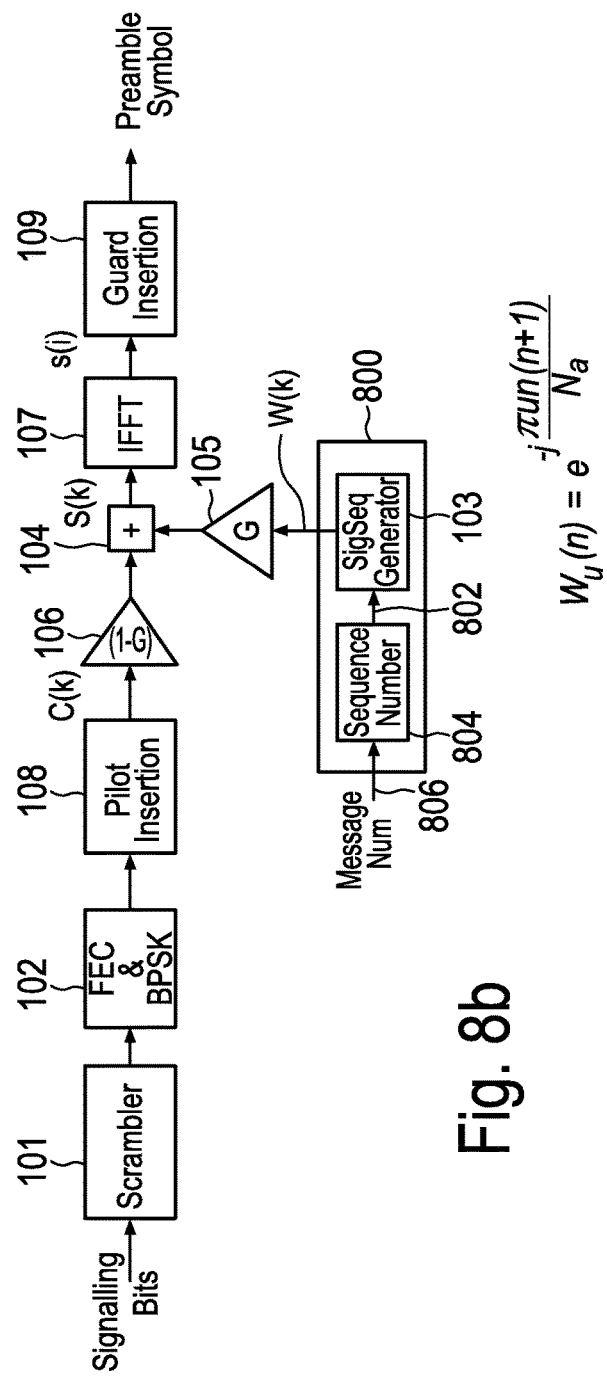

In an alternative, more advance embodiment shown in FIG. 8*b* a sequence number controller 804 is provided with the signaling sequence processor 800. The input 802 to the signature sequence generator 103 receives the output from the sequence number controller 804. The sequence number controller input 806 represents the message that the transmitter would like to convey to receivers within the network. The signature sequence generator 103 is configured to be able to generate one of N+1 possible sequences. A given number $0 \leq i \leq N$ on the input 802 of the signature sequence generator 103 causes the signature sequence generator 103 to output the sequence whose cardinal number is i from amongst its set of signature sequences. The output of one or other of the signature sequences from generator 103 conveys a pre-determined message to all receivers in the network that receive the signal. In one example the message represents an early warning signal (EWS). In this example, N=1. For example, when there is need to convey an early warning signal (EWS) to all receivers, the input 806 to the signature sequence processor 800 carries a 1. Accordingly, the sequence number controller 804 outputs '1' onto input 802 of the signature sequence generator 103 which effect is to cause the signature sequence generator 103 to generate signature sequence number 1 and output this to the gain block 105. When there is no EWS to be conveyed, the input 806 to the signature sequence processor 800 carries a '0'. Accordingly, the sequence number controller 804 outputs '0' onto input 802 of the signature sequence generator 103 which effect is to cause the signature sequence generator 103 to generate signature sequence number zero and output this to the gain block 105. In this example, all receivers within the network detecting signature sequence '1' determine that this represents an EWS further information about which is carried in the EWS signaling data. The receiver can then take further action to decode and interpret the emergency information. On the other hand, receivers detecting signature sequence number zero would determine that there are no current emergencies imminent and so continue to regularly decode and display the audio-visual information in the payload of the frame. In another embodiment continuous service decoding could be provided in case of emergencies.

In another example the signature sequence generated by the signature sequence generator 103 is one of a predetermined set of sequences which represent as many messages as there are signature sequences generated by the signature sequence generator 103. In order to communicate each of these messages the message number of input 806 is arranged to be the required signature sequence number which the signature sequence generator 103 uses to select one of the signature sequences from its predetermined set of signature sequences. The selection of the signature sequence is therefore representative of a different one of a corresponding predetermined set of messages which thereby conveys information which may be a particular warning message, such as a tsunami warning or may be a message for a different purpose. Each message can provide different information. For example in a N=4 message system, message 1 could be an early warning of a possible emergency situation, such as an approaching hurricane or tsunami while message 2 could be an indication of an all-clear prior to the normal state represented by message 0 which requires no particular action. In an embodiment the early warning signal could trigger the receiver to display a message or audible warning instructing users of the device to evacuate a building for example. Thus a receiver could detect the message 1 and generate audible or visual output to the users to provide a warning. Similarly messages message 3 and message 4 could provide similar broadcast information, such as public safety announcement, radio traffic announcements or flooding. As will be understood, the choice of sequence thereby represents one of the messages selected and therefore conveys information.

Figures 41, 42:
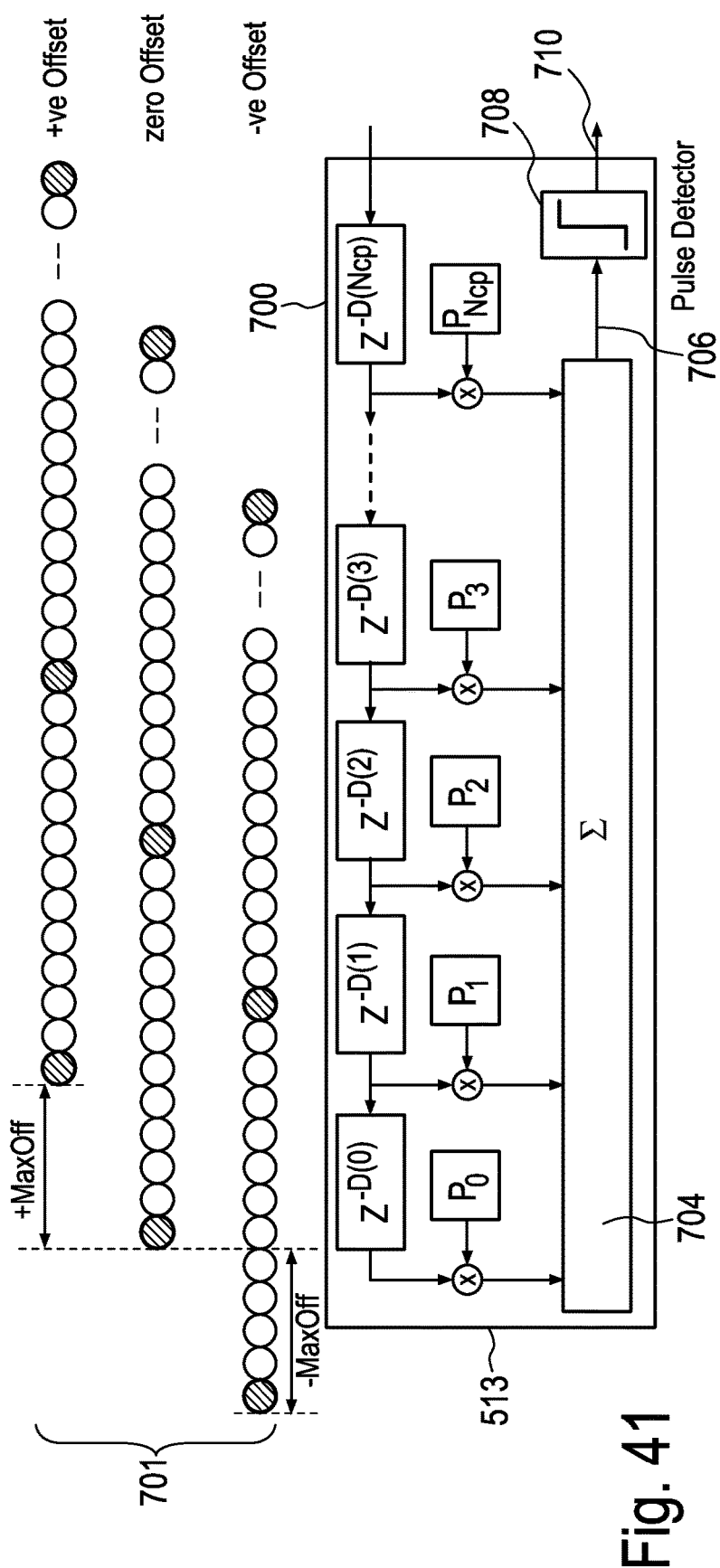
FIG. 41 shows a schematic block diagram illustrating a circuit for detecting a coarse frequency offset in the receiver of FIG. 37a, FIG. 42 shows a table showing example parameters of operation of the transmitter shown in FIG. 8b.

Returning to FIG. 8 and assuming a system with N=1 which represents a system with only one message for example one with only 'normal operation' and 'impending disaster' messages, the table shown in FIG. 42 shows example parameters for generating the two signature sequences required. To generate each sequence, the sequence generator 103 will use the corresponding set of parameters {u, Na} in the CAZAC sequence generator equation shown.

Figure 43:
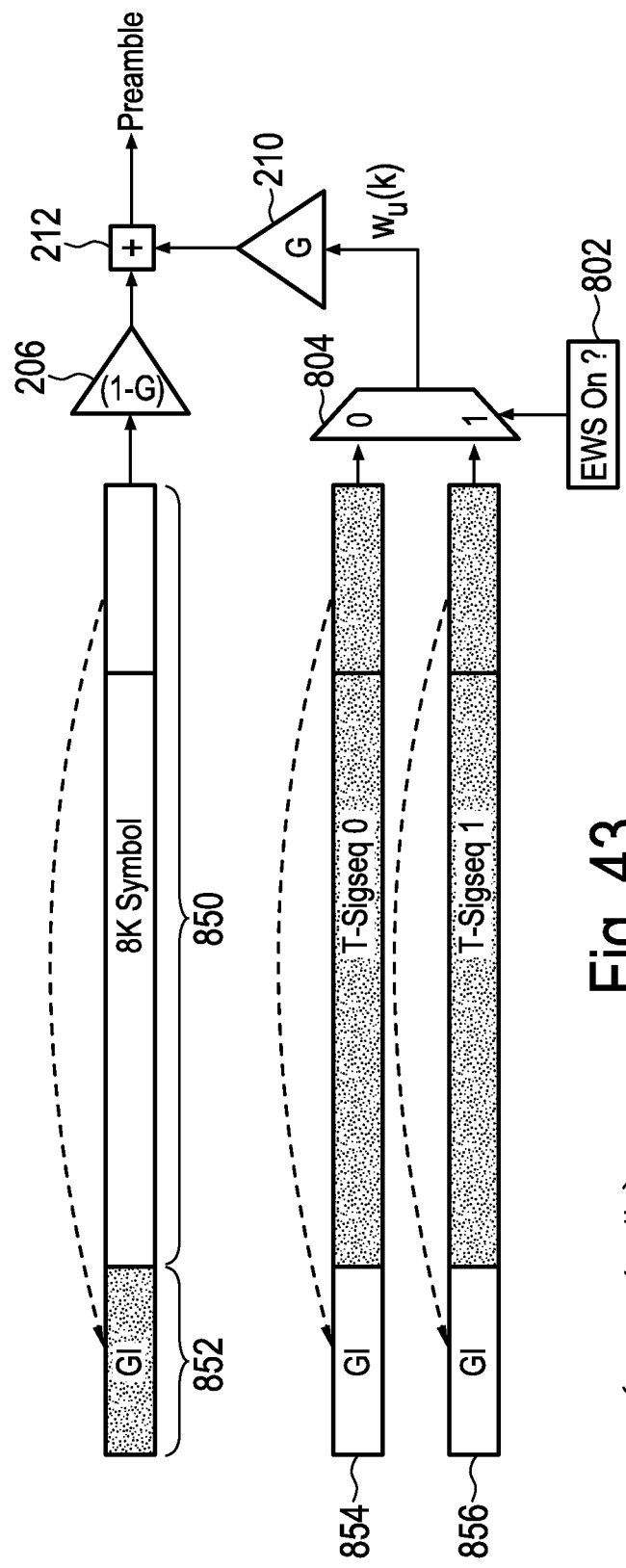
FIG. 43 shows a schematic block diagram and part operational diagram schematically illustrating a formation of the preamble OFDM symbol by the transmitter of FIG. 8b.

FIG. 43 provides a conceptual representation of the operation of the guard insertion unit 109 when operating in combination with the signaling sequence processor 800. As shown in FIG. 43, the OFDM symbol for example for 8K mode which is fed to an input of the scaling unit 106 is formed from samples including the useful part of the OFDM symbol 850 and the guard interval samples 852. The first signature sequence 854 or the second signature sequence 856 is selected under the control of the sequence number controller 804. The mapping of the guard interval from the useful part of the OFDM symbol is shown from the examples for the message sequence and the signature sequence 854, 856.

Figure 44:
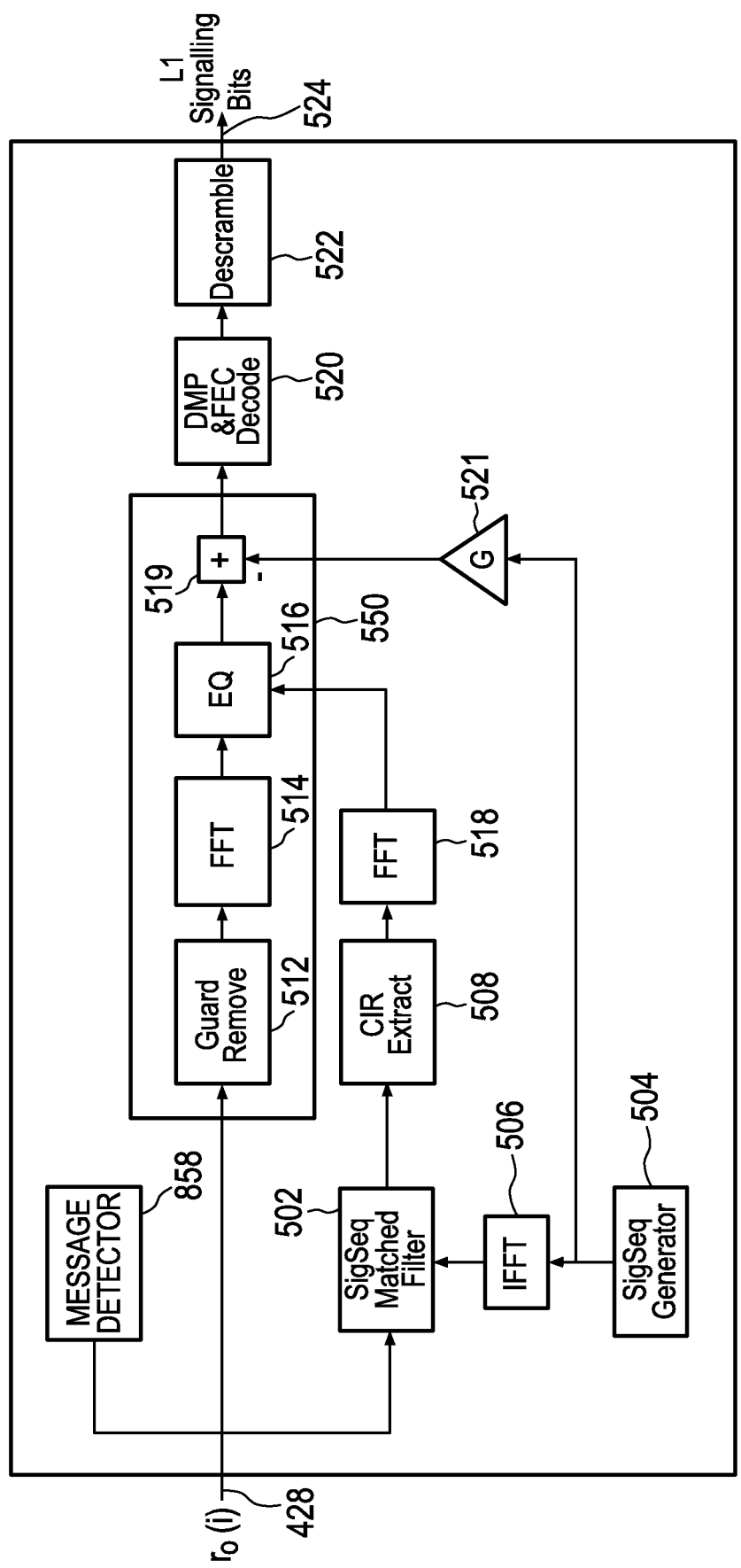
FIG. 44 shows a schematic block diagram of a receiver for detecting a signature sequence of a received signal, which has been transmitted by the transmitter of FIG. 8b.

A receiver which has been adapted in accordance with the present technique to detect and decode a message provided by the message sequence transmitted by the transmitter shown in FIGS. 8 and 43 is provided in FIG. 44. FIG. 44 corresponds to the receiver shown in FIG. 17 for the example of the frequency domain signature sequence removal. However, as will be appreciated a corresponding adaptation can be made to the receiver which removes the signature sequence in the time domain as shown in FIGS. 38 and 39.

Figure 9:
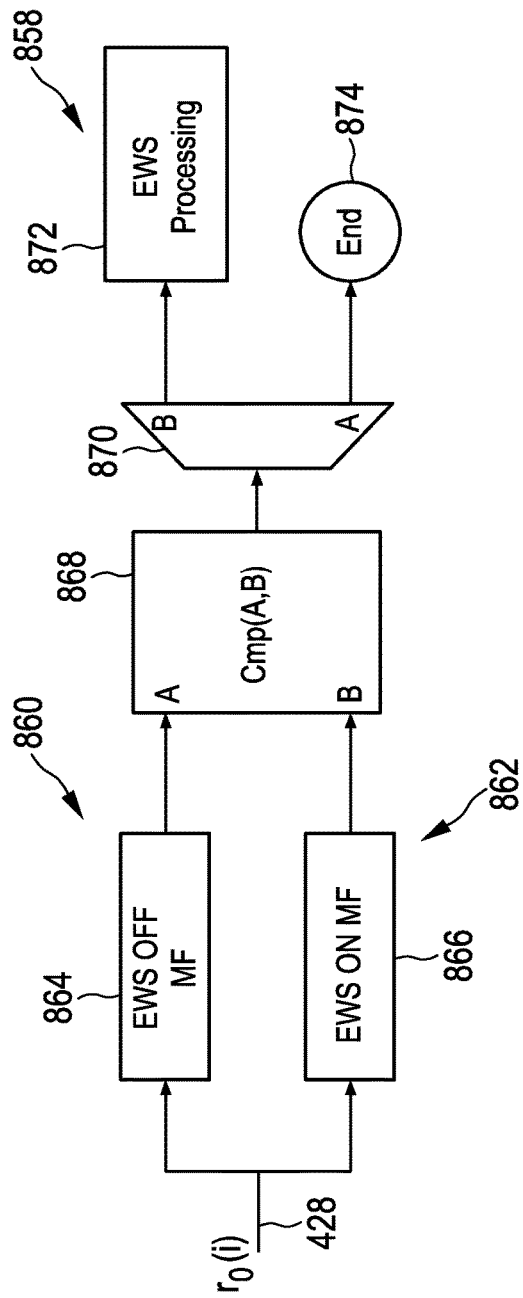
FIG. 9 shows an embodiment of a receiver detection block of the EWS detection signal.
Figure 37A:
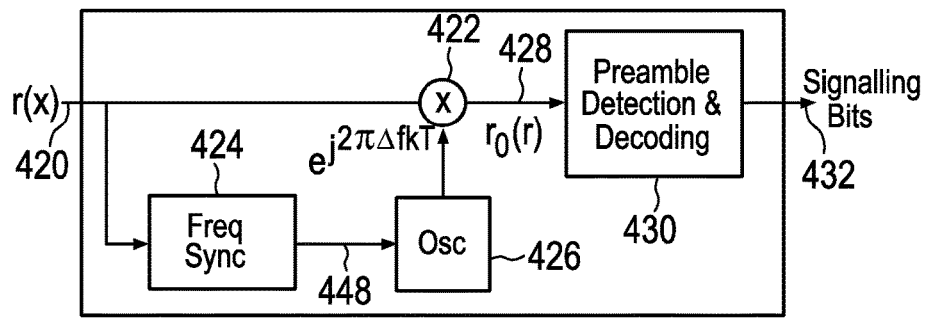
FIG. 37 shows schematic block diagrams of a receiver for detecting and recovering signaling data from a signaling OFDM symbol, of a frequency synchronization detector, of a preamble guard interval, of a coarse frequency offset synchronization detector, and of a differential encoder.

As shown in FIG. 44 the receiver includes a message detector 858. The message detector 858 is shown in more detail in FIG. 9. As shown in FIG. 9 the received signal is fed to the message detector 858 after the frequency offset has been removed by the receiver as shown in FIG. 37*a*. Thus the message detector 858 comprises first and second branches 860, 862 in which two matched filters are present 864, 866. The first matched filter 864 corresponds to the matched filter 502 shown in FIGS. 17 and 38 and has an impulse response which is matched to that of the signature sequence '0' for detecting the preamble symbol in 'normal operation'. The second matched filter 866 is matched to the signature sequence '1' which may be transmitted to provide for example an early warning message. The outputs from the first and second matched filters 864, 866 are fed to first and second inputs of a comparator 868 which outputs an indication as to which of the two signature sequences was better matched to the received signal. Depending upon whether the degree of the better match exceeds a given threshold a selector 870 then initiates further processing of the input data to extract more information about the emergency in unit 872 or terminates at 874. If the preamble symbol is carrying the signature sequence '0' indicating 'normal operation' then no further processing of the signal for emergency extraction purposes is required. However if the EWS sequence is detected then the further emergency processing is in general done by the processor 872.

According to the present technique it will be appreciated that because the signature sequence is designed to be detected first, with the detection of the preamble OFDM symbol in a frame, at lower signal to noise ratios than the payload data, early warning signaling by the method described above can provide an early warning which is more widely detectable than the payload data. Furthermore, because the EWS message can be detected independently of the payload data, a receiver can be configured to detect the EWS message even in a standby state or powered-off state by providing a small amount of power to only the part of the receiver (described above) which is configured to detect the EWS message.

For the example in which more than one (N>1) possible messages may be conveyed, the message sequence matched filter 864 can be adapted as shown in FIG. 45 to include a bank of matched filters 864.1, 864.2, 864.3 etc. For the example shown in FIG. 25, a matched filer 864.1, 864.2, 864.3 is provided for each of the possible N+1 signature sequences corresponding to message 0 ('normal operation), MESSAGE1, MESSAGE2, MESSAGE3, MESSAGE4, to MESSAGE N although it will be appreciated that this is a functional description and a software arrangement could be provided in which a matched filter is adapted to have a different impulse responses for each of the possible signature sequences. The message processor 872 receives the outputs from the respective matched filters 864.1, 864.2, 864.3 via the comparator 868 and the selector 870 and then extracts the appropriate message from the received signal according to which of the matched filters produces the highest output relatively. The output is however compared with a threshold to determine that the message was transmitted to avoid a false alarm due to the presence of noise. The message can therefore be detected by identifying one of the possible sequences of the set of signature sequences. Thus, by identifying the message sequence from a possible set of sequences the information conveyed by the message is identified. In one example the message sequence represents second signaling data, which may represent layer one signaling data and so may be fed to the preamble detector and decoder 430 for detecting and recovering the payload data. For the case of N>1 for every N the syntax of the 256 bits basic EWS data could be different.

According to one example embodiment, the signaling data may be used to identify a type of constellation which is used for carrying the layer one signaling in the signaling OFDM symbol. Thus, the second signaling data carried by the message sequence can represent a modulation scheme, for example, BPSK, QPSK, 16QAM, or 64QAM, which may be represented by different possible sequences of the message sequence. The modulation scheme therefore represents the way in which data has been modulated onto the signaling OFDM symbol. Thus, having detected the synchronization sequence within the received signal to identify the signaling frame, the message processor 872 is used to detect the message sequence, the detected message sequence from for example four possible sequences each representing a different modulation scheme therefore provides the modulation scheme with which data is modulated onto the signaling OFDM symbol. Therefore, the message processor 872 feeds an output signal to the preamble detector and decoder 430 which is arranged to demodulate the data from the sub-carriers of the signaling OFDM symbol to thereby recover the signaling data which may represent layer one data of the preamble OFDM symbol.

For the example in which the message sequence is used to provide user level information such as an early warning message for a public safety broadcast, then the receiver could be arranged to provide power to the preamble detector and decoder 430 even in a powered off state or standby state so that the preamble detector and decoder 430 can be arranged to substantially continuously monitor the signaling messages. In some examples a battery may be used to provide power if the receiver is not connected to a mains electricity supply. In some examples where necessary the matched filter 502 may also be provided with power when the receiver is not in a powered on state so that the message sequence can be detected, although in other examples the preamble detector and decoder 430 may be configured to provide all necessary functionality to detect the message sequence and so may only need to be powered substantially continuously.

Figure 10:
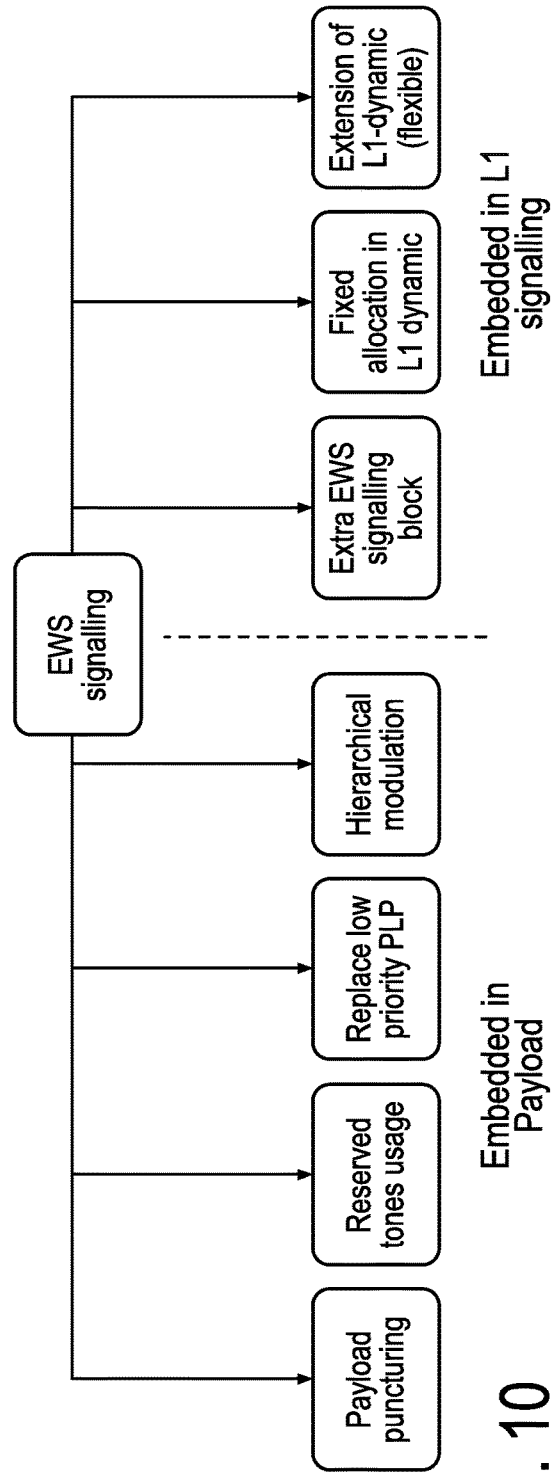
FIG. 10 shows a diagram illustrating different EWS signaling options.

Next, the proposed Emergency Warning system signaling will be described in more detail. In the following, different embodiments to embed the EWS signaling data in the transmission signal are explained. The classification of the different EWS signaling options is summarized in FIG. 10.

Various embodiments for EWS signaling on the payload level will be explained first. In a first embodiment signaling insertion by replacing OFDM subcarriers or particular bits of QAM symbols of a payload PLP is used. In this first approach, the EWS signaling replaces on transmission side in case of an emergency event pre-defined payload subcarriers at known locations of an OFDM symbol. Instead of replacing OFDM subcarriers of an OFDM based transmission systems, analogously, transmission symbols of a single-carrier system can be replaced.

The receiver generally knows (or is informed of, e.g. by signaling from the transmitter) the number of affected carriers and ignores them (i.e. by setting the related LLR values prior to LDPC decoding to 0), and is therefore still able to decode the payload PLP with a small penalty in the required SNR for error free decoding. This is exemplary shown in FIG. 11 (showing a simplified view of a transmitter 900, e.g. without interleaving stages) for a system using elements from a system in according with the DVB-T2 standard with the two signaling stages L1-pre and L1-post at the beginning of the transmission frame (T2-frame) and one payload PLP processed by a FEC payload PLP modulator 902, a QAM mapper 904, a preamble generator 906, a framing unit 908 and an OFDM unit 910. Such a frame is exemplary shown in FIG. 12, particularly showing an EWS signaling block replacing subcarriers of a payload PLP before frequency and time interleaving (in this example, the first PLP after L1 signaling is partly replaced by the EWS signaling block).

For generating and embedding the EWS signaling data into the frames an EWS signaling receiver 912, an FEC EWS signaling modulator 914, a QAM mapper 916 and an EWS embedder 918 are provided. By use of switches 920, 922 the processing chain can be modified such that the EWS signaling data are embedded into the frames.

The EWS signaling block punctures the first OFDM subcarriers of the payload PLP. As one example, this example shows the scheduling of the OFDM subcarriers before frequency and time interleaving, i.e. after frequency and time interleaving the EWS signaling block is spread across the complete interleaving depth for maximum frequency and time diversity.

Of course, the punctured subcarriers may also be at other locations of a frame. Devices in sleep mode that detected the emergency event in the preamble might not be able to decode the EWS signaling after the preamble, since they need some time to power up to full operational mode. The EWS signaling block might therefore be scheduled to a later position in the frame to allow for all required 'waking up' steps (power up, synchronization, channel estimation, buffering, etc.).

The impact of this puncturing for the payload is negligible for large time interleaver sizes, since only a small fraction of the time interleaver frame is affected by the puncturing. The puncturing penalty can be reduced by optimized scheduling, such as:

in case of scheduling without subslicing (so called type 1 PLP for DVB-T2/NGH) schedule the PLP with largest time interleaver frames first for replacement by EWS;

sub-slicing (so called type 2 PLP for DVB-T2/NGH) with short sub slices distributes the puncturing penalty to multiple PLPs;

higher modulation order and code rates of EWS signaling block reduces the puncturing penalty (this is a trade-off between EWS coverage and payload puncturing penalty). However, highest priority needs to be set to a reliable EWS decoding, on the cost of some picture quality.

Figure 13:
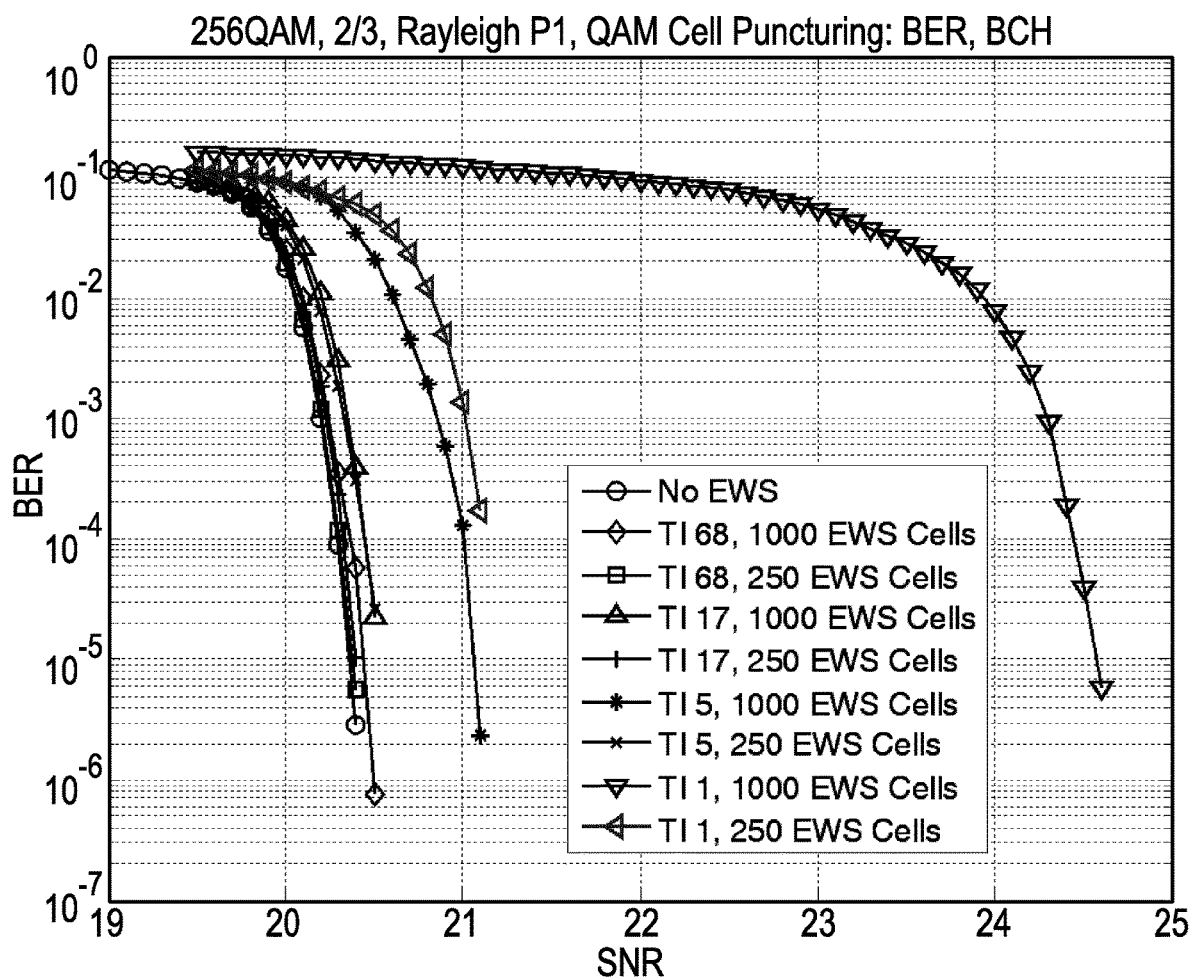
FIG. 13 shows a diagram illustrating the payload PLP BER performance of DVB-T2 for different TI depths.

The puncturing penalty can be reduced if the EWS signaling block only affects a small fraction of the payload PLP. Spreading the EWS over multiple transmission frames is one option, but drastically increases the decoding delay of the EWS system. On the other hand, instead of spreading the EWS, an increased time interleaving size of the payload PLP or the reduction of the size of the EWS signaling block can also reduce the effects of punctured payload. FIG. 13 illustrates the dependency of the payload decoding performance for different time interleaver depths and different numbers of punctured subcarriers by the EWS signaling block. In particular, FIG. 13 illustrates the payload PLP BER performance of DVB-T2 for different TI depths (denoted as multiples of 64 k FEC Frames) and different EWS signaling block lengths (cell=OFDM subcarrier).

So far the puncturing or replacement of complete QAM symbols has been considered. The main advantage is the simple insertion at a very late stage in the processing chain of the transmitter before the frequency interleaver.

As an alternative solution more sophisticated puncturing schemes can be used to reduce the puncturing penalty for the payload PLP(s). One possibility is to puncture/replace only the LSBs of QAM symbols instead of puncturing/replacing the complete QAM symbols. This reduces the puncturing penalty of the payload PLP, since the least robust bits are punctured. The drawback is that this may increases the EWS delay, since more QAM symbols are required to carry the same EWS signaling data amount.

In addition the insertion of the EWS signaling data is more difficult, since already modulated QAM cells have to be altered. The robustness of the EWS signaling block is directly related to the modulation order of the payload PLP, reducing the flexibility of the robustness of the EWS signaling block. Finally, there is a large impact on the scheduling as well as the de-scheduling in case of Multiple PLPs, since the EWS signaling block may be transmitted in PLPs with different modulation orders. The effect of choosing different QAM cell bits for EWS data is as follows: If LSBs are selected, the EWS performance is degraded compared to the payload; if MSBs are selected it is the other way around.

Another solution is to apply the EWS insertion only to the last parity bits of each FEC Frame of a systematic FEC instead of random bits of the payload and the parity bits. For this solution a negligible gain for the payload is expected. Again there is a large impact on the (de)scheduling to find the interleaved subcarriers carrying the corresponding parity bits. Again, the solution may imply an increase in the EWS delay, since more subcarriers are required to carry the same amount of EWS signaling data.

In another embodiment hierarchical modulation of EWS signaling data on a high priority stream is proposed. To illustrate this approach an example shall be given: Let the payload originally use 16-QAM. In order to embed the coded EWS signaling block the constellation size for these QAM symbols is increased to 64-QAM, the EWS signaling data is inserted on the 2 MSBs. Only as many hierarchically modulated symbols as necessary are inserted. As a drawback, one FEC Frame comprises many normal QAM symbols but also some hierarchically modulated symbols.

Another measure to adjust the EWS coverage or robustness is to select the bit-priority of the hierarchical modulation, i.e. selecting MSBs or LSBs. This comes with a slight increase of the payload receiver complexity, as the receiver needs to support the change of modulation order during payload decoding. However there is no related increase in the EWS device complexity (QPSK demapping of 64-QAM to get two MSBs). Another drawback is the fact that Hierarchical Modulation is not possible if the payload already uses the largest possible modulation order. Furthermore the payload bit interleaver is not optimized for the next higher QAM size. This typically results in a negligible penalty. However, the penalty on payload PLP using hierarchical modulation is comparably small.

Figure 14:
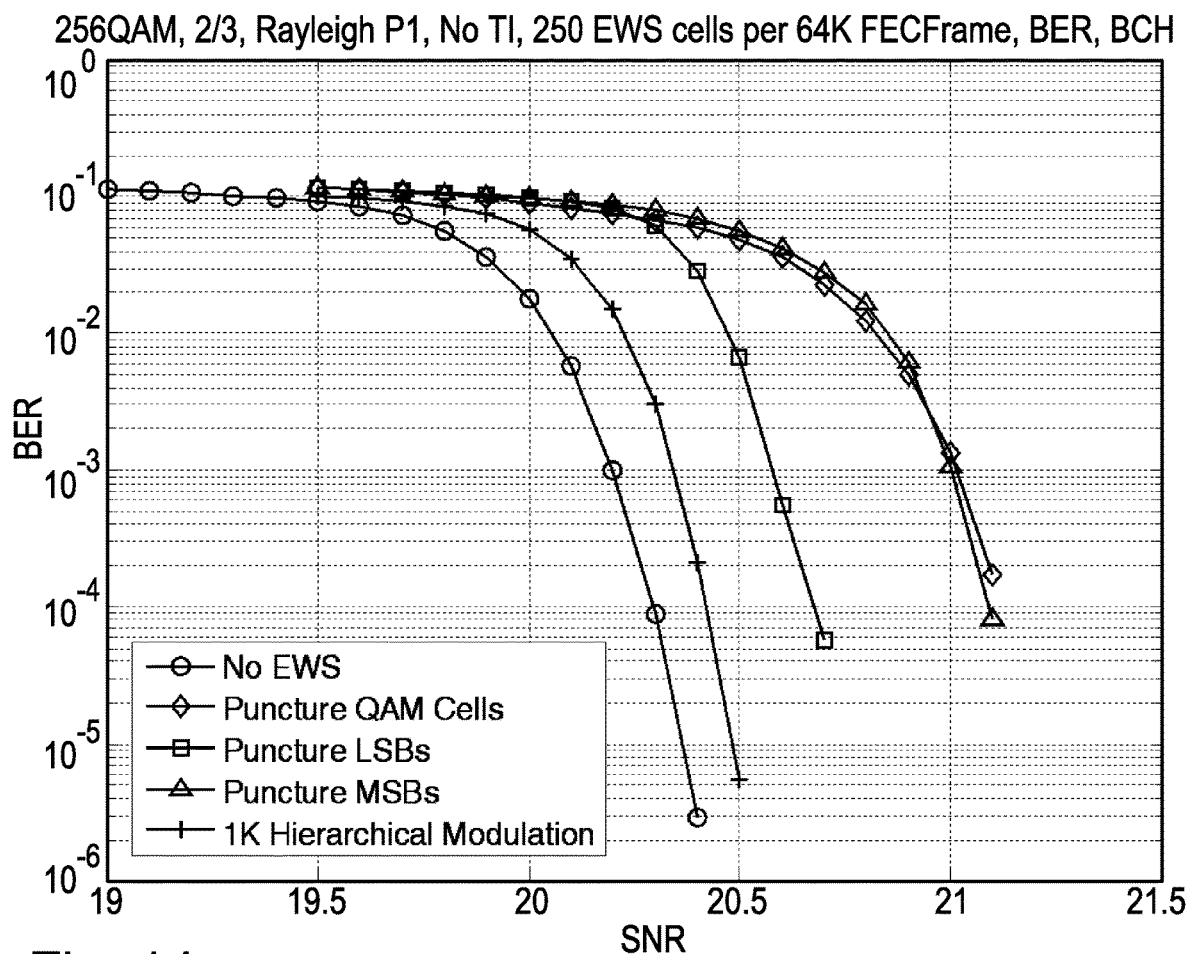
FIG. 14 shows a diagram illustrating the payload PLP performance for different EWS insertion methods.
Figure 15:
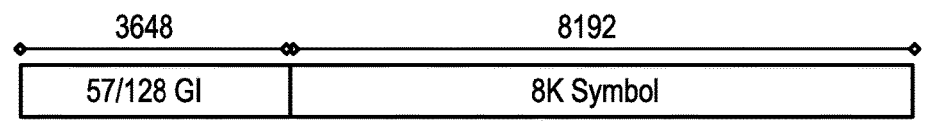
FIG. 15 shows the time domain characteristics of the preamble symbol.

A performance comparison of the above explained payload related options can be seen in FIG. 14 showing the payload PLP performance for different EWS insertion methods.

The use of reserved tones for detection and signaling will now be explained. Reserved tones are used in OFDM based transmission systems such as DVB-T2 to reduce the PAPR (Peak to Average Power Ratio): Roughly 1% of the OFDM subcarriers are adjusted in their complex value by an algorithm to influence the time domain OFDM signal in a positive way, i.e. peaks in the time domain signal are reduced. Basically, it is possible to use the capacity of the reserved tones for the EWS signaling—of course only if an emergency event occurs. Otherwise the reserved tones can be used for PAPR reduction. Therefore, the system remains functional at every time, although having a (slightly, e.g. 2 dB) worse PAPR during EWS events. If the capacity of the reserved tones is not high enough for a single OFDM symbol, the EWS signaling data can be spread across several OFDM symbols (related signaling can be embedded in the L1 data).

Another aspect is that a mechanism based on reserved tones might allow for an emergency event signaling even within a frame, e.g. if a suitable correlation pattern is modulated onto the reserved tones carriers. This has the advantage that for EWS detection the receivers do not need to wait for the next preamble, i.e. the EWS processing delay can be reduced.

In another embodiment it is proposed that the EWS signaling data substitutes a less important PLP. This scenario foresees that the EWS signaling completely replaces one (or more) selected PLP in case of an emergency event. Naturally, the original PLP disappears for the time of an EWS event. However, the operator can select a less important service to be replaced in the seldom event of emergencies. This could be a PLP carrying only audio, video text, shopping channel, service having a low number of users or other associated services. A large negative user experience is therefore not expected, as the service is not consumed by many customers. The definition of the PLP to be replaced can be embedded in the L1 signaling. It is expected that the capacity of any service PLP exceeds by far the data rate requirement for the EWS signaling data. More robust ModCods as well as data repetitions can be applied to increase the EWS signalling robustness as well as to adjust the final data rate.

In still another embodiment the EWS signaling data are part of signaling data. While the above explained embodiments all propose to change the parts of payload symbols or payload PLPs, the following options include the EWS signaling into the signaling part itself. From a functional aspect this is preferred, but comes on the other hand with additional overhead or decoding complexity for the receiver.

Still further, in an embodiment an extra EWS signaling block is provided. For this option, the EWS information is encoded and modulated into a dedicated, standalone EWS signaling block. The modulation and coding is performed similar to the way done for the L1 signaling, i.e. a punctured LDPC with fixed length and code rate is used. The advantage of this solution is that a more robust ModCod can be used for the EWS signaling (although high robustness is tougher to achieve for that short codewords, as robustness generally decreases with decreasing codeword size).

Of course the EWS signaling block is only present in case of emergencies, i.e. normally it comes without overhead. In an embodiment the presence of the EWS signaling block in case of emergencies is signaled in the L1-dynamic signaling (e.g. as a 1 bit flag). The modulation of the EWS signaling block is signaled in the L1-config part, which allows for different robustness levels as well as independent EWS coverage planning with respect to payload.

In a rather simple embodiment without additional complexity but fixed overhead the required EWS signaling data capacity is allocated in the L1 signaling (e.g. 256 bits). The advantage is that no dynamic handling is required which eases receiver implementation significantly.

Instead of a self-contained EWS signaling block as described above, the L1-dynamic signaling could also be extended only in case of emergencies by the required amount of EWS signaling data Again, in regular operation without emergencies there is no overhead. However, this dynamic handling has also some drawbacks, as the L1-dynamic block length becomes flexible. A major impact is on scheduling since additional capacity needs to be integrated dynamically on the short term; and the L1-pre becomes flexible since the L1-dynamic length must be signaled for every frame.

In still another embodiment the OFDM carrier extension is used for transmitting EWS signaling data. This option basically proposes to insert the EWS signaling onto a limited number of additional OFDM subcarriers (preferably exclusively on payload symbols, but not on signaling or preamble symbol(s)) on a limited number of payload symbols (i.e. EWS information is inserted only on a few payload symbols per frame. Alternatively EWS signaling is repeated to have them on all payload symbols per frame). Due to the very limited amount of necessary subcarriers per payload symbol the spectrum characteristics and masks are de facto not or only marginally affected.

Figure 32:
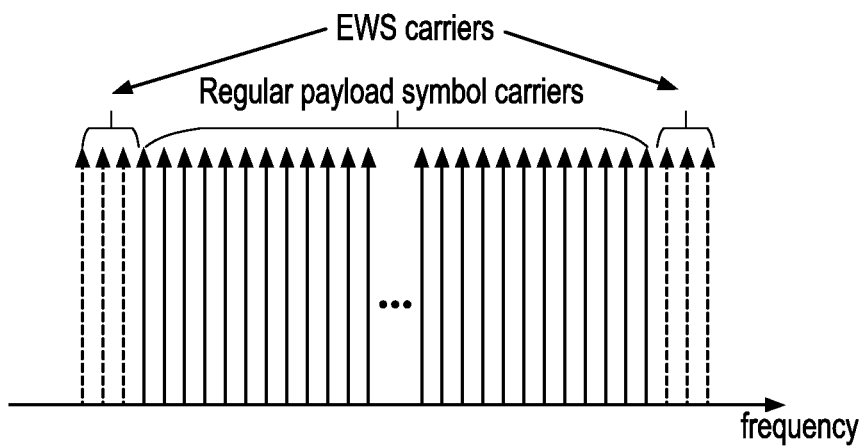
FIG. 32 shows a diagram illustrating the insertion of EWS carriers on the edges of payload symbols.

In the simplest version the carriers are added on the edges of the regular spectrum of the payload symbols. FIG. 32 shows the principle. The main advantages of this solution are that the subcarriers of the payload symbols carrying the payload data can be decoded in the exactly same way as before, i.e. no change in pilot and payload carrier allocation. Further, the transmitter IFFT easily allows embedding the few additional subcarriers. Still further, only marginal changes are required in the receiver, i.e. the original decoding chain is almost unchanged and only a non-complex EWS decoder is required in addition.

The following examples illustrate possible configurations:

Example 1

A 32 k FFT is used per 6 MHz channel. i.e. the carrier spacing is approximately 209 Hz, which results in a symbol duration of approximately 4.8 msec (=1/(carrier spacing)). In this example 256 bits basic EWS signaling data are modulated with QPSK code rate ½, i.e. 256 subcarriers are required to carry this basic EWS signalling information. These 256 required subcarriers might be spread across 8 symbols, 16 subcarriers on each spectrum edge. The resulting EWS signaling period is therefore 38.2 msec. The extension of the bandwidth is very marginal: 6.7 kHz, i.e. only approximately 0.12% of the current channel bandwidth.

Example 2

32 k Tx FFT size per 6 MHz channel as in example 1, but now all 256 EWS basic bits are added onto a single payload symbol. The required additional bandwidth increases to 53.5 kHz, i.e. approximately 1% of the channel bandwidth. The signaling period is in this example reduced to 4.8 msec.

Example 3

8 k Tx FFT size instead of 32 k FFT size per 6 MHz channel. As 8 k symbols have only ¼ symbol duration compared to 32 k symbols, the number of payload symbols to spread the EWS information can be increased, in order to achieve a similar bandwidth extension and a similar latency.

The channel estimation for the EWS carriers at the spectrum edges allows for a simple implementation, especially as the EWS signaling data is very robustly modulated and encoded (e.g. QPSK CR ½). The channel estimation could therefore be based on the existing pilots of the regular payload symbol: The channel for the EWS carriers at the spectrum edges is estimated by extrapolation from the regular payload symbol and its pilots. Alternatively, the EWS signaling data is modulated with differential QPSK (DQPSK): From the edge pilot, every following EWS carrier can be estimated from the previous carrier. No dedicated channel estimation is required.

The drawback of the upper solution is the lacking frequency diversity of the EWS carriers, i.e. they might not be decodable if the few EWS carriers fall into a low SNR region within a fading channel.

Figure 33:
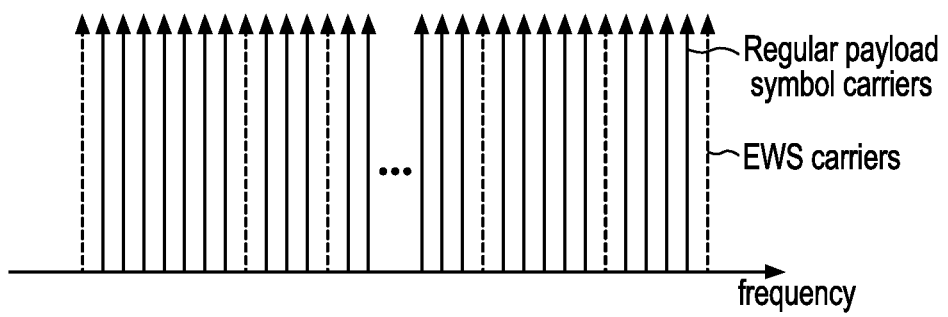
FIG. 33 shows a diagram illustrating the insertion of EWS carriers that are spread within payload symbols.

Therefore, in another embodiment it is proposed that the EWS carriers are spread across the other subcarriers as depicted in FIG. 33. The overall number of subcarriers per OFDM symbol remains constant in comparison to the upper previous embodiment. Potentially the pilot structure and location might need to be adapted to ensure proper channel estimation for all subcarriers. However, this is straightforward if the extension is carried out with a multiple of the pilot spacing.

Figure 11:
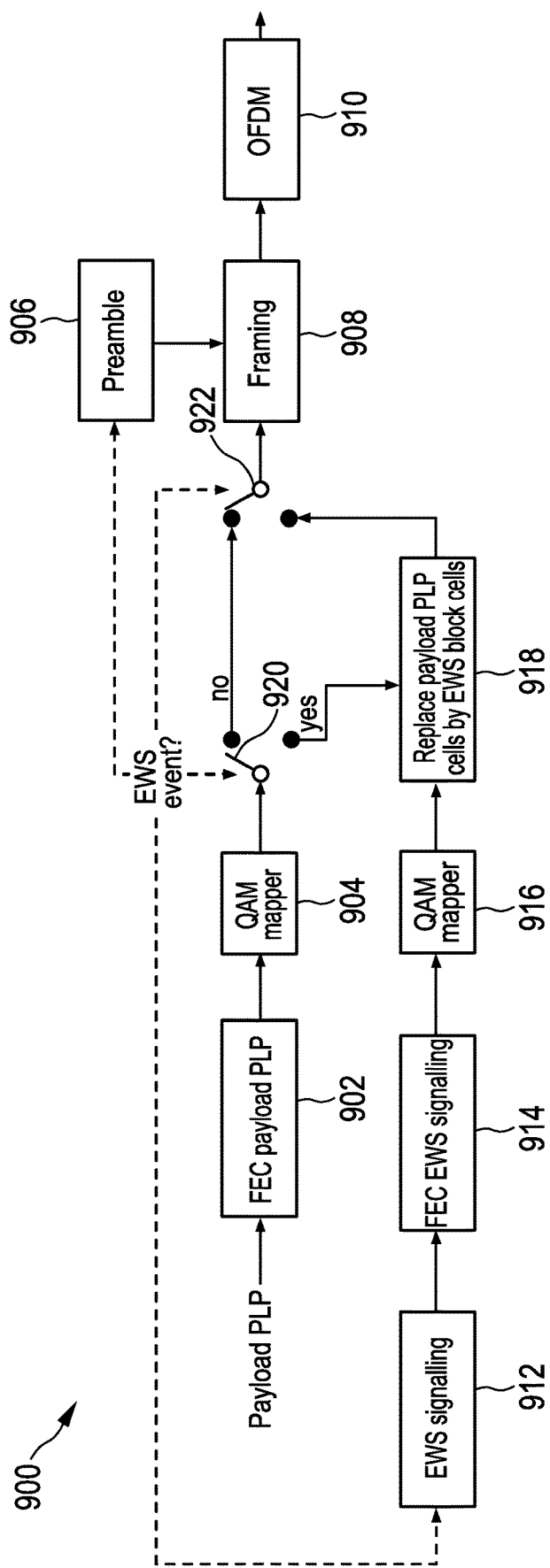
FIG. 11 shows an embodiment of a transmitter including means for generation of EWS signaling data.
Figure 12:
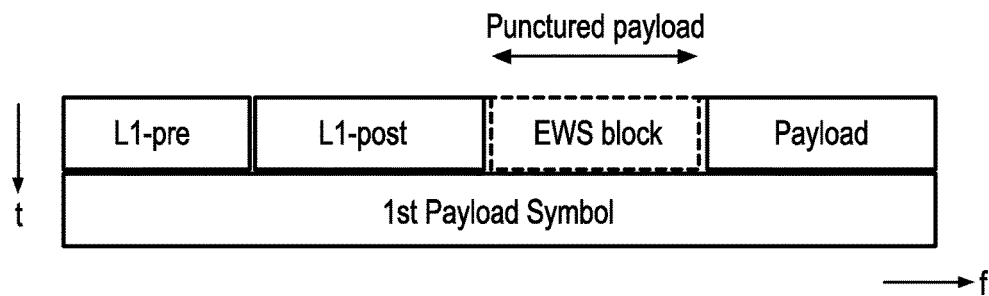
FIG. 12 shows an embodiment of the embedding of EWS signaling data into a transmission symbol.
Figure 34:
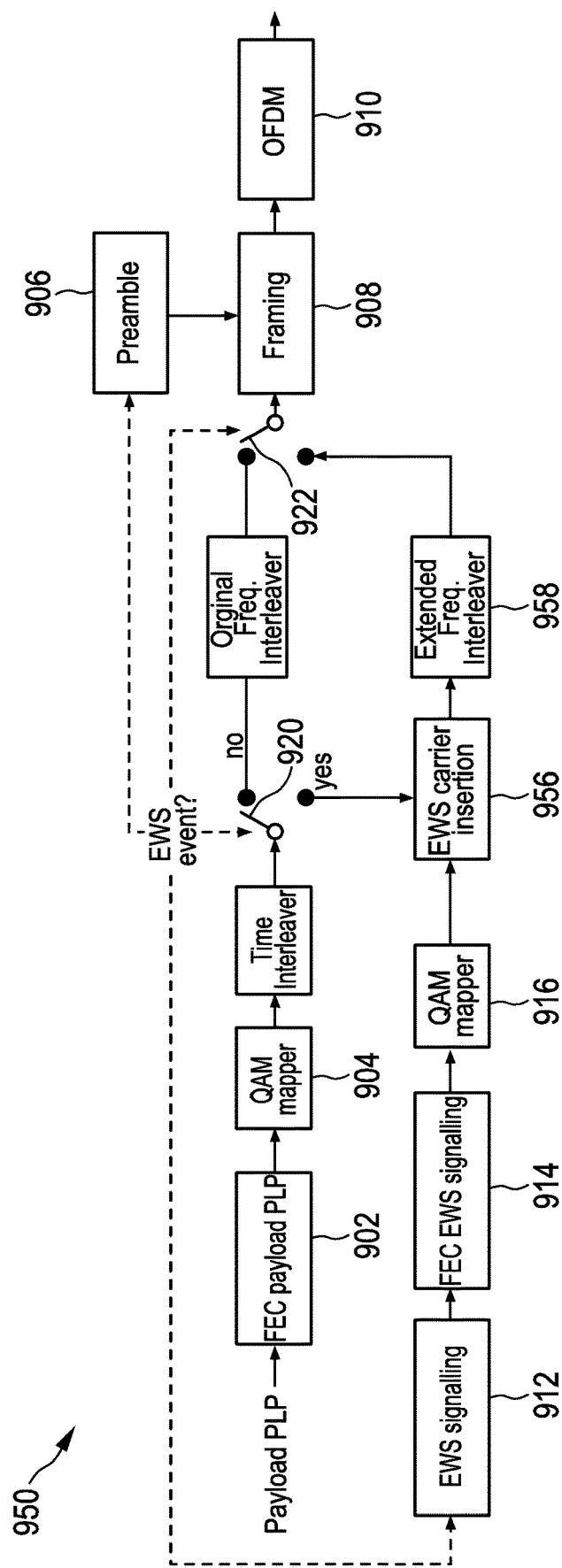
FIG. 34 shows another embodiment of a transmitter including means for generation of EWS signaling data.

One simple possibility for inserting EWS carriers in a distributed way in the frequency domain is to use an extended frequency interleaver, which works during emergency events across the new extended number of subcarriers, while the regular frequency interleaver is used during normal operation. A schematic diagram of a transmitter 950 including means for insertion of EWS signaling data with the help of an extended frequency interleaver is shown in FIG. 34. In addition to the elements of the embodiment of the transmitter 900 as shown in FIG. 11. It comprises a time interleaver 952 and a frequency interleaver 954 in the "normal" processing chain and an EWS carrier insertion unit 956 and an extended frequency interleaver 958 for embedding of the EWS signaling data onto additional frequency subcarriers.

In an embodiment the content of "basic EWS signaling data" is:
Emergency No.—up to 16 emergencies can be handled: 4 bits
Type—up to 256 different emergency types: 8 bits (Not just earthquake)
Predefined messages (up to 64): 6 bits
Location (longitude and latitude): 32 bits
Reference ISDB-T EWS: 23 bits
Broadcast location (multiple areas are always affected): 64 bits (Basically County Information (ISDB-T EWS: 56 bits). US situation: The average number of counties per state is 62; the state with the most counties is Texas (254); the state with fewest is Delaware (3))
Time of disaster (or of information): 16 bits (Reference: 10 bits for ISDB-T EWS)

Link to other PLP(s) containing detailed info: 32 bits (4 links per emergency?)
For each link, type of info (2 bits), PLP ID (4 bits): 8 bits
Check (parity check coding/CRC etc.): 32 bits
Total: max. 256 bits (cycle through each emergency number in turn)

In the proposed ATSC3.0 frame structure, which will be explained in more detail below, OFDM symbols in different physical layer frames may have different subcarrier spacing. Frequency domain frame synchronization in (preamble detection) is thus not readily possible. The preamble symbol (as generated by the L1 signaling unit 15) must therefore be detected in the time domain. It is only after the preamble is decoded and its signaling payload interpreted that frequency domain processing of the frame can proceed. The new preamble fulfills all specific requirements:
Synchronization capabilities;
Offset correction capabilities;
Robustness of signaling;
Protection against interference.

The same preamble is used for all frame types. As shown in FIG. 14 (showing the time domain characteristics of the preamble symbol) it consists of a regular 8 k symbol with an extended guard interval GI (fractional length 57/128). This GI is chosen to map to the longest possible guard interval for a 32 k EFT size, i.e. 57/512). ISI avoidance for all frame types is therefore guaranteed.

For the standard bandwidth (i.e. 6 MHz), the preamble symbol allocates 6912 subcarriers and contains 45 frequency offset estimation pilots at the same locations as the continual pilots of a payload symbol. No other pilots are foreseen. The 6867 payload carriers use BPSK modulation for L1 signaling.

The preamble symbol uses an overlaid time domain pilot signal (SigSeq). This requires good ACF (auto correlation function) properties that allow for accurate frame synchronization and channel impulse response (CIR) estimation. The full-band Channel Transfer Function estimation at the receiver is accordingly calculated from the CIR.

The SigSeq consists of one of two possible constant amplitude zero autocorrelation (CAZAC) sequences in order to allow power efficient EWS. CAZAC sequences have been chosen due to their excellent correlation properties in time and frequency domain as well as their band-limited spectrum behavior. Due to the fixed size of the guard interval the search for preamble can be limited to Ng samples (i.e. the number of samples of the guard interval).

Figure 16:
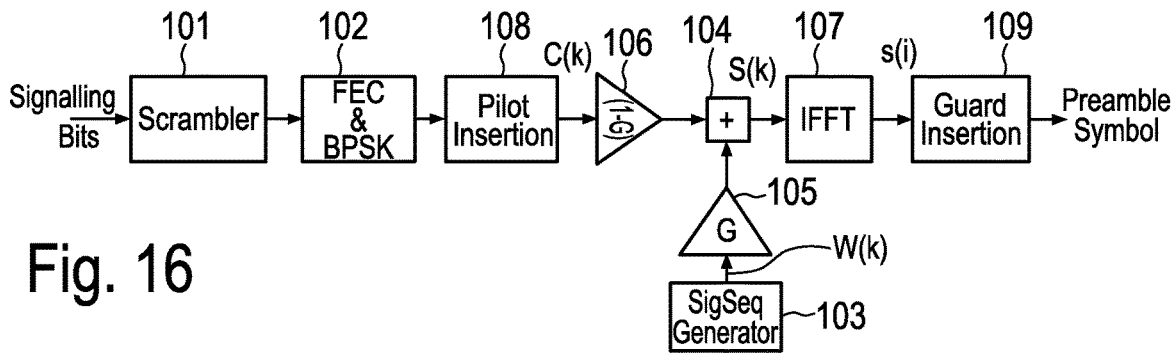
FIG. 16 shows an embodiment of a transmitter side time-domain approach for the generation of the preamble symbol.

FIG. 16 illustrates the transmit side generation of the preamble. The scrambling of the signaling bits in the scrambler 101 ensures that the PAPR of the preamble symbol will not be excessive due to many similarly modulated OFDM subcarriers. The scrambled signaling bits are then FEC coded with a 4K LDPC code at a low code rate (¼ or ⅕) prior to mapping to a low order constellation ((D)BPSK or (D)QPSK) in a FEC and BPSK unit 102. Afterwards, the SigSeq sequence generated in a SigSeq generator 103 is added in a combiner (e.g. an adder) 104. Different amplitude ratios can be applied: Each sample is scaled by a term G in a first scaling unit 105 and the corresponding input sample is scaled by (1−G) in a second scaling unit 106 so that the power of the composite preamble symbol should remain the same. P=(1−G)/G=8 dB is proposed as best possible value.

The IFFT unit 107 follows pilot insertion in a pilot inserter 108. The pilots inserted at this stage are not for channel estimation. This is then followed by the insertion of the guard interval by a guard interval inserter 109 which is a cyclic prefix of the preamble OFDM symbol. After guard interval insertion, a normal OFDM time domain symbol of duration Ts=Tu+Tg made up of Ns=Nu+Ng complex samples has been made up, where Tu is the useful symbol period with Nu samples and Tg is the guard interval duration with Ng samples.

Figure 36:
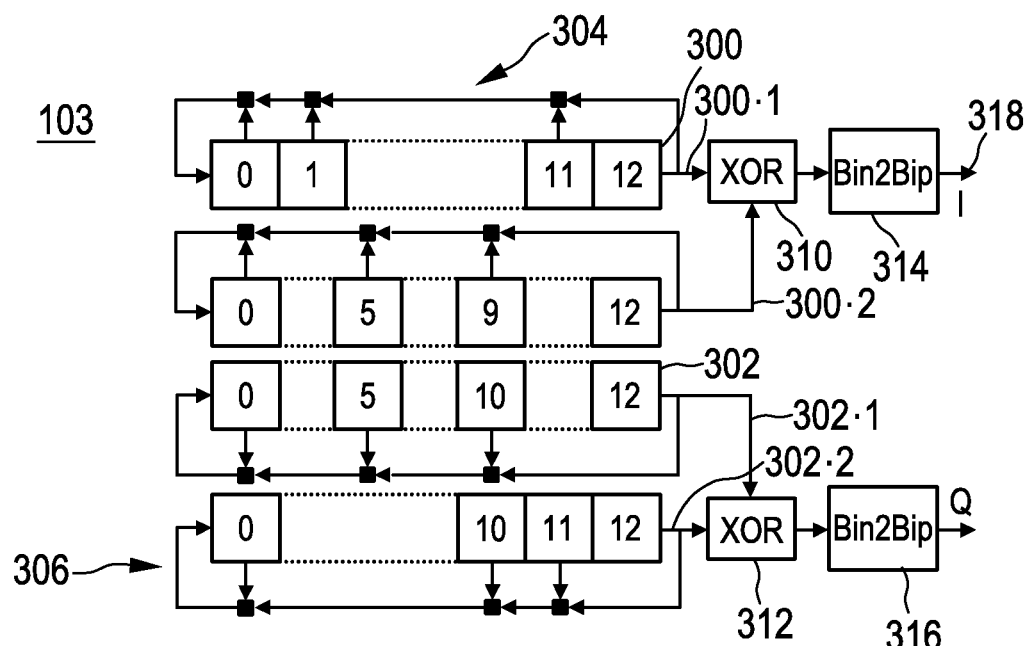
FIG. 36 shows a schematic block diagram of a signature sequence generator according to one embodiment.

One example of the signature sequence generator 103 shown in FIG. 16 is shown in more detail in FIG. 36. FIG. 36 is arranged to generate a complex signature sequence which is added to the complex samples of the signaling OFDM symbol by the combiner 104 shown in FIG. 16.

In FIG. 36 two linear feedback shift registers are used in each case to generate a pair of pseudo random bit sequences for the in-phase 300.1 and 300.2 and quadrature 302.1 and 302.2 components. In each case, the pseudo-random bit sequence pair is combined using exclusive-OR circuits 310, 312 to produce the Gold sequences for the in-phase (300.1 and 300.2) and quadrature (302.1 and 302.2) part of the signature sequence, respectively. A binary to bipolar mapper unit 314, 316 then forms respectively a sample for the in-phase 318 and quadrature (imaginary) 320 components of the signature sequence. Effectively, the arrangement shown in FIG. 36 generates Gold codes formed by XORing two m-sequences. The m-sequences are generated by the linear feedback shift registers 300, 302. The table below shows the generator polynomials for the linear feedback shift registers according to the example shown in FIG. 36:

| Sequence Name | Generator polynomial |
| --- | --- |
| R_seq1 | $x^{13} + x^{11} + x + 1$ |
| R_seq2 | $x^{13} + x^9 + x^5 + 1$ |
| I_seq1 | $x^{13} + x^{10} + x^5 + 1$ |
| I_seq2 | $x^{13} + x^{11} + x^{10} + 1$ |

As shown in FIG. 16, the scaler 105 multiplies the signature sequence by a factor G and the scaler 106 multiplies the signaling OFDM symbol by a factor 1−G. As such, if the time domain signaling OFDM symbol signal is c(n) while the signature sequence signal is f(n), then the composite transmitted preamble symbol s(n) is given by s(n)=(1−G)c(n)+Gf (n) where G is the scaling applied to the signature sequence. The signature signal effectively adds distortion to the signaling OFDM symbol thereby increasing the bit error rate of the signaling OFDM symbol at the receiver. Furthermore, with a normalised power of 1, the composite symbol in effect distributes power between the signature signal and the signaling OFDM symbol signal. With a high value for G, the signature signal has more power and so frame synchronization (detection of the preamble) at the receiver should be achieved at a lower signal to noise ratio. However, reducing the power of the signaling OFDM symbol (in order to increase the power of the signature signal) also means that error-free decoding of the signaling information itself becomes more difficult at the receiver as the signal-to-noise of the signaling OFDM symbol has fallen. Therefore, an optimum value for G has to be a compromise between these conflicting aims. It can further be defined P=(1−G)/G which is proportional to the power ratio between the signaling OFDM symbol and the signature signal. An appropriate value for G can be set by experimenting with this power ratio P.

At first detection, the signaling or preamble OFDM symbol may have to be decoded in the presence of any tuning frequency offsets introduced by tuner 52. This means that either the signaling data should be modulated onto the preamble OFDM symbol in a manner that reduces the effects of any frequency offsets or resources are inserted into the preamble symbol to allow the frequency offset to be estimated and then removed prior to preamble decoding. In one example the transmission frame may only include one preamble OFDM symbol per frame so the first option is difficult to achieve. For the second option, additional resources can be in the form of frequency domain pilot subcarriers, which are inserted into the OFDM so that these can be used to estimate the frequency offset and common phase error. The frequency offsets are then removed before the symbol is equalized and decoded. In a similar vein to the insertion of pilots into the data payload bearing OFDM symbols, embodiments of the present technique can be arranged to provide within the signaling (preamble) OFDM symbol pilot subcarriers, which can allow for the estimation of frequency offsets that are larger than the preamble subcarrier when multipath propagation may result in regular nulls of the pilots across the full preamble OFDM symbol. Accordingly, 180 pilot subcarriers can be provided across the 8K symbol with the positions defined a priori. The sub-EFT bin frequency offset is estimated via the detection of the preamble OFDM symbol itself. Accordingly embodiments of the present technique can provide a preamble OFDM symbol in which the number of subcarriers carrying pilot symbols is less than the number which would be required to estimate a channel impulse response through which the preamble OFDM symbol is transmitted, but sufficient to estimate a coarse frequency offset of the transmitted OFDM symbol.

As explained above the preamble is formed by combining an OFDM symbol carrying signaling data with a signature sequence. In order to decode the signaling data, the receiver has to first detect and capture preamble OFDM symbol. In one example the signature sequence may be detected using a matched filter which has impulse response which is matched to the conjugate of the complex samples of the known signature sequence. However any frequency offset in the received signal has an effect of modulating the output of the matched filter and preventing accurate detection of the signature sequence using a match filter. An example receiver for detecting the preamble and recovering the signaling information provided by the preamble in the presence of a frequency offset is shown in FIG. 37a. In FIG. 37a, a signal received from an antenna is converted to a baseband signal, using a conventional arrangement and fed from an input 420 respectively to a complex number multiplier 422 and a frequency synchronizer 424. The frequency synchronizer 424 serves to detect the frequency offset in the received signal r(x) and feed a measure of the offset in respect of a number of subcarriers to an oscillator 426. The oscillator 426 generates a complex frequency signal which is fed to a second input of the multiplier 422 which serves to introduce a reverse of the offset into the received signal r(x). Thus the multiplier 422 multiplies the received signal r(x) with the output from the oscillator 426 thereby compensating or substantially reversing the frequency offset in the received signal so that a preamble detection and decoding unit 430 can detect the preamble OFDM symbol and recover the signaling data conveyed by the preamble which is output on output channel 432.

Figure 37B:
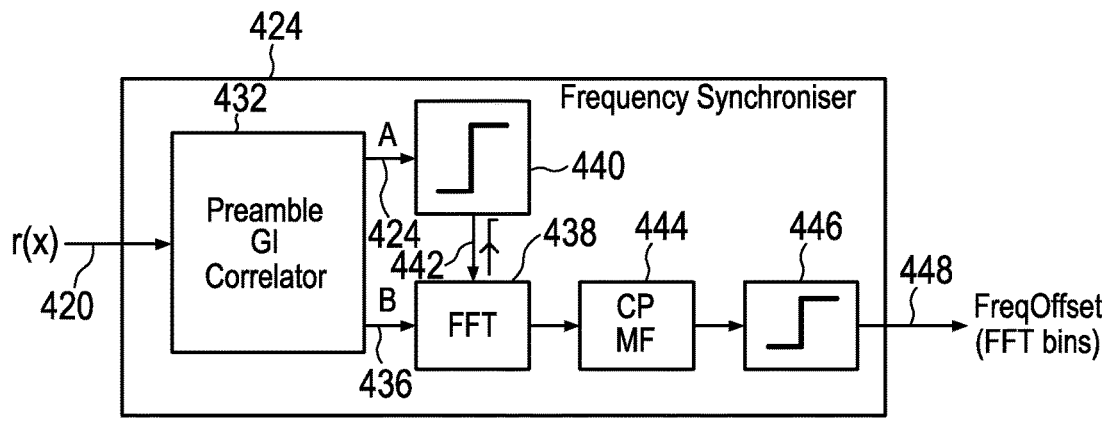

FIG. 37b provides an example implementation of the frequency synchronizer 424 which forms part of the receiver shown in FIG. 37a. In FIG. 37b the received signal is fed from the input 420 to a preamble guard interval correlator 432 which generates at a first output 434 a signal providing an indication of the start of the useful part of the OFDM symbol samples Nu. A second output 436 feeds the samples of the OFDM symbol to a Fourier transform processor 438, but delayed by the number of samples in the useful part Nu. The first output 434 from the preamble guard interval correlator 432 detects the location of the guard interval and serves to provide a trigger signal from a threshold detector 440 to the FFT 438 through a channel 442 which triggers the FFT 438 to convert the time domain samples of the useful part of the OFDM symbol Nu into the frequency domain. The output of the Fourier transform processor 438 is fed to a continuous pilot (CP) matched filter unit 444, which correlates the pilot signals in the received OFDM symbol with respect to replicas at the receiver which are used to set an impulse response of the CP matched filter in the frequency domain. The matched filter 444 therefore correlates the regenerated pilots with the received OFDM symbol and feeds a result of the correlation to an input to a detection threshold unit 446. The detection threshold unit 446 detects an offset in the received signal in terms of the number of FFT bins on channel 448 which effectively provides the frequency offset which is fed to the oscillator 426 for correcting the offset in the received signal.

Figure 37C:
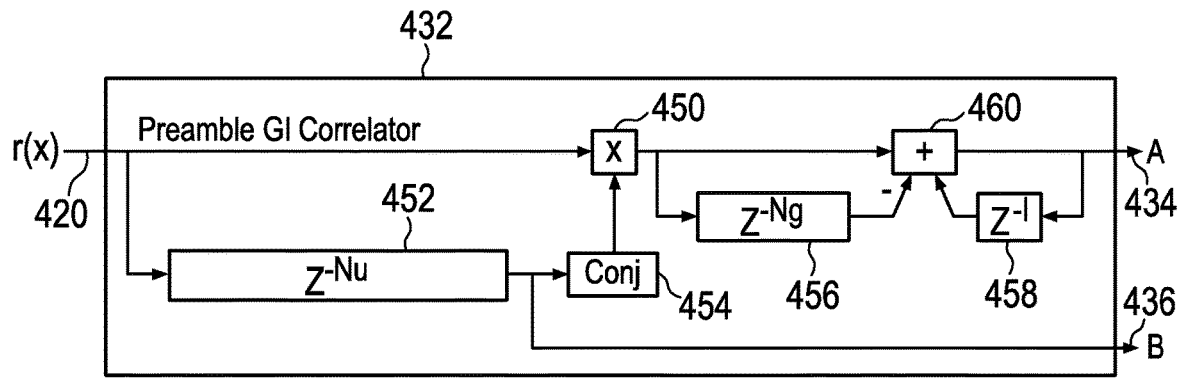

FIG. 37c provides an example of implementation of the preamble guard interval correlator 432 and corresponds to a conventional arrangement for detecting the guard interval. Detection is performed by cross correlating the samples of the received OFDM symbol with themselves after a delay of Nu samples with the cross correlation outputs accumulated over consecutive Ng sample intervals. Thus the received signal is fed from an input 420 to a multiplier 450 and a delay unit 452 which feeds an output to a complex conjugator 454 for multiplying by the multiplier 450 with the received signal. A delay unit 456 delays the samples by the number of samples Ng in the guard interval and a single delay unit 458 delays an output of an adder 460. The adder 460 receives from the multiplier 450 the results of multiplying the received signal with a conjugate of the delayed samples corresponding to the useful samples Nu which is then fed to the adder 460. Together adder 460, delay blocks 456 and 458 implement a moving average filter of order Ng whose effect is to accumulate successive output of the cross-correlator over Ng samples. Thus at a point 434 there is provided an indication of the detection of the useful part of the OFDM symbol by detecting the guard interval period. The output 436 provides the delayed received signal samples which are fed to the FFT in order to trigger the Fourier transform after the guard interval has been detected by the first output 434.

Figure 37D:
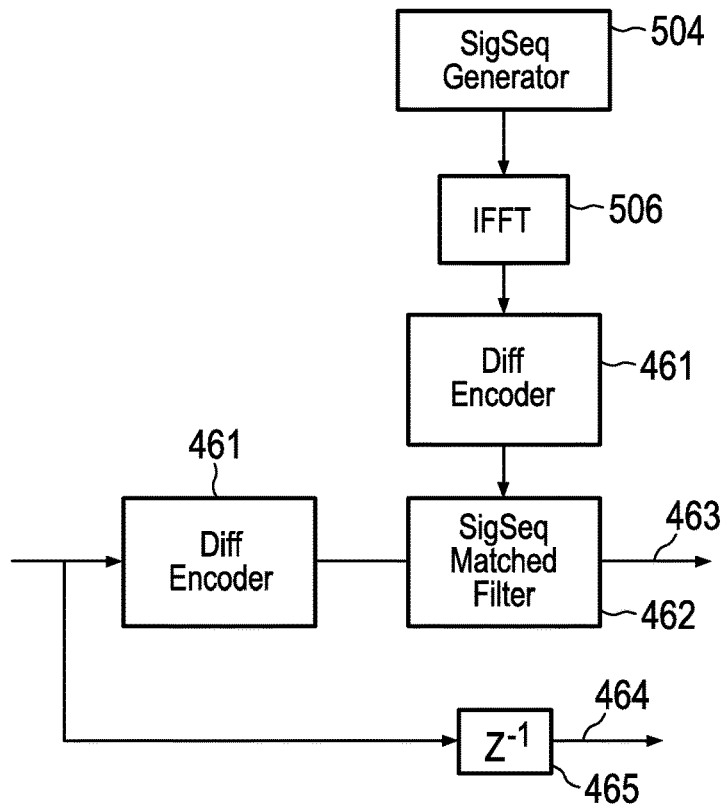
Figure 40A:
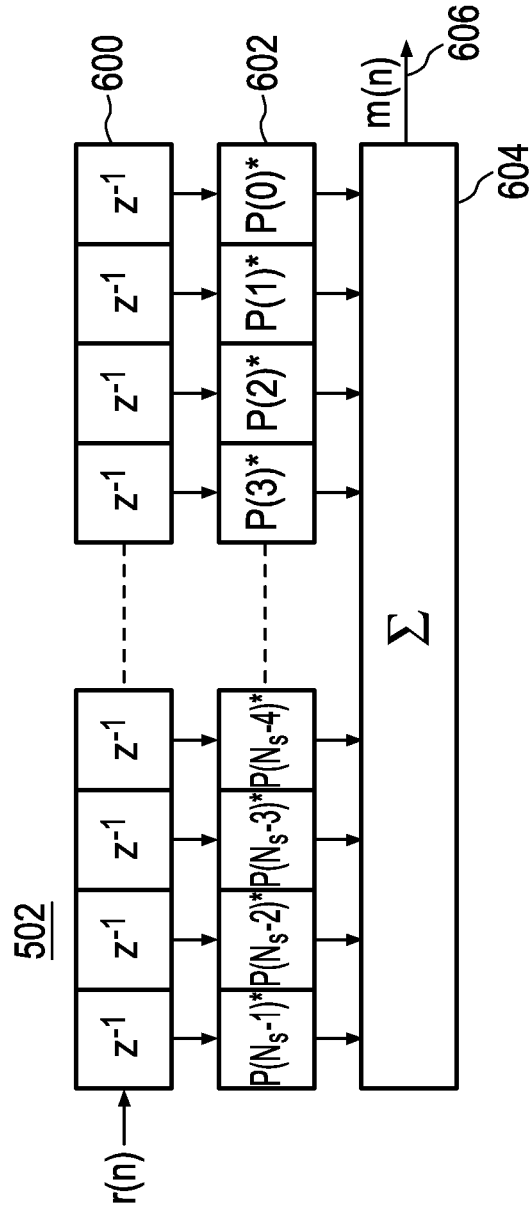
FIG. 40 shows a schematic block diagram of a matched filter and of a signature sequence remover.

FIG. 37d provides another example of implementation of the frequency synchronizer 424 and corresponds to a first detection of the preamble symbol by use of a signature sequence matched filter 462. Firstly however, the differential encoder block 461 is used to alter the received signal so as to reduce the modulation of the matched filter output by any frequency offset present in the received signal. The differential encoder 461 is applied both to the received signal and the time domain signature sequence which is generated by inverse Fourier transform 506 of the output of the frequency domain signature sequence generator 504. The signature sequence matched filter 462 to be described later in FIG. 40a is a finite impulse response filter whose taps are set to the coefficients of the time domain signature sequence.

The circuit shown in FIG. 37d therefore forms an example of the frequency synchronizer 424 in which the signature sequence generator 504 re-generates the signature sequence, the inverse Fourier transformer 506 transforms the signature sequence into the time domain, and the differential encoder 461 compares differentially successive samples of the received signal to reduce a modulating effect of the frequency offset in the radio signal, and correspondingly compares differentially successive samples of the time domain version of the signature sequence. As already explained the matched filter 462 has an impulse response corresponding to the differentially encoded signature sequence and receives the received signal from the differential encoder 461 and filters the differentially encoded received signal to generate at an output an estimate of the coarse frequency offset.

Figure 37E:
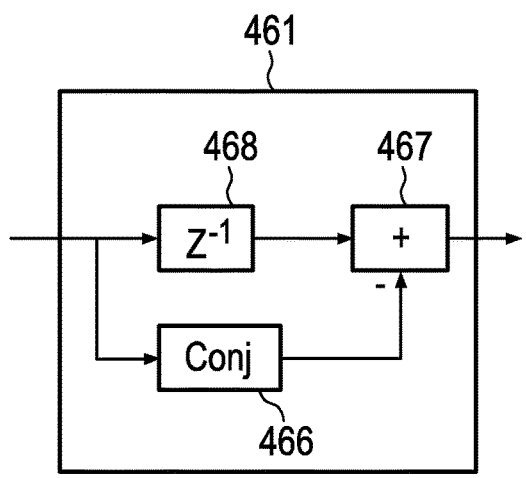

Corresponding to output channel 434 in FIG. 37b, output channel 463 in FIG. 37d produces a signal which is fed to the threshold block 440 to generate a trigger for the FFT 438; whilst output channel 436 in FIG. 37b corresponds to output channel 464 in FIG. 37d. This channel conveys the preamble OFDM symbol samples to the FFT block 438 which at the right moment is triggered by through channel 442 by the threshold block 440. FIG. 37e provides an example of the differential encoding block 461. The received samples r(n) enter a unit delay element 465 and also a conjugation block 466. The delay element 465 delays each sample for one sample period while the conjugation element 466 changes each input sample to its conjugate at its output whose effect is to convert an input $[r_i(n)+jr_q(n)]$ into an output $[r_i(n)-jr_q(n)]$. This conjugated sample is then subtracted from the output of delay element 465 by the adder 467. For an input signal $[r_i(n)+jr_q(n)]$ and output $[y_i(n)+jy_q(n)]$ n=0,1,2 . . . , the differential encoder 461 acts to implement the equation:

$$[y_i(n)+jy_q(n)]=[r_i(n-1)-r_i(n)]+j[r_q(n-1)+r_q(n)]$$

Accordingly before preamble detection and decoding is performed by the preamble detection decoding unit 430 the frequency offset in the received signal is estimated and corrected by the arrangements shown in FIGS. 37a and 37b and 37c, or 37d and 37e.

As explained above for the example of the receiver shown in FIG. 37a, a preamble detector and decoder 430 is configured to detect the preamble symbol and to recover the signaling data from the preamble symbol. To this end, the preamble detector and decoder 430 detects the preamble by detecting the signature sequence and then removes the signature sequence before recovering the signaling data from the preamble. Example embodiments of the preamble detector and decoder 430 are illustrated in FIGS. 17, 38 and 39.

Embodiments of the present technique can provide a receiver which detects the signature sequence and removes the signature sequence in the frequency domain or in the time domain. FIG. 17 provides a first example in which the signature sequence is removed in the frequency domain. Referring to the example receiver shown in FIG. 17, the received base band signal is fed from a receive channel 428 to a matched filter 502 and a demodulator 550. The match filter 502 receives the signature sequence in the time domain after a signature sequence generator 504, which is the same as the signature sequence generator 103 at the transmitter, re-generates a copy of the signature sequence. The matched filter 502 is configured to have an impulse response which is matched to the time domain signature sequence. As such, it correlates the time domain signature sequence with the received signal fed from the receive channel 428 and the correlation output result can be used to detect the presence of the preamble OFDM symbol when an output of the correlation process exceeds a predetermined threshold. Furthermore, as a result of the presence of the signature sequence in the preamble OFDM symbol, an impulse response of the channel through which the received signal has passed can also be estimated from the correlation output of the matched filter by a channel impulse response estimator 508. The receiver can therefore include an arrangement for estimating the channel impulse response using the signature sequence without recourse to the traditional scattered pilots.

Having detected the presence of the signature sequence and estimated the channel impulse response, the effect of the channel impulse response can be removed from the received signal within the demodulator 550. Accordingly a Fast Fourier Transformer 518 transforms the channel impulse response estimate into the frequency domain channel transfer function and feeds the channel transfer function to an equalizer 516 within the demodulator 550.

Figure 17:
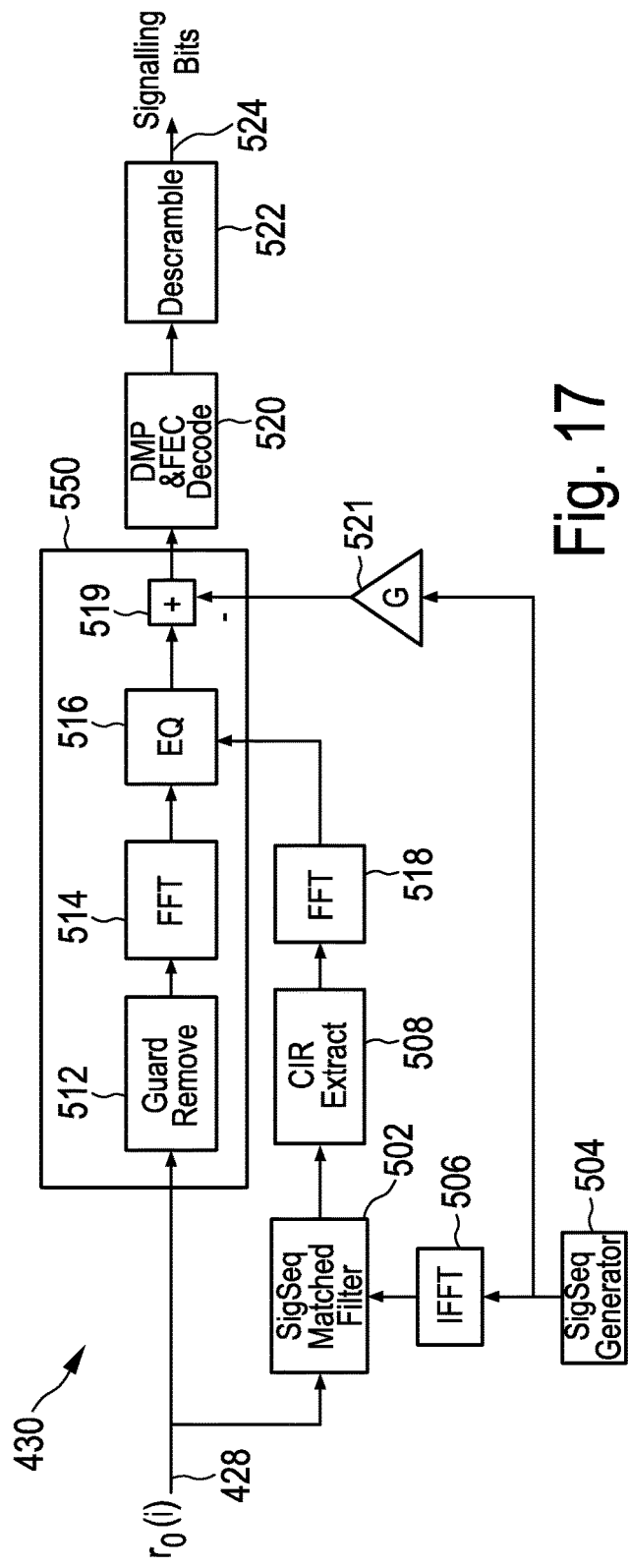
FIG. 17 shows an embodiment of a transmitter side frequency-domain approach generation of the preamble symbol.

In the receiver shown in FIG. 17 the demodulator 550 is arranged to recover the signaling data in a base band form encoded with an error correction code. The demodulator 550 therefore recovers the signaling data from the signaling (preamble) OFDM symbol, which is then decoded using a forward error correction decoder 520 before being descrambled by a descrambling unit 522 which corresponds to the scrambling unit 101 shown in FIG. 16 but performs a reverse of the scrambling.

The demodulator 550 includes a guard interval remover 512, which removes the guard interval from the signaling OFDM symbols, and an FFT unit 514, which converts the time domain samples into the frequency domain. The equalizer 516 removes the effects of the channel impulse response, which has been converted into the frequency domain to form a channel transfer function by the FFT unit 518 as already explained above. In the frequency domain the equalizer 516 divides each signaling data carrying OFDM subcarrier by its corresponding channel transfer coefficient to remove, as far as possible, the effect of the transmission channel from the modulation symbols.

A signature sequence remover is formed by an adder unit 519 which receives the signature sequence in the frequency domain generated by the signature sequence generator 504 after this has been scaled by the scaling factor G, as explained above by a scaling unit 521. Thus the signature sequence remover 519 receives at a first input the equalized preamble OFDM symbol and on a second input a scaled signature sequence in the frequency domain and subtracts one from the other to form at the output estimates of the modulation symbols which were carried by the data bearing subcarriers of the preamble OFDM symbol.

The modulation symbols representing the error correction encoded preamble signaling data are then demodulated and error correction decoded by the demodulator and FEC decoder 520 to form at an output the scrambled bits of the L1 signaling data which are then descrambled by the descrambling unit 522 to form as an output 524 the L1 signaling data bits.

A further example of the preamble detector and decoder 430 which operates in the time domain to remove the signature sequence is shown in FIGS. 38 and 39. FIG. 38 provides an example of the preamble detector and decoder 430 which corresponds to the example shown in FIG. 17 and so only differences with respect to the operation of the example shown in FIG. 38 will be explained. In FIG. 38 as with the example in FIG. 17 the baseband received signal is fed to a signature sequence matched filter 502 and to a demodulator 550. As with the example shown in FIG. 17, the signature sequence matched filter cross-correlates the received signal with an impulse response which is matched to the time domain signature sequence. The signature sequence is received in the time domain form by regenerating the signature sequence in the frequency domain using the signature sequence generator 504 and transforming the signature sequence into the time domain using an inverse Fourier transform processor 506. As with the example shown in FIG. 17 a channel impulse response estimator 508 detects the channel impulse response from the output of the signature sequence matched filter 502 and forms this into the frequency domain channel transfer function using an FFT unit 518 to feed the frequency domain channel estimate to an equalizer 516 within the demodulator 550.

So far the operation of the example shown in FIG. 38 corresponds to that shown in FIG. 17. As shown in FIG. 38 the demodulator 550 includes the signature sequence remover 559 at before the guard remover 512. The time domain signature sequence which is fed from the inverse Fourier transform unit 560 is scaled by the scaling unit 521 by the predetermined factor G. The scaled time domain signature sequence is then fed to the signature sequence remover 559 which removes the signature sequence in the time domain from the received baseband signal. Thereafter the guard remover 512, the FFT unit 514 and the equalizer 516 operate in a corresponding way to the elements shown in FIG. 17.

Figure 40B:
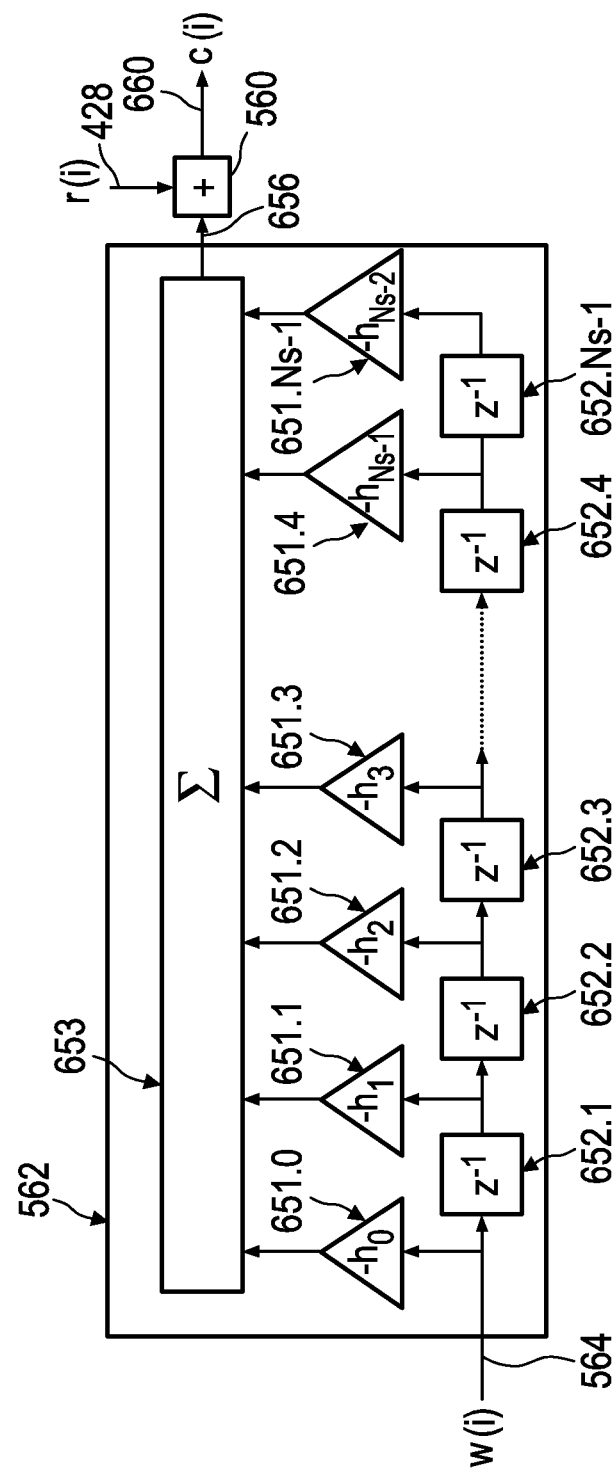

The signature sequence remover 559 shown in FIG. 38 is shown in more detail in FIG. 39. In FIG. 39 the signature sequence remover 559 comprises a guard interval inserter 561, a combiner unit 560 and an FIR filter 562. The time domain baseband received signal is received on the input channel 428 at one input of the combiner unit 560. A second input 564 receives the scaled time domain version of the signature sequence, which is fed to the guard interval inserter 561 which prepends a cyclic prefix to the signature sequence in much the same way as the guard interval inserter 561 42 at the transmitter. The output of the guard interval inserter feeds the FIR filter 562 which receives on a second input 566 the estimate of the channel impulse response generated the channel impulse response extraction block 508. 502. The FIR filter 562 therefore convolves the channel impulse response estimate with the signature sequence in the time domain which is then subtracted by the combiner 560 from the received baseband signal to remove the effect of the signature sequence from the received signal. FIG. 40*b* shows a more detailed example implementation of this signature sequence removal and how the FIR filter 562 is configured.

As will be appreciated the operation of the demodulator and FEC decoder 520 and the scrambler 522 perform the same functions as explain with reference to FIG. 17.

Thus, on the receiver side, frame synchronization (preamble symbol detection) is done in a first step. The Matched Filter is configured for the time-domain version of the CAZAC signature sequence (T-SigSeq) detection and allows deriving the CIR from the Matched Filter output. For removing the SigSeq from the preamble there are two possible ways:

Time domain removal: Use CIR to synthesize the effect of the T-SigSeq transiting the channel for removal in the time domain;

Frequency domain removal: Remove F-SigSeq after equalization in the frequency domain.

As indicated above the matched filter 502 generates an output signal which represents a correlation of the received signal with the signature sequence. A block diagram showing an example of the signature sequence matched filter 502 is shown in FIG. 40*a*. It shows a sequence of Ns delay elements 600 connected to scaling units 602 which scale each of the samples of the data stored in the delay storing unit 600 by a corresponding component of the signature sequence P(n) but conjugated. The output from each of the scaling units 602 is then fed to an adding unit 604 which forms an output signal representing a correlation of the received signal samples r(n) with the signature sequence at an output 606. The matched filter implements the equation:

$$0(i) = \Sigma_{n=0}^{Ns-1} P^*(n) r(n+i) \text{ for } i=-Ns+1, -Ns+2 \ldots, 0,1,2, \ldots Ns-1$$

When the filter taps P(i) are of form (±1±j 1), the multiplier at each tap could simply be done by adding and subtract circuits for each of the in-phase and quadrature components. When the signature sequence is a CAZAC sequence, the quadrature components of P(i) are not bipolar. The scaling units 602 can use the sign of each quadrature component instead so as to have the form (±1±j 1).

Figure 18:
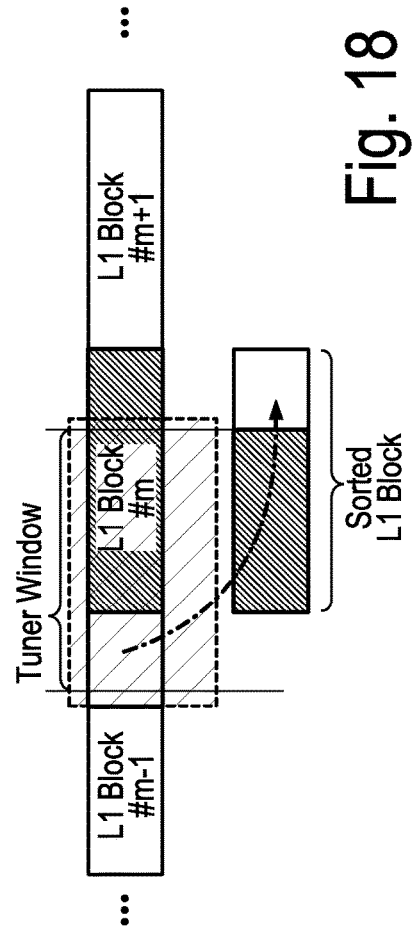
FIG. 18 shows a diagram illustrating retrieving the L1 block on CM side from an arbitrary tuning position.

In order to equalize the preamble in the frequency domain, the CIR retrieved from the SigSeq matched filter is converted into the Channel Transfer Response (CTF) by EFT processing. As explained above, FIG. 17 shows an example implementation of the receiver processing, in particular the generation of the preamble symbol (Frequency domain approach). The L1 blocks contain all Layer 1 signaling to decode the payload data. These L1 blocks are cyclically repeated every 5.71 MHz. Thus, if the CM's tuner position does not match to the L1 block structure, the CM is still able to obtain the data by sorting the data of two blocks. FIG. 18 shows the principle, i.e. the retrieving of the L1 block on CM side from an arbitrary tuning position.

As a result, the complete signaling inside the L1 block is available in any tuning position as long as the tuner bandwidth is 5.71 MHz or more. The preamble symbol is additionally scrambled in the frequency direction to avoid any negative impact of the cyclically repeated L1 blocks. The scrambling of the L1 blocks result in a unique preamble footprint across the whole HFC frequency range, which is called 'Absolute OFDM' and allows a frequency specific recognition of any ATSC3.0 signal. Although the preamble signal is virtually defined for all frequencies, the preamble as well as the L1 blocks are generally only transmitted where an actual ATSC3.0 signal is transmitted, too.

The superimposed SigSeq sequence is aligned to the L1 blocks, i.e. the CAZAC sequence modulated onto the subcarriers repeats with every 5.71 MHz. This feature allows supporting any bandwidth exceeding the minimum bandwidth of 5.71 MHz (see also FIG. 17).

Having formed an estimate of the channel impulse response, a component of the received signal corresponding to that contributed by the signature sequence in the received signal can be generated by passing the received signal r(i) through the signature sequence remover 559, which is configured with filter taps hn to reflect the delay and amplitude profile of the channel impulse response. This can be accomplished by suitable scaling, shifting and adding of the signature sequence of length Ns=Nu+Ng of the preamble symbol. An example of the filter is shown in FIG. 40*b*.

As shown in FIG. 40*b*, the signature sequence remover 559 includes a finite impulse response (FIR) filter 562 made up of a delay line comprised of Ns−1 delay elements 652.1, 652.2, to 652.Ns−1. The output of these delay elements are connected to corresponding gain terms 651.1, 651.2, to 651.Ns−1 each of which gain stages feed their output to the adder 653. The input 654 of the filter is connected both to the input of delay element 652.1 and to the input of gain term 651.0. The output 656 of the FIR filter 650 is connected to the input of an adder 560 whose other input 657 receives the received preamble signal samples r(i). During operation, the gain stages of the FIR filter are set to the negative values of the samples of the channel impulse response derived by the channel impulse response estimator 506. The FIR 650 generates at an output 656 a signal representing the convolution of the signature sequence by the channel impulse response estimate, which effectively provides an estimate of the effect of the channel on the signature sequence imposed upon the signaling OFDM symbol. An adder 560 then subtracts the output signal of the FIR 656 from the received signal from an input 657 to remove the effect of the signature sequence from the received signal to form an output 660. Therefore a result (of the signature sequence transiting the channel described by the channel impulse response) is subtracted from the received signal by the signature sequence remover 510 with a delay matched to the point from which the first significant impulse (of the output of the matched filter) occurred. This process can be iterated in that the matched filter 502 can be re-run with the results of the subtraction, the channel impulse response re-estimated by the channel impulse response estimator 508 and the its effect on the signature sequence being extracted again by the signature sequence remover 559. As a result, a more accurate estimate of the effect of the signature sequence on the received signal can be estimated and subtracted from the received signal Channel impulse responses from all iterations can then be summed and normalized to provide an improved estimate of the channel impulse response from which the channel transfer function (CTF) is derived for preamble symbol equalization.

FIG. 41 provides a more detailed schematic block diagram of the preamble pilot matched filter 444 used for detecting a coarse frequency offset in the received signaling OFDM symbol, which may form part of the frequency synchronizer 424 of FIG. 37a. As explained above, the number of pilots introduced into the signaling OFDM symbol is less than the number which would be required in order to estimate the channel. The number of pilot symbols is therefore set to estimate a coarse frequency offset. The block diagram shown in FIG. 41 provides an example representation of the coarse frequency remover 513 and is shown with three versions of the received preamble signal 701.

As shown in FIG. 41 a sequence of delay elements 700 are used to feed in discrete samples of the signal which are then multiplied by multipliers 702 with the known pilot signal values P(n) and summed by a summing unit 704 to form a correlation output 706. A pulse detector or peak detector 708 is the same one shown as 446 in FIG. 37b which then generates an output signal on channel 710 showing a peak when there is a coincidence between a relative offset of the received signal with the company of the pilot signals at the receiver. Shaded circles of each received signal 701 show sub-carrier cells that represent preamble pilots whilst the un-shaded cells show non-pilot sub-carrier cells. All sub-carrier cells are shifted into the transversal filter from right to left. The parameter MaxOff is a design parameter that represents the maximum value of the frequency offset in units of sub-carrier spacing Q that the designer may expect. The output of the pulse detector is only valid between shifts (0.5(Na+Nu)−MaxOff) and (0.5(Na+Nu)+MaxOff) where Na is the number of sub-carriers (out of a total of Nu) used in the preamble OFDM symbol. If the shifts are numbered from −MaxOff to +MaxOff then the pulse detector output will go high for the shift that corresponds to the observed frequency offset.

Once $\Omega$ is detected, this coarse frequency is removed by shifting the subcarriers by −$\Omega$ i.e. in the opposite direction to the frequency offset. This can also be removed prior to FFT in common with the fine frequency offset estimated from the preamble detection matched filter or guard interval correlation 432 by modulation with a suitably phased sinusoid generated by the oscillator 426 in FIG. 37a. The two frequency offsets can be used to start off the carrier correction loop for the rest of the OFDM symbols in the frame.

After signature sequence removal from the received samples and the coarse frequency offset has been adjusted, OFDM equalization can begin with the FFT of the received sequence. The FFT window starts from a trigger position in the FFT unit 514 corresponding to the relative delay of the first impulse in the channel impulse response estimate. If the channel impulse response estimate duration is longer than the preamble GID, then the trigger position is altered to ensure that it starts at the beginning of a Ng (Ng is the number of time domain samples in the guard interval of the preamble symbol) long window under which the maximum of the energy of the channel impulse response estimate falls. The Nu point FFT produces the preamble OFDM symbol in the frequency domain with the effect of the channel superposed. Before equalization and decoding, any frequency offsets have to be calculated and removed by the frequency offset remover as explained above with reference to FIGS. 37a, 37b, 37c. This estimation uses correlation with the known preamble pilots to determine how far to the right or left the full symbol is shifted in frequency. Equalization of the preamble OFDM symbol requires a channel transfer function (CTF). This is derived by executing a Nu point FFT on the channel impulse response estimate by the FFT unit 518. This provides a channel transfer function for all subcarriers in the preamble OFDM symbol allowing subcarrier by subcarrier one-tap equalization to take place Finally, the equalized data subcarriers are extracted (pilot subcarriers discarded) and de-mapped, forward error correction (FEC) decoded to provide the signaling.

Figure 19:
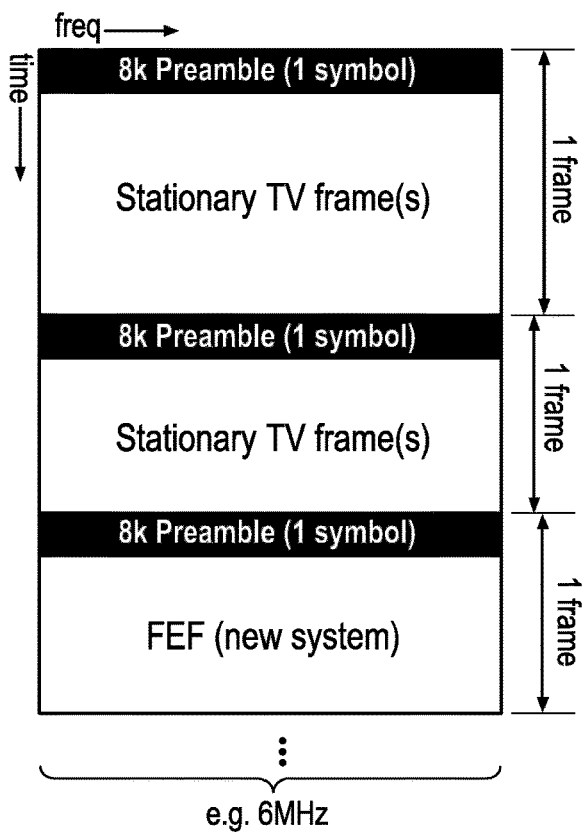
FIG. 19 shows an embodiment of a framing structure.

The proposed framing concept as used by the frame builder 18 will now be described. The proposed framing concept allows mixing different frame types in a time multiplexed way. This enables to embed within a single RF channel stationary TV frames as well as frames for mobile TV. Furthermore, a container is foreseen to integrate future frame types, which is called FEF (Future Extension Frame) as in DVB-T2. The basic principle is shown in FIG. 19 showing the framing concept, allowing the mixing of different frame types.

One principal requirement for fixed reception frames is spectral efficiency which may be assured by use of such features as:

High order modulation e.g. 256QAM;
High code rates (>½) because of relative benign channel conditions;
High FFT size such as 32K—this reduces the capacity loss due to the guard interval fraction;
Low density scattered pilot patterns.

The high FFT size, for example, makes such frames unsuitable for mobile reception because of Doppler. On the other hand, the main requirement for mobile reception frames could be robustness in order to ensure a high rate of service availability. This can be assured by adopting such features as:

Low order modulation e.g. QPSK;
Low code rates (<=½);
Low FFT size (<=8K);
High density scattered pilot pattern.

The low FFT size means a wider subcarrier spacing and so more resilience to Doppler. The high density pilot pattern eases channel estimation in the presence of fast channel variation.

Figure 20:
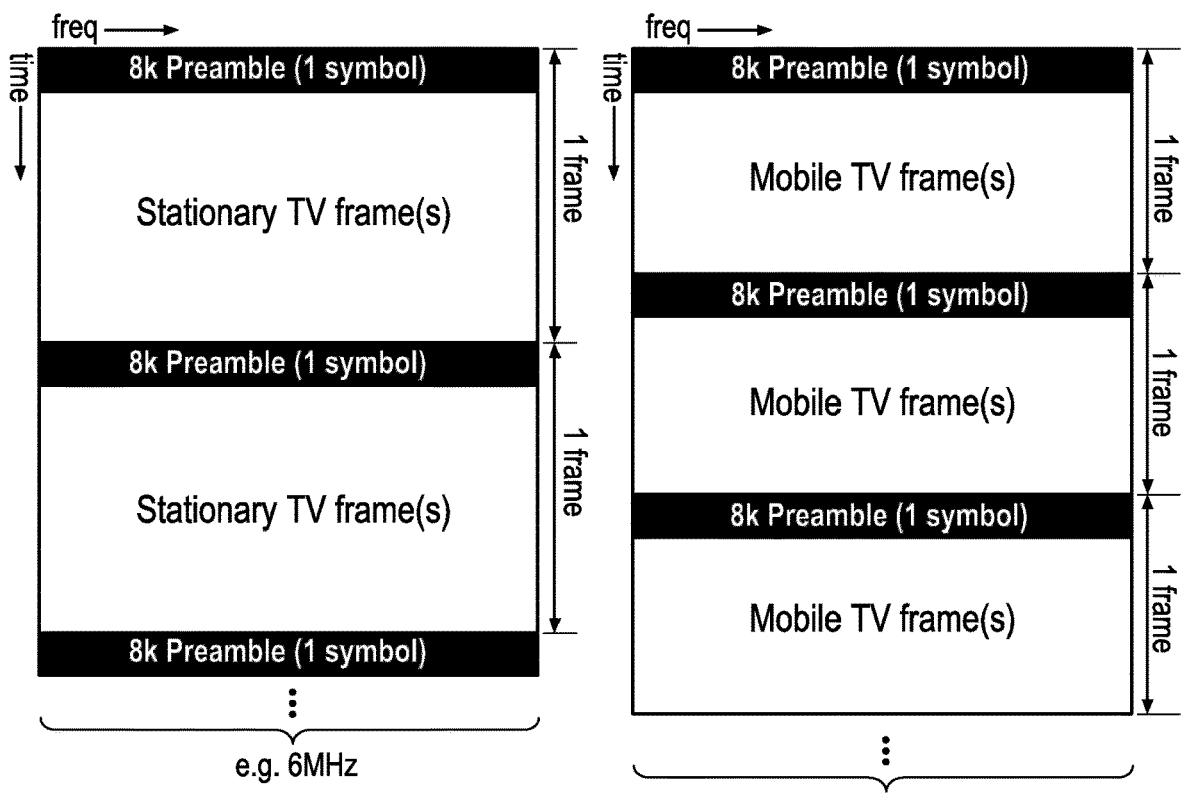
FIG. 20 shows system transmission examples comprising single frame types.

Every frame comprises a preamble symbol and a number of following payload symbols. In order to increase the spectral efficiency short frames should therefore be avoided. The minimum length of a frame should therefore not be below four times the scattered pilot repetition rate in time direction (i.e. 4*Dy). On the other hand, the frame size should not be too long to provide a reasonable low zapping time and fast EWS detection. For example, 100 msec could be a reasonable upper bound for a single frame. Of course it is possible to use a single frame type (e.g. stationary or mobile). In that case frames of the same type are concatenated; examples are shown in FIG. 20 showing system transmission examples consisting of single frame types.

Figure 21:
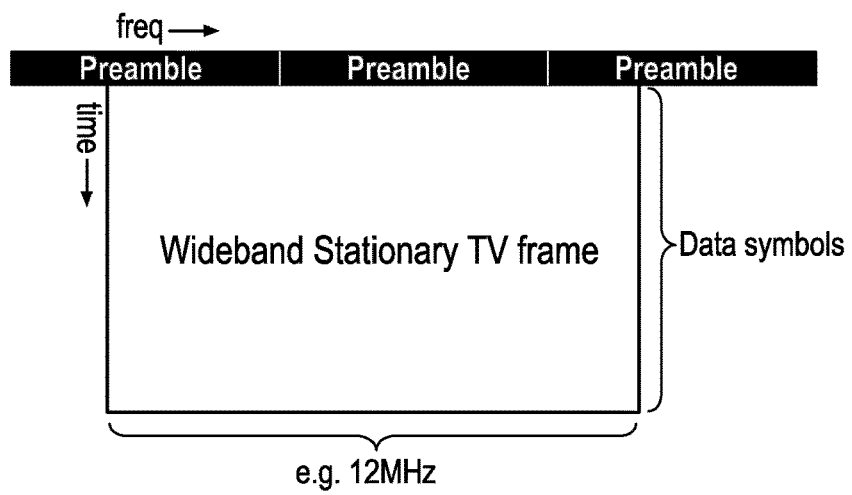
FIG. 21 shows broadband transmissions beyond 6 MHz.

The proposed system furthermore supports different channel bandwidths as a multiple of a basic standard bandwidth (e.g. 6 MHz). FIG. 21 shows broadband transmissions beyond 6 MHz. Data rates required for upcoming advanced services like 4 k2 k services (or even 8 k2 k services) which would so far not fit into a single RF channel can be accommodated. Furthermore an improved statistical multiplexing within a broader channel bandwidth is expected, especially with increasing bit rates per service. The flexible channel bandwidth becomes possible due to the special characteristics of the preamble located at the beginning of each frame (as explained above).

In each frame the preamble symbol is followed by a number of payload symbols. Every payload symbol contains a mix of payload cells and pilots (scattered and continual) at locations as described below. The only exceptions are the frame starting and frame closing symbols as also described in the following.

Figure 22:
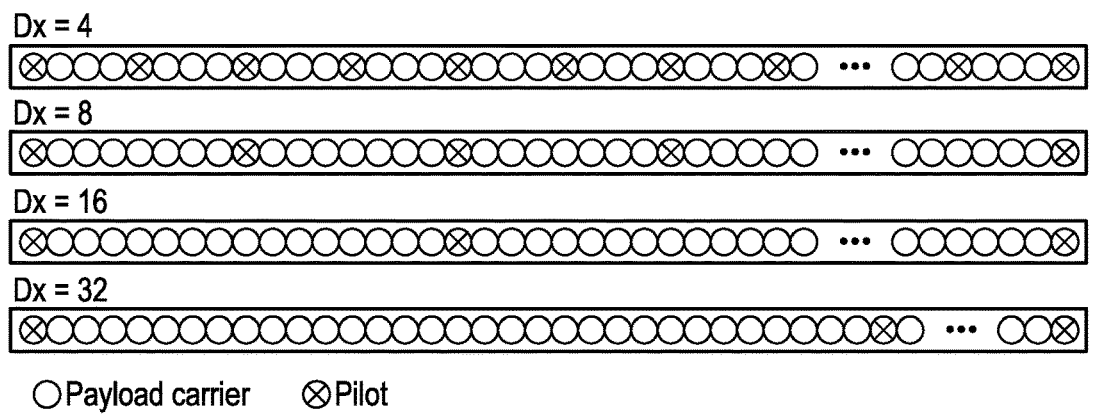
FIG. 22 shows a frame starting and a frame closing pattern for SISO.

In order to allow proper channel estimation that is independent from the preamble symbol, the first and last symbols (frame starting and frame closing symbols) in a frame will contain extra pilots with a density of Dx. FIG. 22 shows the pilot allocation for different values of Dx for SISO (Single Input Single Output).

The pilot pattern as inserted by the pilot insertion unit 19 will now be explained. First, a scattered pilot pattern is described. Scattered pilots are inserted into the signal at regular intervals in both time and frequency directions. The following table summarizes the proposed pilot patterns for SISO. Dx denotes the scattered pilot-bearing carrier spacing, Dy denotes the pattern repetition rate in time direction (i.e. number of OFDM symbols). Furthermore, a capacity loss number due to the scattered pilot overhead is provided.

| Label | Dx | Dy | Dx · Dy | Capacity Loss |
|---|---|---|---|---|
| P4,4 | 4 | 4 | 16 | 6.25% |
| P8,2 | 8 | 2 | 16 | 6.25% |
| P16,2 | 16 | 2 | 32 | 3.1% |
| P32,2 | 32 | 2 | 64 | 1.6% |

Compared to DVB-T2, the number of required pilot patterns is reduced from 8 to 4. The patterns are designed to optimize the 6 MHz bandwidth default case, an extension to other bandwidths is however applicable. A small value for Dy is chosen to reduce memory size and for better mobile performance. Furthermore this selection reduces latency. The options for mapping the different scattered pilot patterns to different guard interval lengths and FFT sizes are given in the following table indicating the scattered pilot pattern to be used for each allowed combination of FFT size and guard interval in SISO mode.

| FFT size | Guard Interval Fraction | | | | | | |
|---|---|---|---|---|---|---|---|
| | 3/512 | 6/512 | 12/512 | 24/512 | 48/512 | 57/512 | 96/512 |
| 8K | P32,2 | P16,2 | P8,2 | P4,2 | P4,2 | P4,2 | P4,2 |
| 16K | | P32,2 | P16,2 | P4,4 | P4,4 | P4,4 | P4,4 |
| 32K | | | P32,2 | P8,2 | P8,2 | P8,2 | |
| | | | | P16,2 | | | |

Next, a continual pilot pattern is described. New continual pilot patterns are proposed for this system. Following key considerations are taken into account:
Fully utilized whilst minimizing channel capacity loss;
Reasonable randomization whilst providing a good and uniform coverage of the full band;
Consistent performance and utilization across all FFT sizes;
Reducing receiver overheads (memory requirements) as much as possible;
CP Pilot Patterns are designed in a way that it is only necessary to store one single set of numbers.

The following table summarizes the continual pilot patterns.

| FFT Size | Bandwidth Extension Mode | Position of CP Bearing Carriers | Number of CPs | Capacity Loss (%) | Utilization Ratio (%) |
|---|---|---|---|---|---|
| 8K | Normal | See next table below | 44 | 0.65 | 100 |
| | Extended | {One single set for all 5 scattered pilot patterns} | 45 | | |
| 16K | Normal | See 3 | 88 | | |
| | Extended | {One single set for all 5 scattered pilot patterns} | 90 | | |
| 32K | Normal | See 3 | 176 | | |
| | Extended | {One single set for all 5 scattered pilot patterns} | 180 | | |

The following table summarizes the locations of the CPs for normal and extended mode for 8 k, 16 k and 32 k FFT sizes (per 6 MHz).

| FFT size (Number of Continual Pilots) | Bandwidth Extended Mode | Continual Pilot Carrier Indices |
|---|---|---|
| 8K (44) | Off | Set (A) = {41, 173, 357, 505, 645, 805, 941, 1098, 1225, 1397, 1514, 1669, 1822, 1961, 2119, 2245, 2423, 2587, 2709, 2861, 3026, 3189, 3318, 3510, 3683, 3861, 4045, 4163, 4297, 4457, 4598, 4769, 4942, 5113, 5289, 5413, 5585, 5755, 5873, 6045, 6207, 6379, 6525, 6675} |
| 8K (45) | On | Set (A) + {6862} |
| 16K (88) | Off | Set (B) = {82, 243, 346, 517, 714, 861, 1010, 1157, 1290, 1429, 1610, 1753, 1881, 2061, 2197, 2301, 2450, 2647, 2794, 2899, 3027, 3159, 3338, 3497, 3645, 3793, 3923, 4059, 4239, 4409, 4490, 4647, 4847, 5013, 5175, 5277, 5419, 5577, 5723, 5895, 6051, 6222, 6378, 6497, 6637, 6818, 7021, 7201, 7366, 7525, 7721, 7395, 8090, 8199, |

| FFT size (Number of Continual Pilots) | Bandwidth Extended Mode | Continual Pilot Carrier Indices |
|---|---|---|
| 16K (90) | On | 8325, 8449, 8593, 8743, 8915, 9055, 9197, 9367, 9539, 9723, 9885, 10058, 10226, 10391, 10578, 10703, 10825, 10959,<br>11169, 11326, 11510, 11629, 11747, 11941, 12089, 12243, 12414, 12598, 12753, 12881, 13050, 13195, 13349, 13517}<br>Set (B) + {13725, 13821} |
| 32K (176) | Off | Set (C) = {163, 290, 486, 605, 691, 858, 1033, 1187, 1427, 1582, 1721, 1881, 2019, 2217, 2314, 2425, 2579, 2709, 2857, 3009, 3219, 3399, 3506, 3621, 3702, 3997, 4122, 4257, 4393, 4539, 4601, 4766, 4899, 5095, 5293, 5378, 5587, 5693, 5797, 5937, 6054, 6139, 6317, 6501, 6675, 6807, 6994, 7163, 7289, 7467, 7586, 7689, 7845, 8011, 8117, 8337, 8477, 8665, 8817, 8893, 8979, 9177, 9293, 9539, 9693, 9885, 10028, 10151, 10349, 10471, 10553, 10646,<br>10837, 10977, 11153, 11325, 11445, 11605, 11789, 11939, 12102, 12253, 12443, 12557, 12755, 12866, 12993, 13150, 13273, 13445, 13635, 13846, 14041, 14225, 14402, 14571, 14731, 14917, 15050, 15209, 15442, 15622, 15790, 15953, 16179, 16239, 16397, 16533, 16650, 16750 16897, 17045, 17186, 17351, 17485, 17637, 17829, 17939, 18109, 18246, 18393, 18566, 18733, 18901, 19077, 19253, 19445, 19589, 19769, 19989, 20115, 20275, 20451, 20675, 20781, 20989, 21155, 21279, 21405, 21537, 21650, 21789, 21917, 22133, 22336, 22489, 22651, 22823, 23019, 23205, 23258, 23361, 23493, 23685, 23881, 24007, 24178, 24317, 24486, 24689, 24827, 25061, 25195, 25331, 25515, 25649, 25761, 25894, 26099, 26246 26390, 26589, 26698, 26910. 27033, 27241} |
| 32K (180) | On | Set (C) + {27449, 27511, 27642, 27801} |

Next, pilot boosting values will be described. Pilots are boosted to ensure a good balance between reduced power loss of the payload as well as reduced effective performance loss when using channel estimation with respect to perfect channel knowledge. Furthermore it takes into account a reduction of inter carrier leakage. The following table summarizes the proposed boosting values scattered and continual pilots.

| FFT Sizes | Channel Bandwidth | QAM Range | Guard Interval Fractions | Scattered Pilot Pattern Range | Boosting Values of Scattered Pilot Patterns | SP Equivalent Boost Value (dB) | Boosting Value of Continual Pilot Patterns |
|---|---|---|---|---|---|---|---|
| 8K, 16K, 32K | 6 MHz | QPSK, 16QAM, 64QAM, 256QAM, 1024QAM | 3/512, 6/512, 12/512, 24/512, 48/512, 57/512, 96/512 | P4,4 [Dx = 4, Dy = 4] P8,2 [Dx = 8, Dy = 2] P16,2 [Dx = 16, Dy = 2] P32,2 [Dx = 32, Dy = 2] | 8/5<br><br>8/5<br><br>13/7<br><br>2.0 | 4.1<br><br>4.1<br><br>5.4<br><br>6.0 | 12/5 [7.6 dB] |

Next, the interleavers will be described. The frequency interleavers 20 for 8 k, 16 k and 32 k FFT size are reused from DVB-T2 or DVB-NGH. The proposed time interleaver 21 operates at PLP level. The parameters of the time interleaving may be different for different PLPs within the system.

The FEC blocks for each PLP are grouped into Interleaving Frames. Each Interleaving Frame contains a dynamically variable whole number of FEC blocks plus some padding, which is described below. It is possible that the length of an Interleaving Frame is unknown at its start; when it is determined that an Interleaving Frame will end, this fact is signaled using the L1 signaling described below. The very long Interleaving Frame would be used for the case where the bit-rate and MODCOD of a PLP is constant for a long time; the dynamically varying shorter Interleaving Frame is used when the bit-rate of a PLP is changing continually. However, it should be noted that there is no fundamental difference between these two cases—the difference is purely the length of the Interleaving Frame.

Figure 23:
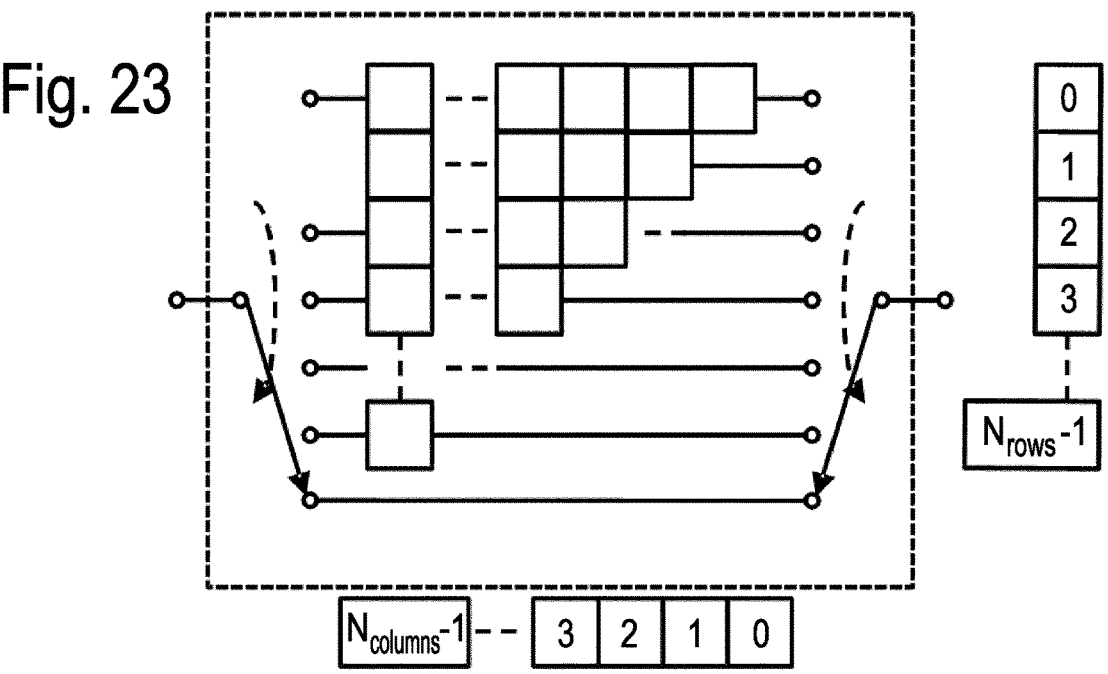
FIG. 23 shows an embodiment of a time-interleaver.

Each Interleaving Frame is passed through a convolutional interleaver with the ability to be started and stopped so that it can interleave individual Interleaving Frames. FIG. 23 shows a convolutional interleaver. As each cell is input to the interleaver, the selectors advance one row downwards, wrapping round back to the top after the bottom row. Each square in the diagram represents a memory location that can store one cell.

At the beginning and end of an Interleaving Frame a method is required to overcome the fact that some rows in the interleaver would contain cells whilst others did not. In this case, the selectors to skip over rows which contain no valid cells. The interleaver calculates when it is necessary for the selectors to skip over rows which contain no valid cells. The points at which the interleaver skips whilst at the beginning of an Interleaving Frame will be referred to as startup punctures; the points at which the interleaver skips whilst at the end of an Interleaving Frame will be referred to as shutdown punctures.

With the configuration shown in FIG. 23, the rows are numbered $N_{row}=0,1,2 \ldots N_{rows}-1$, where $N_{rows}$ is the number of rows and the iterations of the selector are numbered from 0: $N_{iter}=0,1,2 \ldots \infty$. Let the number of cells remaining in the Interleaving Frame be $N_{frame}$. It is possible to calculate the ordinal number of each output from the interleaver relative to the time that the startup process began:
$N_{ord}=(N_{iter}-N_{rows}+1)N_{rows}+(N_{rows}+1)N_{row}$.

The ordinal number is the position of the cell in the uninterleaved interleaving-frame. If this ordinal number is less than 0, then a startup puncture has been detected and the selector should be moved on to the next row $N_{ord}<0$. If this ordinal number is greater than or equal to $N_{frame}$ (where $N_{frame}$ is the number of cells in the Interleaving Frame) then a shutdown puncture has been detected and again the selector should be moved on to the next row $N_{ord} \geq N_{frame}$. In this way startup and shutdown punctures can be detected without having to store a flag for each location to indicate whether the cell in each location is valid or invalid.

Whilst the interleaver is running, a count of the number of cells output from the interleaver can be maintained. Once this is equal to $N_{frame}-1$ then all the cells in the Interleaving Frame have been output from the interleaver. In the case where the interleaver is started before the time that it would be shut down was known, the method described above can be used unchanged to detect the startup punctures, because it is not necessary to know the length of the Interleaving Frame $N_{frame}$ in order to detect startup punctures. However, the above method needs to be adapted to enable shutdown punctures to be detected in this situation, given that the length of the Interleaving Frame $N_{frame}$ is not known. In this situation, some arbitrary time is defined before the shutdown process has started and at which the selectors are at row 0 ($N_{row}=0$). $N_{iter}$ is defined to be 0 at this time and $N_{frame}$ is defined to be the number of cells remaining in the Interleaving Frame. Then the method described above can be used to detect the shutdown punctures.

It is necessary for the selectors in the interleaver (and the corresponding deinterleaver in the receiver) to be synchronized. If, the interleaver has been started before the receiver was switched on, then the receiver needs to know the correct position of the selectors. This is done by the transmitter signaling the position of the selectors at the start of each frame using dynamic L1 signaling. Then, during its acquisition process, the receiver can decode that signaling in order to set the selector in the correct position. Once the deinterleaver is synchronized with the interleaver, then this signaling does not need to be decoded.

Also, the receiver needs to be able to determine the position of the start of a FEC block at the output of the deinterleaver. This is done by the transmitter signaling the number of cells that the deinterleaver will output during that frame before the start of a FEC block will be output from the deinterleaver. The size of the deinterleaver is known, so this can be calculated by the transmitter.

It is desirable that the latency through the system is constant. When the interleaver selectors skip a row the latency through the system will change. For example, if a shutdown puncture is determined, then the current cell will not be input to the current row, because that row is to be skipped. However, there still will be data that needs to be output from the current row. Therefore, this input data needs to be stored somehow in a buffer. Likewise, in the deinterleaver, if a shutdown puncture is determined, then again the current symbol will not be input to the current row and so this input data needs to be stored somehow in a buffer, too.

The design of the interleaver (and corresponding deinterleaver) includes methods for reusing the interleaver and deinterleaver memory as buffers to enable constant latency whilst minimizing the amount of memory required. This is particularly important in the deinterleaver, because there will be many more receivers than transmitters. A consequence of these methods is that the length of the Interleaving Frame must be an integer multiple of the number of rows, $N_{rows}$, i.e. $N_{frame} \mod N_{rows}=0$. In order to achieve this condition, padding data is added to the end of the Interleaving Frame. Moreover a few signaling fields in the L1 signaling are required per frame to enable the proposed interleaver scheme.

The OFDM generation of the OFDM generator 22 will now be described.

3 FFT (NFFT) sizes are proposed for the proposed system, e.g. an ATSC 3.0 system. All numbers given below relate to the default bandwidth of 6 MHz: 8 k FFT, 16 kFFT, 32 kFFT. The elementary period for 6 MHz is defined as $T=7/48$ usec. The following table summarizes the main OFDM parameters. Values are given for normal and extended carrier mode (see below)

| Parameter | | 8k mode | 16k mode | 32k mode |
|---|---|---|---|---|
| Number of | normal | 6817 | 13633 | 27265 |
| carriers | extended | 6913 | 13921 | 27841 |
| Duration Tu | | 8192T | 16384T | 32768T |
| Duration Tu | | 1194.7 μsec | 2389.3 μsec | 4778.7 μsec |
| Carrier spacing (1/Tu) | | 837.1 Hz | 418.5 Hz | 209.3 Hz |
| Bandwidth | normal | 5.71 MHz | 5.71 MHz | 5.71 MHz |
| between 1st and last carrier | extended | 5.79 MHz | 5.83 MHz | 5.83 MHz |

Broader channel bandwidths can be realized as an integer multiple of the default bandwidth of 6 MHz. This is done by carrier aggregation, i.e. increasing the number of subcarriers while keeping the carrier spacing constant. The following table lists the number of subcarriers for examples of higher channel bandwidths (normal mode):

| | Number of subcarriers | | | |
|---|---|---|---|---|
| Carrier spacing | 6 MHz | 12 MHz | 18 MHz | 24 MHz . . . |
| 837.1 Hz (8kFFT for 6 MHz) | 6817 | 15009 | 23201 | 31393 . . . |
| 418.5 Hz (16k FFT for 6 MHz) | 13633 | 30017 | 46401 | 62785 . . . |
| 209.3 Hz (32k FFT for 6 MHz) | 27265 | 60033 | 92801 | 125569 . . . |

The following table summarizes the FFT size specific options for the guard interval length.

| FFT Size | Guard Interval Fractions | Guard Interval Duration (μS) (Assuming 6 MHz Channel Bandwidth) |
|---|---|---|
| 8K | [3, 6, 12, 24, 48, 57, 96]/512 | [7, 14, 28, 56, 112, 133, 224] |
| 16K | [3, 6, 12, 24, 48, 57, 96]/512 | [14, 28, 56, 112, 224, 266, 448] |
| 32K | [3, 6, 12, 24, 48, 57]/512 | [28, 56, 112, 224, 448, 532] |

Because the rectangular part of the spectrum rolls off more quickly for the larger FFT-sizes, the outer ends of the OFDM signal's spectrum can be extended for the proposed FFT modes, i.e. more subcarriers per symbol can used for data transport. The capacity gain achieved is between 1.4% (8 K) and 2.1% (32 K).

Spectrum notches are supported in this system to coexist with other transmission systems whilst maintaining the maximum possible payload for terrestrial transmissions. Notching reduces spectrum efficiency for broadcast transmissions by removing selected carriers from the OFDM signal. The notching parameters available in the L1 signaling (within the preamble) mean that this reduction of spectrum efficiency can be kept to a minimum by precisely defining the start position and width of the spectrum notch. Two types of notches are proposed: Narrowband and Broadband. The following table summarizes the possible configurations:

| | Narrowband notches | Broadband notches |
|---|---|---|
| Bandwidth | <=Dx · Dy − 1 (n * Dx − 1) | >Dx − 1 (n * Dx − 1). No maximum, but one L1 block adjacent to a Broadband notch |
| Notch position within a Data Slice | Yes | No |
| Signaled in L1 | Yes | Yes |
| Receiver handling | Notch corrected by L1 FEC | Notch not inside tuning bandwidth |

In certain scenarios signals arriving from several (at least two) transmitters interfere destructively and the complete signal is canceled (over almost all subcarriers). This behavior was measured in different field trials, where there are spots in the landscape, which are permanently in deep fade. When the different transmitters have slightly different frequencies, then these spots move with time, yielding bad reception conditions in various places.

To circumvent this effect a transmitter specific and almost random-like predistortion of the transmitted signals is proposed. The receiver treats these superimposed signals as a regular SFN signal. With these predistorted signals, the likelihood of complete signal losses is minimized. Special care is taken such that the predistortion, which the receiver interprets as being part of the transmit channel, does not introduce a prolonged channel impulse response.

The so called eSFN (enhanced SFN) processing, as shown in FIG. 24 as a simplified Tx diagram, is therefore applied to decorrelate the transmitted signal between multiple transmitters in an SFN configuration. The transmitter 200 comprising eSFN processing comprises a modulator 202, a framing and pilot insertion unit 204, n parallel pre-distortion units 206, 208, n IFFT unit 210, 212 and n antennas 214, 216.

The eSFN predistortion term for carrier k is calculated using $$\Phi_k = \sum_{p=0}^{L} \left[ e^{j2\pi\Theta(p)} \cdot H_{RC}\left(k - p \cdot \frac{N_{FFT}}{L}\right) \right]$$

where $L = N_{FFT}/512$, $N_{FFT} = T_U/T$, and $k = K_{min}, \ldots, K_{max}$. The term $H_{RC}(n)$ is a Raised Cosine function, which is shifted by $$\left(p \cdot \frac{N_{FFT}}{L}\right).$$

The Raised Cosine function itself is defined as:

$$H_{RC}(n) = \begin{cases} 1 & \text{if} & |n| \le \frac{1-\alpha}{2T_c} \\ \cos^2\left[\frac{\pi T_C}{2\alpha}\left(|n| \le \frac{1-\alpha}{2T_c}\right)\right] & \text{if} & \frac{1-\alpha}{2T_C} < |n| \le \frac{1-\alpha}{2T_C} \\ 0 & \text{otherwise} \end{cases}$$

with the time constant $T_C = L/N_{FFT}$ and the roll-off-factor $\alpha = 0.5$.

The phase term Θ(p) recursively defines the phase of each Raised Cosine function and is obtained by:

$$\Theta(p) = \begin{cases} TX_0/3 & \text{if } p = 0 \\ \Theta(p-1) + TX_p/8 & \text{else} \end{cases}$$

in which the values $TX_p \in \{-1, 0, 1\}$, with $p=0, \ldots, L$, identify each transmitter within the network.

While OFDM has many advantages, especially for terrestrial transmissions, it has the disadvantage of higher spectrum shoulders at the edge of the channel, i.e. the spectrum slope at the channel edges is not steep enough to provide sufficient channel isolation to neighbored signals in all cases. In order to increase the steepness of the spectrum slopes, a short FIR filter is introduced with a marginal loss of the maximum delay spread and no impact on the system performance.

Figure 26:
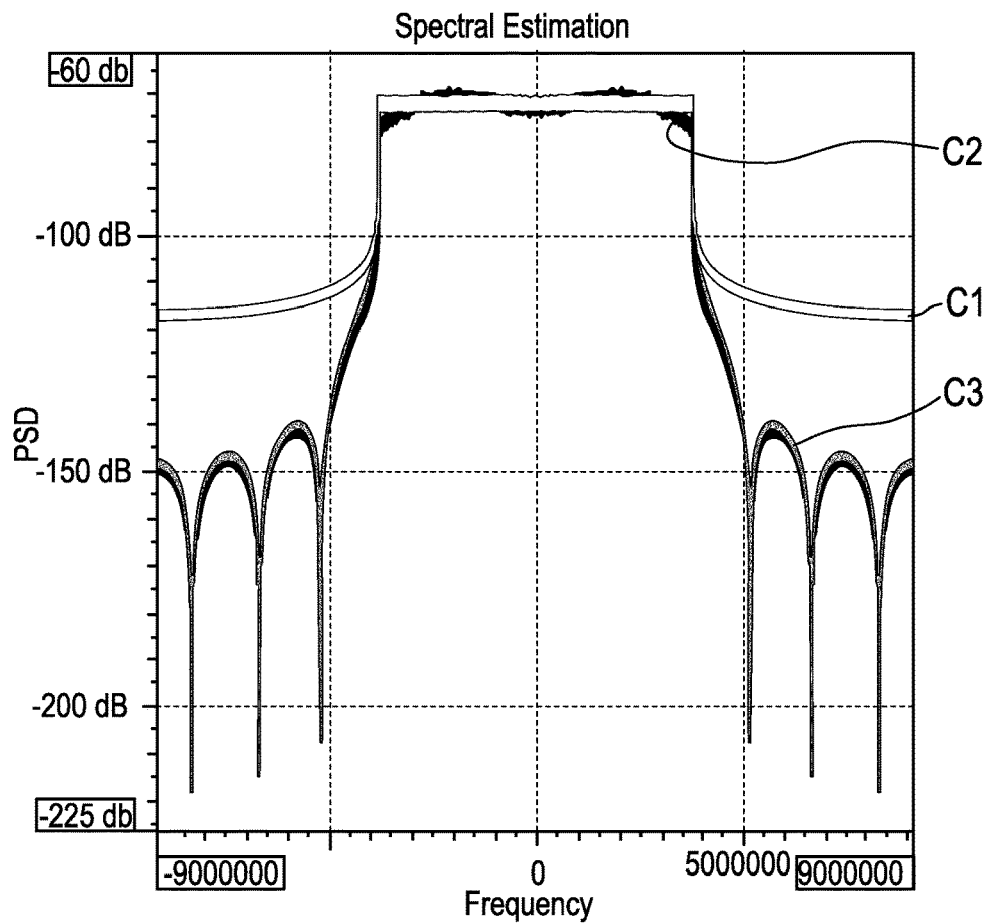
FIG. 26 shows a diagram illustrating power spectral density of the OFDM signal after filtering with and without linear pre-distortion in the frequency domain.

FIG. 25 shows block diagrams of a normal OFDM encoding device 250 (FIG. 25A), comprising a framing unit 252 and a OFDM processor 254, and modified OFDM encoding device 260 (FIG. 25B). In case of the modified OFDM encoding, in addition to the elements of the normal OFDM encoding device 250, a predistortion unit 262 is applied before IFFT and a filter 264 is applied after the IFFT (OFDM processor 254) to reduce the shoulders (out-of-band emissions) of the generated OFDM signal. This filter 264 does not necessarily have a flat characteristic within the pass-band, leading to only few filter coefficients for the required impulse response of the filter. An example is shown in FIG. 26. The curve C1 is the original OFDM signal without any filtering. The curve C2 is the filtered signal. This curve does no longer have a flat characteristic within the signal bandwidth, which is caused by the low number of filter coefficients of the filter. However, the curve shows a good attenuation of the out-of-band emissions.

In order to obtain a flat characteristic in the signal bandwidth a linear pre-distortion is used. The pre-distortion compensates the selectivity of the filter. This is reached by the multiplication of each individual OFDM subcarrier (in the frequency domain) with the inverse of the transfer function of the filter at the specific subcarrier. The curve C3 in FIG. 26 shows the power spectral density of the same filter as applied for the curve C2, but with the described pre-distortion. The curve ideally overlaps with the non-filtered curve C1 in the signal bandwidth, but still shows the high attenuation in the other parts of the spectrum. Simulations have not shown any negative effect on the BER performance as well as for the PAPR characteristics.

Figure 27:
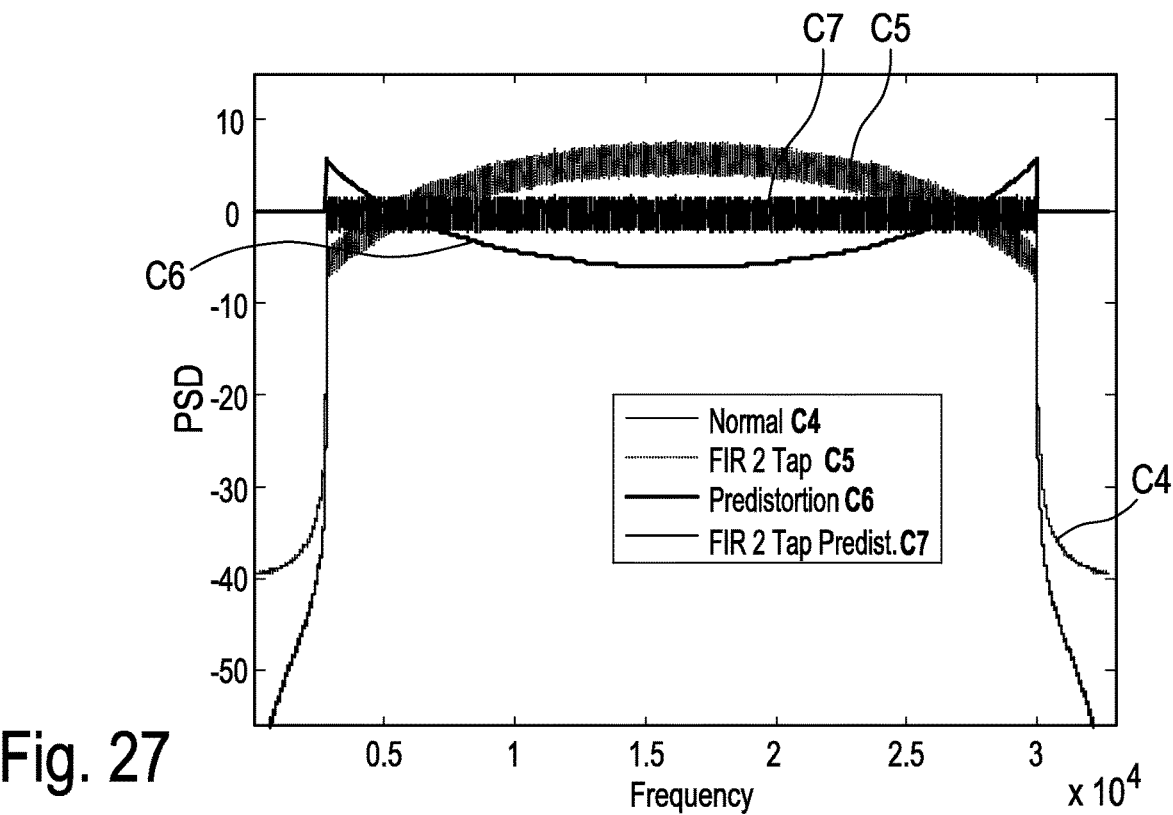
FIG. 27 shows a 0 dB echo (2 tap FIR filter) for spectral shaping of an OFDM signal.

In the most extreme case the filtering (here as an example with a two tap FIR filter) can be realized by a single 0 dB echo. FIG. 27 shows an example plot for a single dB echo with two samples delay only. The curve C4 illustrates the original OFDM signal without any filtering. The curve C5 shows the filtered signal with the additional attenuation of the out-of-band emissions but with the resulting ripple in the Tx signal. The curve C6 shows the pre-distortion. Finally, the curve C7 depicts the filtered signal with pre-distortion.

Next, PAPR reduction will be described. The DVB-T2 Tone reservation (TR) algorithm is adopted. The number of reserved carriers remains the same as the DVB-T2 (as shown in Table (21)). New scattered and continual pilot patterns have been proposed for ATSC3.0 physical layer. This has resulted in recommending a new set of reserved carrier indices that ensure optimum reference kernels for the three FFT sizes and all possible scattered and continual pilot patterns. The following tables show the number and the position of the reserved carriers for this tone reservation scheme.

| FFT Size | Bandwidth Extension Mode | Number of Reserved Carriers | Capacity Loss (%) |
|---|---|---|---|
| 8K | Normal | 72 | 1.0 |
|  | Extended |  |  |
| 16K | Normal | 144 |  |
|  | Extended |  |  |
| 32K | Normal | 288 |  |
|  | Extended |  |  |

| FFT size (Number of reserved carriers) | Reserved Carrier Indices |
|---|---|
| 8K (72) | 131, 263, 267, 611, 639, 696, 782, 811, 829, 860, 861, 930, 982, 1029, 1380, 1476, 1571, 1589, 1594, 1609, 1793, 1836, 2131, 2215, 2538, 2540, 2717, 2966, 2975, 2995, 3058, 3171, 3399, 3483, 3666, 3698, 3786, 4004, 4015, 4057, 4181, 4241, 4292, 4326, 4356, 4516, 4772, 4929, 5027, 5069, 5214, 5234, 5306, 5307, 5310, 5400, 5494, 5500, 5602, 5685, 5717, 5858, 5911, 6133, 6139, 6217, 6241, 6266,6341, 6686, 6708 |
| 16K (144) | 140, 152, 180, 271, 277, 282, 285, 316, 406, 494, 794, 895, 1021, 1060, 1085, 1203, 1318, 1324, 1414, 1422, 1597, 1674, 1890, 1907, 1931, 2004, 2125, 2348, 2356, 2834, 2854, 2870, 2913, 2917, 3017, 3183, 3225, 3311, 3491, 3549, 3566, 3715, 3716, 3949, 3987, 4054, 4127, 4147, 4422, 4534, 4585, 4597, 4687, 4759, 4879, 4882, 5015, 5097, 5114, 5412, 5527, 5571, 5639, 5661, 5666, 5737, 5795, 5997, 6014, 6029, 6084, 6108, 6122, 6170, 6251, 6500, 6609, 6620, 6721, 6774, 6842, 7162, 7247, 7503, 7770, 7775, 7890, 7932, 7985, 8043, 8089, 8092, 8104, 8156, 8233, 8241, 8329, 8362, 8371, 8518, 8603, 9022, 9090, 9190, 9400, 9453, 9544, 9598, 9769, 10022, 10043, 10150, 10347, 10568, 10849, 10895, 11313, 11394, 11401, 11574, 11583, 11726, 11822, 12120, 12244, 12276, 12438, 12451, 12540, 12574, 12654, 12671, 12806, 12898, 12899, 12950, 13021, 13107, 13153, 13293, 13303, 13430, 13433, 13494 |
| 32K (288) | 275, 303, 526, 537, 584, 648, 722, 779, 794, 859, 867, 1182, 1238, 1251, 1263, 1336, 1389,1399 1420, 1471, 1498, 1541, 1587, 1628, 1719, 1822, 2055, 2068, 2181, 2242, 2248, 2346, 2350, 2359, 2502, 2525 2834, 2889, 2937, 3018, 3091, 3124, 3160, 3480, 3489, 3512, 3707, 3718, 3734, 3861, 4079, 4255, 4371, 4484 4499, 4550, 4588, 4850, 4854, 4935, 4946, 5084, 5110, 5127, 5169, 5178, 5345, 5480, 5623, 5849, 5805, 6236 8265, 6346, 6397, 6447, 6482, 6500, 6644, 6735, 6796, 6934, 6956, 7113, 7146, 7186, 7194, 7215, 7226, 7266 7507, 7736, 7757, 7942, 8056, 8471, 8516, 8567, 8583, 8613, 8868, 8883, 9000, 9005, 9134, 9163, 9242, 9310 9348, 9358, 9378, 9586, 9682, 9697, 9732, 9825, 9883, 10037, 10792, 10830, 10872, 10879,10892, 10894, 11007, 11030 11103, 11129, 11186, 11461, 11466, 11585, 11912, 11937, 11970, 12035, 12185, 12392, 12406, 12424, 12529, 12666, 12842, 12982 13004, 13115, 13182, 13226, 13356, 13407, 13554, 13681, 13743, 14114, 14119, 14247, 14369, 14458, 14468, 14629, 14655, 14694 14724, 14796, 14815, 15084, 15143, 15249, 15420, 15530, 15655, 15666, 15703, 15844, 15882, 15970, 16019, 16065, 18215, 16420 16695, 16705, 16707, 16764, 16818, 16855, 16913, 16925, 16958, 16965, 17048, 17233, 17441, 17624, 17729, 18157, 18181, 18193 18433, 18451, 18506, 18665, 18858, 18988, 19085, 19098, 19286, 19374, 19659, 19707, 19717, 19878, 19890, 19979, 19983, 20008 20241, 20295, 20527, 20801, 20943, 21015, 21067, 21163, 21175, 21191, 21201, 21293, 21337, 21608, 21656, 21674, 21755, 21758 22145, 22380, 22788, 22847, 22856, 22878, 22889, 22924, 23069, 23099, 23103, 23151, 23897, 23997, 24033, 24039, 24063, 24127 24163, 24217, 24302, 24386, 24434, 24854, 24910, 24946, 25017, 25199, 25256, 25455, 25513, 25555, 25565, 25772, 25778, 25782 25889, 25943, 26034, 26161, 26167, 26289, 26409, 26492, 26498, 26620, 26683, 26709, 26758, 26821, 26842, 26920, 26952, 26968 |

MIMO is seen as one valuable technology to increase the throughput rates, especially for higher SNR values above 15 dB. DVB-NGH is the first system providing a rate 2 MIMO scheme for terrestrial broadcast. Generally it is proposed to reuse similar MIMO codes that are derived from plain 2×N Spatial Multiplexing MIMO, adding some additional features for improved correlation handling, diversity as well as handling power imbalances.

One drawback of MIMO is the additional installation effort. Especially for stationary rooftop reception effort and costs on domestic side need to be reduced to a minimum. In any case it is required that the so far single polarized antenna is exchanged. Another bottleneck is the single cable installation of typical households that prevent to deliver both MIMO signal components on the same frequencies to the tuners of the receiver. However, the existing single cable can be reused to convey both MIMO Rx paths (e.g. signal polarizations) if they are mapped onto different frequencies. For example, one MIMO signal component is fed directly to the cable, while the signal of the other polarization is shifted to an unused frequency.

Figure 28:
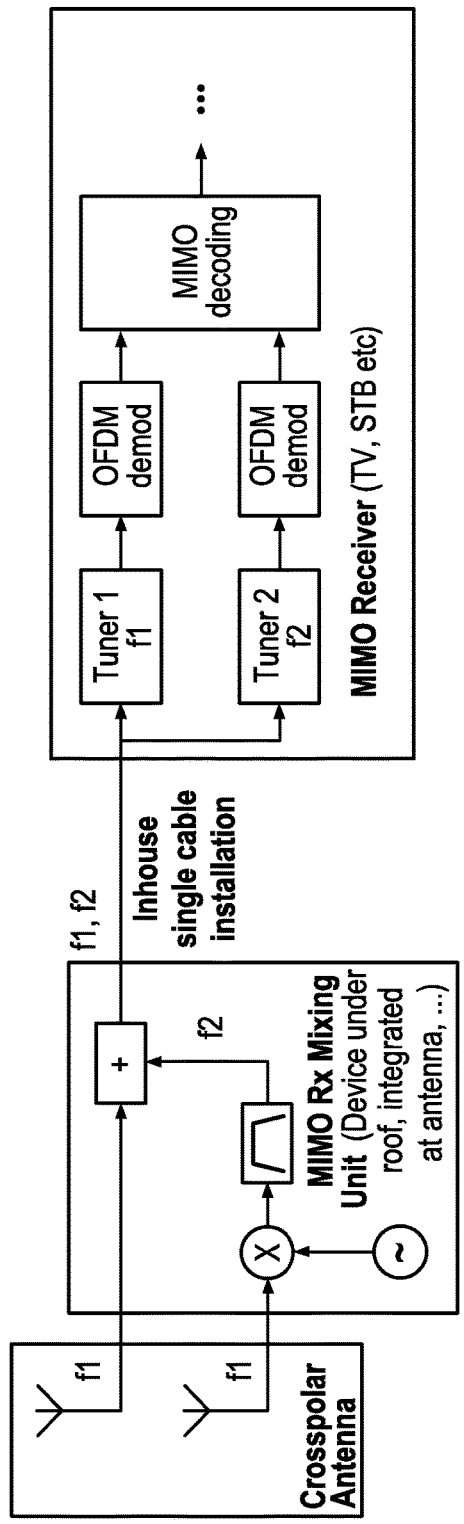
FIG. 28 shows an embodiment of a MIMO receiver.

FIG. 28 illustrates this principle according to which both MIMO Rx path signals (e.g. polarizations) are passed on a single cable: the first signal used as is, the second signal is filtered and shifted to unused frequency band. The MIMO encoded RF signal requires to include signaling that allows the receiver (behind the single cable) to determine/detect the RF frequency of the second MIMO component. For example, the signaling includes a list of available frequencies (i.e. not allocated at the current geographical location). In another example, the signaling includes specific frequencies for the second MIMO component selected by the operator that the receiver must tune to. Based on the signaling the receiver sends with the help of a suitable control protocol (such as DiSEqC) the corresponding mixing frequency to the MIMO Rx Mixing Unit.

Thus, a MIMO receiving apparatus is proposed comprising
    an input interface that receives a multiplex signal from a MIMO preprocessing apparatus on an input signal path, said multiplex signal comprising one or more MIMO transmission channels of a MIMO transmission signal, wherein a MIMO transmission channel carrying one or more services comprises two MIMO receive signal components multiplexed onto said multiplex signal,
    a signaling unit that signals to said MIMO preprocessing apparatus a channel allocation information indicating the allocation of the two MIMO receive signal components of at least the MIMO transmission channel carrying a desired service that shall be used by said MIMO receiving apparatus to respective frequency channels so that the two MIMO receive signal components of said MIMO transmission channel will be allocated to different frequency channels, a processing unit that processes the two MIMO receive signal components of the MIMO transmission channel carrying the desired service, including tuning to the frequency channels of the respective MIMO receive signal component based on said channel allocation information, to obtain a service data stream, an output interface that outputs said service data stream.

Further, a corresponding MIMO preprocessing apparatus is proposed comprising an input interface that receives a MIMO transmission signal comprising at least two MIMO transmission signal streams received via different input signal paths, wherein said MIMO transmission signal comprises one or more MIMO transmission channels and wherein a MIMO transmission channel carrying one or more services comprises two MIMO receive signal components covering the same frequency channel and being included in different transmission signal streams, a MIMO multiplexer that multiplexes the two MIMO receive signal components of one or more MIMO transmission channels onto a multiplex signal, wherein the two MIMO receive signal components of said one or more MIMO transmission channels are allocated to different frequency channels based on channel allocation information derived from said MIMO transmission signal or received from a MIMO receiving apparatus, and an output interface that outputs said multiplex signal to an output signal path.

Still further, a corresponding MIMO transmitting apparatus is presented comprising an input processing unit receiving input data to be transmitted, a Bit Interleaved Coding and Modulation unit that encodes and modulates the received input data and signaling information, said signaling information comprising a channel allocation information indicating the allocation of two MIMO receive signal components of at least a MIMO transmission channel carrying a desired service that shall be used by a MIMO receiving apparatus to respective frequency channels so that the two MIMO receive signal components of said MIMO transmission channel will be allocated to different frequency channels, a MIMO encoding unit that MIMO encodes the output signals of the Bit Interleaved Coding and Modulation unit to obtain two MIMO encoded signal streams, two MIMO transmission antennas that transmit said MIMO encoded signal streams as MIMO transmission signal, wherein said MIMO transmission signal comprises one or more MIMO transmission channels and wherein a MIMO transmission channel carrying one or more services comprises two MIMO receive signal components covering the same frequency channel and being included in different MIMO encoded streams.

Figure 29:
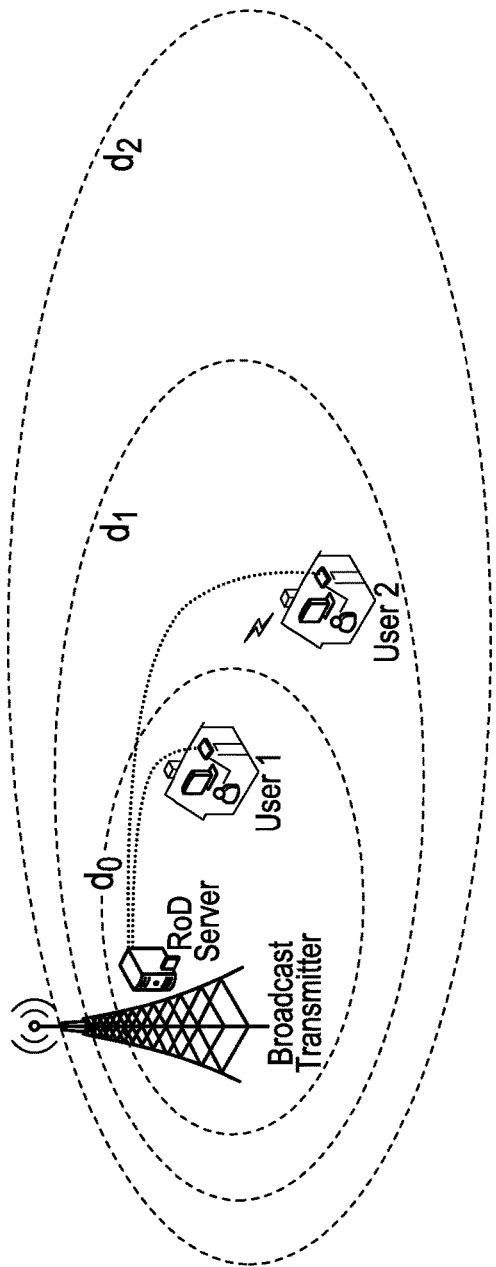
FIG. 29 shows a diagram illustrating the principle of Redundancy on Demand.

Terminals located at the edge of the coverage area of a broadcast network are suffering from low receptions levels, which may hinder error-free decoding. This is also true for indoor reception or if large objects attenuate the transmitted signal. To counter this problem the proposal suggests the additional utilization of either a wired or a wireless broadband network for transmitting additional redundancy for enabling error-free reception, as depicted in FIG. 29 illustrating a broadcast system using the proposed principle of "Redundancy on Demand". In many cases only a few dBs received signal level are missing for the correct decoding of the broadcasting data, resulting in an additional redundancy data stream of few hundred kbit/s.

In this proposed scheme the signal transmission in the terrestrial network remains totally unchanged, but for a poor reception the terminal device can fetch additional data via broadband network to improve error correction performance. The terminal device evaluates the data received from the terrestrial network, and according to the signal quality it requires certain amount of additional data to assure quasi-error-free (QEF) reception. Under more severe conditions more additional data is needed. In this way, a smooth transition between pure terrestrial broadcast and complete delivery via broadband network can be realized. This creates a new degree of freedom for the broadcast network management and helps to reduce the overall delivery cost and energy consumption.

Figure 30:
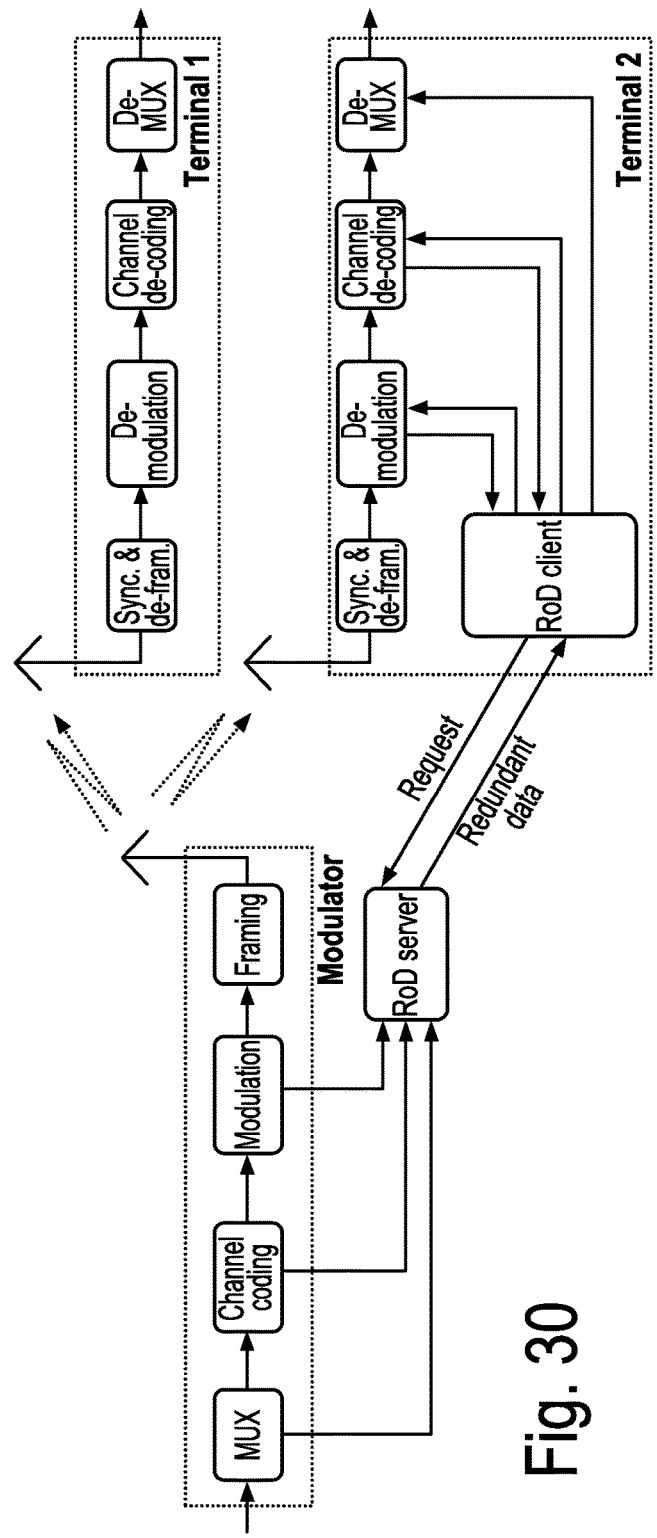
FIG. 30 shows a more detailed diagram illustrating the principle of Redundancy on Demand.

The data received via both networks is combined for decoding in the terminal. What kind of additional data is transmitted via the broadband network depends on the technology used in the terrestrial broadcast network. FIG. 30 illustrates the proposed Redundancy on Demand (RoD) concept for the proposed system. A RoD capable terminal (Terminal 2 in FIG. 30) is equipped with a RoD client that performs a request to the RoD server if the reception conditions do not allow for error free decoding. The RoD server is then transmitting the required amount of redundancy, which is generated from the initially transmitted data stream, to the client. Different convergence levels for generating the RoD data are possible, i.e. the transmitted redundancy can either be generated from the output of the Multiplexer (MUX), the channel-coding or the modulation block. RoD is backwards compatible, since terminals that are not capable of a broadband connection for improving the reception remain unchanged (such as Terminal 1 in FIG. 30).

An essential task of the RoD-System is to correctly determine the required amount of RoD data for successful FEC decoding in the terminal. If too few RoD-Data is transferred from the RoD-Server to the Terminal, the decoding process will fail and additional RoD-Data needs to be requested in a second step. This causes network overhead and increases the system delay until successful decoding is achieved due to the multiple RoD-requests. If on the other hand too much RoD-Data is transferred to the terminal, the system efficiency is reduced, since data is transmitted via the broadband connection in vain.

The proposed system uses the Mutual Information (MI) as metric for the estimation of the required RoD amount in the individual receiver. In general Mutual Information is especially suited for determining the required amount of RoD data, since it is independent from the channel characteristics and the modulation order of the QAM constellation, but only depends on the FEC code. If the code rate of the FEC is e.g. 0.5, decoding is successful if the Mutual Information exceeds the value of 0.5.

Naturally operating at the maximum channel capacity (Shannon capacity) is not possible with practical FEC codes. For instance the DVB-T2 64K LDPC code with a code rate ½ requires a Mutual Information of 0.55 for successful decoding. Some code specific small margin needs therefore to be added. This margin fortunately does almost not depend on the modulation order and the channel characteristics. The required Mutual Information for the utilized FEC codes can be stored in a table in the RoD server or the terminal, such that the required mutual information that needs to be transmitted via RoD can be calculated in the terminal or the RoD server.

The Mutual Information is determined based on the Log-Likelihood-Ratios (LLR) at the output of the QAM-demapper and is a good measure if the following FEC is able to successfully decode the FEC codeword. The Mutual Information of a single Bit based on its LLR value is defined as If transmitted bit=1: $MI = 1 - \log_2(1 + e^{-inputLLR})$ If transmitted bit=0: $MI = 1 - \log_2(1 + e^{+inputLLR})$ The Mutual Information is typically averaged over one FEC Block, to decide if successful decoding is possible. However, the knowledge of the transmitted bit is required for the calculation, which is not available in a receiver. To avoid the need for the reference data for the calculation of the Mutual Information, the formula is weighted by the linear probability that a 1 or a 0 is transmitted, respectively. The linear probability that a 1 is transmitted is calculated from its LLR value by $$p = \frac{1}{1 + e^{-inputLLR}}.$$

After weighting the initial MI formula with the probability p and 1−p, respectively, the following formulas are resulting:

$MI_1 = 1 - p^* \log_2(1 + e^{-inputLLR})$ $MI_0 = 1 - (1-p)^* \log_2(1 + e^{+inputLLR})$ The estimated Mutual Information without reference is then resulting from their sum $MI_{estimated} = MI_1 + MI_0 = 1 - p^* \log_2(1 + e^{-inputLLR}) + 1 - (1-p)^* \log_2(1 + e^{+inputLLR})$ The Mutual Information estimation is proven to be very accurate compared to its ideal values for different channel models and modulation sizes. It is observed that estimated Mutual Information exactly corresponds to the ideal Mutual Information.

There are different possibilities for the format of RoD data. One possibility is the re-transmission of complete packets, similar to ARQ known from bidirectional systems. Possible convergence levels are e.g. IP-Packets, FEC Frames or Generic Stream Encapsulation (GSE) Packets for DVB-Systems. This possibility is most simple, however not most bit efficient. The approach requires a unique packet identifier.

Another possibility is based on bit values. For instance, random bits, e.g. spread across the FEC codeword, or the least significant bits (LSB) of the QAM constellations can be used, as redundancy data. The receiver demodulates the QAM constellations, but uses the LSBs from the broadband network instead of the ones from the terrestrial broadcast network, because the LSBs typically carry the lowest amount of information within the QAM symbol.

Figure 31:
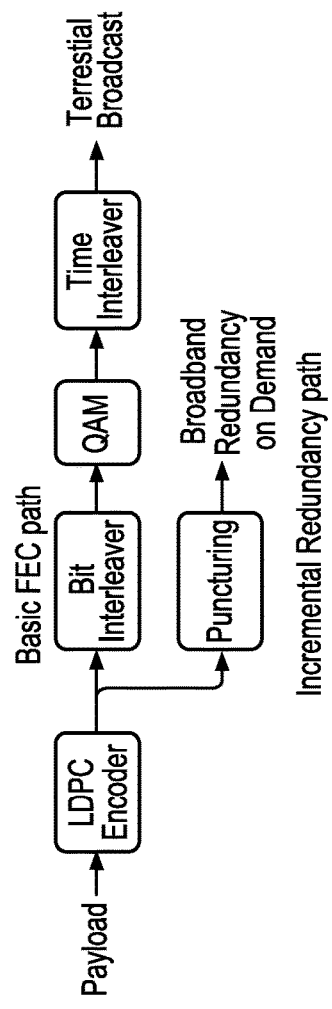
FIG. 31 shows a diagram illustrating Redundancy on Demand based on Incremental Redundancy.

Still another possibility is incremental redundancy (IR): IR extends an existing FEC generator matrix without altering the original part of the matrix. This allows for an extension of the original FEC codeword with an additional parity block, without altering the remaining part of the codeword. A block diagram of a RoD transmission system based on IR is depicted in FIG. 31 using an LDPC code as FEC code. The basic FEC path of the LDPC encoder output is transmitted as usual by means of a digital terrestrial broadcast network, whereas the IR part with the parities supporting terrestrial reception are transmitted on demand via broadband. To allow for a flexible adjustment of the amount of transmitted parity bits, puncturing of the IR part is performed.

In summary in an aspect of the present disclosure is a transmitter 2000 is provided as schematically shown in FIG. 46 for transmitting payload data and emergency information using data symbols in a single-carrier or multi-carrier broadcast system. The transmitter 2000 comprises a modulator 2010 configured to modulate one or more transmission symbols with signaling data for use in detecting and recovering the payload data at a receiver and to modulate one or more transmission symbols with the payload data. An emergency information receiver 2020 receives emergency information carrying information of an actual emergency. An emergency information embedder 2030 embeds emergency information into one or more transmission symbols, wherein the emergency information is embedded within a predetermined time period after its reception by using a resource used for carrying signaling data and/or payload data if no emergency information shall be transmitted. A transmission unit 2040 transmits the transmission symbols.

In another aspect of the present disclosure the transmitter 2000 is configured for transmitting payload data and emergency information using data symbols in a multi-carrier broadcast system and comprises a modulator 2010 that modulates one or more transmission symbols with signaling data for use in detecting and recovering the payload data at a receiver and to modulate one or more transmission symbols with the payload data. The emergency information receiver 2020 is configured to receive emergency information carrying information of an actual emergency. The emergency information embedder 2030 is configured to embed emergency information into one or more transmission symbols modulated with payload data, wherein the emergency information is embedded within a predetermined time period after its reception by providing a number of additional subcarriers carrying said emergency information, said subcarriers being provided at an edge of the spectrum used for transmission and/or spread across the subcarriers carrying the payload data. The transmission unit 2040 finally transmits the transmission symbols.

In still another aspect of the present disclosure a receiver 3000 is provided as schematically shown in FIG. 47 for detecting and recovering payload data and emergency information from a received signal that has been transmitted using data symbols in a single-carrier or multi-carrier broadcast system. The receiver 3000 comprises a detector 3010 that detects the received signal, the received signal comprising the payload data and signaling data for use in detecting and recovering the payload data, the signaling data being carried by one or more transmission symbols and the payload data being carried by one or more transmission symbols, wherein emergency information carrying information of an actual emergency is embedded into one or more transmission symbols. An emergency information detector 3020 detects and recovers the emergency information from the one or more transmission symbols. A demodulator 3030 recovers the signaling data from the one or more transmission symbol for recovering the payload data from the one or more transmission symbols. An emergency information output 3040 outputs the emergency information and/or predetermined emergency output information provided for being output in case of the detection of emergency information.

According to a preferred embodiment the present disclosure is applied in an Orthogonal Frequency Division Multiplexed, OFDM, based broadcast system or in another multicarrier broadcast system. However, in alternative embodiments the present disclosure is applied in single carrier transmission systems and/or transmission systems that do not make use of a framing structure.

Still further, in an embodiment the proposed EWS signaling concept that enables a very fast signaling of an emergency event can be used include a link to basic and existing EWS signaling systems that provide more detailed emergency information with some latency. For instance the quickly transmitted, decoded and output EWS signaling data may include location information where and when the receiver can find such more detailed emergency information (e.g. by use of an already existing EWS signaling concept).

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

The following numbered clauses provide a first set of further example aspects and features of the present technique:

1. A transmitter for transmitting payload data using Orthogonal Frequency Division Multiplexed (OFDM) symbols, the transmitter comprising a frame builder configured to receive the payload data to be transmitted and to receive first signaling data for use in detecting and recovering the payload data at a receiver, and to form the payload data with the first signaling data into frames for transmission, a modulator configured to modulate a first OFDM symbol with the first signaling data and to modulate one or more second OFDM symbols with the payload data, a signature sequence processor for generating a signature sequence, a combiner for combining the generated signature sequence with the first OFDM symbol, and a transmission unit for transmitting the first and second OFDM symbols, wherein the signature sequence provided by the signature sequence processor is selected from one of a set of signature sequences, the signature sequence being combined by the combiner with the first OFDM symbol, so that a receiver can detect and recover the first signaling data from the first OFDM symbol and the signature sequences of the set provide message information to the receiver.

2. A transmitter according to clause 1, wherein the signature sequence processor comprises a signature sequence generator for generating the selected signature sequence from the set of the signature sequences and a sequence controller for selecting the signature sequence to be generated, wherein a first of the signature sequences is selected so that the first OFDM symbol can be detected and the first signaling data recovered before the one or more second OFDM symbols, and one or more other signature sequences of the set are selected to represent a different message.

3. A transmitter according to clause 1 or 2, wherein the first OFDM symbol is a first type having a different number of sub-carriers than the one or more second OFDM symbols of a second type.

4. A transmitter according to clause 2 or 3, wherein the signature sequence processor is configured to provide either the first synchronization sequence for a receiver to use in detecting the first OFDM symbol before the one or more second OFDM symbols or to provide one of the other signature sequences from the set for detecting the first OFDM symbol and indicating a message to the receiver as one of a plurality of signature sequences, each sequence representing a difference message.

5. A transmitter according to clause 4, wherein the first synchronization sequence and the each of the other message sequences each comprises a set of complex coefficients that are combined with the first OFDM symbol by adding each of the complex coefficients with a corresponding sample of the first OFDM symbol in the time domain.

6. A transmitter according to any of clauses 1 to 5, wherein the set of complex coefficients are based on a sequence generated using at least a first pseudo-random binary sequence generator configured to generate a real component of the complex coefficients, and at least a second pseudo-random binary sequence generator separately configured to generate the imaginary component of the complex coefficients.

7. A transmitter according to clause 6, wherein each pseudo-random binary sequence generator is formed from an M-sequence or Gold code sequence generator.

8. A transmitter according to clause 5 where in the set of complex coefficients of the signature sequences is generated using a constant amplitude zero autocorrelation sequence generator.
9. A transmitter according to any of clauses 1 to 8, wherein the information includes user level information such as a publicly broadcast early warning or the like/10.
10. A method of transmitting payload data using Orthogonal Frequency Division Multiplexed (OFDM) symbols, the method comprising
receiving the payload data to be transmitted,
receiving first signaling data for use in detecting and recovering the payload data to be transmitted at a receiver,
forming the payload data with the first signaling data into frames for transmission,
modulating a first OFDM symbol with the first signaling data,
modulating one or more second OFDM symbols with the payload data,
providing a signature sequence,
combining the signature sequence with the first OFDM symbol, and
transmitting the first and second OFDM symbols, wherein the providing the signature sequence comprises selecting the signature sequence from one of a set of signature sequences, the selected signature sequence being combined with the first OFDM symbol, so that a receiver can detect and recover the first signaling data from the first OFDM symbol and the signature sequence selected from the set of signature sequences represents message information to the receiver.
11. A method according to clause 10, wherein the providing the signature sequence includes selecting the signature sequence from the set to be generated, and
generating the selected signature sequence from the set of the signature sequences, wherein a first of the signature sequences is selected so that the first OFDM symbol can be detected and the first signaling data recovered before the one or more second OFDM symbols, and one or more other signature sequences of the set are selected to represent different message information.
12. A method according to clause 10 or 11, wherein the first OFDM symbol is a first type having a different number of sub-carriers than the one or more second OFDM symbols of a second type.
13. A method according to any of clauses 11 to 13, wherein the providing the synchronization sequence includes
providing either the first synchronization sequence for a receiver to use in detecting the first OFDM symbol before the one or more second OFDM symbols, or
providing one of the other signature sequences from the set for detecting the first OFDM symbol and indicating a message to the receiver as one of a plurality of signature sequences, each sequence representing a difference message.
14. A method according to any of clauses 10 to 13, wherein the first synchronization sequence and each of the message sequences comprise a set of complex coefficients and the signature sequence is combined with the first OFDM symbol by adding each of the complex coefficients with a corresponding one of the samples of the first OFDM symbol in the time domain.
15. A method according to any of clauses 10 to 14, wherein the set of complex coefficients are based on a sequence generated using at least a first pseudo-random binary sequence generator configured to generate a real component of the complex coefficients, and at least a second pseudo-random binary sequence generator separately configured to generate the imaginary component of the complex coefficients.
16. A method according to clause 16, wherein each pseudo-random binary sequence generator is formed from an M-sequence or Gold code sequence generator.
17. A method according to clause 15, wherein the set of complex coefficients of the signature or message sequences is generated using a constant amplitude zero autocorrelation sequence generator.
18. A method according to any of clauses 10 to 17, wherein the information includes user level information such as a publicly broadcast emergency warning or the like.
19. A receiver for detecting and recovering payload data from a received signal, the receiver comprising a detector for detecting the received signal, the received signal comprising the payload data with first signaling data for use in detecting and recovering the payload data, the first signaling data being carried by a first Orthogonal Frequency Division Multiplexed, OFDM, symbol, and the payload data being carried by one or more second OFDM symbols, and the first OFDM symbol having been combined with a signature sequence,
a synchronization detector comprising a matched filter having an impulse response which has been matched to the signature sequence with the effect that an output of the matched filter generates a signal representing a correlation of the signature sequence with the received signal, and
a demodulator for recovering the first signaling data from the first OFDM symbol for recovering the payload data from the second OFDM symbols, wherein the signature sequence comprises one of a predetermined set of synchronization sequences, which includes a first synchronization sequence one or more second message sequences, the signature sequence having been selected and combined with the first OFMD symbol, the first synchronization sequence being provided for a receiver to detect and to recover the first signaling data from the first OFDM symbol and the one or more second message sequences representing message information to the receiver, and the receiver including
a message detector for detecting and recovering the message information by identifying the second message sequence from amongst the set of second message sequences.
20. A receiver according to clause 19, wherein the message detector includes a second matched filter having an impulse response which has been matched to the differentially encoded designated message sequence, the message detector being configured to detect the presence of the second message sequence from processing the output of the second matched filter thereby decoding the message information.
21. A receiver according to clause 19 or 20, wherein the first OFDM symbol is a first type having a different number of sub-carriers than the one or more second OFDM symbols of a second type.
22. A receiver according to clause 19, 20 or 21, wherein the first synchronization sequence and the second message sequence of the signature sequence each comprise a set of complex coefficients and the signature sequence is combined with the first OFDM symbol by adding each of the complex coefficients with a corresponding one of the samples of the first OFDM symbol in the time domain.
23. A receiver according to any of clauses 19 to 22, wherein the set of complex coefficients of the signature sequence is based on a sequence generated using at least a first pseudo-random binary sequence generator configured to generate a real component of the complex coefficients, and at least a second pseudo-random binary sequence generator separately configured to generate the imaginary component of the complex coefficients.
24. A receiver according to clause 23, wherein each pseudo-random binary sequence generator is formed from an M-sequence or Gold code sequence generator.
25. A receiver according to clause 23, wherein the set of complex coefficients of the signature or message sequences is generated using a constant amplitude zero autocorrelation sequence generator.
26. A receiver according to any of clauses 19 to 25, comprising a power supply and a controller, wherein the controller is configured in combination with the power supply to supply power to the signaling decoder, when the receiver is in a powered off or standby state when power is not supplied to some or all of the remaining parts of the receiver.
27. A method of detecting and recovering payload data from a received signal, the method comprising detecting the received signal, the received signal comprising time divided frames including the payload data with first signaling data for use in detecting and recovering the payload data, the first signaling data being carried by a first Orthogonal Frequency Division Multiplexed, OFDM, symbol, and the payload data being carried by one or more second OFDM symbols, and the first OFDM symbol having been combined with a signature sequence, filtering the received signal with a matched filter having an impulse response which has been matched to the signature sequence with the effect that an output of the matched filter generates a signal representing a correlation of the signature sequence with the received signal, detecting the first OFDM symbol from the output signal of the matched filter, and demodulating the first OFDM symbol to recover the first signaling data from the first OFDM symbol for recovering the payload data from the second OFDM symbol, wherein the signature sequence comprises one of a predetermined set of synchronization sequences, which includes a first synchronization sequence one or more second message sequences, the signature sequence having been selected and combined with the first OFMD symbol, the first synchronization sequence being provided for a receiver to detect and to recover the first signaling data from the first OFDM symbol and the one or more second message sequences representing message information to the receiver, and the method including detecting and recovering the message information by identifying the second message sequence.
28. A method according to clause 27, the method comprising detecting the message information using additional matched filters each having an impulse response which has been matched to each of the set of second message sequences each differentially processed thereby correlating each of the second message sequences with the received first OFDM symbol, and detecting the message information from a highest correlation output from each of the matched filters in correspondence to the sequences in the predetermined set of sequences.
29. A method according to clause 27 or 28, wherein the first OFDM symbol is a first type having a different number of sub-carriers than the one or more second OFDM symbols of a second type.
30. A method according to any of clauses 27 to 29, wherein the first synchronization sequence and the second message sequence of the signature sequence each comprise a set of complex coefficients and the signature sequence having been combined with the first OFDM symbol by adding each of the complex coefficients with a corresponding one of the samples of the first OFDM symbol in the time domain.
31. A method according to any of clauses 27 to 30, wherein the first synchronization sequence and the second message sequence of the signature sequence each comprise a set of complex coefficients and the signature sequence having been combined with the first OFDM symbol by adding each of the complex coefficients with a corresponding one of the samples of the first OFDM symbol in the frequency domain.
32. A method according to clauses 30 or 31, wherein the the first synchronization sequence comprises the set of complex coefficients of the signature sequence generated using at least a first pseudo-random binary sequence generator configured to generate a real component of the complex coefficients, and at least a second pseudo-random binary sequence generator separately configured to generate the imaginary component of the complex coefficients.
33. A method according to clause 32, wherein each pseudo-random binary sequence generator is formed from an M-sequence or Gold code sequence generator.
34. A method according to clause 32, wherein the set of complex coefficients of the signature or message sequences is generated using a constant amplitude zero autocorrelation sequence generator
35. A method according to any of clauses 27 to 34, comprising supplying power to the signaling decoder, when the receiver is in a powered off or standby state when power is not supplied to some or all of the remaining parts of the receiver.

It follows a list of further embodiments of the present disclosure:
1. A transmitter for transmitting payload data and emergency information using data symbols in a single-carrier or multi-carrier broadcast system, the transmitter comprising a modulator configured to modulate one or more transmission symbols with signaling data for use in detecting and recovering the payload data at a receiver and to modulate one or more transmission symbols with the payload data, an emergency information receiver configured to receive emergency information carrying information of an actual emergency, an emergency information embedder configured to embed emergency information into one or more transmission symbols, wherein the emergency information is embedded within a predetermined time period after its reception by using a resource used for carrying signaling data and/or payload data if no emergency information shall be transmitted, and a transmission unit configured to transmit the transmission symbols.

2. The transmitter according to any preceding embodiment,
wherein the emergency information embedder is configured to embed the emergency information into one or more transmission symbols within a predetermined time period of less than 1 sec, in particular less than 500 msec, more particularly less than 100 msec, after its reception.

3. The transmitter according to any preceding embodiment,
wherein the emergency information embedder is configured to replace one or more subcarriers of one or more transmission symbols carrying signaling data or payload data by one or more subcarriers carrying emergency information.

4. The transmitter according to any preceding embodiment,
wherein the emergency information embedder is configured to replace one or more modulation bits, in particular one or more least significant bits or most significant bits, of modulation symbols, in particular QAM symbols, carrying signaling data or payload data by modulation bits carrying emergency information.

5. The transmitter according to any preceding embodiment,
wherein the emergency information embedder comprises a modulation encoder configured to modulation encode the emergency information separate from the signaling data and the payload data, in particular using a higher modulation order for modulation encoding the emergency information, or to increase the modulation order of modulation symbols, in particular QAM symbols, carrying signaling data or payload data and inserting the emergency information into the additional bits of the modulation symbols obtained by increasing their modulation order.

6. The transmitter according to any preceding embodiment,
wherein the emergency information embedder is configured to use one or more reserved subcarriers that are reserved for a predetermined purpose, in particular subcarriers reserved for Peak to Average Power Ratio, PAPR, reduction, for carrying emergency information.

7. The transmitter according to any preceding embodiment,
wherein the emergency information embedder is configured to replace payload data of a predetermined or selected service, in particular a less important service such as video text, an audio channel, a shopping channel, or a channel having a low number of users, by emergency information.

8. The transmitter according to any preceding embodiment,
wherein the emergency information embedder is configured to dynamically extend the allocated capacity of the signaling data and to insert the emergency information into the dynamically extended capacity of the signaling data.

9. The transmitter according to any preceding embodiment,
further comprising a frame builder configured to receive payload data and signaling data to be transmitted, to form the payload data with the signaling data into frames for transmission, and to add embedding information indicating the way and/or location of embedded emergency information into one or more frames, in particular as part of the signaling data included in one or more frames carrying embedded emergency information.

10. The transmitter according to any preceding embodiment,
wherein the way and/or location of embedding emergency information into the one or more transmission symbols is predetermined, wherein the emergency information embedder is configured to use embedding information indicating the predetermined way and/or location for embedding emergency information.

11. The transmitter according to any preceding embodiment,
further comprising an emergency signaling processor configured to provide an emergency indicator indicating that emergency information will be embedded in one or more transmission symbols, and to embed said emergency indicator into the signaling data.

12. The transmitter according to embodiment 11, wherein the emergency signaling processor comprises
a signature sequence processor configured to provide a signature sequence representing said emergency indicator, and
a combiner configured to combine the signature sequence with a transmission symbol carrying signaling data,
wherein the signature sequence provided by the signature sequence processor is selected from one of a set of signature sequences, the signature sequence being combined by the combiner with a transmission symbol, in particular a transmission symbol carrying signaling data so that a receiver can detect and recover the signaling data from the said transmission symbol and the signature sequences of the set provide the emergency indicator to the receiver.

13. A transmitter for transmitting payload data and emergency information using data symbols in a multi-carrier broadcast system, the transmitter comprising
a modulator configured to modulate one or more transmission symbols with signaling data for use in detecting and recovering the payload data at a receiver and to modulate one or more transmission symbols with the payload data,
an emergency information receiver configured to receive emergency information carrying information of an actual emergency,
an emergency information embedder configured to embed emergency information into one or more transmission symbols modulated with payload data, wherein the emergency information is embedded within a predetermined time period after its reception by providing a number of additional subcarriers carrying said emergency information, said subcarriers being provided at an edge of the spectrum used for transmission and/or spread across the subcarriers carrying the payload data, and
a transmission unit configured to transmit the transmission symbols.

14. A transmission method for transmitting payload data and emergency information using data symbols in a single-carrier or multi-carrier broadcast system, the transmission method comprising modulating one or more transmission symbols with signaling data for use in detecting and recovering the payload data at a receiver, modulating one or more transmission symbols with the payload data, receiving emergency information carrying information of an actual emergency, embedding emergency information into one or more transmission symbols, wherein the emergency information is embedded within a predetermined time period after its reception by using a resource used for carrying signaling data and/or payload data if no emergency information shall be transmitted, and transmitting the transmission symbols.

15. A receiver for detecting and recovering payload data and emergency information from a received signal that has been transmitted using data symbols in a single-carrier or multi-carrier broadcast system, the receiver comprising a detector configured to detect the received signal, the received signal comprising the payload data and signaling data for use in detecting and recovering the payload data, the signaling data being carried by one or more transmission symbols and the payload data being carried by one or more transmission symbols, wherein emergency information carrying information of an actual emergency is embedded into one or more transmission symbols, an emergency information detector configured to detect and recover the emergency information from the one or more transmission symbols, a demodulator configured to recover the signaling data from the one or more transmission symbol for recovering the payload data from the one or more transmission symbols, and an emergency information output configured to output the emergency information and/or predetermined emergency output information provided for being output in case of the detection of emergency information.

16. The receiver according to embodiment in embodiment 15, further comprising an emergency information evaluator configured to evaluate the detected emergency information if the actual emergency is relevant for the user of said receiver, wherein the emergency information output is configured to output the emergency information and/or the predetermined emergency output information only if the actual emergency has been found relevant for the user.

17. The receiver according to embodiment 15 or 16, further comprising an emergency signaling detector configured to detect an emergency indicator from the signaling data, said emergency indicator indicating that emergency information will be embedded one or more transmission symbols of at least the same and/or one or more of the subsequent frames, wherein the emergency information output is configured to output the emergency information and/or the predetermined emergency output information only if the emergency indicator and the emergency information have been detected.

18. The receiver according to embodiment 17, wherein the emergency signaling detector comprises a synchronization detector comprising a matched filter having an impulse response which has been matched to a differentially encoded signature sequence representing said emergency indicator with the effect that an output of the matched filter generates a signal representing a correlation of the differentially encoded signature sequence with the differentially encoded received signal, wherein the signature sequence comprises one of a set of signature sequences, the signature sequence being combined with the transmission symbol carrying the emergency indicator, so that the receiver can detect and recover the signaling data from the one or more transmission symbol and the signature sequences of the set provide the emergency indicator to the receiver, and an information detector configured to detect and recover the emergency information by identifying the signature sequence from amongst the set of signature sequences.

19. A receiving method for detecting and recovering payload data and emergency information from a received signal that has been transmitted using data symbols in a single-carrier or multi-carrier broadcast system, the receiving method comprising detecting the received signal, the received signal comprising the payload data and signaling data for use in detecting and recovering the payload data, the signaling data being carried by one or more transmission symbols and the payload data being carried by one or more transmission symbols, wherein emergency information carrying information of an actual emergency is embedded into one or more transmission symbols, detecting and recovering the emergency information from the one or more transmission symbols, recovering the signaling data from the one or more transmission symbol for recovering the payload data from the one or more transmission symbols, and outputting the emergency information and/or predetermined emergency output information provided for being output in case of the detection of emergency information.

20. A transmitter for transmitting payload data and emergency information using data symbols in a multi-carrier broadcast system, the transmitter comprising a modulator configured to modulate one or more transmission symbols with signaling data for use in detecting and recovering the payload data at a receiver and to modulate one or more transmission symbols with the payload data, an emergency information receiver configured to receive emergency information carrying information of an actual emergency, an emergency information embedder configured to embed emergency information into one or more transmission symbols modulated with payload data, wherein the emergency information is embedded within a predetermined time period after its reception by providing a number of additional subcarriers carrying said emergency information, said subcarriers being provided at an edge of the spectrum used for transmission and/or spread across the subcarriers carrying the payload data, and a transmission unit configured to transmit the transmission symbols.

21. A non-transitory computer-readable recording medium that stores therein a computer program product, which, when executed by a processor, causes the method according to embodiment 14, 19 or 20 to be performed.

22. A computer program comprising program code means for causing a computer to perform the steps of said method according to embodiment 14, 19 or 20 when said computer program is carried out on a computer.

The invention claimed is:

1. A receiver for detecting and recovering payload data and emergency information from a received signal that has been transmitted using data symbols in a single-carrier or multi-carrier broadcast system, the receiver comprising:
   circuitry configured to
      detect the received signal, the received signal comprising one or more frames, each frame having a frame signaling portion followed by a frame payload portion, the frame payload portion including the payload data and the frame signaling portion including signaling data for use in detecting and recovering the payload data, wherein an emergency state indicator comprising a first constant amplitude zero autocorrelation (CAZAC) sequence is included in the signaling data and emergency information carrying information of an emergency is included in the signaling data or the payload data; and
      detect and recover the emergency information from the signaling data or the payload data based on the first CAZAC sequence, wherein, in response to a determination that the emergency state indicator comprises the first CAZAC sequence, an emergency state is detected, and, in response to a determination that the emergency state indicator comprises a second CAZAC sequence, a non-emergency state is detected;
   a demodulator configured to recover the signaling data and the payload data; and
   emergency information output circuitry configured to output the emergency information in case of the detection of the emergency information.

2. The receiver as claimed in claim 1,
   wherein the circuitry is further configured to evaluate the detected emergency information if the emergency is relevant for a user of the receiver,
   wherein the emergency information output circuitry is configured to output the emergency information only if the emergency has been found relevant for the user.

3. The receiver as claimed in claim 1,
   wherein the circuitry is further configured to detect the emergency state indicator from the signaling data, the emergency state indicator indicating that the emergency information is embedded in one or more subsequent transmission symbols,
   wherein the emergency information output circuitry is configured to output the emergency information only if the emergency state indicator and the emergency information have been detected.

4. The receiver as claimed in claim 3, wherein the circuitry comprises:
   a matched filter having an impulse response which has been matched to a differentially encoded signature sequence representing the emergency state indicator such that an output of the matched filter generates a signal representing a correlation of the differentially encoded signature sequence with the received signal which is differentially encoded, wherein the signature sequence comprises one of a set of signature sequences, the signature sequence being combined with one or more transmission symbols carrying the emergency state indicator, so that the receiver can detect and recover the signaling data from the one or more transmission symbols and the signature sequences of the set provide the emergency state indicator to the receiver; and
   the circuitry is further configured to detect and recover the emergency information by identifying the signature sequence from amongst the set of signature sequences.

5. The receiver as claimed in claim 1, wherein the emergency information is decoded from resources associated with signaling and/or payload data.

6. The receiver as claimed in claim 1, wherein the first CAZAC sequence and the second CAZAC sequence are selected from a plurality of CAZAC sequences.

7. The receiver as claimed in claim 6, wherein
   each of the plurality of CAZAC sequences corresponds to a different message that is associated in the receiver with the respective CAZAC sequence, such that detection of the selected CAZAC sequence indicates to the receiver the message associated with the selected CAZAC sequence.

8. The receiver as claimed in claim 1, wherein the first CAZAC sequence is used in the receiver for frame synchronization.

9. The receiver as claimed in claim 7, wherein one of the plurality of CAZAC sequences is associated with an early warning of a possible emergency situation.

10. The receiver as claimed in claim 1, wherein the frame signaling portion is disposed at a head end of each of the one or more frames.

11. A receiving method for detecting and recovering payload data and emergency information from a received signal that has been transmitted using data symbols in a single-carrier or multi-carrier broadcast system, the receiving method comprising:
   detecting the received signal, the received signal comprising one or more frames, each frame having a frame signaling portion followed by a frame payload portion, the frame payload portion including the payload data and the frame signaling portion including signaling data for use in detecting and recovering the payload data, wherein an emergency state indicator comprising a first constant amplitude zero autocorrelation (CAZAC) sequence is included in the signaling data and emergency information carrying information of an emergency is included in the signaling data or the payload data;
   detecting and recovering the emergency information from the signaling data or the payload data based on the first CAZAC sequence, wherein, in response to a determination that the emergency state indicator comprises the first CAZAC sequence, an emergency state is detected, and, in response to a determination that the emergency state indicator comprises a second CAZAC sequence, a non-emergency state is detected;
   recovering the signaling data and the payload data; and
   outputting the emergency information in case of the detection of the emergency information.

12. The method as claimed in claim 11, wherein the emergency information is decoded from resources associated with signaling and/or payload data.

13. The method as claimed in claim 11, wherein the first CAZAC sequence and the second CAZAC sequence are selected from a plurality of CAZAC sequences.

14. The method as claimed in claim 13, wherein
   each of the plurality of CAZAC sequences corresponds to a different message that is associated with the respective CAZAC sequence, such that detection of the selected CAZAC sequence indicates the message associated with the selected CAZAC sequence.

15. The method as claimed in claim 11, wherein the first CAZAC sequence is used for frame synchronization.

16. The method as claimed in claim 14, wherein one of the plurality of CAZAC sequences is associated with an early warning of a possible emergency situation.

17. The method as claimed in claim 11, wherein the frame signaling portion is disposed at a head end of each of the one or more frames.

18. A non-transitory computer-readable recording medium that stores therein a computer program product, which, when executed by a processor, causes the method according to claim 11 to be performed.

* * * * *